(12) United States Patent
Hayakawa

(10) Patent No.: US 8,405,915 B2
(45) Date of Patent: Mar. 26, 2013

(54) ZOOMING OPTICAL SYSTEM, OPTICAL APPARATUS AND ZOOMING OPTICAL SYSTEM MANUFACTURING METHOD

(75) Inventor: Satoshi Hayakawa, Ichikawa (JP)

(73) Assignee: Nikon Corporation, Tokyo (JP)

( * ) Notice: Subject to any disclaimer, the term of this patent is extended or adjusted under 35 U.S.C. 154(b) by 242 days.

(21) Appl. No.: 12/710,745

(22) Filed: Feb. 23, 2010

(65) Prior Publication Data

US 2010/0214667 A1   Aug. 26, 2010

(30) Foreign Application Priority Data

Feb. 26, 2009   (JP) .................................. 2009-043347
Feb. 26, 2009   (JP) .................................. 2009-043348
Feb. 26, 2009   (JP) .................................. 2009-043349
Feb. 26, 2009   (JP) .................................. 2009-043350
Nov. 26, 2009   (JP) .................................. 2009-268887

(51) Int. Cl.
  *G02B 15/14*   (2006.01)
(52) U.S. Cl. ...................................... 359/676; 359/683
(58) Field of Classification Search .................. 359/676, 359/683, 684

See application file for complete search history.

(56) References Cited

U.S. PATENT DOCUMENTS

| | | | |
|---|---|---|---|
| 5,189,557 A * | 2/1993 | Endo .............................. | 359/683 |
| 6,104,544 A * | 8/2000 | Matsuzawa et al. .......... | 359/649 |
| 6,141,156 A | 10/2000 | Aoki | |
| 6,563,643 B2 * | 5/2003 | Hayakawa et al. ........... | 359/557 |
| 7,817,346 B2 * | 10/2010 | Arimoto et al. ............... | 359/687 |
| 7,961,402 B2 * | 6/2011 | Saori ............................. | 359/683 |

FOREIGN PATENT DOCUMENTS

JP   11-258504 A   9/1999
JP   2004-212612 A   7/2004

* cited by examiner

*Primary Examiner* — Mohammed Hasan

(74) *Attorney, Agent, or Firm* — Miles and Stockbridge P.C.

(57) ABSTRACT

The present invention has at least a first lens group G1 to a fifth lens group G5 which are disposed in order from an object. The first lens group G1 has positive refractive power, and is divided into at least two subgroups (front group G1F and rear group G1R in FIG. 1). One of the subgroups is a focusing lens group (rear group G1R in FIG. 1). The subgroup other than the focusing lens group (front group G1F in FIG. 1), out of the subgroups, is fixed, upon focusing from an infinite object point to a close object point.

38 Claims, 106 Drawing Sheets

(EXAMPLE 1)

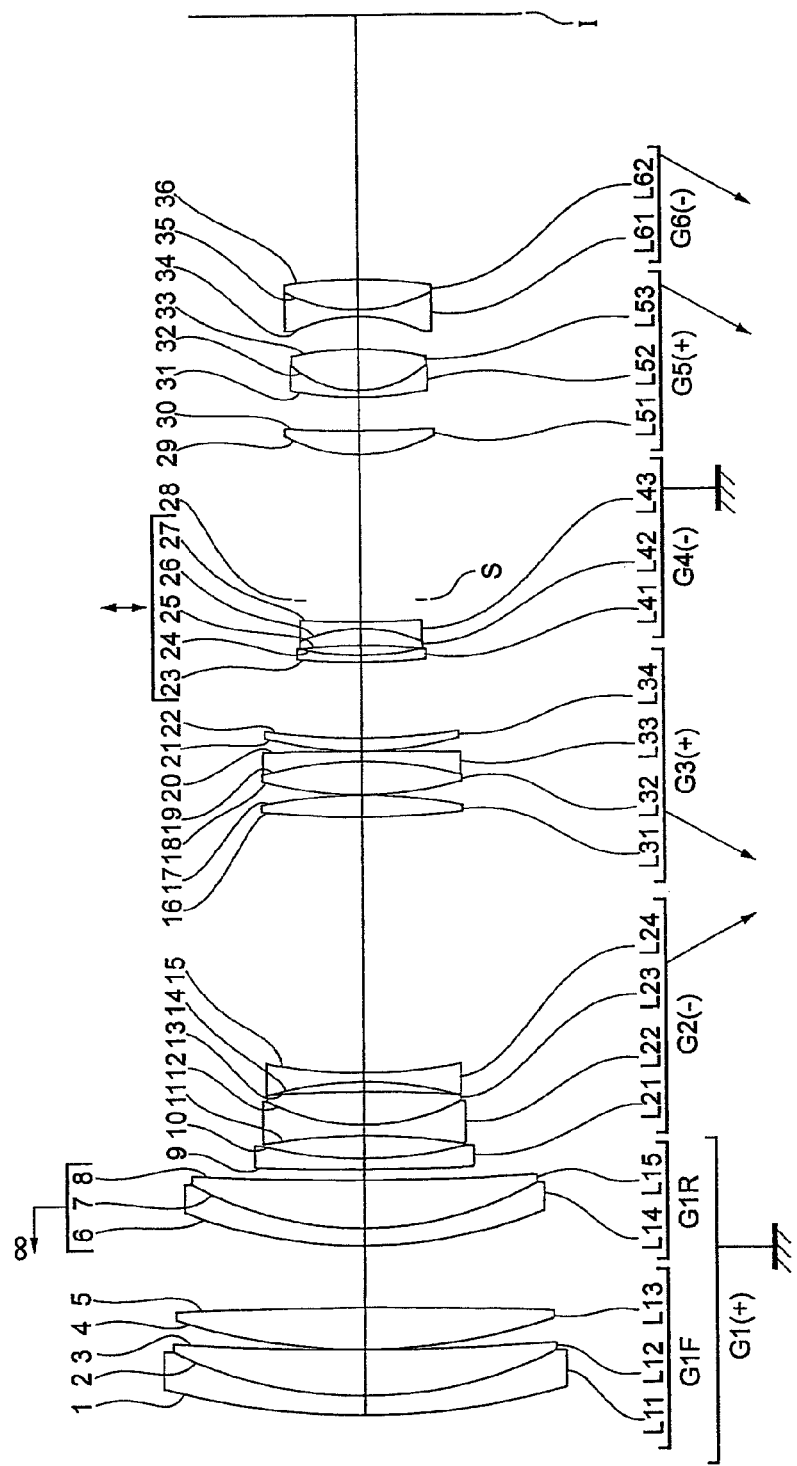

MERIDIONAL
LATERAL ABERRATION

MERIDIONAL
LATERAL ABERRATION

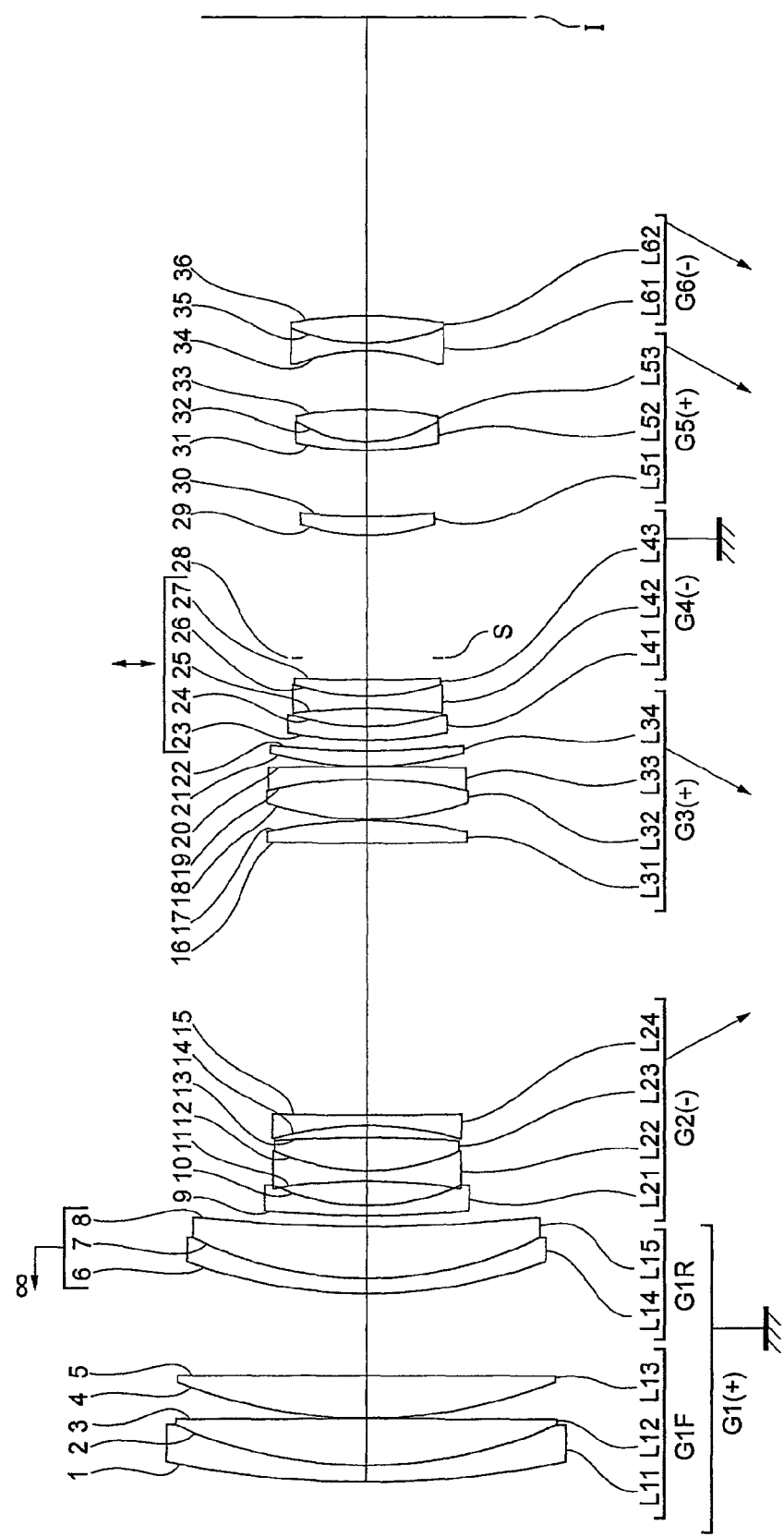

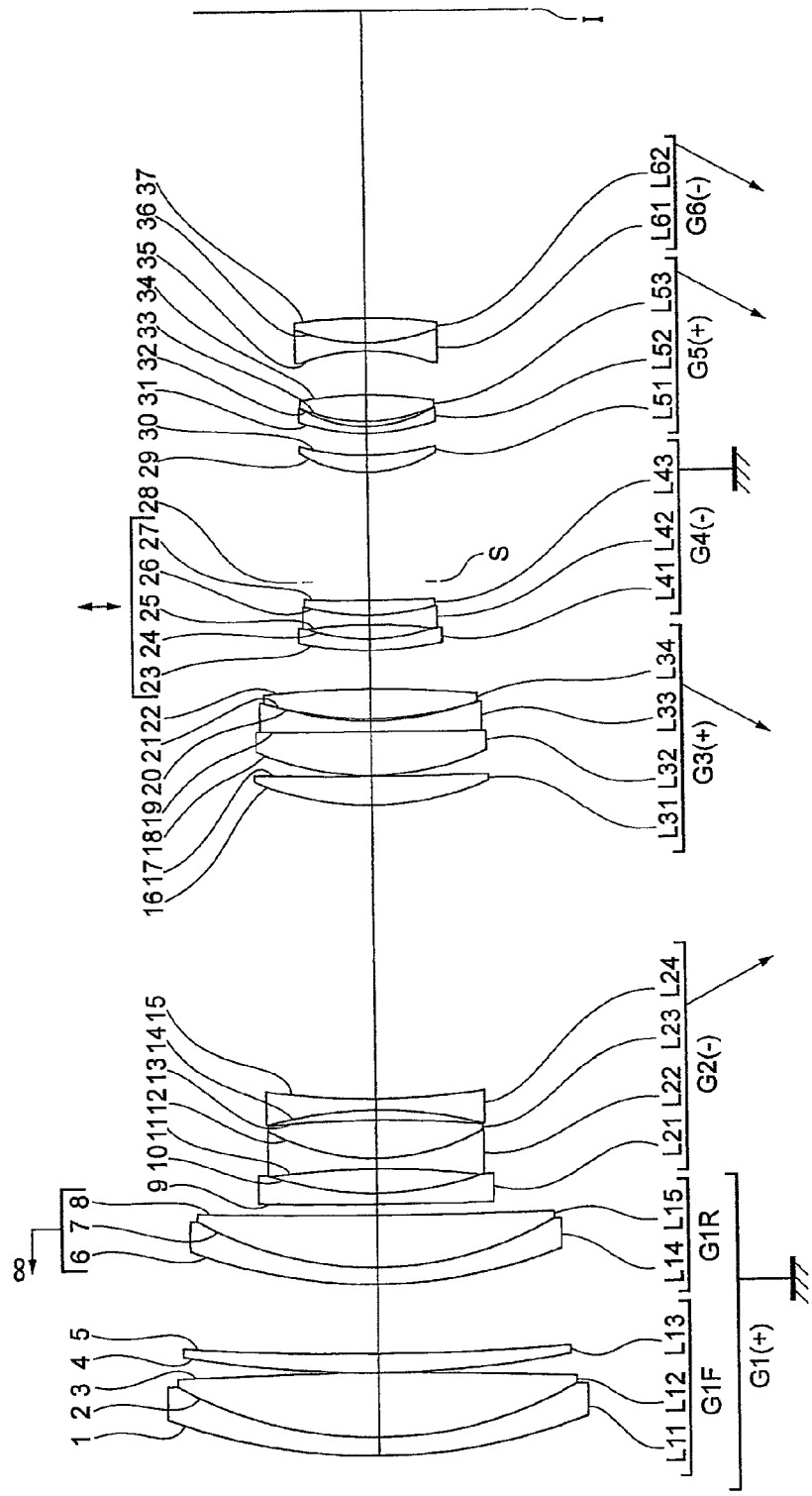

MERIDIONAL
LATERAL ABERRATION

MERIDIONAL
LATERAL ABERRATION

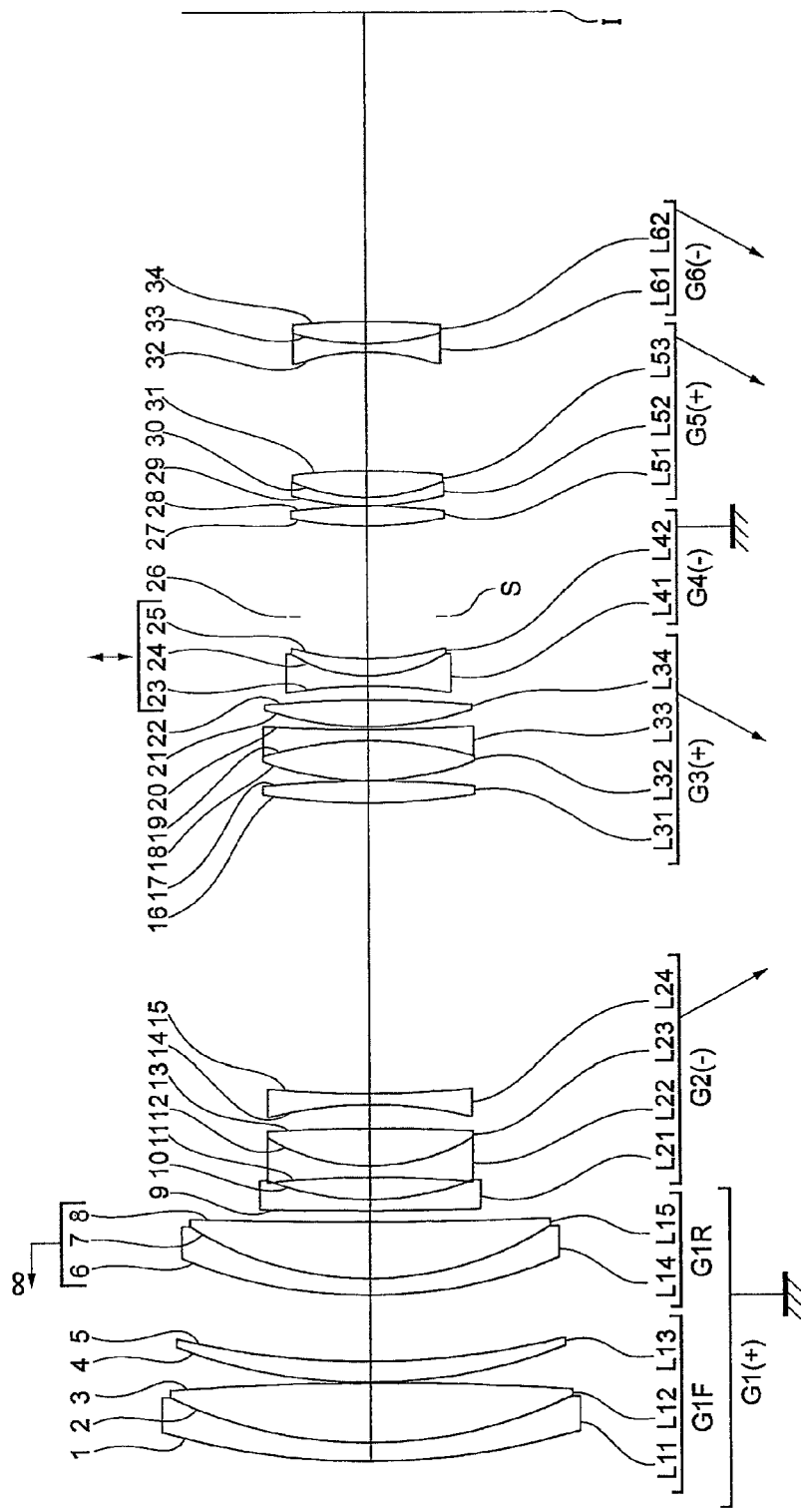
Fig.13 (EXAMPLE 4)

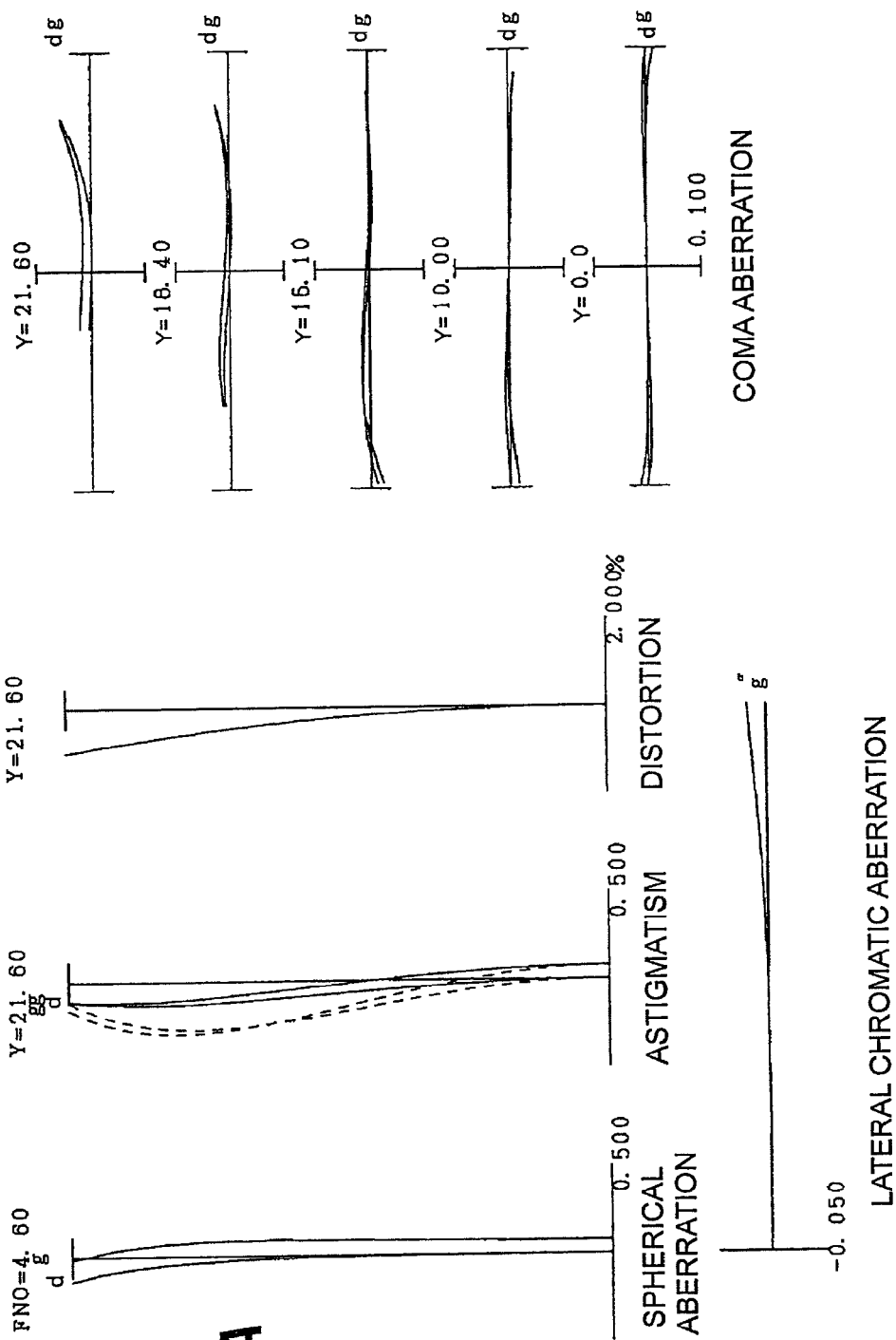

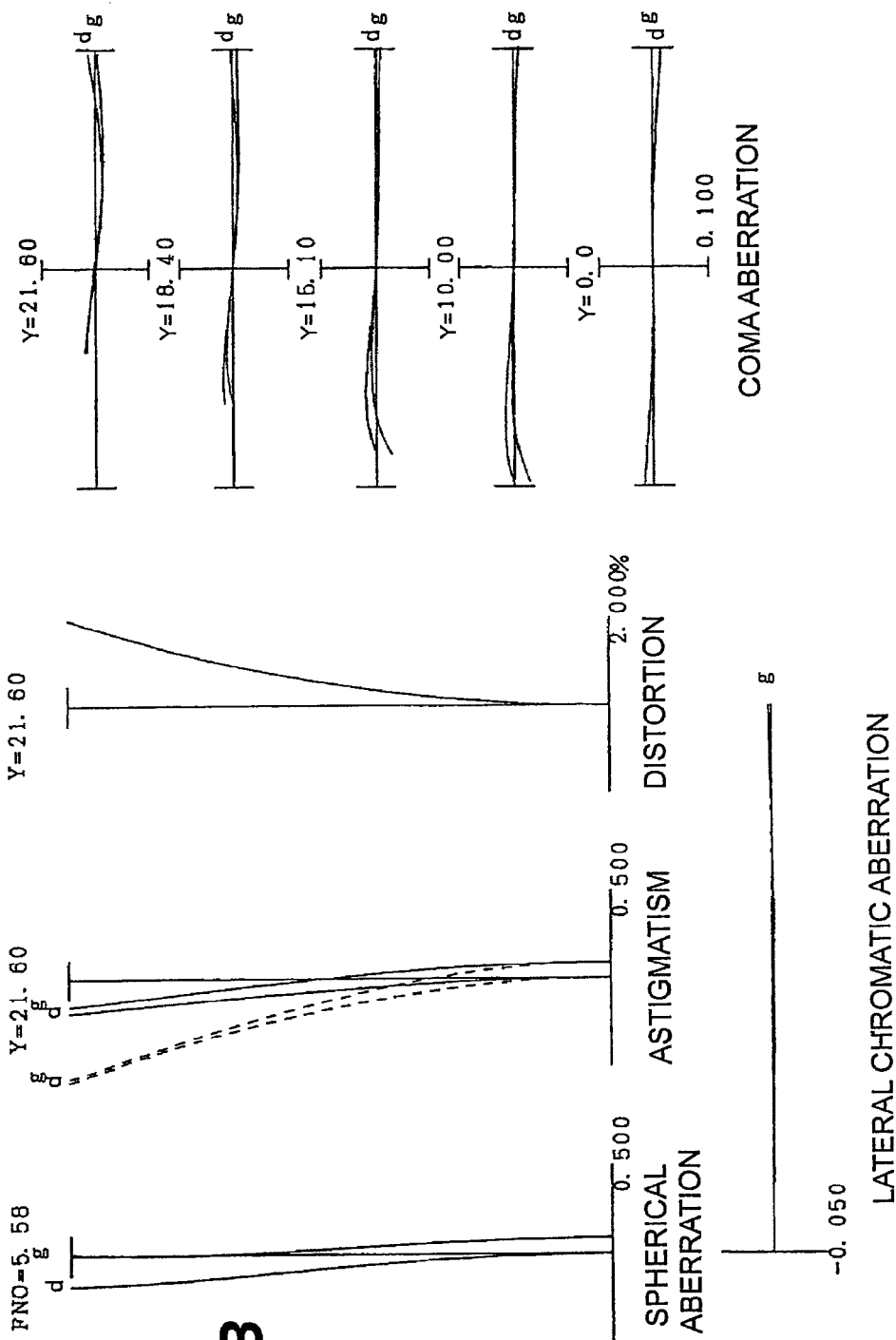

MERIDIONAL LATERAL ABERRATION

MERIDIONAL LATERAL ABERRATION

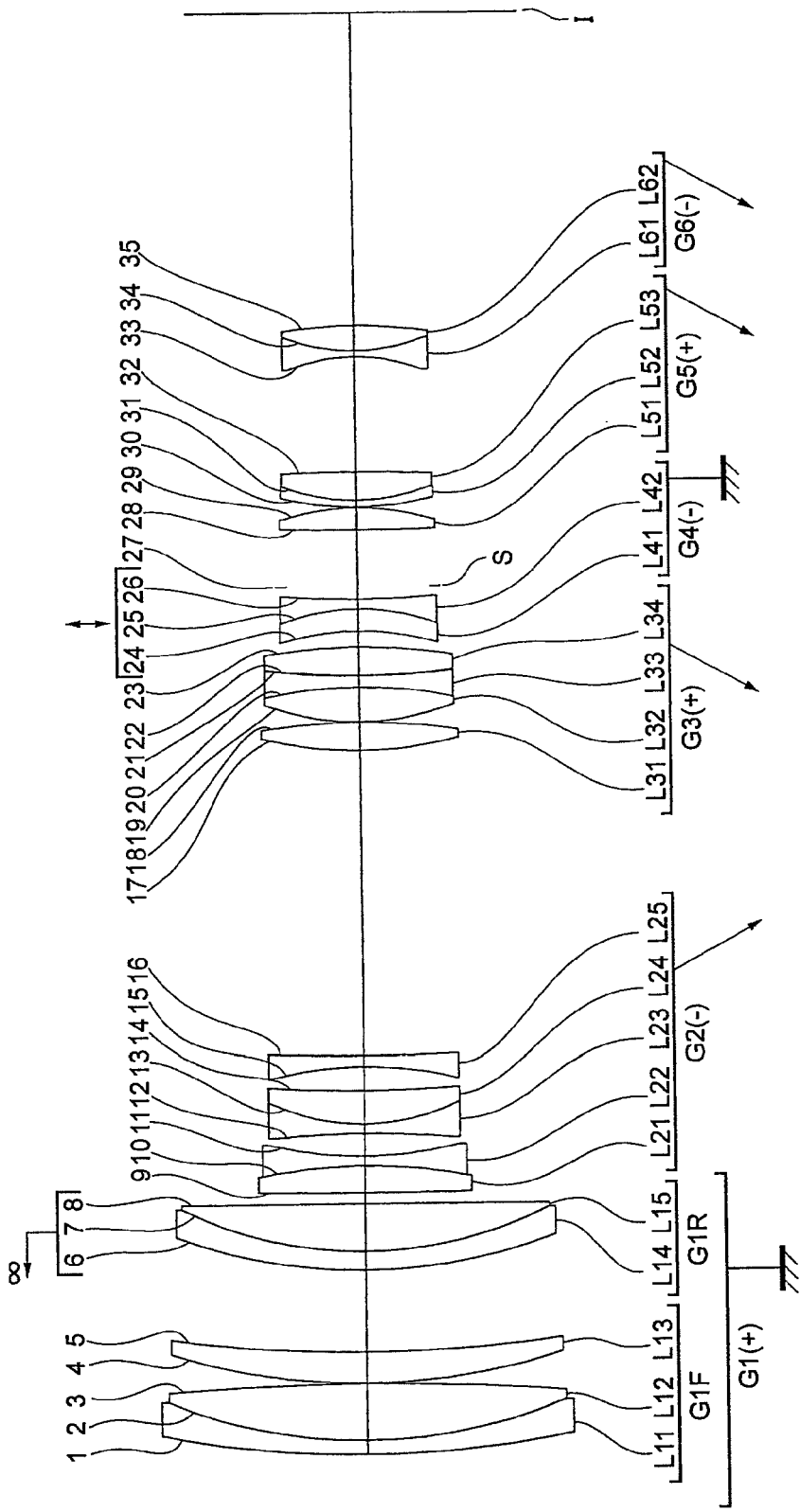
Fig. 17 (EXAMPLE 5)

(EXAMPLE 6)

MERIDIONAL LATERAL ABERRATION

MERIDIONAL LATERAL ABERRATION

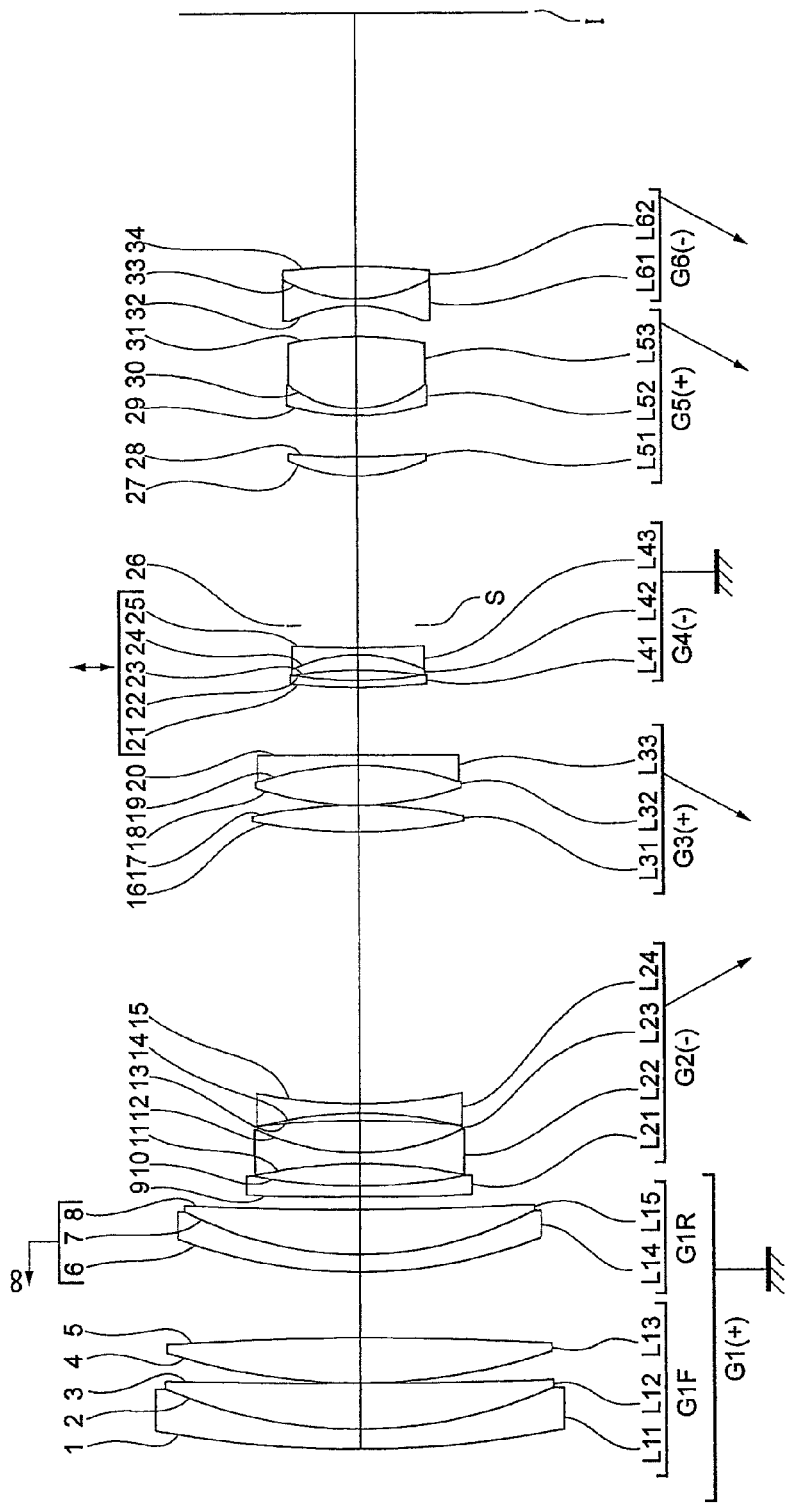
Fig. 25 (EXAMPLE 7)

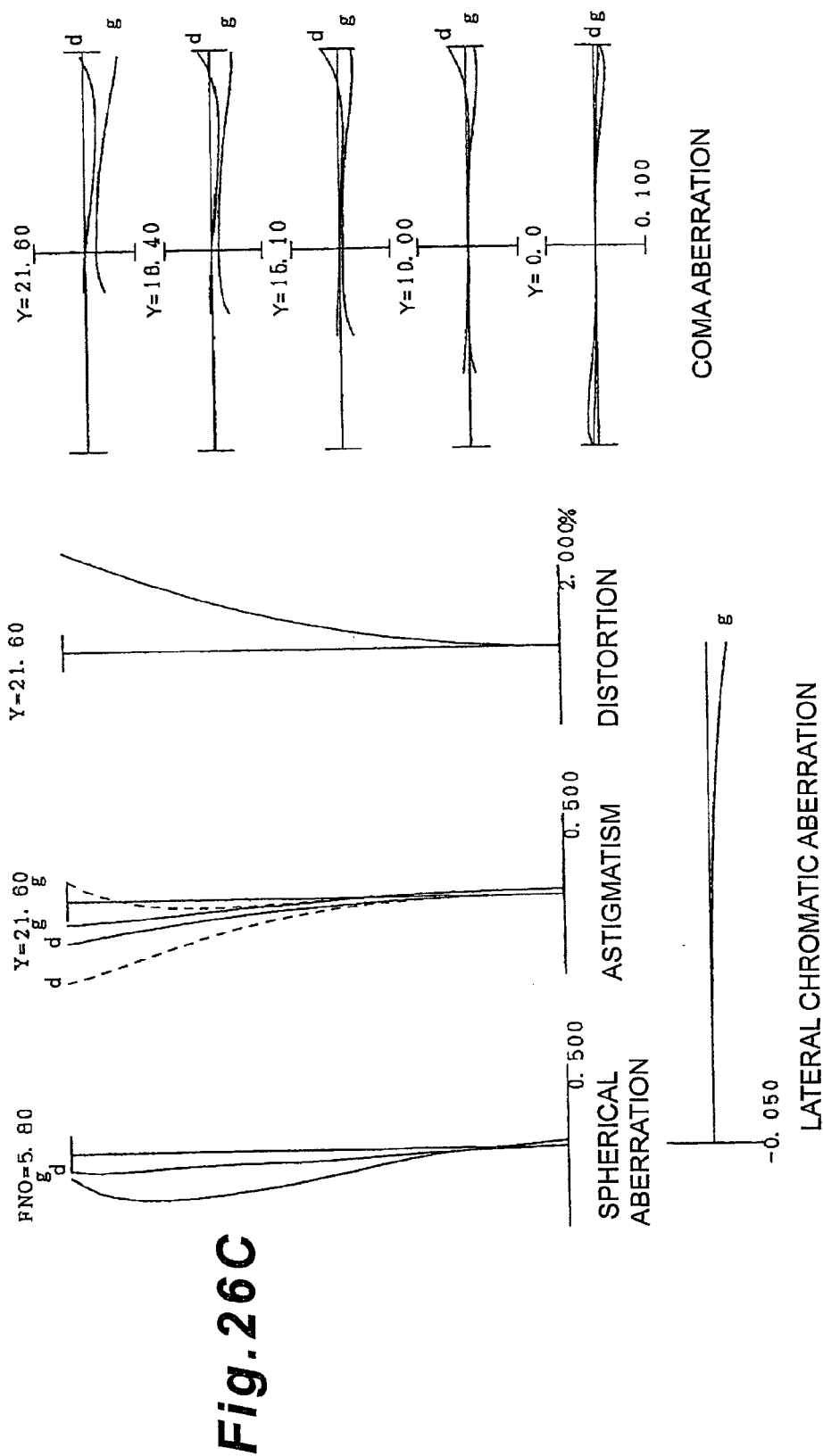

MERIDIONAL LATERAL ABERRATION

MERIDIONAL LATERAL ABERRATION

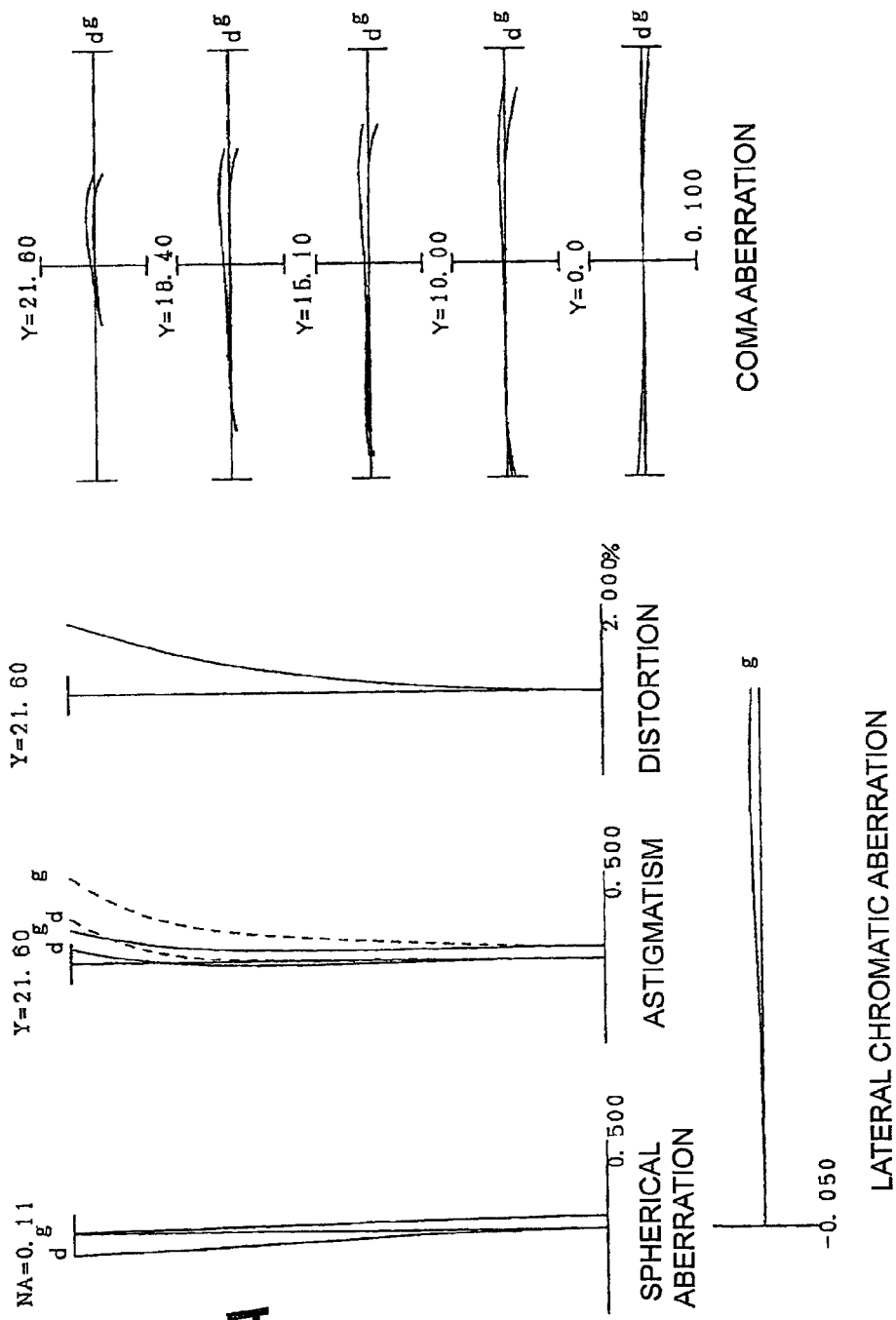

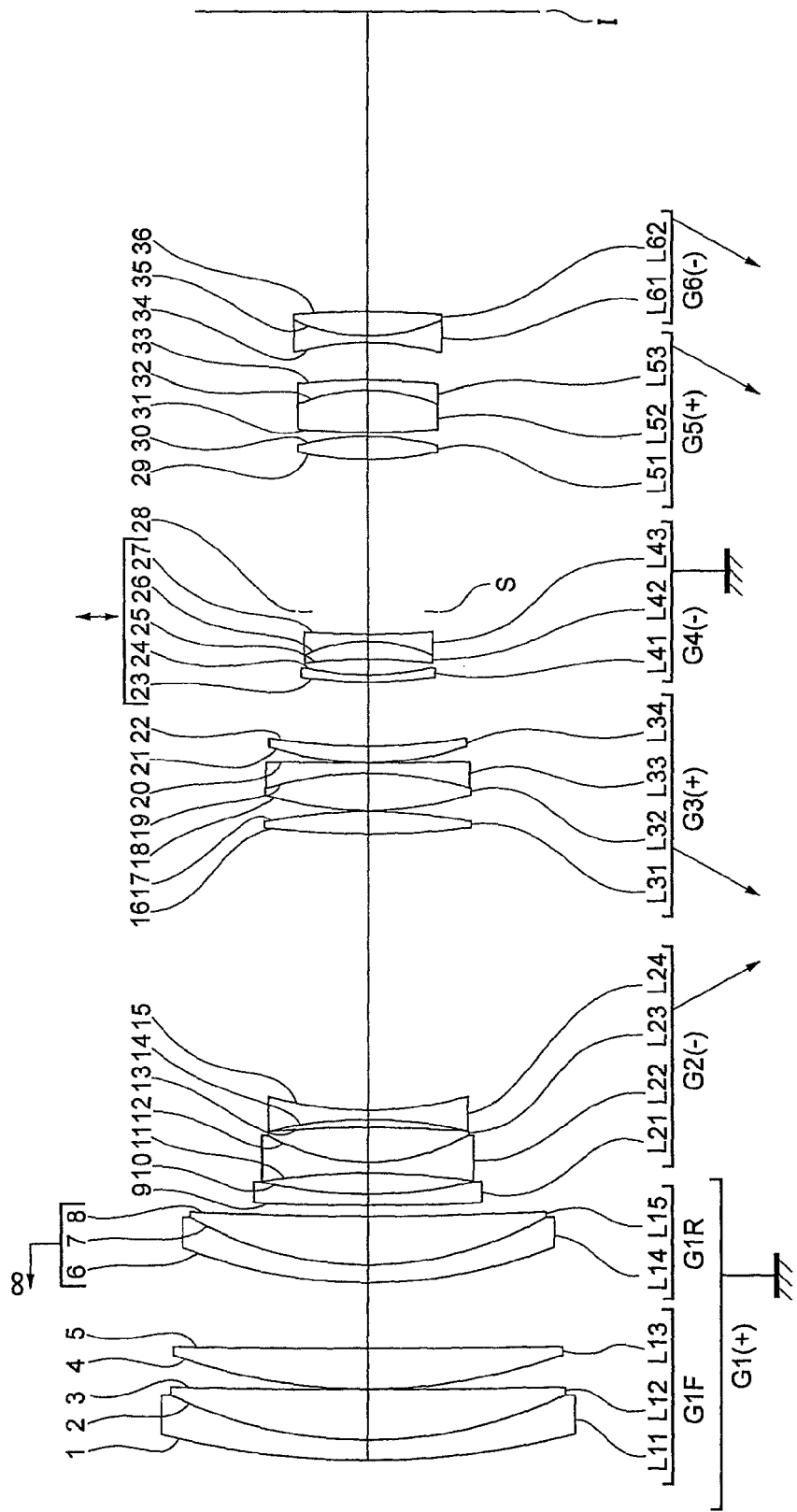

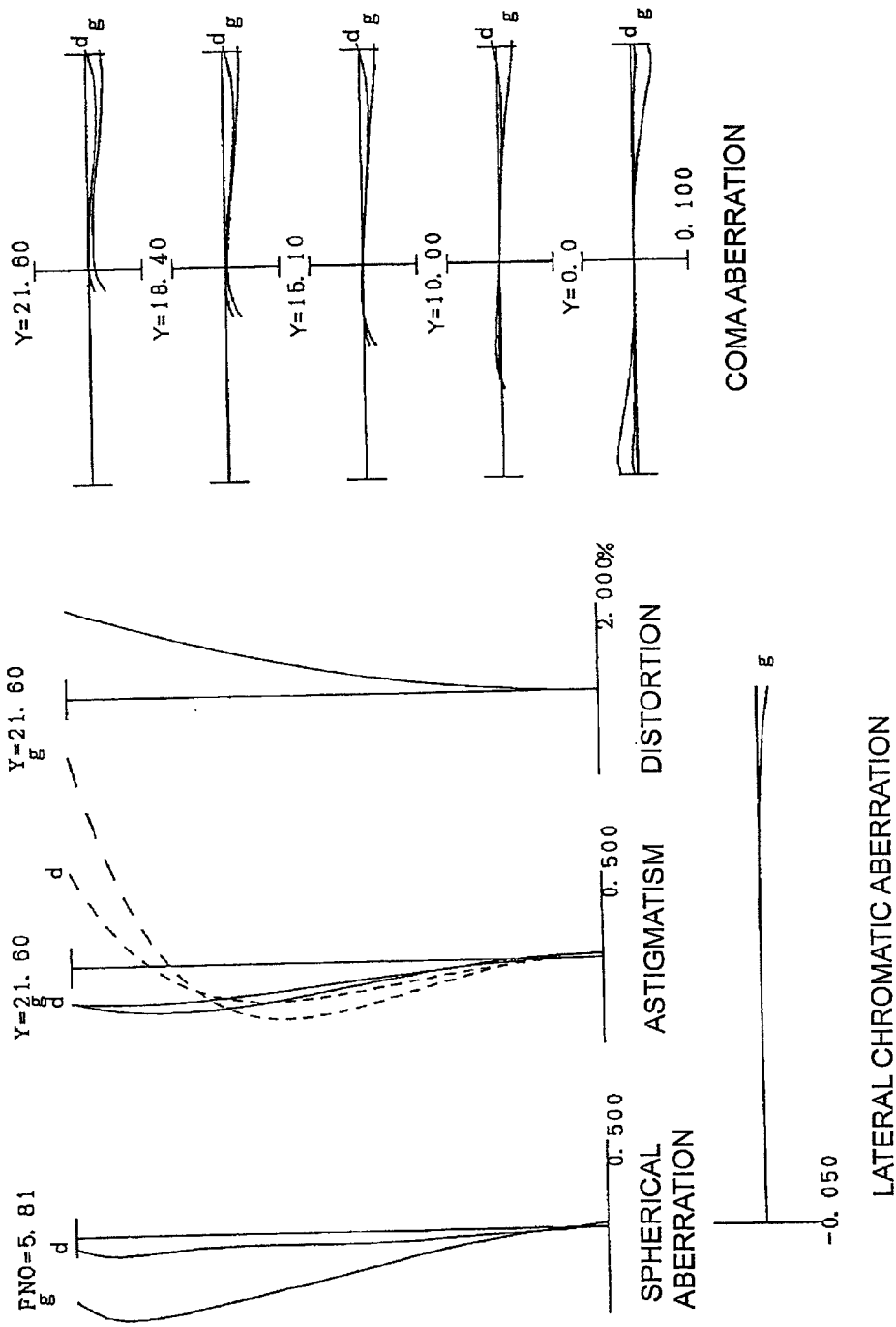

MERIDIONAL LATERAL ABERRATION

MERIDIONAL LATERAL ABERRATION

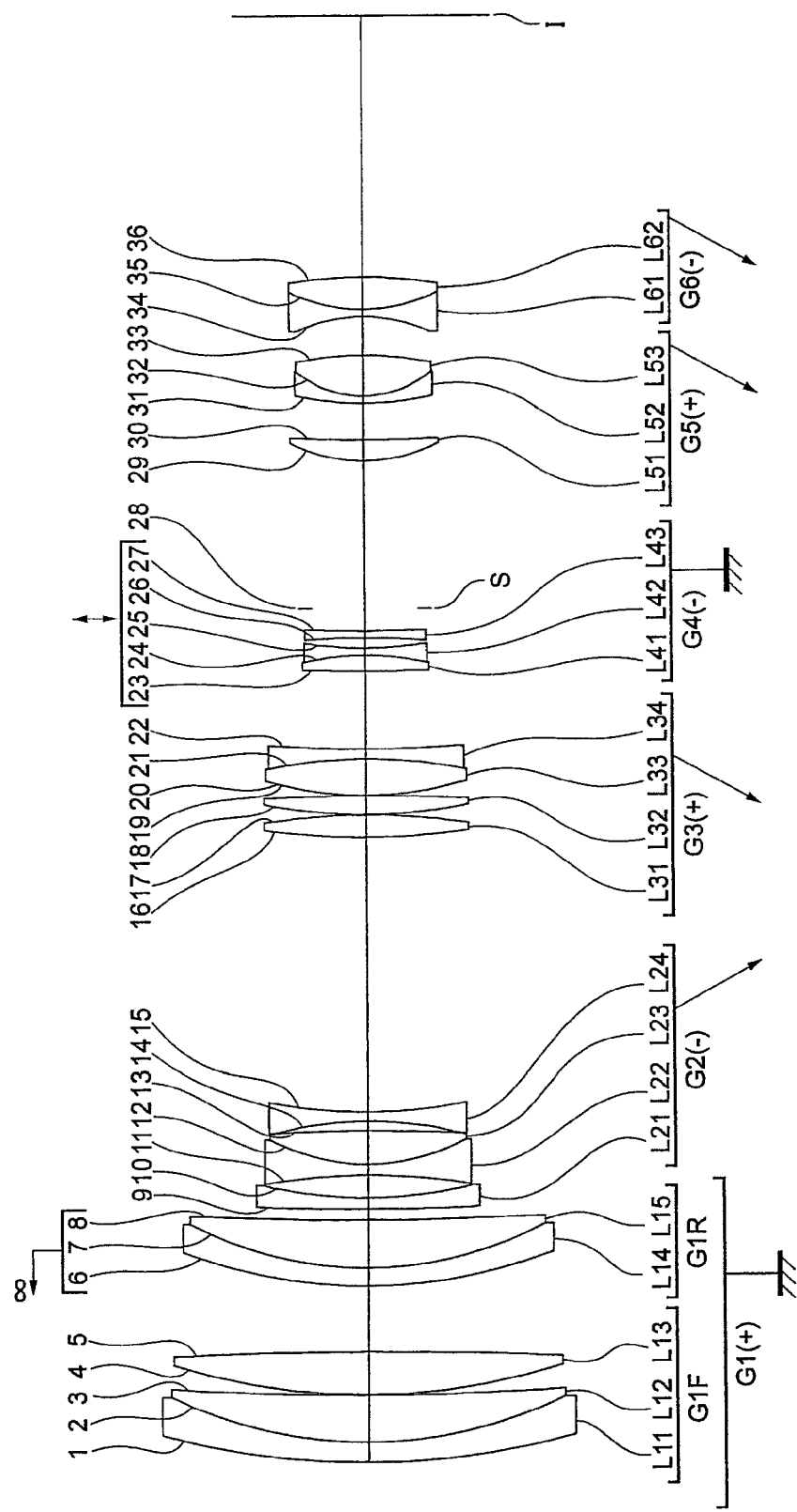
Fig. 33 (EXAMPLE 13)

MERIDIONAL
LATERAL ABERRATION

MERIDIONAL
LATERAL ABERRATION

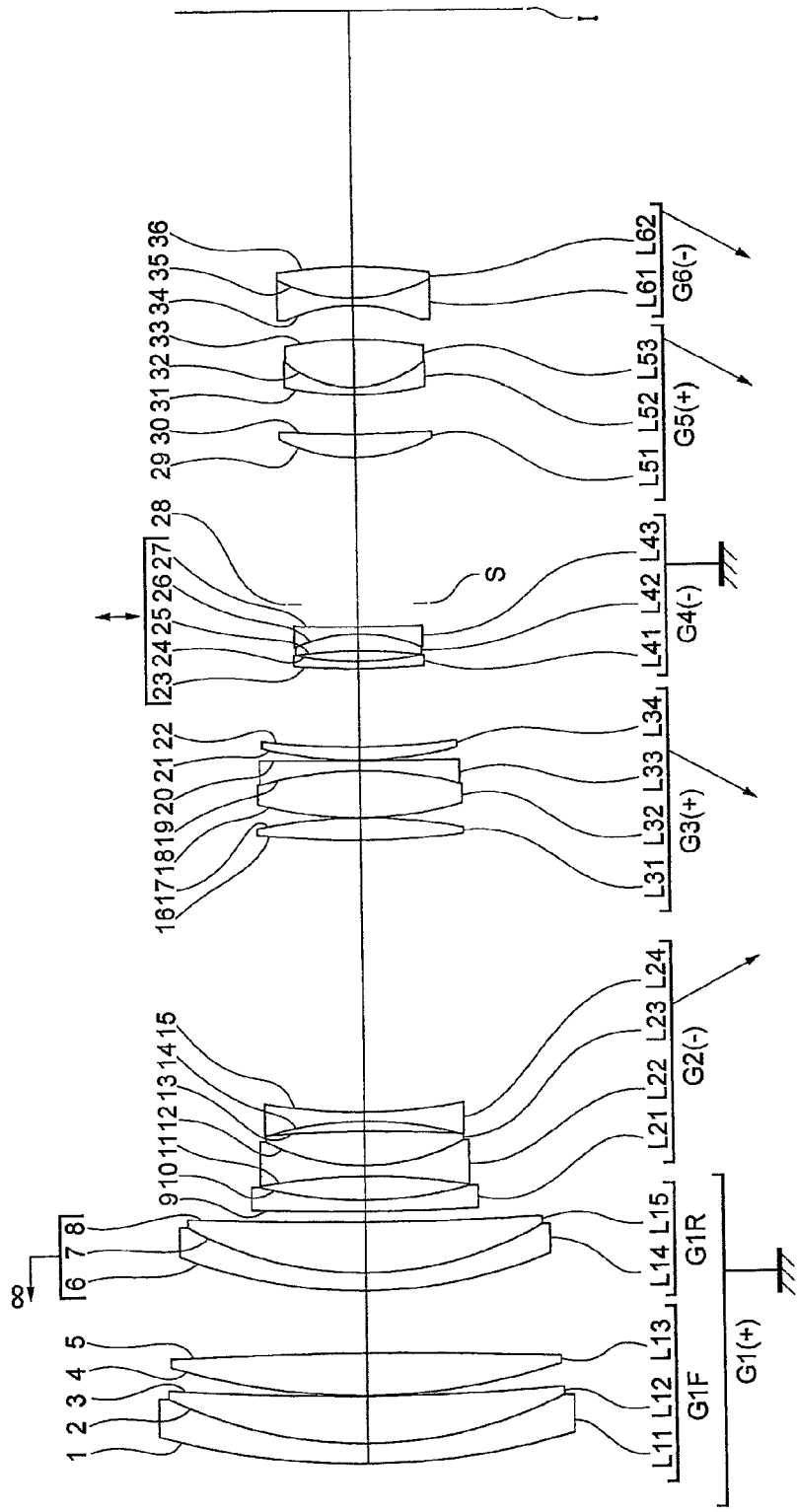

MERIDIONAL
LATERAL ABERRATION

MERIDIONAL
LATERAL ABERRATION

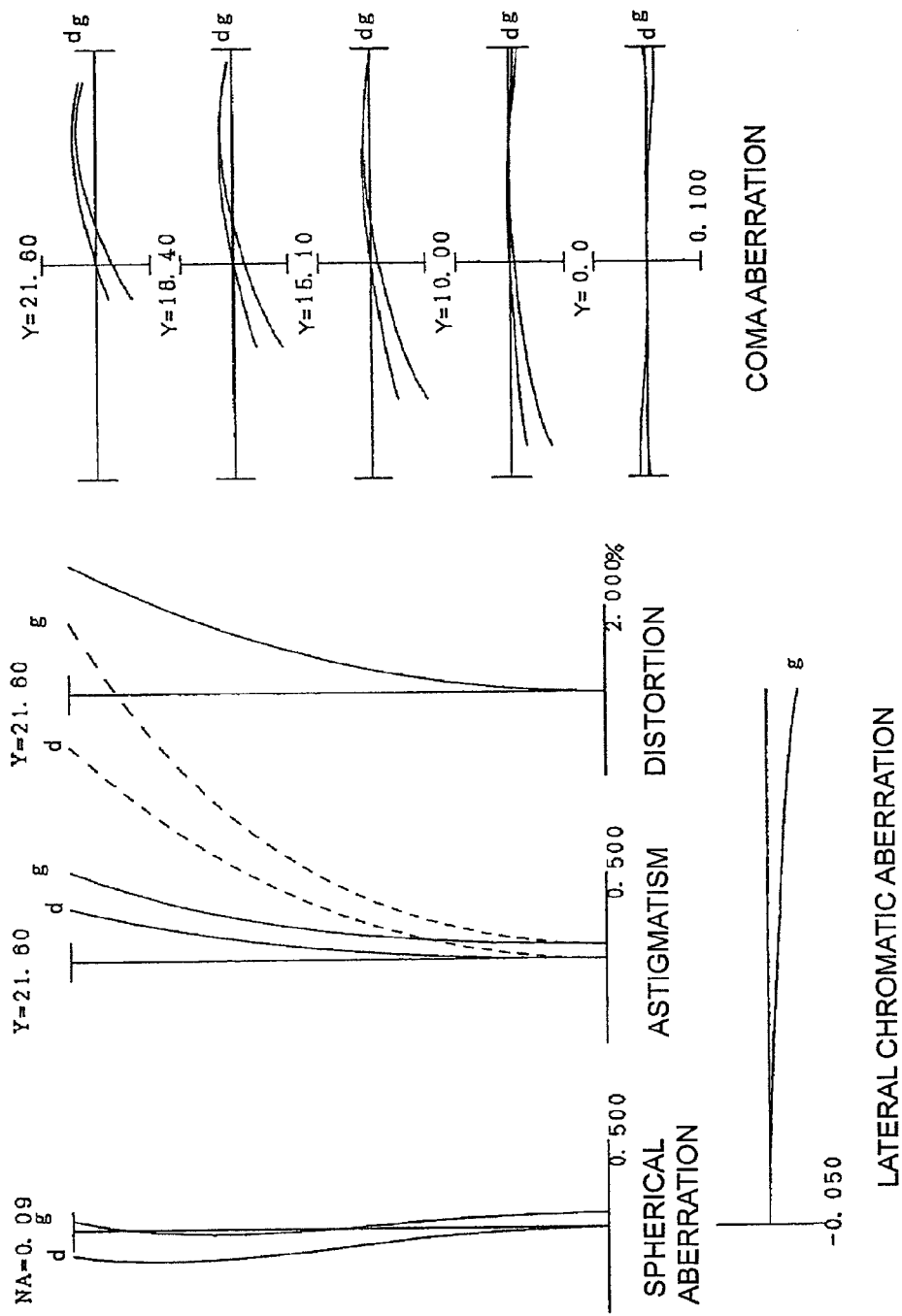

(EXAMPLE 11)

MERIDIONAL
LATERAL ABERRATION

MERIDIONAL
LATERAL ABERRATION

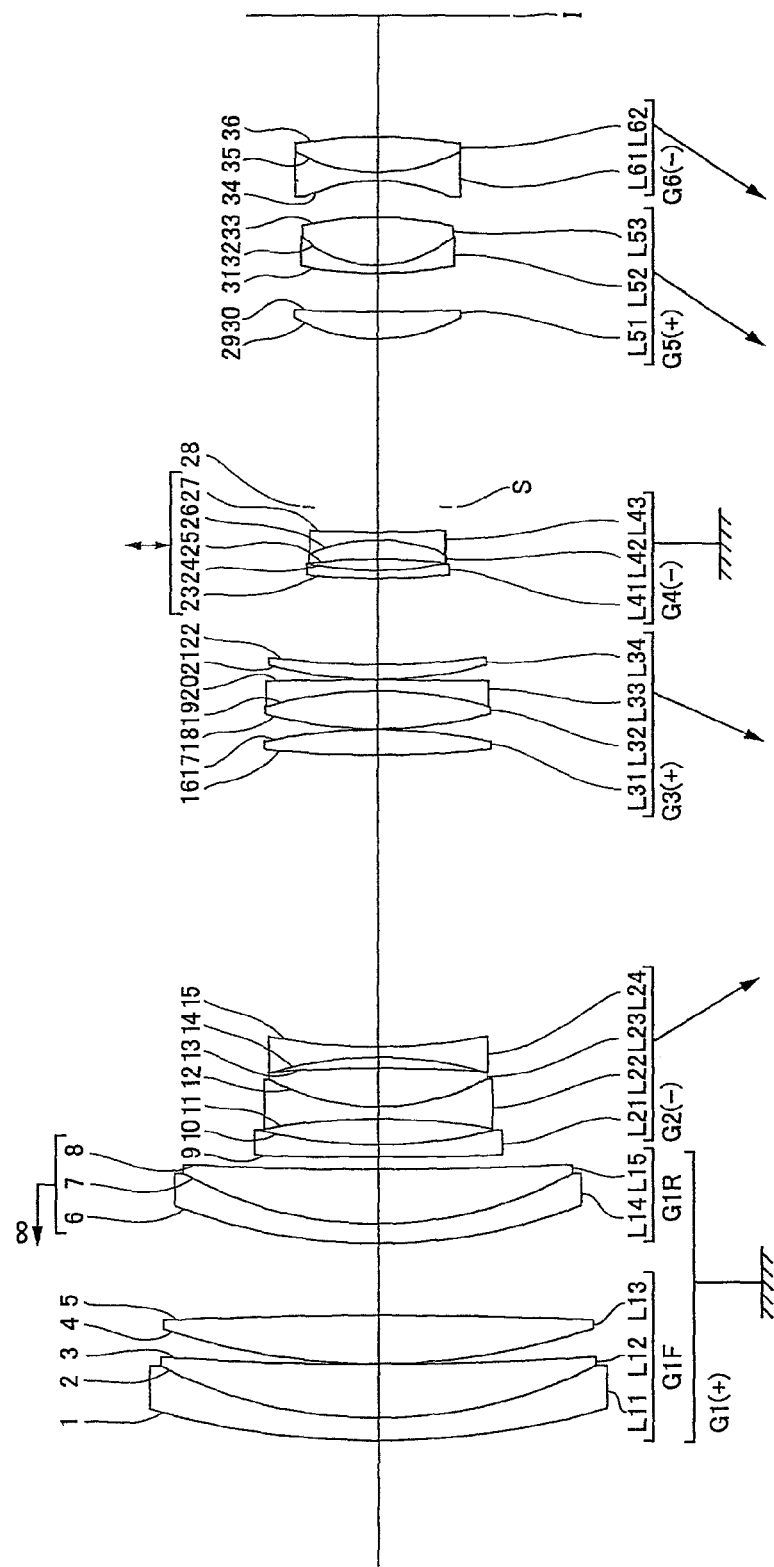

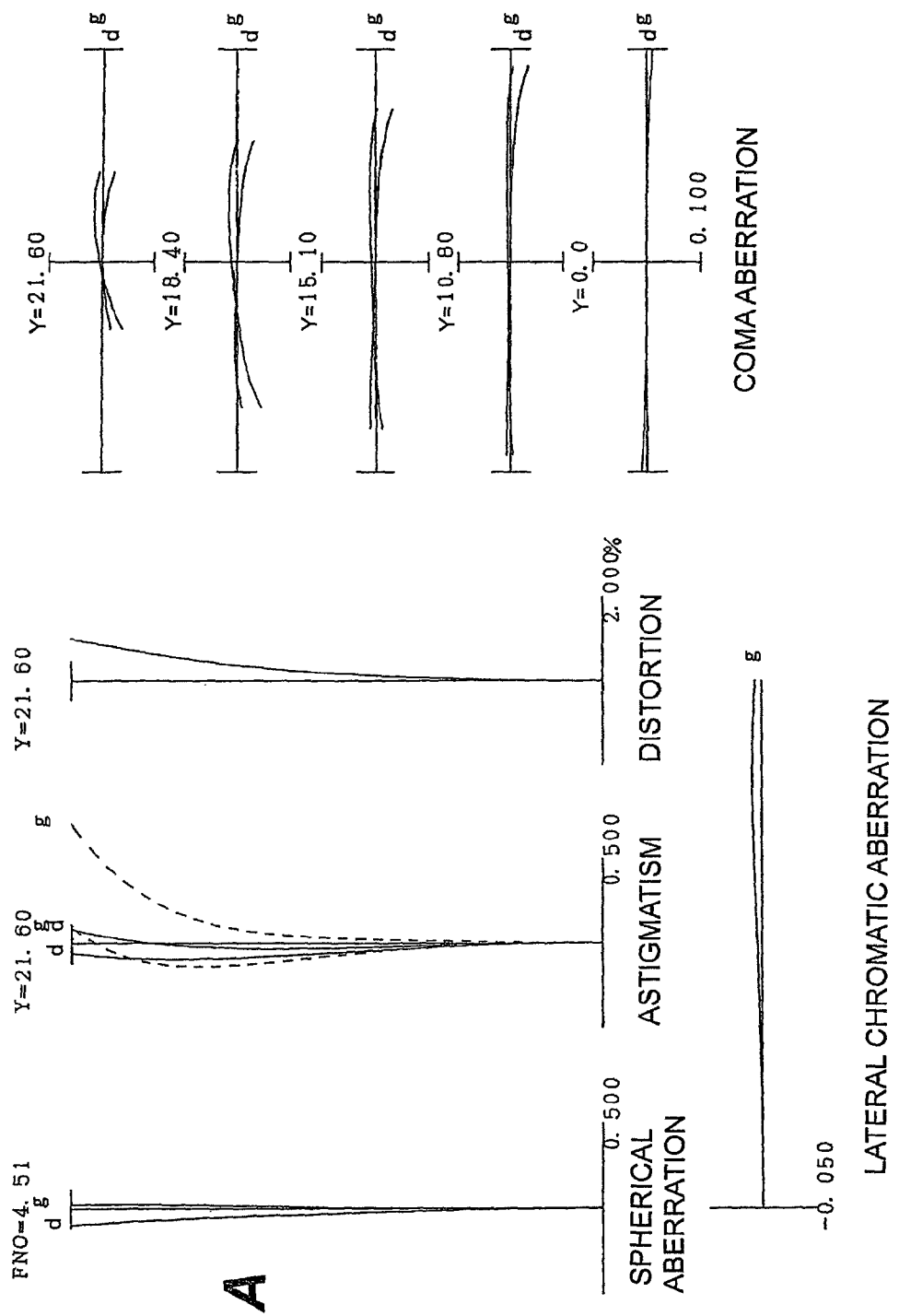

MERIDIONAL LATERAL ABERRATION

MERIDIONAL LATERAL ABERRATION

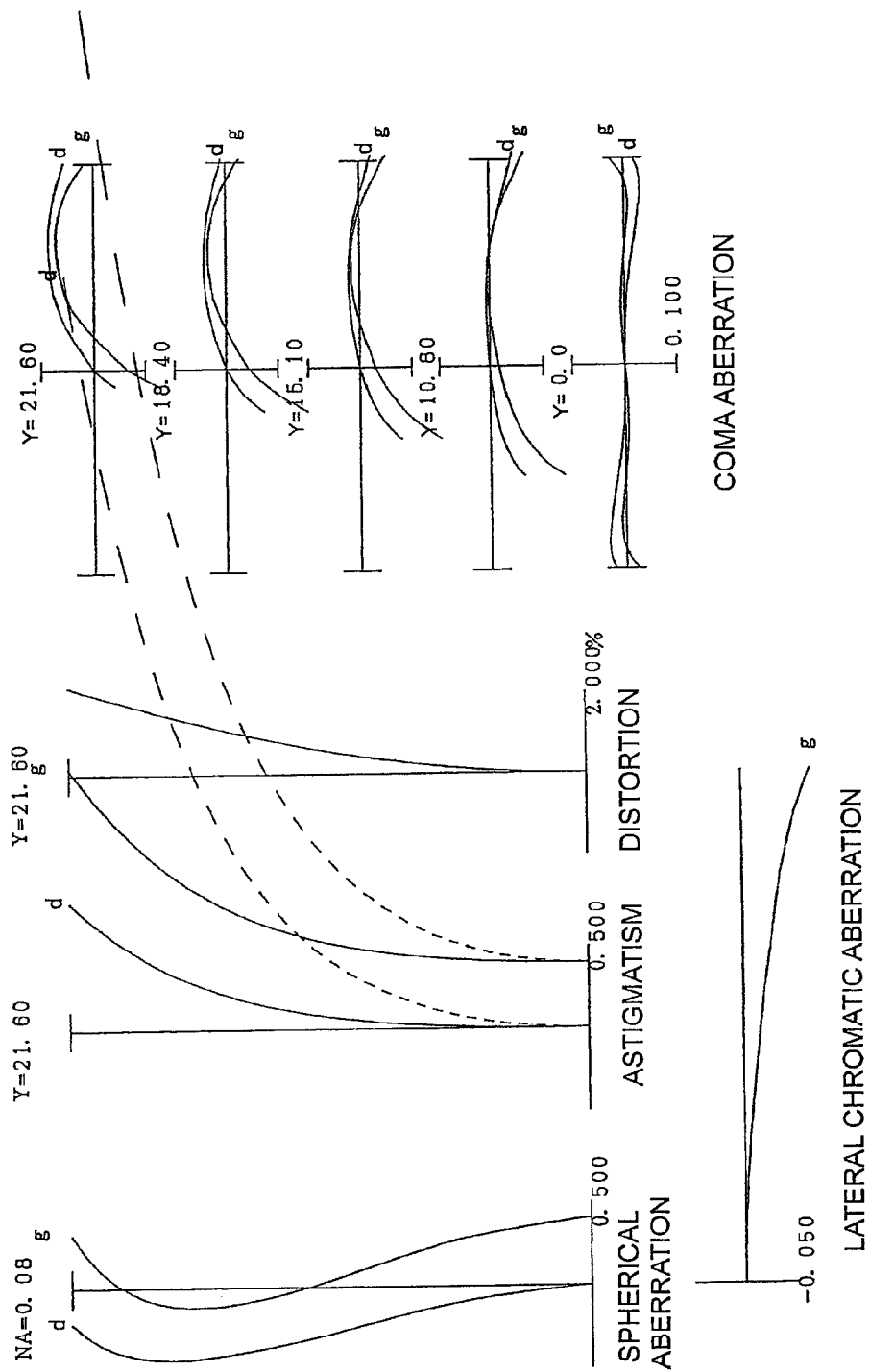

ZOOMING OPTICAL SYSTEM, OPTICAL APPARATUS AND ZOOMING OPTICAL SYSTEM MANUFACTURING METHOD

INCORPORATION BY REFERENCE

This invention claims the benefit of Japanese Patent Application No. 2009-043347, No. 2009-043348, No. 2009-043349, No. 2009-043350 and No. 2009-268887 which are hereby incorporated by reference.

FIELD OF THE INVENTION

The present invention relates to a zooming optical system, an optical apparatus and a zooming optical system manufacturing method.

BACKGROUND OF THE INVENTION

As a focusing method for an optical system having a high zoom ratio, a method of feeding a lens group positioned closest to an object, that is the so called front lens feeding method (e.g. see Japanese Patent Application Laid-Open No. H11-258504), and an internal focusing method (e.g. see Japanese Patent Application Laid-Open No. 2004-212612) are known.

PROBLEMS TO BE SOLVED BY THE INVENTION

In the case of the above mentioned Japanese Patent Application Laid-Open No. H11-258504, which concerns a front lens feeding method, focusing is possible with a same feed amount for objects located in a same photographing distance, throughout the entire zooming area, from the wide angle end state to the telephoto end state, and an advantage is therefore that the focusing mechanism can be simplified. A problem of the front lens feeding method, however, is that the holding mechanism and the drive mechanism of the focusing lens group tend to be large, and the focusing speed may be slow, since the lens group that is normally large and heavy and positioned closest to the object is moved.

In the case of the above mentioned Japanese Patent Application Laid-Open No. 2004-212612, which concerns an internal focusing method, a second lens group or a subsequent lens group, which is lighter than the first lens group positioned closest to the object, can be used for the focusing lens group, and the advantage is therefore that the focusing speed can be increased. The internal focusing method, however, normally cannot focus on objects located in a same photographing distance with a same feed amount throughout the entire zooming area, from the wide angle end state to the telephoto end state, so the focusing mechanism may be complicated.

In other words, according to conventional optical systems having a high zoom ratio, both an increase in focusing speed and simplification of the focusing mechanism cannot be Implemented simultaneously.

SUMMARY OF THE INVENTION

With the foregoing in view, it is an object of the present invention to provide a zooming optical system, an optical apparatus and a manufacturing method for the zooming optical system that implement both an increase in focusing speed and simplification of the focusing mechanism simultaneously by appropriately setting the positions of the focusing lens group.

MEANS TO SOLVE THE PROBLEMS

To achieve this object, a first zooming optical system according to the present invention has at least a first lens group to a fifth lens group which are disposed in order from an object, the first lens group has positive refractive power and is divided into at least two subgroups, one of the subgroups is used as a focusing lens group, and the subgroups) other than the focusing lens group in the subgroups, is(are) fixed upon focusing from an infinite object point to a close object point. It is preferable that the focusing lens group is a subgroup closest to an image, out of the subgroups.

A second zooming optical system according to the present invention has at least a first lens group to a fifth lens group which are disposed in order from an object, the first lens group is divided into at least two subgroups, the subgroup closest to the object in the subgroups, has positive refractive power, and the subgroup closest to an image in the subgroups, is used as a focusing lens group. It is preferable that the subgroups other than the focusing lens group in the subgroups, are fixed upon focusing from an infinite object point to a close object point. It is preferable that the first lens group has positive refractive power.

In the first and second zooming optical systems, it is preferable that the focusing lens group moves to the object side upon focusing from the infinite object point to the close object point.

In the first and second zooming optical systems, it is preferable that at least one of the subgroup closest to the object and the subgroup closest to the image in the subgroups, has positive refractive power.

In the first and second zooming optical systems, it is preferable that the fourth lens group has negative refractive power.

In the first and second zooming optical systems, it is preferable that the second lens group has negative refractive power, the third lens group has positive refractive power, and the fifth lens group has positive refractive power.

In the first and second zooming optical systems, it is preferable that the fourth lens group is fixed in the optical axis direction with respect to the image surface upon zooming from the wide angle end state to the telephoto end state.

In the first and second zooming optical systems, it is preferable that all or a part of the fourth lens group is moved so as to have a moving component orthogonal to the optical axis.

In the first and second zooming optical systems, it is preferable that the first lens group is fixed in the optical axis direction with respect to the image surface upon zooming from the wide angle end state to the telephoto end state.

In the first and second zooming optical systems, it is preferable that a diaphragm is disposed closet to the image than the fourth lens group. In this case, it is preferable that the diaphragm is fixed in the optical axis direction with respect to the image surface upon zooming from the wide angle end state to the telephoto end state.

In the first and second zooming optical systems, it is preferable that a condition of the expression $|f4|/fT<0.210$ is satisfied, where f4 denotes a focal length of the fourth lens group and fT denotes a focal length in the telephoto end state.

In the first and second zooming optical systems, it is preferable that a condition of the expression $0.570<f3/|f4|<0.880$ is satisfied, where f3 denotes a focal length of the third lens group.

An optical apparatus according to the present invention has the above mentioned first or second zooming optical system.

A manufacturing method according to the present invention is a manufacturing method for a zooming optical system having at least a first lens group to a fifth lens group which are disposed in order from an object, comprising steps of assembling the lenses in a lens barrel and confirming operation so that the first lens group has positive refractive power and is divided into at least two subgroups, one of the subgroups is used as a focusing lens group, and the subgroup(s) other than the focusing lens group in the subgroups, is(are) fixed upon focusing from an infinite object point to a close object point.

A third zooming optical system according to the present invention has at least a first lens group to a fifth lens group which are disposed in order from an object, the first lens group is divided into at least two subgroups, the subgroups closest to an image in the subgroups, is used as a focusing lens group, and a diaphragm is disposed closer to the image than the fourth lens group.

In the third zooming optical system, it is preferable that the focusing lens group moves to the object side upon focusing from the infinite object point to the close object point.

In the third zooming optical system, it is preferable that the subgroups) other than the focusing lens group, out of the subgroups, is(are) fixed upon focusing from an infinite far object point to a close object point.

In the third zooming optical system, it is preferable that at least one of the focusing lens group and the subgroup closest to the object in the subgroups, has positive refractive power.

In the third optical system, it is preferable that the fourth lens group has negative refractive power.

In the third zooming optical system, it is preferable that the second lens group has negative refractive power, the third lens group has positive refractive power, and the fifth lens group has positive refractive power.

In the third zooming optical system, it is preferable that the fourth lens group is fixed in the optical axis direction with respect to the image surface upon zooming from the wide angle end state to the telephoto end state.

In the third optical system, it is preferable that all or a part of the fourth lens group is moved so as to have a moving component orthogonal to the optical axis.

In the third zooming optical system, it is preferable that the first lens group is fixed in the optical axis direction with respect to the image surface upon zooming from the wide angle end state to the telephoto end state.

In the third zooming optical system, it is preferable that the diaphragm is fixed in the optical axis direction with respect to the image surface upon zooming from the wide angle end state to the telephoto end state.

In the third zooming optical system, it is preferable that the first lens group has positive refractive power.

In the third zooming optical system, it is preferable that a condition of the expression $|f4|/fT<0.210$ is satisfied, where $f4$ denotes a focal length of the fourth lens group, and $fT$ denotes a focal length in the telephoto end state.

In the third zooming optical system, it is preferable that a condition of the expression $0.570<f3/|f4|<0.880$ is satisfied, where $f3$ denotes a focal length of the third lens group.

An optical apparatus according to the present invention has the above mentioned third zooming optical system.

A manufacturing method according to the present invention is a manufacturing method for a zooming optical system having at least a first lens group to a fifth lens group which are disposed in order from an object, comprising steps of assembling each lens in a lens barrel and confirming operation so that the first lens group is divided into at least two subgroups, the subgroup closest to an image in the subgroups, is used as a focusing lens group, and a diaphragm is disposed closest to the image than the fourth lens group.

A fourth zooming optical system according to the present invention has at least a first lens group to sixth lens group which are disposed in order from an object, one lens group having positive refractive power, out of the lens groups, is divided into at least two subgroups, at least one of the subgroups is used as a focusing lens group, and the focusing lens group is moved to the object side upon focusing from an infinite far object point to a close object point. In this configuration, it is preferable that the first lens group includes the focusing lens group.

A fifth zooming optical system according to the present invention has at least a first lens group to a sixth lens group which are disposed in order from an object, the first lens group has positive refractive power and is divided into at least two subgroups, and at least one subgroup out of the subgroups is used as a focusing lens group.

In the fourth and fifth zooming optical systems, it is preferable that the focusing lens group is a subgroup closest to the image in the subgroups.

In the fourth and fifth zooming optical systems, it is preferable that the subgroups) other than the focusing lens group in the subgroups, is(are) fixed upon focusing from an infinite object point to a close object point.

In the fourth and fifth zooming optical systems, it is preferable that at least one of the subgroup closest to the image and the subgroup closest to the object in the subgroups, has positive refractive power.

In the fourth and fifth zooming optical systems, it is preferable that the fourth lens group has negative refractive power.

In the fourth and fifth zooming optical systems, it is preferable that the second lens group has negative refractive power, the third lens group has positive refractive power, the fifth lens group has positive refractive power, and the sixth lens group has negative refractive power.

In the fourth and fifth zooming optical systems, it is preferable that the fourth lens group is fixed in the optical axis direction with respect to the image surface upon zooming from the wide angle end state to the telephoto end state.

In the fourth and fifth zooming optical systems, it is preferable that all or a part of the fourth lens group is moved so as to have a moving component orthogonal to the optical axis.

In the fourth and fifth zooming optical systems, it is preferable that the first lens group is fixed in the optical axis direction with respect to the image surface upon zooming from the wide angle end state to the telephoto end state.

In the fourth and fifth zooming optical systems, it is preferable that a diaphragm is disposed closer to the image than the fourth lens group.

In the fourth and fifth zooming optical systems, it is preferable that the diaphragm is fixed in the optical axis direction with respect to the image surface upon zooming from the wide angle end state to the telephoto end state.

In the fourth and fifth zooming optical systems, it is preferable that a condition of the expression $|f4|/fT<0.210$ is satisfied, where $f4$ denotes a focal length of the fourth lens group, and $fT$ denotes a focal length in the telephoto end state.

In the fourth and fifth zooming optical systems, it is preferable that a condition of the expression $0.570<f3/|f4|<0.880$ is satisfied, where $f3$ denotes a focal length of the third lens group.

An optical apparatus according to the present invention has the above mentioned fourth or fifth zooming optical system.

A manufacturing method according to the present invention is a manufacturing method for a zooming optical system having at least a first lens group to a sixth lens group which are disposed in order from an object, comprising steps of assembling each lens in a lens barrel and confirming operation so that one of the lens group having positive refractive power in the lens groups, is divided into at least two subgroups, at least one of the subgroups is used as a focusing lens group, and the focusing lens group is moved to the object side upon focusing from an infinite object point to a close object point.

A sixth zooming optical system according to the present invention has at least a first lens group to a fifth lens group which are disposed in order from an object, the fourth lens group has negative refractive power and is fixed in an optical axis direction with respect to an image surface upon zooming from a wide angle end state to a telephoto end state, and a diaphragm is disposed closer to an image than the fourth lens group. In this case, it is preferable that all or a part of the fourth lens group is moved so as to have a moving component orthogonal to the optical axis.

A seventh zooming optical system according to the present invention has at least a first lens group to a sixth lens group which are disposed in order from an object, the fourth lens group has negative refractive power and is fixed in the optical axis direction with respect to the image surface upon zooming from a wide angle end state to a telephoto end state, and all or a part thereof is moved so as to have a moving component orthogonal to the optical axis.

In the sixth and seventh zooming optical systems, it is preferable that one lens group of the lens groups is divided into at least two subgroups, and at least one of the subgroups is used as a focusing lens group.

In the sixth and seventh zooming optical systems, it is preferable that the focusing lens group is the subgroup closest to the image in the subgroups.

In the sixth and seventh zooming optical systems, it is preferable that the subgroups) other than the focusing lens group in the subgroups, is(are) fixed upon focusing from an infinite object point to a close object point.

In the sixth and seventh zooming optical systems, it is preferable that the first lens group includes the focusing lens group.

In the sixth and seventh zooming optical systems, it is preferable that the first lens group has positive refractive power.

In the sixth and seventh zooming optical systems, it is preferable that the first lens group has at least two subgroups, and at least one of the subgroup closest to the image and the subgroup closest to the object in the subgroups, has positive refractive power.

In the sixth and seventh zooming optical systems, it is preferable that the second lens group has negative refractive power, the third lens group has positive refractive power, and the fifth lens group has positive refractive power.

In the sixth and seventh zooming optical systems, it is preferable that the first lens group is fixed in the optical axis direction with respect to the image surface upon zooming from the wide angle end state to the telephoto end state.

In the sixth and seventh zooming optical systems, it is preferable that a diaphragm is disposed closer to the image than the fourth lens group, and the diaphragm is fixed in the optical axis direction with respect to the image surface upon zooming from the wide angle end state to the telephoto end state.

In the sixth and seventh zooming optical systems, it is preferable that the focusing lens group moves to the object side upon focusing from the infinite far object point to the close object point.

In the sixth and seventh zooming optical systems, it is preferable that a condition of the expression $|f4|/fT<0.210$ is satisfied, where f4 denotes a focal length of the fourth lens group, and fT denotes a focal length in the telephoto end state.

In the sixth and seventh zooming optical systems, it is also preferable that a condition of the expression $0.570<f3/|f4|<0.880$ is satisfied, where f3 denotes a focal length of the third lens group.

An optical apparatus according to the preset invention has the above mentioned sixth or seventh zooming optical system.

A manufacturing method according to the present invention is a manufacturing method for a zooming optical system having at least a first lens group to a fifth lens group which are disposed in order from an object, comprising steps of assembling each lens in a lens barrel and confirming operation so that the fourth lens group has negative refractive power and is fixed in an optical axis direction with respect to an image surface upon zooming from a wide angle end state to a telephoto end state, and a diaphragm is disposed closer to an image than the fourth lens group.

ADVANTAGEOUS EFFECTS OF THE INVENTION

According to the present invention, positions of the focusing lens group can be appropriately set, hence a zooming optical system, an optical apparatus and a manufacturing method for the zooming optical system that can implement both an increase in focusing speed and simplification of the focusing mechanism simultaneously, and can correct aberration well, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration and zoom locus of the zooming optical system according to the first example;

FIG. 2 are graphs showing various aberrations of the zooming optical system according to the first example upon focusing on infinity, wherein

FIG. 3 are graphs showing meridional lateral aberrations when blur correction (i.e. vibration reduction on image stabilization) is performed on the zooming optical system according to the first example upon focusing on infinity, wherein

FIG. 4 are graphs showing various aberrations of the zooming optical system according to the first example upon focusing on close distance (photographing distance of entire system: R=1.8 m), wherein

FIG. 5 is a diagram depicting a configuration and zoom locus of the zooming optical system according to the second example;

FIG. 6 are graphs showing various aberrations of the zooming optical system according to the second example upon focusing on infinity, wherein

FIG. 7 are graphs showing meridional lateral aberrations when blur correction is performed on the zooming optical system according to the second example upon focusing on infinity, wherein

FIG. 8 are graphs showing various aberrations of the zooming optical system according to the second example upon focusing on close distance (photographing distance of entire system: R=1.8 m), wherein

FIG. 9 is a diagram depicting a configuration and zoom locus of the zooming optical system according to the third example;

FIG. 10 are graphs showing various aberrations of the zooming optical system according to the third example upon focusing on infinity, wherein

FIG. 11 are graphs showing meridional lateral aberrations when blur correction is performed on the zooming optical system according to the third example upon focusing on infinity, wherein

FIG. 12 are graphs showing various aberrations of the zooming optical system according to the third example upon focusing on close distance (photographing distance of entire system: R=1.8 m), wherein

FIG. 13 is a diagram depicting a configuration and zoom locus of the zooming optical system according to the fourth example;

FIG. 14 are graphs showing various aberrations of the zooming optical system according to the fourth example upon focusing on infinity, wherein FIG. 14A shows the wide angle end state, FIG. 14B shows the intermediate focal length state.

FIG. 15 are graphs showing meridional lateral aberrations when blur correction is performed on the zooming optical system according to the fourth example upon focusing on infinity, wherein

FIG. 16 are graphs showing various aberrations of the zooming optical system according to the fourth example upon focusing on close distance (photographing distance of entire system: R=1.8 m), wherein

FIG. 17 is a diagram depicting a configuration and zoom locus of the zooming optical system according to the fifth example;

FIG. 18 are graphs showing various aberrations of the zooming optical system according to the fifth example upon focusing on infinity, wherein

FIG. 19 are graphs showing meridional lateral aberrations when blur correction is performed on the zooming optical system according to the fifth example upon focusing on infinity, wherein

FIG. 20 are graphs showing various aberrations of the zooming optical system according to the fifth example upon focusing on close distance (photographing distance of entire system: R=1.8 m), wherein

FIG. 22 are graphs showing various aberrations of the zooming optical system according to the sixth example upon focusing on infinity, wherein

FIG. 23 are graphs showing meridional lateral aberrations when blur correction is performed on the zooming optical system according to the sixth example upon focusing on infinity, wherein

FIG. 24 are graphs showing various aberrations of the zooming optical system according to the sixth example upon focusing on close distance (photographing distance of entire system: R=1.8 m), wherein

FIG. 25 is a diagram depicting a configuration and zoom locus of the zooming optical system according to the seventh example;

FIG. 26 are graphs showing various aberrations of the zooming optical system according to the seventh example upon focusing on infinity, wherein FIG. 26C shows the telephoto end state;

FIG. 27 are graphs showing meridional lateral aberrations when blur correction is performed on the zooming optical system according to the seventh example upon focusing on infinity, wherein

FIG. 28 are graphs showing various aberrations of the zooming optical system according to the seventh example upon focusing on close distance (photographing distance of entire system: R=1.8 m), wherein FIG. 28A shows the wide angle end state.

FIG. 29 is a diagram depicting a configuration and zoom locus of the zooming optical system according to the eighth example;

FIG. 30 are graphs showing various aberrations of the zooming optical system according to the eighth example upon focusing on infinity, wherein FIG. 30C shows the telephoto end state;

FIG. 31 are graphs showing meridional lateral aberrations when blur correction is performed on the zooming optical system according to the eighth example upon focusing on infinity, wherein

FIG. 32 are graphs showing various aberrations of the zooming optical system according to the eighth example upon focusing on close distance (photographing distance of entire system: R=1.8 m), wherein

FIG. 33 is a diagram depicting a configuration and zoom locus of the zooming optical system according to the ninth example;

FIG. 34 are graphs showing various aberrations of the zooming optical system according to the ninth example upon focusing on infinity, wherein

FIG. 35 are graphs showing meridional lateral aberrations when blur correction is performed on the zooming optical system according to the ninth example upon focusing on infinity, wherein

FIG. 36 are graphs showing various aberrations of the zooming optical system according to the ninth example upon focusing on close distance (photographing distance of entire system: R=1.8 m), wherein

FIG. 37 is a diagram depicting a configuration and zoom locus of the zooming optical system according to the tenth example;

FIG. 38 are graphs showing various aberrations of the zooming optical system according to the tenth example upon focusing on infinity, wherein

FIG. 39 are graphs showing meridional lateral aberrations when blur correction is performed on the zooming optical system according to the tenth example upon focusing on infinity, wherein

FIG. 40 are graphs showing various aberrations of the zooming optical system according to the tenth example upon focusing on close distance (photographing distance of entire system: R=1.8 m), wherein FIG. 40B shows the intermediate focal length state.

FIG. 42 are graphs showing various aberrations of the zooming optical system according to the eleventh example upon focusing on infinity, wherein

FIG. 43 are graphs showing meridional lateral aberrations when blur correction is performed on the zooming optical system according to the eleventh example upon focusing on infinity, wherein

FIG. 44 are graphs showing various aberrations of the zooming optical system according to the eleventh example upon focusing on close distance (photographing distance of entire system: R=1.8 m), wherein

FIG. 46 are graphs showing various aberrations of the zooming optical system according to the twelfth example upon focusing on infinity, wherein

FIG. 47 are graphs showing meridional lateral aberrations when blur correction is performed on the zooming optical system according to the twelfth example upon focusing on infinity, wherein

FIG. 48 are graphs showing various aberrations of the zooming optical system according to the twelfth example upon focusing on close distance (photographing distance of entire system: R=1.8 m), wherein

FIG. 49 is a diagram depicting a configuration and zoom locus of the zooming optical system according to the thirteenth example;

FIG. 50 are graphs showing various aberrations of the zooming optical system according to the thirteenth example upon focusing on infinity, wherein FIG. 50A shows the wide angle end state.

FIG. 51 are graphs showing meridional lateral aberrations when blur correction is performed on the zooming optical system according to the thirteenth example upon focusing on infinity, wherein

FIG. 52 are graphs showing various aberrations of the zooming optical system according to the thirteenth example upon focusing on close distance (photographing distance of entire system: R=1.8 m), wherein FIG. 52C shows the telephoto end state;

DESCRIPTION OF THE PREFERRED EMBODIMENTS

Figure 2A:
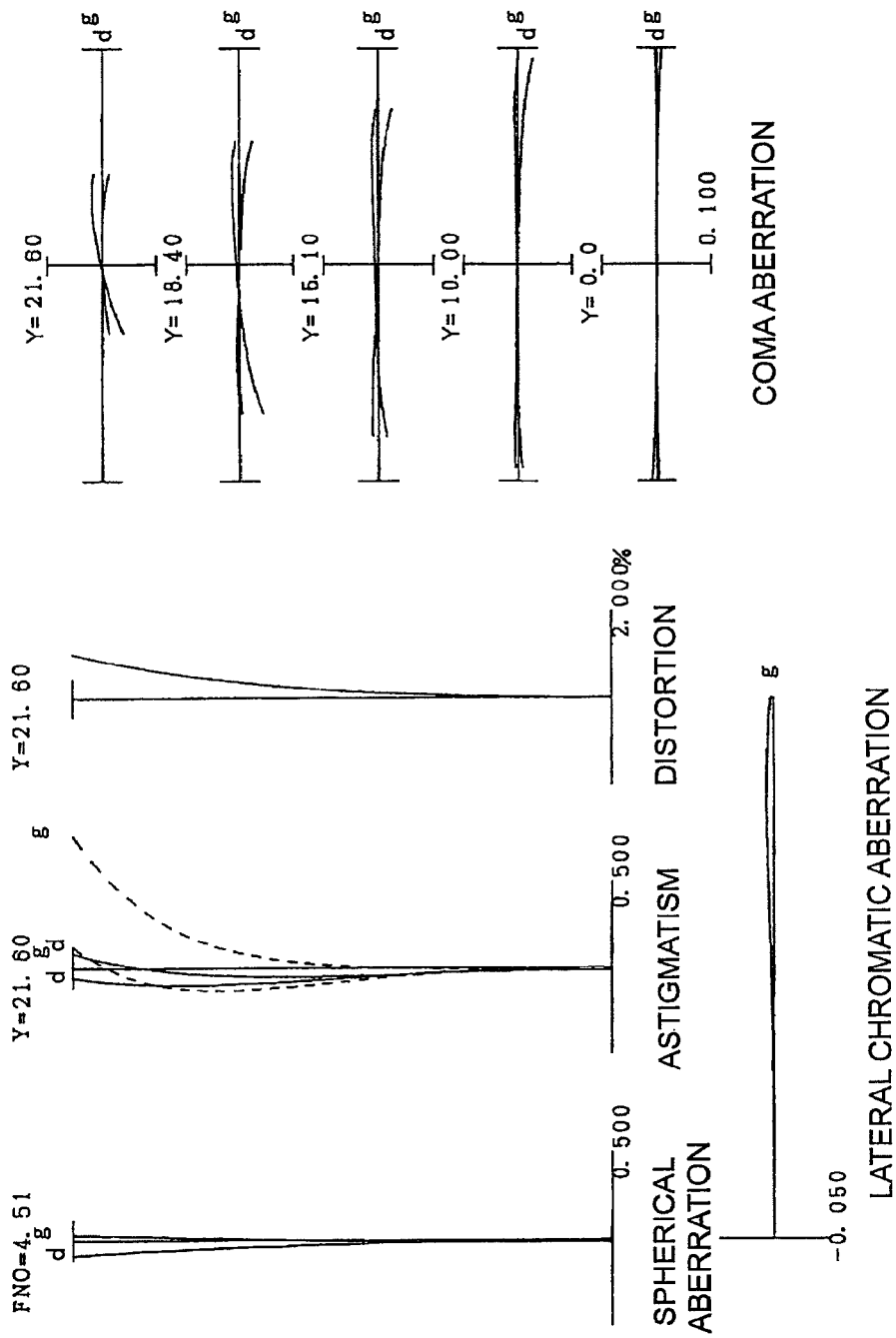
FIG. 2A shows the wide angle end state.

Embodiments will now be described with reference to the drawings.

A zooming optical system according to a first embodiment has at least a first lens group G1 to a fifth lens group G5 which are disposed in order from an object, as shown in FIG. 1. The first lens group G1 has positive refractive power and is divided into at least two subgroups (front group G1F and rear group G1R in FIG. 1), one of the subgroups is a focusing lens group (rear group G1R in FIG. 1), and the subgroup other than the focusing lens group (front group G1F in FIG. 1), out of the subgroups, is fixed upon focusing from an infinite object point to a close object point.

According to this zooming optical system of the first embodiment, which has five or more lens groups in total, an optical system with a high zoom ratio can easily be Implemented. Since the first lens group G1 has positive refractive power, the total length of the optical system can be decreased, and distortion can be easily corrected. The focusing mechanism can be simplified by dividing the first lens group G1 into at least two subgroups, and using one of the subgroups as the focusing lens group. Further, the subgroups) other than the focusing lens group, out of the subgroups, is(are) fixed upon focusing from an infinite object point to a close object point, thereby a drop in performance, due to decentering, is suppressed, and good optical performance can be Implemented, and also the focusing mechanism can be simplified.

In the first embodiment, it is preferable that the focusing lens group is a subgroup closest to the image, out of the subgroups. By this configuration, the focusing mechanism can be simplified, and focusing speed can be increased. Since the focusing lens group is light weight, an ultrasonic motor can be selected, and quiet focusing can be implemented.

A zooming optical system according to a second embodiment has at least a first lens group G1 to a fifth lens group G5 which are disposed in order from an object, as shown in FIG. 1. The first lens group G1 is divided into at least two subgroups (front group G1F and rear group G1R in FIG. 1), the subgroup closest to the object (front group G1F in FIG. 1), out of the subgroups, has positive refractive power, and the subgroup closest to the image (rear group G1R in FIG. 1), out of the subgroups, is a focusing lens group.

According to this zooming optical system of the second embodiment, which has five or more lens groups in total, an optical system with a high zoom ratio can easily be implemented. Since the first lens group G1 is divided into at least two subgroups and the subgroup closest to the object, out of the subgroups, has positive refractive power, the total length of the optical system can be decreased, and distortion can easily be corrected. The subgroup closest to the image, out of the subgroups, is the focusing lens group, so the focusing mechanism can be simplified, and focusing speed can be increased. Furthermore if the focusing lens group has a smaller outer diameter and lighter weight than the other subgroup(s), an ultrasonic motor can be selected, and quiet focusing can be implemented.

In the second embodiment, it is preferable that the subgroup(s) other than the focusing lens group, out of the subgroups, is(are) fixed upon focusing from an infinite object point to the close object point. Because of this configuration, a drop in performance due to decentering is suppressed, and good optical performance can be implemented, and also the focusing mechanism can be simplified.

In the second embodiment, it is preferable that the first lens group has positive refractive power. By this configuration, the total length of the optical system can be decreased, and distortion can easily be corrected.

In both the first and second embodiments, it is preferable that the focusing lens group moves to the object side upon focusing from an infinite object point to a close object point. By this configuration, the outer diameter of the focusing lens group can be decreased, and the focusing speed can be increased.

In both the first and second embodiments, it is preferable that at least one of the subgroup closest to the object and the subgroup closest to the image, out of the subgroups, has positive refractive power. By this configuration, the total length of the optical system can be decreased, and distortion can easily be corrected.

In both the first and second embodiments, it is preferable that the diaphragm S is disposed closer to the image than the fourth lens group G4. By this configuration, distortion can easily be corrected. And by disposing the diaphragm S in a position close to the lens mount, the diaphragm mechanism can be simplified.

In both the first and second embodiments, it is preferable that the diaphragm S is fixed in the optical axis direction with respect to the image surface I upon zooming from a wide angle end state to a telephoto end state. By this configuration, movement of the diaphragm S is not required upon zooming, and configuration of the zooming optical system is simplified. As a result, accuracy of the diaphragm diameter Improves with less fluctuation, and optical performance can be stabilized.

A zooming optical system according to a third embodiment has at least a first lens group G1 to a fifth lens group G5 which are disposed in order from an object, as shown in FIG. 1, the first lens group G1 is divided into at least two subgroups (front group G1F and rear group G1R in FIG. 1), the subgroup closest to the image, out of the subgroups, is a focusing lens group (rear group G1R in FIG. 1), and a diaphragm is disposed closer to the image than the fourth lens group G4.

According to this zooming optical system of the third embodiment, which has five or more lens groups in total, an optical system with a high zoom ratio can be easily implemented. Since the first lens group G1 is divided into at least two subgroups and the subgroup closest to the image, out of the subgroups, is the focusing lens group, the focusing mechanism can be simplified, and focusing speed can be increased. If the focusing lens group has a smaller outer diameter and lighter weight than the other subgroup(s), an ultrasonic motor can be selected, and quiet focusing can be implemented. By disposing the diaphragm S closer to the image than the fourth lens group G4, distortion can easily be corrected. By disposing the diaphragm S in a position closer to the lens mount than an image blur correction mechanism, the diaphragm mechanism can be simplified.

In the third embodiment, it is preferable that the focusing lens group moves to the object side upon focusing from an infinite object point to a close object point. By this configuration, the outer diameter of the focusing lens group can be decreased, and focusing speed can be increased.

In the third embodiment, it is preferable that the sub lens group(s) other than the focusing lens group (front group G1F in FIG. 1), out of the subgroups, is(are) fixed upon focusing from an infinite object point to a close object point. By this configuration, a drop in performance, due to decentering, is suppressed, and good optical performance can be implemented. The focusing mechanism can also be simplified.

In the third embodiment, it is preferable that at least one of the focusing lens group and the subgroup closest to the object, out of the subgroups, has positive refractive power. By this configuration, the total length of the optical system can be decreased. The distortion can also easily be corrected.

In the third embodiment, it is preferable that the diaphragm S is fixed in the optical axis direction with respect to the image surface I upon zooming from a wide angle end state to a telephoto end state. By this configuration, this zooming optical system can be easily constructed. As a result, accuracy of the diaphragm diameter improves, and adjustment of the luminous flux and spherical aberration by the diaphragm S is simplified, and good optical performance can be implemented.

In the third embodiment, it is preferable that the first lens group G1 has positive refractive power. By this configuration, the total length of the optical system can be decreased, and distortion can easily be corrected.

A zooming optical system according to a fourth embodiment has at least a first lens group G1 to a sixth lens group G6 which are disposed in order from an object, as shown in FIG. 1, one lens group having positive refractive power, out of the lens groups, is divided into at least two subgroups, at least one subgroup out of the subgroups is a focusing lens group, and this focusing lens group is moved to the object side upon focusing from an infinite object point to a close object point. In FIG. 1, the first lens group G1 is divided into two lens groups, and the focusing lens group is the rear group G1R, and the lens group, other than the focusing lens group, is the front group G1F.

According to this zooming optical system of the fourth embodiment, which has six or more lens groups in total, an optical system with a high zoom ratio can easily be Implemented. Since one lens group having positive refractive power (G1), out of the lens groups, is divided into at least two subgroups, and at least one subgroup out of the subgroups is a focusing lens group, the focusing speed can be increased. Furthermore if the focusing lens group has a smaller outer diameter and lighter weight than the other subgroup(s), an ultrasonic motor can be selected and quiet focusing can be implemented. By moving the focusing lens group to the object side upon focusing from an infinite object point to a close object point, the outer diameter of the focusing lens group can be decreased, and focusing speed can be increased.

In the fourth embodiment, it is preferable that the first lens group G1 includes the focusing lens group. By this configuration, the total length of the optical system can be decreased, and distortion can be corrected even more easily.

A zooming optical system according to the fifth embodiment has at least a first lens group G1 to a sixth lens group G6 which are disposed in order from an object, as shown in FIG. 1, the first lens group G1 has positive refractive power and is divided into at least two subgroups, and at least one of the subgroups is a focusing lens group (rear group G1R in FIG. 1).

According to this zooming optical system of the fifth embodiment, which has six or more lens groups in total, an optical system with a high zoom ratio can be easily implemented. Since the lens group having positive refractive power that has subgroups is the first lens group G1, the total length of the optical system can be decreased, and distortion can be corrected even more easily. By dividing the first lens group G1 into at least two subgroups and setting at least one of the subgroups to be the focusing lens group, the focusing speed can be increased. Since the focusing lens group is light weight, an ultrasonic motor can be selected and quiet focusing can be implemented.

In the fourth and fifth embodiments, it is preferable that the focusing lens group is a subgroup closest to the image, out of the subgroups. By this configuration, the focusing speed can be increased.

In the fourth and fifth embodiments, it is preferable that the subgroup other than the focusing lens group, out of the subgroups, is fixed upon zooming from an infinite object point to a close object point. By this configuration, a drop in performance, due to decentering, is suppressed, and good optical performance can be implemented. The focusing mechanism can also be simplified.

In the fourth and fifth embodiments, it is preferable that at least one of the subgroup closest to the image and the subgroup closest to the object, out of the subgroups, has positive refractive power. By this configuration, the total length of the optical system can be decreased, and distortion can easily be corrected.

In the first to fifth embodiments, it is preferable that the fourth lens group G4 has negative refractive power. By this configuration, spherical aberration can be easily corrected.

In the first to fifth embodiments, it is preferable that the second lens group G2 has negative refractive power, the third lens group G3 has positive refractive power, the fifth lens group G5 has positive refractive power, and the sixth lens group G6 has negative refractive power. By this configuration, the spherical aberration and curvature of field can be easily corrected.

In the first to fifth embodiments, it is preferable that the fourth lens group G4 is fixed in the optical axis direction with respect to the image surface I upon focusing from a wide angle end state to a telephoto end state. By this configuration, decentering is decreased. As a result, a drop in performance, due to decentering, particularly curvature of field, is decreased, and good optical performance can be implemented.

In the first to fifth embodiments, it is preferable that all or a part of the fourth lens group G4 is moved so as to have an orthogonal component with respect to the optical axis. By this configuration, an image surface can be corrected when an image blur is generated, and good optical performance can be implemented.

In the first to fifth embodiments, it is preferable that the first lens group G1 is fixed in the optical axis direction with respect to the image surface I upon focusing from a wide angle end state to a telephoto end state. By this configuration, decentering is decreased. As a result, a drop in performance due to decentering, particularly curvature of field, is decreased, and good optical performance can be implemented.

In the first to fifth embodiments, it is preferable that the diaphragm S is disposed closer to the image than the fourth lens group G4. By this configuration, distortion can be easily corrected. By disposing the diaphragm S in a position close to the lens mount, the diaphragm mechanism can be simplified.

In the first to fifth embodiment, it is preferable that the diaphragm S is fixed in the optical axis direction with respect to the image surface I upon zooming from a wide angle end state to a telephoto end state. By this configuration, movement of the diaphragm S is not required upon zooming, and configuration of the zooming optical system is simplified. As a result, accuracy of the diaphragm diameter improves with less fluctuation, and optical performance can be stabilized.

A zooming optical system according to a sixth embodiment has at least a first lens group G1 to a fifth lens group G5 which are disposed in order from an object, as shown in FIG. 1. The fourth lens group G4 has negative refractive power, is fixed in the optical axis direction with respect to an image surface I upon zooming from a wide angle end state to a telephoto end state, and a diaphragm S is disposed closer to the image than the fourth lens group G4.

According to this zooming optical system of the sixth embodiment, which has five or more lens groups in total, an optical system with a high zoom ratio can be easily implemented. Since the fourth lens group G4 has negative refractive power, spherical aberration can be easily corrected. The fourth lens group G4 is fixed in the optical axis direction with respect to the image surface I upon zooming from the wide angle end state to the telephoto end state, so decentering is decreased, and as a result, a drop in performance, due to decentering, particularly curvature of field, is decreased, and good optical performance can be implemented. By disposing the diaphragm S closer to the image than the fourth lens group G4, distortion can be easily corrected and the position of the diaphragm S can be closer to the lens mount, hence the diaphragm mechanism can be simplified.

In the sixth embodiment, it is preferable that all or a part of the fourth lens group G4 is moved so as to have an orthogonal component with respect to the optical axis. By this configuration, an image surface can be corrected when an image blur is generated, and good optical performance can be implemented.

The zooming optical system according to the seventh embodiment has at least a first lens group G1 to a sixth lens group G6 which are disposed in order from an object, as shown in FIG. 1. The fourth lens group G4 has negative refractive power, and is fixed in the optical axis direction with respect to an image surface I upon zooming from a wide angle end state to a telephoto end state, and all or a part thereof is moved so as to have an orthogonal component with respect to the optical axis.

According to this zooming optical system of the seventh embodiment, which has six or more lens groups in total, an optical system with a high zoom ratio can be easily implemented. Since the fourth lens group G4 has negative refractive power, spherical aberration can be easily corrected. The fourth lens group G4 is fixed in the optical axis direction with respect to the image surface I upon zooming from a wide angle end state to a telephoto end state, so decentering is decreased, and as a result, a drop in performance, due to decentering, particularly curvature of field, is decreased, and good optical performance can be implemented. In the fourth lens group G4, all or a part is moved so as to have an orthogonal component with respect to the optical axis, whereby an image surface can be corrected when an image blur is generated, and good optical performance can be implemented.

In both the sixth and seventh embodiments, it is preferable that one of the lens groups is divided into at least two subgroups (front group G1F and rear group G1R in FIG. 1), and at least one of the subgroups is a focusing lens group (rear group G1R in FIG. 1). By this configuration, the focusing speed can be increased. If the focusing lens group has a smaller outer diameter and lighter weight than the other subgroup(s), an ultrasonic motor can be selected, and quiet focusing can be implemented.

In both the sixth and seventh embodiments, it is preferable that the focusing lens group is a subgroup closest to the image (rear group G1R in FIG. 1), out of the subgroups. By this configuration, the focusing speed can be increased.

In both the sixth and seventh embodiments, it is preferable that the subgroups) other than the focusing lens group (front group G1F in FIG. 1), out of the subgroups, is(are) fixed upon focusing from an infinite object point to a close object point. By this configuration, a drop in performance, due to decentering, is suppressed, and good performance can be implemented. The focusing mechanism can also be simplified.

In both the sixth and seventh embodiments, it is preferable that the first lens group G1 includes the focusing lens group. By this configuration, focusing with a same feed amount is possible for objects in a same photographing distance throughout all of the zooming area from the wide angle end state to the telephoto end state, and the focusing mechanism can be simplified.

In both the sixth and seventh embodiments, it is preferable that the first lens group G1 has positive refractive power. By this configuration, the total length of the optical system can be decreased, and distortion can be easily corrected.

In both the sixth and seventh embodiments, it is preferable that the first lens group G1 has at least two subgroups, and at least one of the subgroup closest to the image and the subgroup closest to the object, out of the subgroups, has positive refractive power. By this configuration, the total length of the optical system can be decreased. Distortion can also be easily corrected.

In both the sixth and seventh embodiments, it is preferable that the second lens group G2 has negative refractive power, third lens group G3 has positive refractive power, fifth lens group G5 has positive refractive power, and sixth lens group G6 has negative refractive power. By this configuration, spherical aberration and curvature of field can be easily corrected.

In both the sixth and seventh embodiments, it is preferable that the first lens group G1 is fixed in the optical axis direction with respect to the image surface I upon zooming from the wide angle end state to the telephoto end state. By this configuration, decentering is decreased. As a result, a drop in performance, due to decentering, particularly curvature of field, is suppressed, and good optical performance can be implemented.

In both the sixth and seventh embodiments, it is preferable that the diaphragm S is disposed closer to the image than the fourth lens group G4, and is fixed in the optical axis direction with respect to the image surface I upon zooming from the wide angle end state to the telephoto end state. By disposing the diaphragm S closer to the image than the fourth lens group G4, distortion can be easily corrected. Since the position of the diaphragm S is closer to the lens mount, the diaphragm mechanism can be simplified. In addition, the diaphragm S is fixed in the optical axis direction with respect to the image surface I upon zooming from the wide angle end state to the telephoto end state, movement of the diaphragm S is not required upon zooming, and configuration of the zooming optical system is simplified. As a result, accuracy of the diaphragm diameter improves with less fluctuation, and optical performance can be stabilized.

In both the sixth and seventh embodiments, it is preferable that the focusing lens group moves to the object side upon focusing from the infinite object point to the close object point. By this configuration, the outer diameter of the focusing lens group can be decreased, and the focusing speed can be increased.

In any one of the first to seventh embodiments, it is preferable that a condition of the following Expression (1) is satisfied, where f4 denotes a focal length of the fourth lens group G4, and fT denotes a focal length in the telephoto end state.

$$|f4|/fT<0.210 \qquad (1)$$

This conditional Expression (1) specifies a ratio of the focal length f4 of the fourth lens group G4 and the focal length fT in the telephoto end state. By satisfying the conditional Expression (1), this zooming optical system can implement good optical performance. If the upper limit value of the conditional Expression (1) is exceeded, correction of the spherical aberration is difficult. To ensure the effect of the present invention, it is preferable to set the upper limit value of the conditional Expression (1) to 0.200.

In any one of the first to seventh embodiments, it is preferable to satisfy a condition of the following Expression (2), where f3 denotes a focal length of the third lens group G3.

$$0.570<f3/|f4|<0.880 \qquad (2)$$

The conditional Expression (2) specifies a ratio of the focal length f3 of the third lens group G3 and the focal length f4 of the fourth lens group G4. By satisfying the conditional Expression (2), this zooming optical system can implement good optical performance. If the upper limit value of the conditional Expression (2) is exceeded, correction of the curvature of field is difficult. If the lower limit value of the conditional Expression (2) is not reached, correction of the spherical aberration is difficult. To ensure the effect of the present invention, it is preferable to set the upper limit value of the conditional Expression (2) to 0.860. To further ensure the effect of the present invention, it is preferable to set the lower limit value of the conditional Expression (2) to 0.600.

Figure 53:
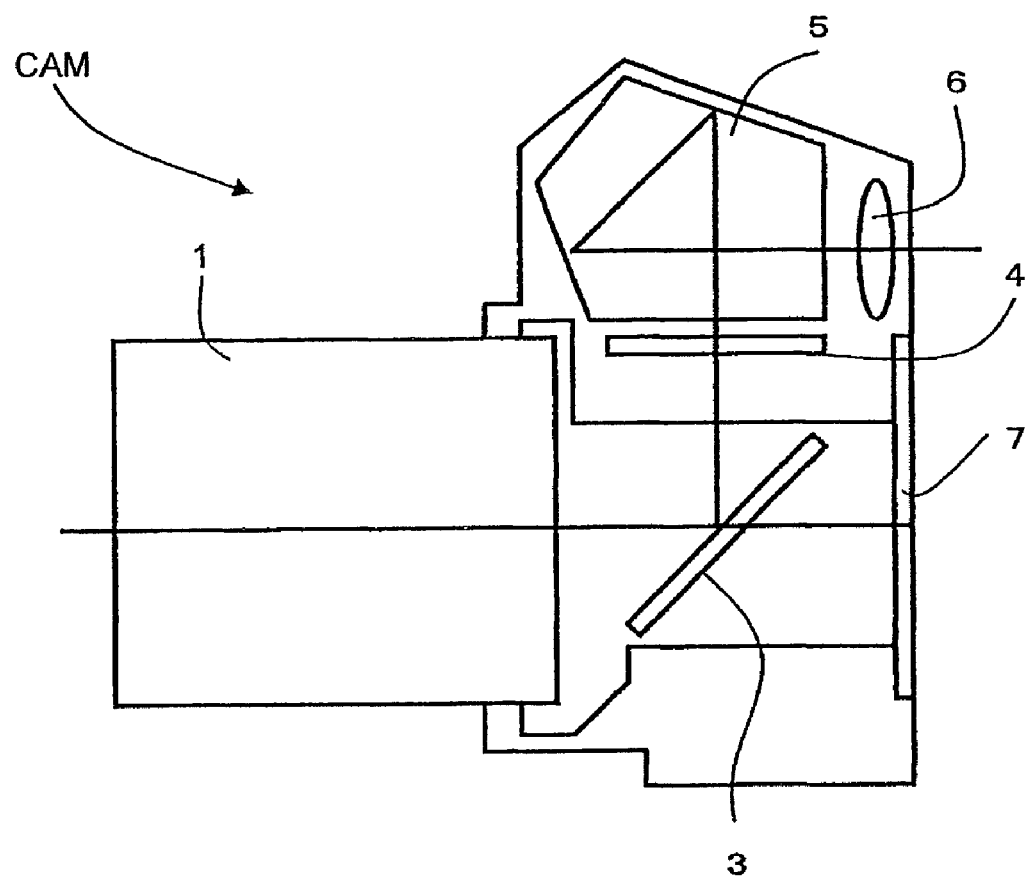
FIG. 53 is a cross-sectional view depicting a digital single lens reflex camera CAM having the zooming optical system with the above mentioned configuration as a camera lens.

FIG. 53 shows a cross-sectional view of a digital single lens reflex camera CAM (optical apparatus) equipping the zooming optical system having the above configuration as a camera lens 1. In the digital single lens reflex camera CAM shown in FIG. 53, the lights from an object (not illustrated) are condensed by the camera lens 1, and form an image on a reticle 4 via a quick return mirror 3. Lights that formed the image on the reticle 4 are reflected in the penta prism 5 multiple times, and are guided to an ocular 6. The user can observe the object image as an erect image through the ocular 6.

When the user presses the release button (not illustrated), the quick return mirror 3 moves out of the optical path, and the lights of the object (not illustrated) condensed by the camera lens 1 form an object image on an image sensing element 7. Thereby the lights from the object are captured by the image sensing element 7, and are recorded in a memory (not illustrated) as an object image. Therefore the user can photograph an object using this camera CAM. The camera CAM shown in FIG. 53 may have a removable camera lens 1, or may be integrated with the camera lens 1. The camera CAM may be a single lens reflex camera, or may be a compact camera without a quick return mirror.

Figure 54:
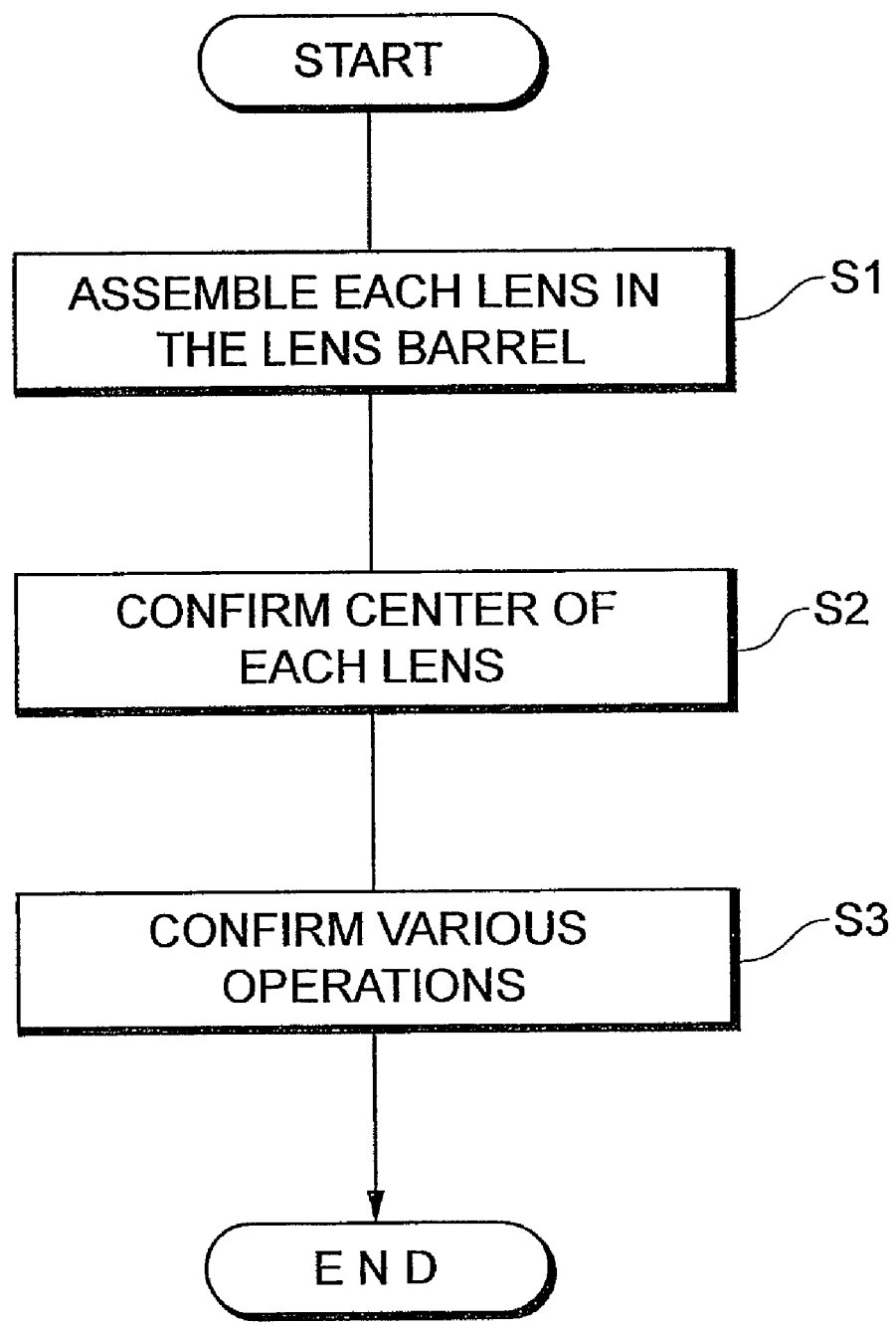
FIG. 54 is a flow chart depicting a manufacturing method for the zooming optical system with the above mentioned configuration.

Now a manufacturing method for the zooming optical system having the above mentioned configuration will be described with reference to FIG. 54. First each lens (e.g. lens L11 to L62 in FIG. 1) is assembled in a cylindrical lens barrel (step S1). When the lenses are assembled in the lens barrel, the lenses may be assembled one by one in the lens barrel in the sequence along the optical axis, or a part or all of the lenses may be integrated by a retainer and then assembled with the lens barrel element. After each lens is assembled in the lens barrel, it is confirmed whether an image of the object is formed in a state in which each lens is assembled in the lens barrel, in other words, whether a center of each lens is aligned (step S2). Then various operations of the zooming optical system are confirmed (step S3). Examples of various operations are a zooming operation upon zooming from a wide angle end state to a telephoto end state (e.g. the second lens G2, third lens G3, fifth lens G5 and sixth lens G6 move in the optical axis direction respectively in the case of FIG. 1), a focusing operation in which lenses used for focusing from a distant object point to a close object point (e.g. rear group G1R in the case of FIG. 1) move in the optical axis direction, and a hand motion blur correction operation that moves at least a part of the lenses (e.g. the fourth lens group G4 in the case of FIG. 1) so as to have an orthogonal component with respect to the optical axis. The sequence of confirming various operations is arbitrary.

DESCRIPTION OF THE EXAMPLES

Concrete examples according to the present embodiment will now be described with reference to the drawings. Table 1 to Table 13 shown below are tables on parameters in the first to thirteenth examples. In [All Parameters], f denotes a focal length of the entire system, FNO denotes an F number, TL denotes a total length of the entire system, and 2ω denotes a full angle of view. In [Lens Data], a surface number denotes a sequence of the lens surface from the object, along the light traveling direction, r denotes a radius of curvature of each lens surface, d denotes a surface distance, that is a distance from each optical surface to the next optical surface (or image surface I) on the optical axis, nd denotes a refractive index at the d-line (wavelength: 587.6 nm), vd is an Abbe number at the d-line, and BF denotes a back focus. "*" is attached to the surface number if the lens surface is aspherical, and a paraxial radius of curvature is shown in the column of the radius of curvature r. "0.0000" of the radius of curvature shows a plane or aperture. The refractive index of air "1.00000" is omitted. In [Variable Distance Data], f denotes a focal length of the entire system, β denotes a lateral magnification of the entire system, and Di (i is an integer) denotes a variable surface distance on the i-th surface. The [Focal length data of each group] shows a first surface and focal length of each group. In [Conditional Expression], values corresponding to conditional Expressions (1) and (2) are shown.

In [aspherical data], the shape of an aspherical surface shown in [Lens data] is represented by the following Expression (a). In other words, [the shape of the aspherical surface] is given by the following Expression (a), where y denotes a height in a direction perpendicular to the optical axis, S (y) denotes a distance (sag amount) from a tangential plane at a vertex of the aspherical surface to a position on the aspherical surface at the height y along the optical axis, r denotes a radius of curvature of a reference spherical surface (paraxial radius of curvature), K denotes a conical coefficient, and An denotes an n-degree aspherical coefficient An. E-n indicates ×10$^n$. For example, 1.234E-05=1.234×10$^{-5}$.

$$S(y)=(y^2/r)/\{1+(1-K \cdot y^2/r^2)^{1/2}\}+A4 \times y^4+A6 \times y^6+A8 \times y^8+A10 \times y^{10} \quad (a)$$

In the tables, "mm" is normally used for units of focal length f, radius of curvature r, surface distance d and other lengths. However unit is not limited to "mm", but another appropriate unit can be used instead, since an equivalent optical performance is obtained even if an optical system is proportionally expanded or proportionally reduced.

The above description on tables is the same for other examples, for which description is omitted.

First Example

A first example will be described with reference to FIG. 1 to FIG. 4 and Table 1. FIG. 1 shows a lens configuration and zoom locus of the first example. As FIG. 1 shows, a zooming optical system according to the first example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a biconvex positive lens L13, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, a cemented lens of a biconvex positive lens L32 and a biconcave negative lens L33, and a positive meniscus lens L34 having a convex surface facing the object.

The fourth lens group G4 has a negative meniscus lens L41 having a convex surface facing the object, and a cemented lens of a positive meniscus lens L42 having a concave surface facing the object and a biconcave negative lens L43, which are disposed in order from the object.

The fifth lens group G5 has a positive meniscus lens L51 having a convex surface facing the object, and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.487, and the focal length is 81.6 (mm), so the moving distance of the lens L41 and the cemented lens of the lens L42 and lens L43 for correction 0.350° of the rotational blur is −0.335 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 1 below shows the values of each parameter of the zooming optical system according to the first example. The surface numbers 1 to 36 in Table 1 correspond to the surfaces 1 to 36 in FIG. 1.

TABLE 1

[All Parameters]

| | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.3 | ~ | 5.8 |
| TL | 259.8 | ~ | 259.8 | ~ | 259.8 |
| 2ω | 29.4 | ~ | 12.0 | ~ | 6.1 |

[Lens Data]

| Surface number | r | d | nd | vd |
|---|---|---|---|---|
| 1 | 131.0386 | 3.6 | 1.83481 | 42.7 |
| 2 | 75.2746 | 8.6 | 1.49782 | 82.6 |
| 3 | 465.9098 | 0.1 | | |
| 4 | 106.2334 | 7.7 | 1.49782 | 82.6 |
| 5 | −944.4570 | D5 | | |
| 6 | 87.6454 | 3.2 | 1.84666 | 23.8 |
| 7 | 62.9536 | 8.8 | 1.58913 | 61.2 |
| 8 | 558.0682 | D8 | | |
| *9 | 964.6881 | 2.0 | 1.79050 | 45.0 |
| 10 | 72.9232 | 4.2 | | |
| 11 | −106.1654 | 2.0 | 1.75500 | 52.3 |
| 12 | 36.6620 | 6.1 | 1.80809 | 22.8 |
| 13 | −262.3610 | 1.8 | | |
| 14 | −62.0716 | 1.7 | 1.80400 | 46.6 |
| 15 | 89.8286 | D15 | | |
| 16 | 157.0245 | 4.1 | 1.74400 | 44.8 |
| 17 | −87.7728 | 0.1 | | |
| 18 | 64.6529 | 6.2 | 1.60300 | 65.5 |
| 19 | −64.6529 | 1.8 | 1.84666 | 23.8 |
| 20 | 0.1000 | 33.1 | | |
| 21 | 63.1830 | 2.4 | 1.48749 | 70.5 |
| 22 | 116.5426 | D22 | | |
| 23 | 117.8024 | 1.3 | 1.62004 | 36.3 |
| 24 | 55.0138 | 1.8 | | |
| 25 | −92.4808 | 3.1 | 1.79504 | 28.7 |
| 26 | −27.0308 | 1.3 | 1.74400 | 44.8 |
| 27 | 198.0882 | 4.1 | | |
| 28 | 0.0000 | D28 | (Aperture stop S) | |
| 29 | 27.1699 | 4.4 | 1.48749 | 70.5 |
| 30 | 230.6303 | 6.2 | | |
| 31 | 59.7890 | 1.3 | 1.75520 | 27.5 |
| 32 | 17.9497 | 7.7 | 1.51823 | 58.9 |
| 33 | −53.3837 | D33 | | |
| 34 | −27.3748 | 1.3 | 1.80400 | 46.6 |
| 35 | 27.3748 | 5.7 | 1.78472 | 25.7 |
| 36 | −82.0848 | BF | | |

[Aspherical Data]
Ninth surface

κ = 1.0000, A4 = 1.2639E−06, A6 = 2.6285E−10,
A8 = 6.3570E−13, A10 = −1.1731E−16

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1540.20 | 1540.20 | 1540.20 |
| D5 | 11.4531 | 11.4530 | 11.4533 | 1.8423 | 1.8422 | 1.8424 |
| D8 | 2.0287 | 19.4242 | 26.6776 | 11.6395 | 29.0350 | 36.2884 |
| D15 | 47.4329 | 21.9992 | 2.1633 | 47.7329 | 21.9992 | 2.1633 |
| D22 | 14.1145 | 22.1525 | 34.7352 | 14.1145 | 22.1525 | 34.7352 |
| D28 | 26.9018 | 12.1781 | 1.9109 | 26.9018 | 12.1781 | 1.9109 |
| D33 | 5.9942 | 5.3840 | 3.3891 | 5.9942 | 5.3840 | 3.3891 |
| BF | 49.1747 | 64.5087 | 76.7705 | 49.1747 | 64.5087 | 76.7705 |

[Focal Length Data of Each Group]

| Group number | First surface of group | Focal length of group |
|---|---|---|
| G1 | 1 | 98.5783 |
| G2 | 9 | −26.6117 |
| G3 | 16 | 44.0931 |
| G4 | 23 | −60.3326 |
| G5 | 29 | 43.5070 |
| G6 | 34 | −51.5242 |

[Conditional Expressions]

| Conditional Expression (1) | |f4|/fT = 0.154 |
| Conditional Expression (2) | f3/|f4| = 0.731 |

As the parameter table in Table 1 shows, the zooming optical system according to this example satisfies both conditional Expressions (1) and (2).

Figure 2B:
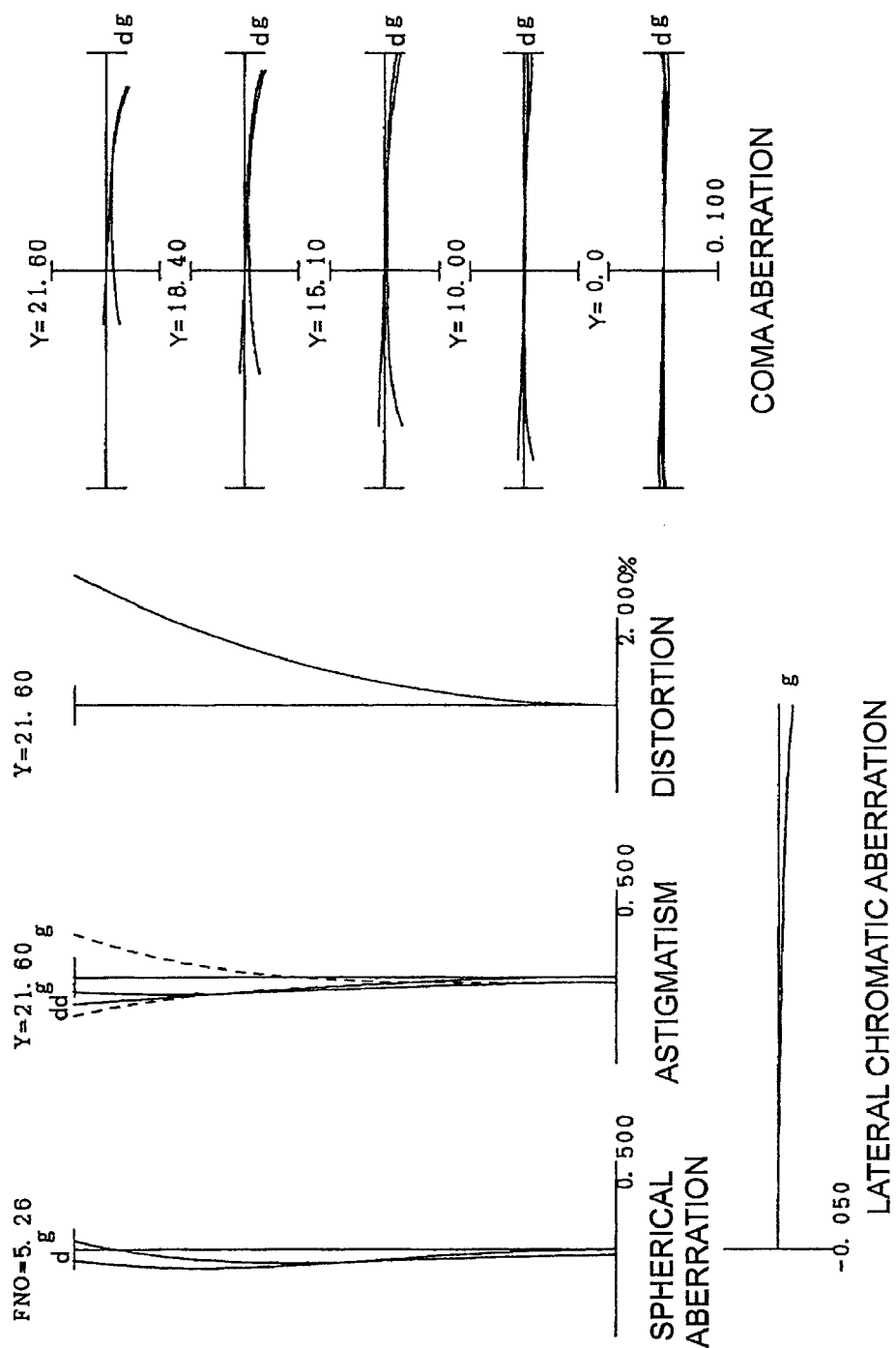
FIG. 2B shows the intermediate focal length state.
Figure 2C:
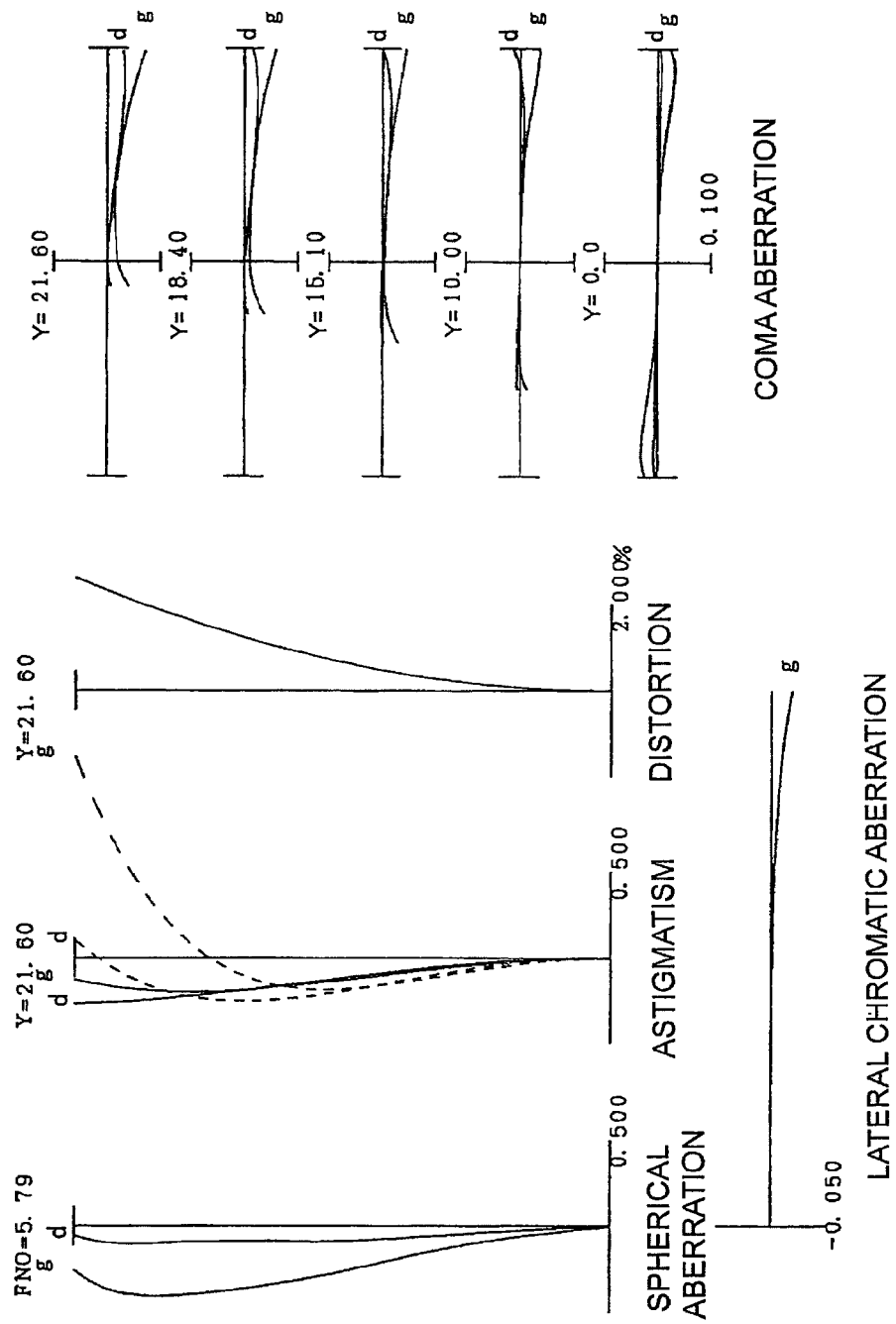
FIG. 2C shows the telephoto end state.
Figure 3A:
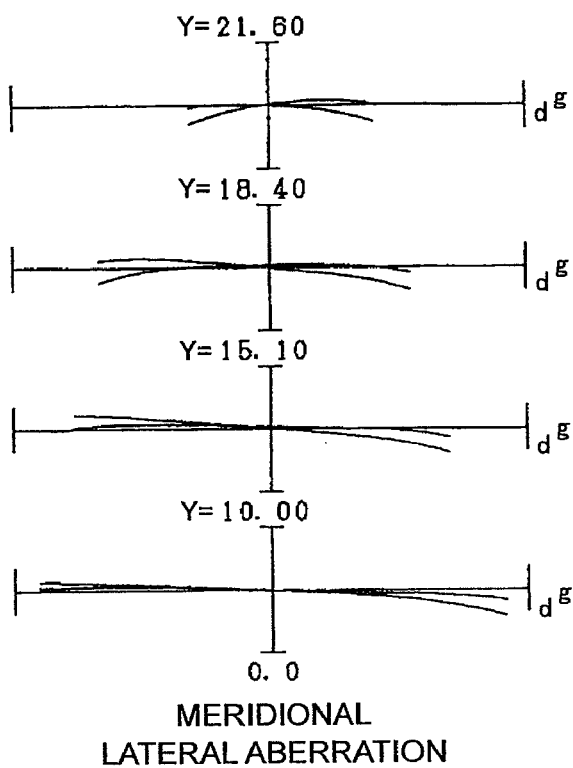
FIG. 3A shows the wide angle end state.
Figure 3B:
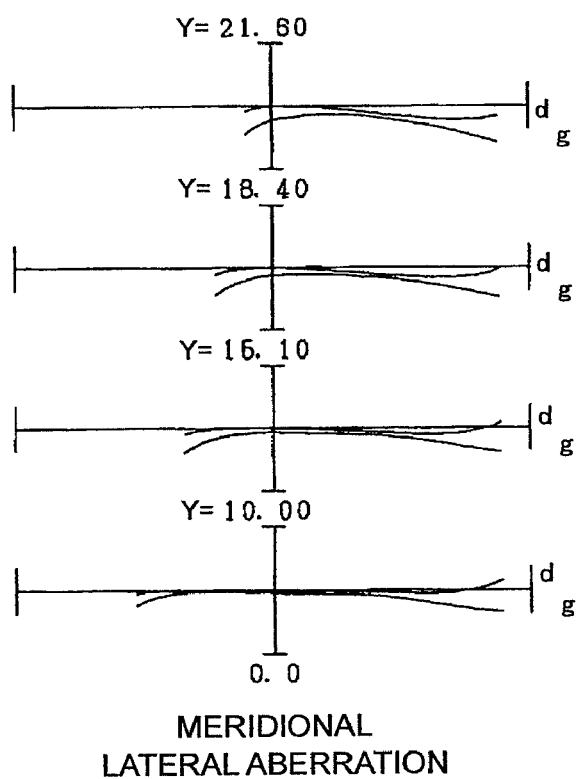
FIG. 3B shows the telephoto end state.
Figure 4A:
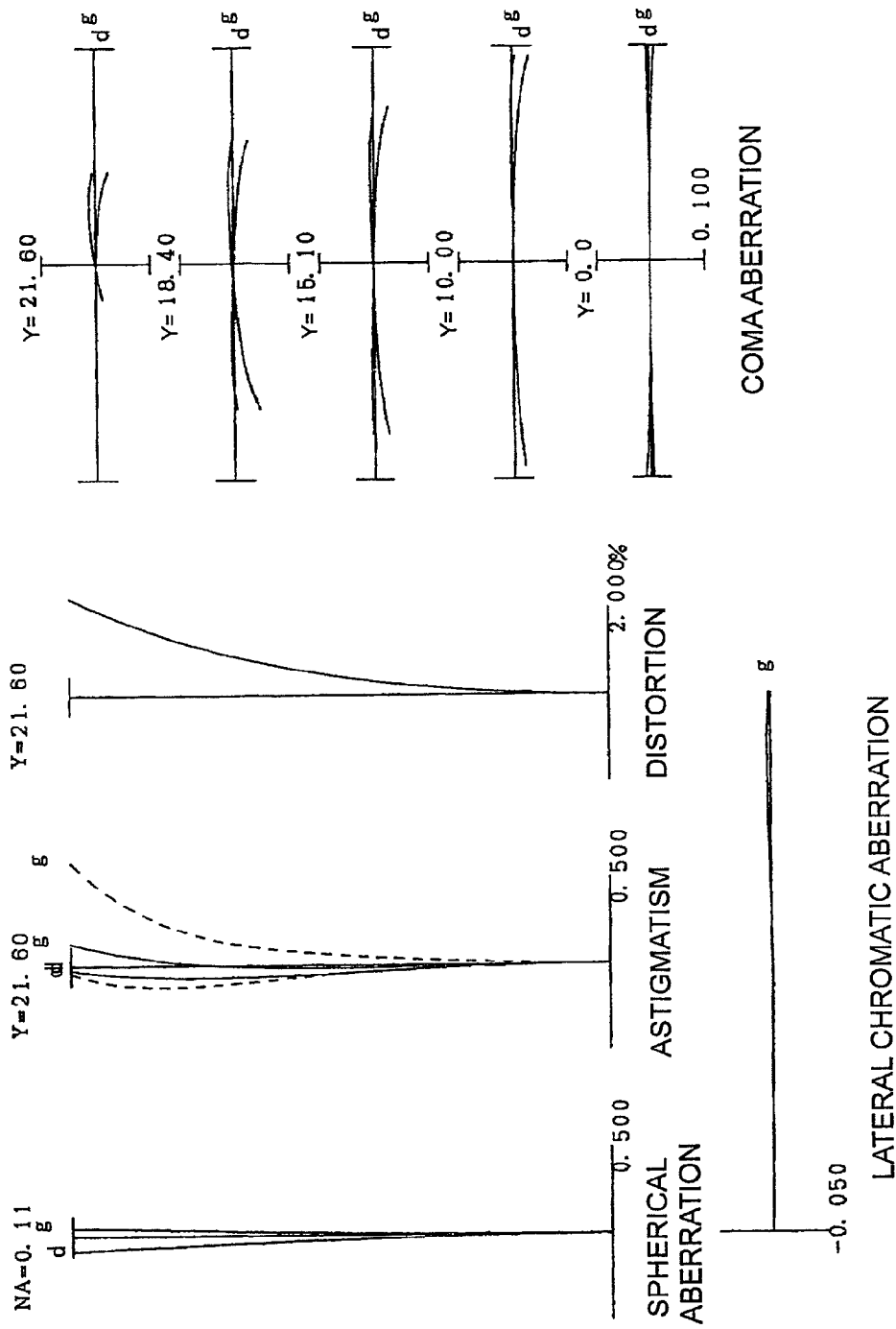
FIG. 4A shows the wide angle end state.
Figure 4B:
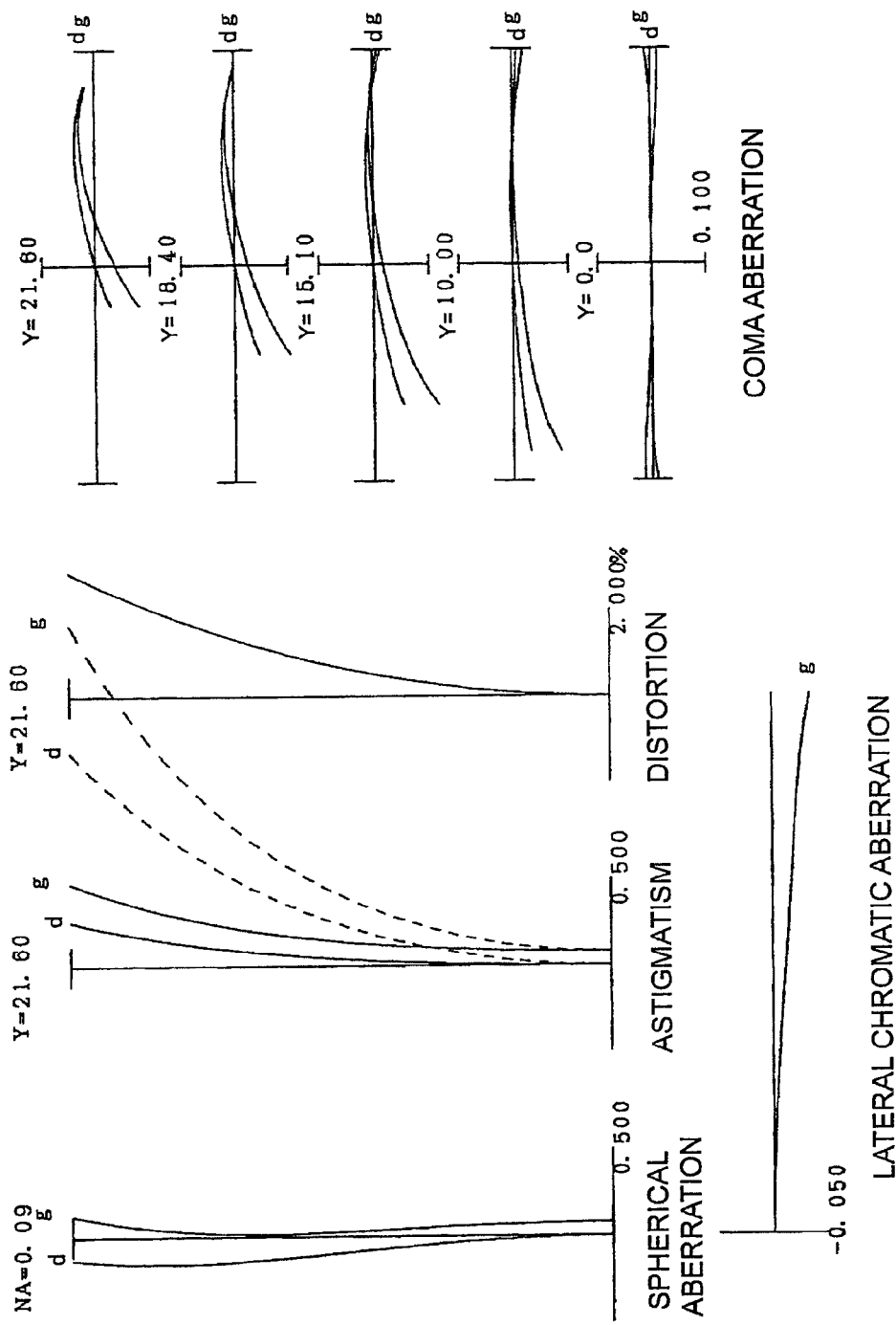
FIG. 4B shows the intermediate focal length state.
Figure 4C:
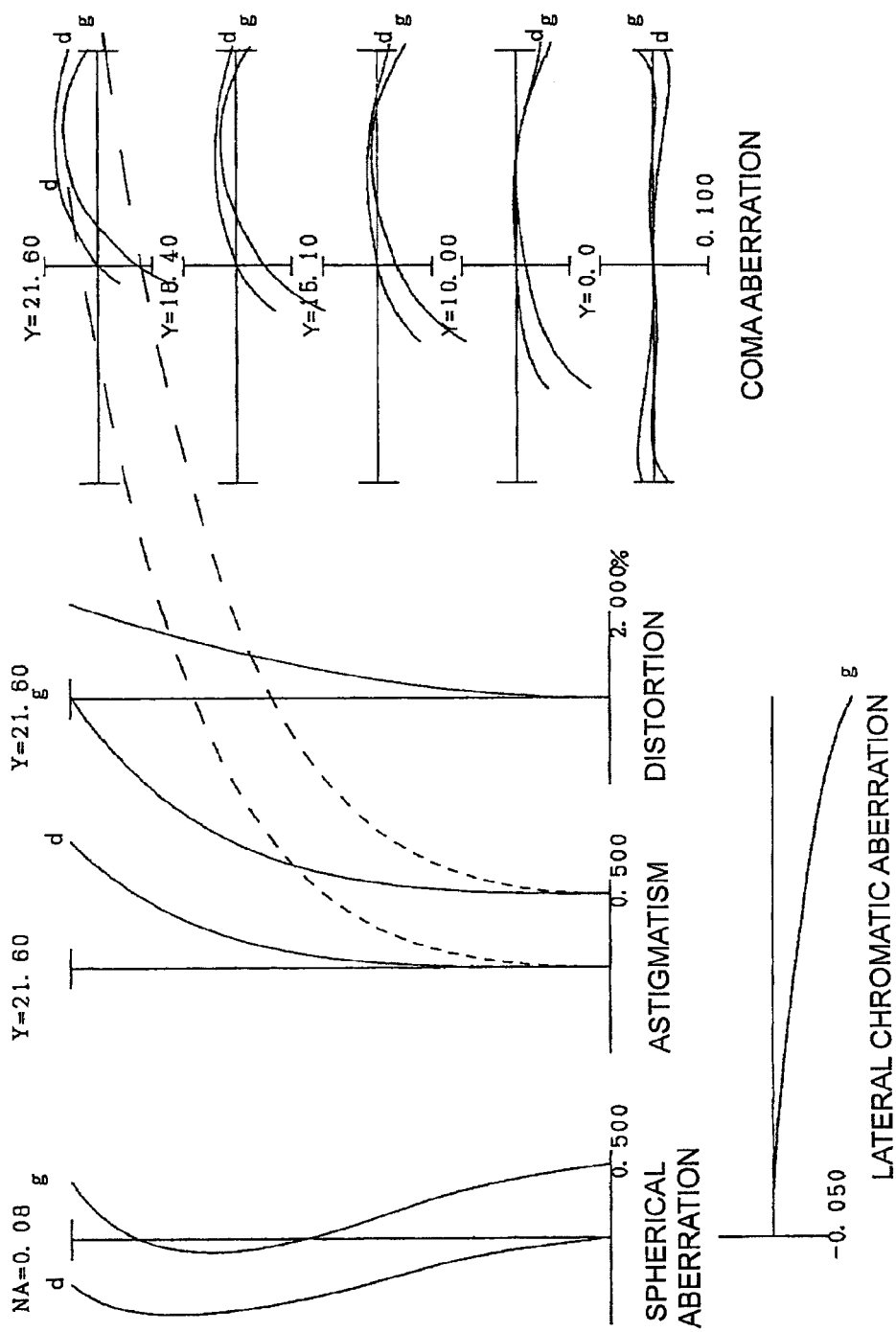
FIG. 4C shows the telephoto end state.

FIG. 2 are graphs showing various aberrations of the zooming optical system according to the first example upon focusing on infinity, wherein FIG. 2A shows the wide angle end state, FIG. 28 shows the intermediate focal length state, and FIG. 2C shows the telephoto end state. FIG. 3 are graphs showing meridional lateral aberrations when blur correction is performed on the zooming optical system according to the first example upon focusing on infinity, wherein FIG. 3A shows the wide angle end state, and FIG. 3B shows the telephoto end state. FIG. 4 are graphs showing various aberrations of the zooming optical system according to the first example upon focusing on close distance (photographing distance of entire system: R=1.8 m), wherein FIG. 4A shows the wide angle end state, FIG. 4B shows the intermediate focal length state, and FIG. 4C shows the telephoto end state.

In each graph showing aberration, FNO denotes an F number and Y denotes an image height (unit: mm). In the graph showing spherical aberration, a value of the F number corresponding to a maximum aperture is shown, in the graphs showing astigmatism and distortion, a maximum value of the image height is shown respectively, and in the graph showing coma aberration, a value of each image height is shown. d denotes various aberrations at the d-line (wavelength: 587.6 nm), and g denotes various aberrations at the g-line (wavelength: 435.8 nm), and no indication indicates various aberrations at the d-line respectively. In the graph showing astigmatism, a solid line indicates a sagittal image surface, and a broken line indicates a meridional image surface. This description on graphs showing aberrations is the same for other examples, for which description is omitted.

According to the first example, as each graph on aberrations shows, various aberrations are corrected well in each focal length state from the wide angle end state to the telephoto end state, and excellent image forming performance is implemented.

Second Example

A second example will be described with reference to FIG. 5 to FIG. 8 and Table 2. FIG. 5 shows a lens configuration and zoom locus of the second example. As FIG. 5 shows, a zooming optical system according to the second example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a biconvex positive lens L12, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex negative lens L23, and a biconcave negative lens L24, which are disposed in order from the object.

The third lens group G3 has a biconvex positive lens L31, a cemented lens of a biconvex positive lens L32 and a negative meniscus lens L33 having a concave surface facing the object, and a positive meniscus lens L34 having a convex surface facing the object, which are disposed in order from the object.

The fourth lens group G4 has a negative meniscus lens L41 having a convex surface facing the object, and a cemented lens having a biconcave negative lens L42 and a positive meniscus lens L43 having a convex surface facing the object, which are disposed in order from the object.

The fifth lens group G5 has a positive meniscus lens L51 having a convex surface facing the object, and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.658, and the focal length is 81.6 (mm), so the moving distance of the lens L41 and the cemented lens of the lens L42 and lens L43 for correction 0.350° of the rotational blur is −0.301 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 2 below shows the values of each parameter of the zooming optical system according to the second example. The surface numbers 1 to 36 in Table 2 correspond to the surfaces 1 to 36 in FIG. 5.

TABLE 2

| [All Parameters] | | | | |
|---|---|---|---|---|
| | Wide angle end state | | Intermediate focal length state | Telephoto end state |
| f | 81.6 | ~ | 200.0 | ~ | 392.0 |
| FNO | 4.6 | ~ | 5.6 | ~ | 5.8 |
| TL | 270.0 | ~ | 270.0 | ~ | 270.0 |
| 2ω | 29.0 | ~ | 11.9 | ~ | 6.1 |

| [Lens Data] | | | | |
|---|---|---|---|---|
| Surface number | r | d | nd | νd |
| 1 | 176.1767 | 3.1 | 1.79952 | 42.3 |
| 2 | 83.7010 | 8.5 | 1.49782 | 82.6 |
| 3 | −8152.7306 | 0.1 | | |
| 4 | 90.6185 | 7.8 | 1.49782 | 82.6 |
| 5 | 28397.5490 | D5 | | |
| 6 | 92.6435 | 2.8 | 1.84666 | 23.8 |
| 7 | 69.3835 | 9.5 | 1.58913 | 61.2 |

TABLE 2-continued

| | | | | |
|---|---|---|---|---|
| 8 | 274.2400 | D8 | | |
| 9 | 185.3195 | 1.9 | 1.81600 | 46.6 |
| 10 | 40.1404 | 4.6 | | |
| 11 | −102.8423 | 1.9 | 1.75500 | 52.3 |
| 12 | 40.3224 | 6.1 | 1.80809 | 22.8 |
| 13 | −266.3547 | 2.3 | | |
| 14 | −61.0923 | 1.9 | 1.81600 | 46.6 |
| 15 | 554.0525 | D15 | | |
| 16 | 585.3312 | 4.2 | 1.69680 | 55.5 |
| 17 | −80.8093 | 0.2 | | |
| 18 | 55.2370 | 7.4 | 1.60300 | 65.5 |
| 19 | −84.0213 | 2.3 | 1.84666 | 23.8 |
| 20 | −1893.0691 | 0.1 | | |
| 21 | 60.6406 | 2.9 | 1.58913 | 61.2 |
| 22 | 147.6093 | D22 | | |
| 23 | 81.2576 | 2.5 | 1.75520 | 27.5 |
| 24 | 46.0346 | 3.3 | | |
| 25 | −103.3563 | 2.3 | 1.74400 | 44.8 |
| 26 | 42.0032 | 2.9 | 1.84666 | 23.8 |
| 27 | 245.2611 | 4.1 | | |
| 28 | 0.0000 | D28 | (Aperture stop S) | |
| 29 | 37.4902 | 3.4 | 1.48749 | 70.5 |
| 30 | 128.4907 | 12.2 | | |
| 31 | 62.3471 | 1.6 | 1.75520 | 27.5 |
| 32 | 23.3504 | 5.8 | 1.48749 | 70.5 |
| 33 | −62.7817 | D33 | | |
| 34 | −32.6512 | 1.4 | 1.79500 | 45.3 |
| 35 | 35.0907 | 5.0 | 1.75520 | 27.5 |
| 36 | −70.7458 | BF | | |

[Variable Distance Data]

| | Infinity | | | Close distance | | |
|---|---|---|---|---|---|---|
| | Wide angle End | Inter-mediate | Telephoto end | Wide angle End | Inter-mediate | Telephoto end |
| f | 81.6 | 200.0 | 392.0 | — | — | — |
| β | 0 | 0 | 0 | −0.06 | −0.14 | −0.27 |
| D0 | 0 | 0 | 0 | 1530.00 | 1530.00 | 1530.00 |
| D5 | 15.0817 | 15.0817 | 15.0817 | 2.0000 | 2.0000 | 2.0000 |
| D8 | 2.0000 | 21.1264 | 29.0195 | 15.0817 | 34.2081 | 42.1012 |
| D15 | 50.1722 | 23.1721 | 2.0000 | 50.1722 | 23.1721 | 2.0000 |
| D22 | 2.0000 | 9.8738 | 23.1528 | 2.0000 | 9.8738 | 23.1528 |
| D28 | 22.6871 | 9.4683 | 2.0000 | 22.6871 | 9.4683 | 2.0000 |
| D33 | 10.9546 | 9.0485 | 3.2613 | 10.9546 | 9.0485 | 3.2613 |
| BF | 55.0000 | 70.1250 | 83.3805 | 55.0000 | 70.1250 | 83.3805 |

[Focal Length Data of Each Group]

| Group number | First surface of group | Focal length of group |
|---|---|---|
| G1 | 1 | 105.2506 |
| G2 | 9 | −27.2581 |
| G3 | 16 | 42.3041 |
| G4 | 23 | −65.5390 |
| G5 | 29 | 61.4146 |
| G6 | 34 | −72.2532 |

[Conditional Expressions]

| | |
|---|---|
| Conditional Expression (1) | |f4|/fT = 0.167 |
| Conditional Expression (2) | f3/|f4|= 0.645 |

As the parameter table in Table 2 shows, the zooming optical system according to this example satisfies both conditional Expressions (1) and (2).

Figure 6A:
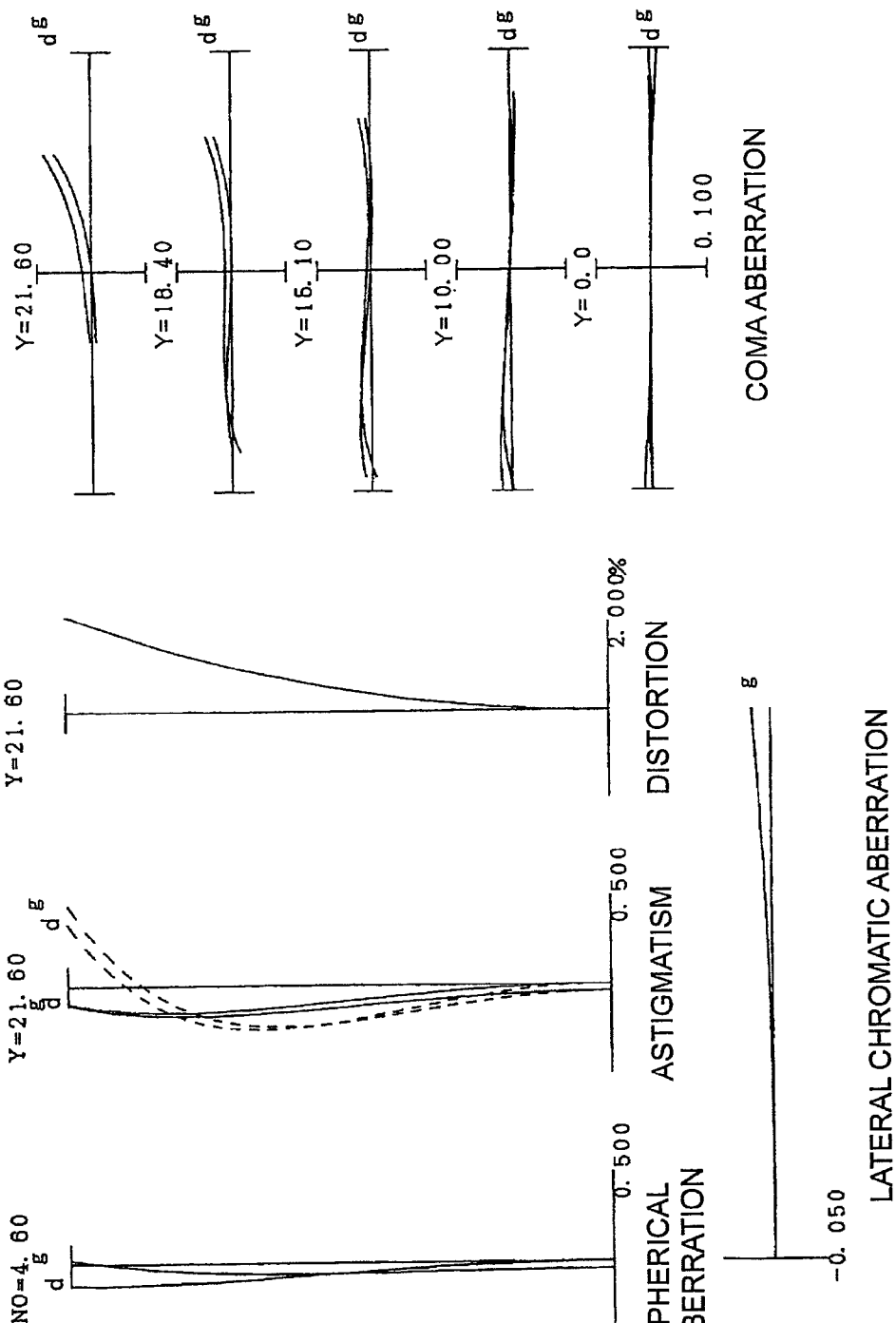
FIG. 6A shows the wide angle end state.
Figure 6B:
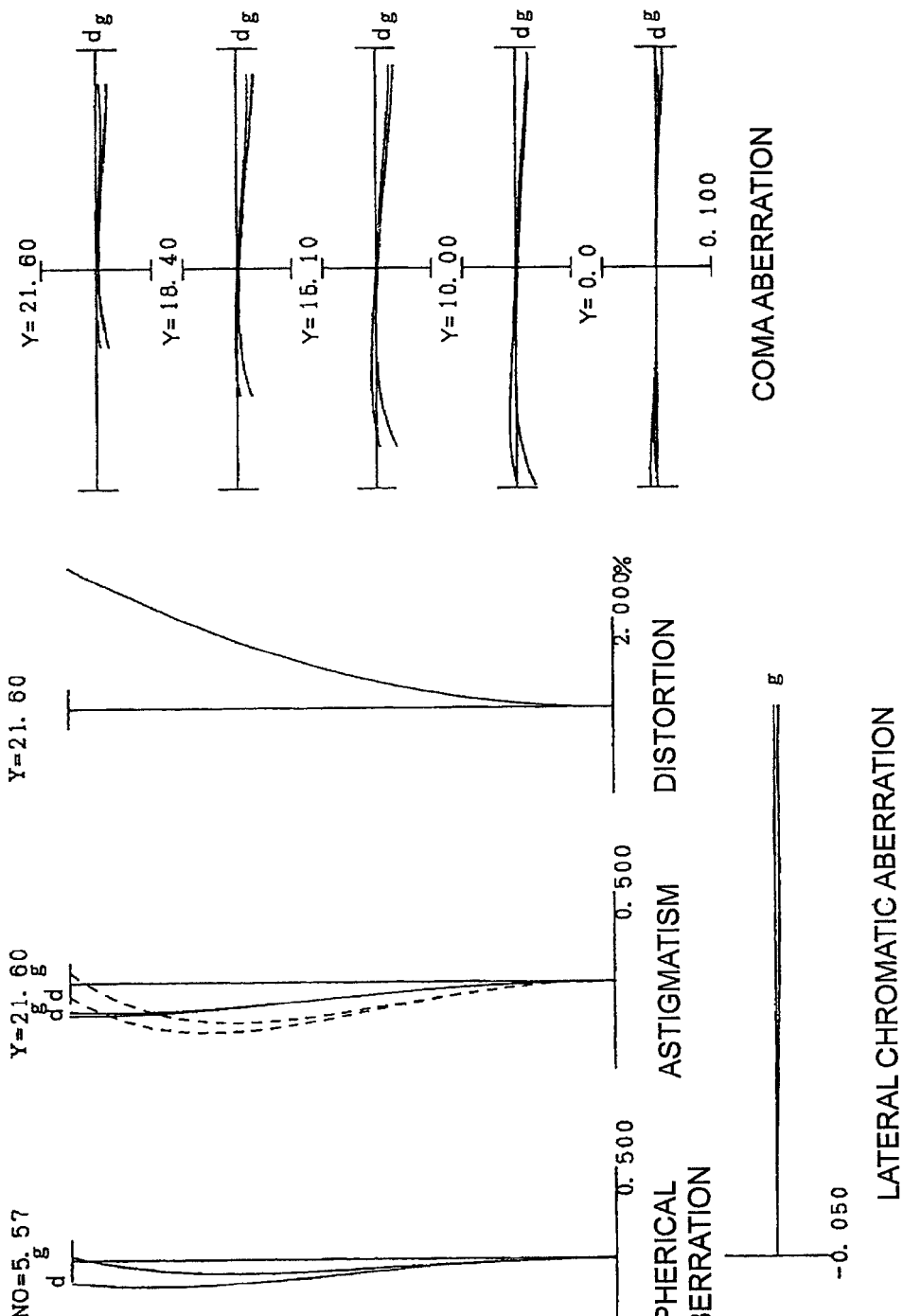
FIG. 6B shows the intermediate focal length state.
Figure 6C:
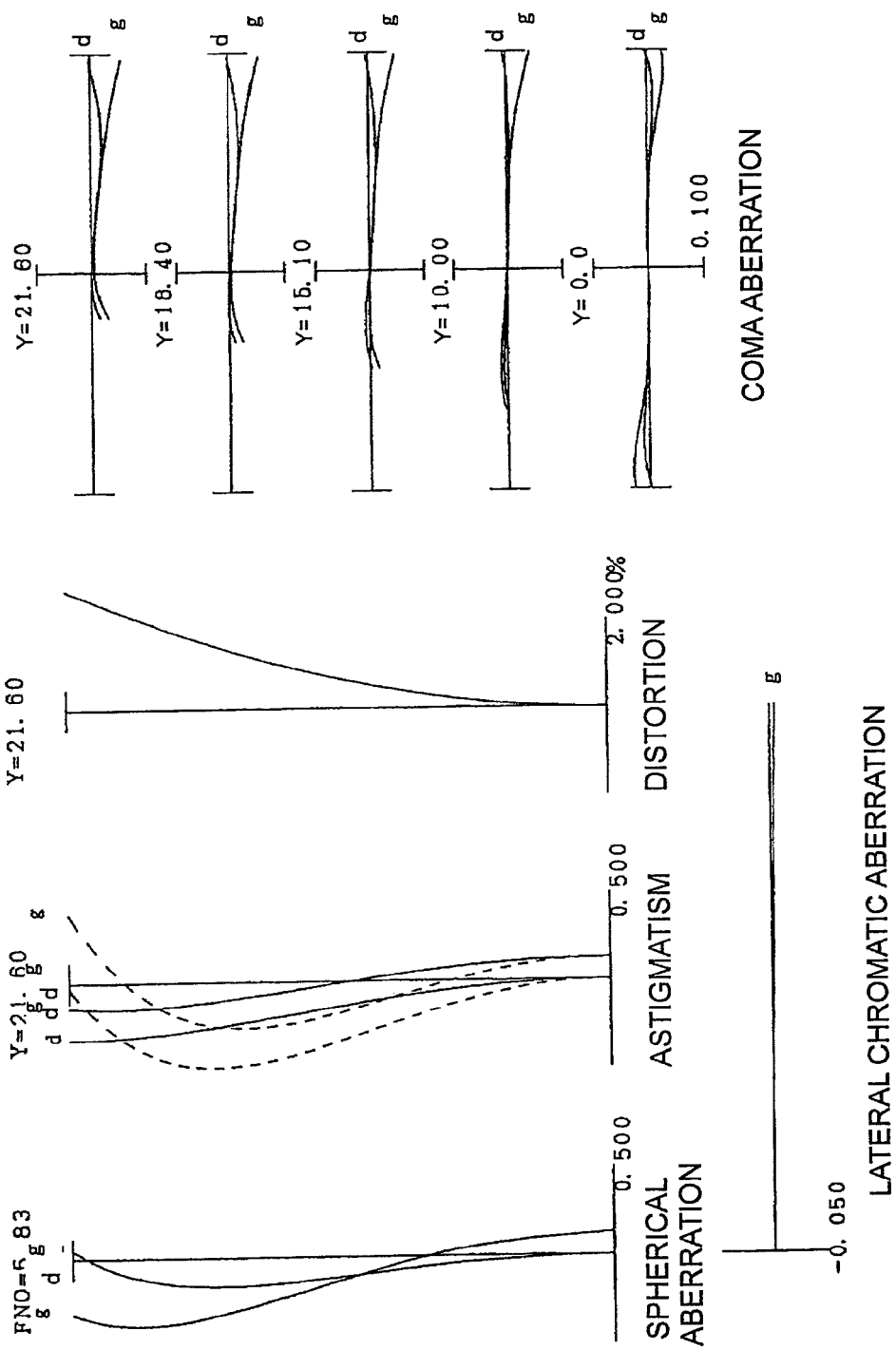
FIG. 6C shows the telephoto end state.
Figure 7A:
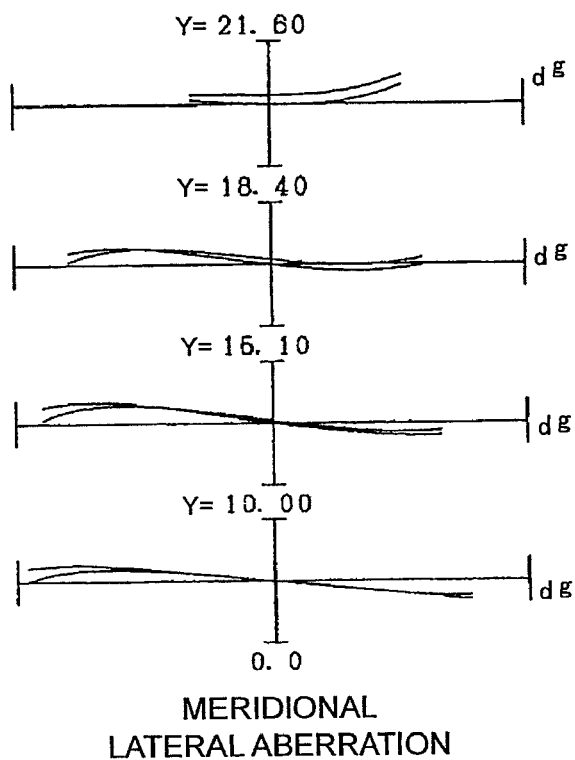
FIG. 7A shows the wide angle end state.
Figure 7B:
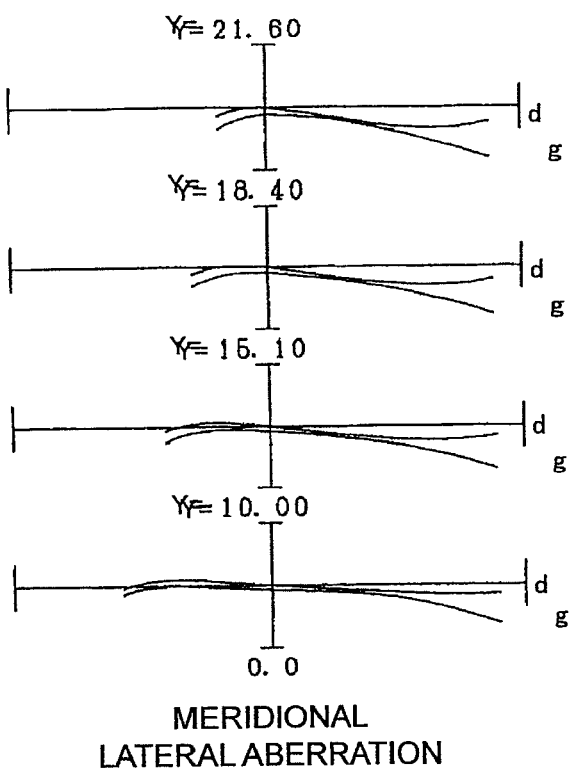
FIG. 7B shows the telephoto end state.
Figure 8A:
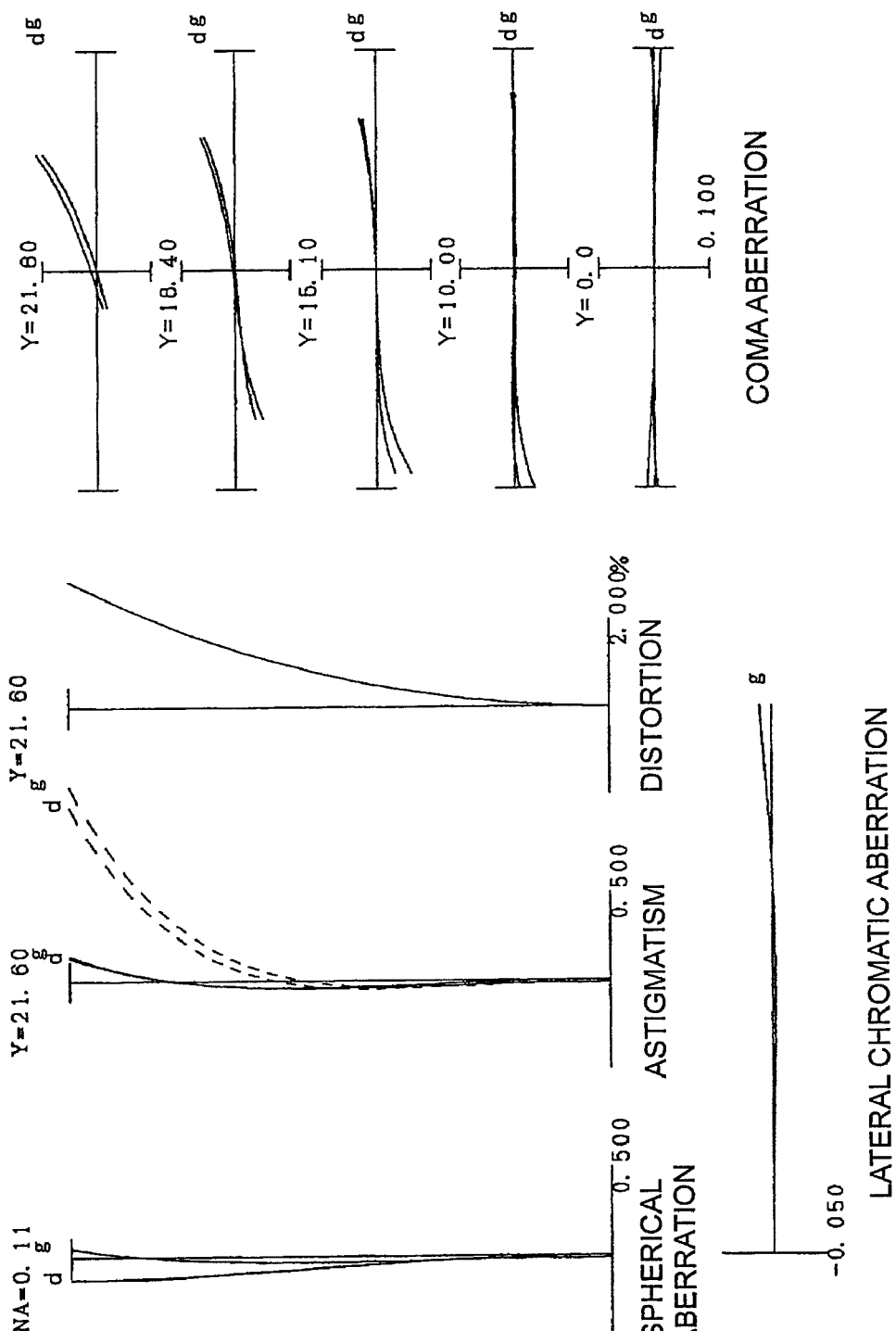
FIG. 8A shows the wide angle end state.
Figure 8B:
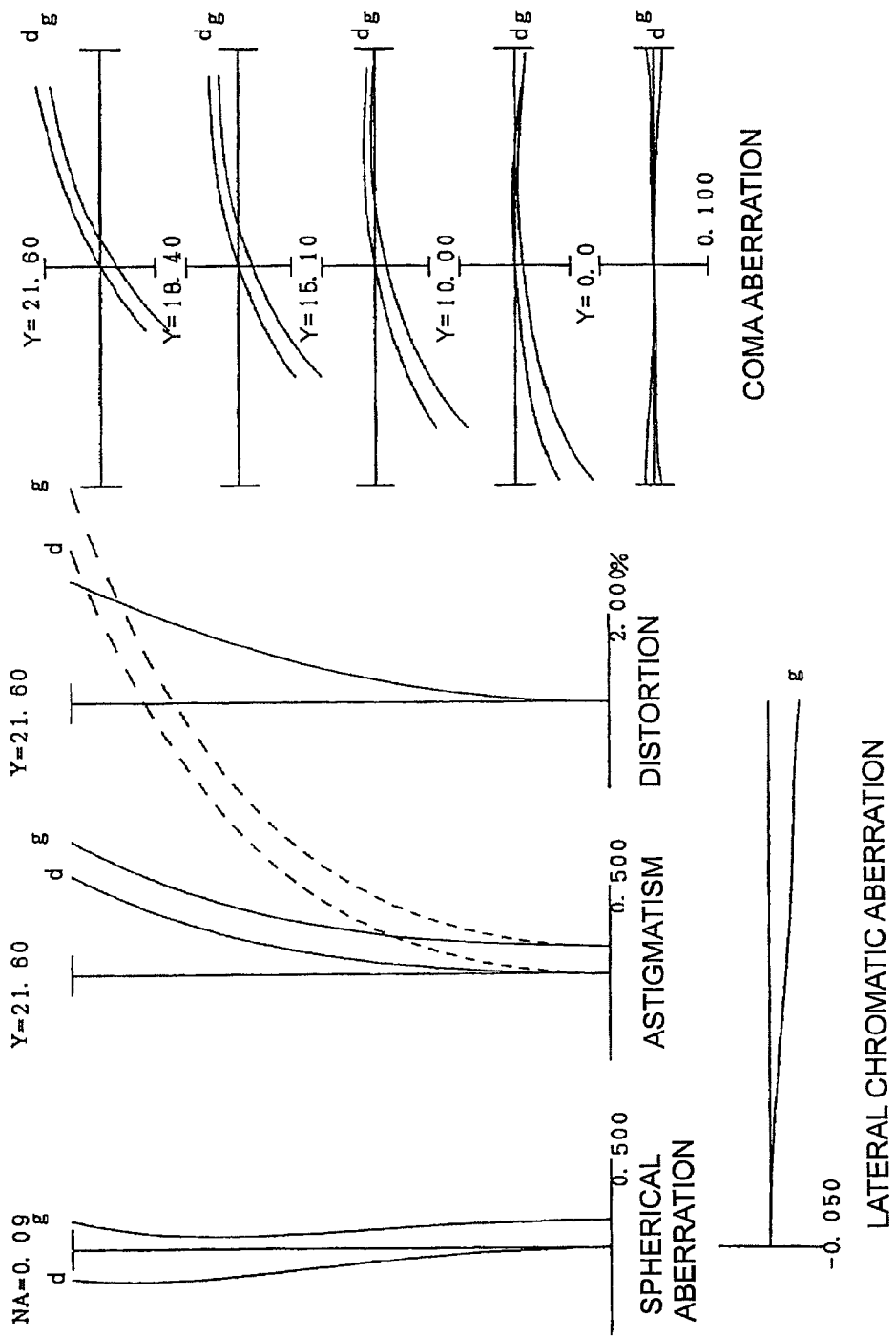
FIG. 8B shows the intermediate focal length state.
Figure 8C:
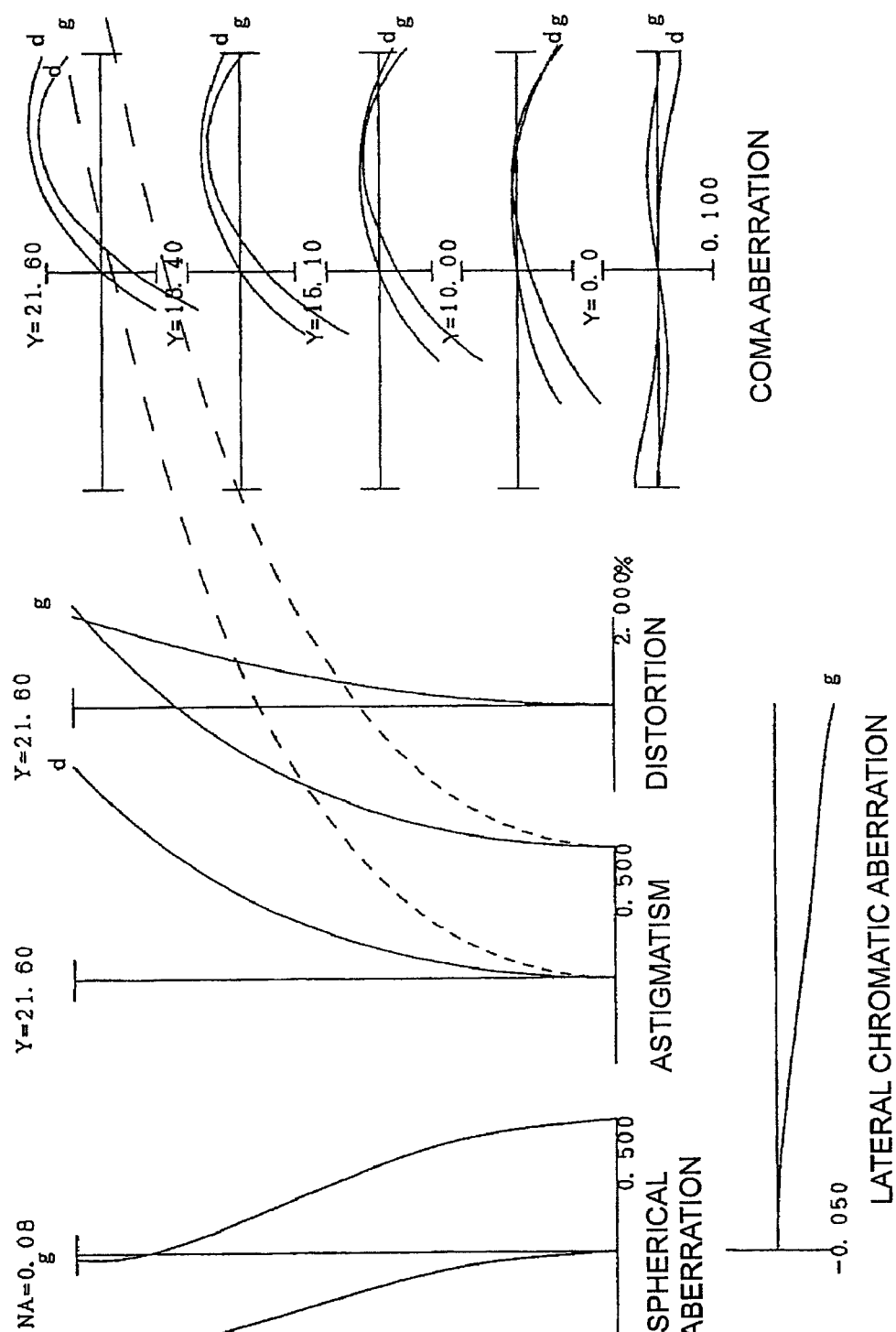
FIG. 8C shows the telephoto end state.

FIG. 6 are graphs showing various aberrations of the zooming optical system according to the second example upon focusing on infinity, wherein FIG. 6A shows the wide angle end state, FIG. 6B shows the intermediate focal length state, and FIG. 6C shows the telephoto end state. FIG. 7 are graphs showing meridional lateral aberrations when blur correction is performed on the zooming optical system according to the second example upon focusing on infinity, wherein FIG. 7A shows the wide angle end state, and FIG. 7B shows the telephoto end state. FIG. 8 are graphs showing various aberrations of the zooming optical system according to the second example upon focusing on close distance (photographing distance of entire system: R=1.8 m), wherein FIG. 8A shows the wide angle end state, FIG. 8B shows the intermediate focal length state, and FIG. 8C shows the telephoto end state.

According to the second example, as each graph on aberrations shows, various aberrations are corrected well in each focal length state from the wide angle end state to the telephoto end state, and excellent image forming performance is implemented.

Third Example

A third example will be described with reference to FIG. 9 to FIG. 12 and Table 3. FIG. 9 shows a lens configuration and zoom locus of the third example. As FIG. 9 shows, a zooming optical system according to the third example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a biconvex positive lens L12, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a positive meniscus lens L31 having a convex surface facing the object, a cemented lens of a positive meniscus lens L32 having a convex surface facing the object and a negative meniscus lens L33 having a convex surface facing the object, and a biconvex positive lens L34, which are disposed in order from the object.

The fourth lens group G4 has a negative meniscus lens L41 having a convex surface facing the object, and a cemented lens having a biconcave negative lens L42 and a positive meniscus lens L43 having a convex surface facing the object, which are disposed in order from the object.

The fifth lens group G5 has a positive meniscus lens L51 having a convex surface facing the object, a negative meniscus lens L52 having a convex surface facing the object, and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an Image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.782, and the focal length is 81.6 (mm), so the moving distance of the lens L41 and the cemented lens of the lens L42 and lens L43 for correction 0.350° of the rotational blur is −0.280 (mm). In the telephoto end state of this example, the blur correction coefficient K is −2.100, and the focal length is 392 (mm), so the moving distance of the lens L41 and the cemented lens of the lens L42 and the lens L43 for correcting 0.160° of rotational blur is −0.520 (mm).

Table 3 below shows the values of each parameter of the zooming optical system according to the third example. The surface numbers 1 to 37 in Table 3 correspond to the surfaces 1 to 37 in FIG. 9.

TABLE 3

[All Parameters]

| | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.5 | ~ | 5.8 |
| TL | 259.3 | ~ | 259.3 | ~ | 259.3 |
| 2ω | 30.0 | ~ | 12.1 | ~ | 6.2 |

[Lens Data]

| Surface number | r | d | nd | vd |
|---|---|---|---|---|
| 1 | 103.6585 | 3.3 | 1.79952 | 42.2 |
| 2 | 70.3321 | 11.5 | 1.49782 | 82.5 |
| 3 | −857.8764 | 0.1 | | |
| 4 | 190.7087 | 3.3 | 1.49782 | 82.5 |
| 5 | 476.9419 | D5 | | |
| 6 | 88.7228 | 3.0 | 1.84666 | 23.8 |
| 7 | 62.1174 | 9.3 | 1.58913 | 61.2 |
| 8 | 941.1159 | D8 | | |
| 9 | 812.8687 | 2.0 | 1.81600 | 46.6 |
| 10 | 54.5496 | 4.4 | | |
| 11 | −150.4014 | 2.0 | 1.75500 | 52.3 |
| 12 | 38.1674 | 6.8 | 1.80810 | 22.8 |
| 13 | −214.5779 | 1.9 | | |
| 14 | −70.5145 | 2.0 | 1.81600 | 46.6 |
| 15 | 124.9509 | D15 | | |
| 16 | 50.7734 | 5.2 | 1.72916 | 54.7 |
| 17 | 564.7327 | 0.2 | | |
| 18 | 48.4637 | 7.8 | 1.60300 | 65.4 |
| 19 | 1669.2624 | 2.0 | 1.84666 | 23.8 |
| 20 | 51.7876 | 0.4 | | |
| *21 | 55.1640 | 5.4 | 1.59201 | 67.0 |

TABLE 3-continued

| 22 | −176.9769 | D22 | | |
|---|---|---|---|---|
| 23 | 59.9693 | 2.0 | 1.83400 | 37.2 |
| 24 | 34.0018 | 2.6 | | |
| 25 | −89.7301 | 1.8 | 1.77250 | 49.6 |
| 26 | 43.2387 | 2.6 | 1.84666 | 23.8 |
| 27 | 373.8436 | 3.3 | | |
| 28 | 0.0000 | D28 | (Aperture stop S) | |
| 29 | 22.1543 | 3.1 | 1.58913 | 61.2 |
| 30 | 43.7426 | 4.0 | | |
| 31 | 34.8785 | 1.2 | 1.84666 | 23.8 |
| 32 | 21.9591 | 0.9 | | |
| *33 | 27.2307 | 4.8 | 1.48749 | 70.5 |
| 34 | −64.5303 | D34 | | |
| 35 | −31.6046 | 1.5 | 1.81600 | 46.6 |
| 36 | 32.9416 | 4.5 | 1.75520 | 27.5 |
| 37 | −98.0294 | BF | | |

[Aspherical Data]

Twenty first surface

κ = 0.1046, A4 = −2.4430E−06, A6 = −1.3165E−09,
A8 = 1.4951E−12, A10 = −2.4416E−15

Thirty third surface

κ = −0.3893, A4 = 2.4812E−06, A6 = −1.7862E−08,
A8 = 1.2944E−10, A10 = −7.6888E−13

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1540.69 | 1540.69 | 1540.69 |
| D5 | 12.3540 | 12.3540 | 12.3540 | 2.6544 | 2.6544 | 2.6544 |
| D8 | 2.0000 | 17.3320 | 24.0092 | 11.6995 | 27.0315 | 33.7087 |
| D15 | 52.6682 | 24.7508 | 2.0000 | 52.6682 | 24.7508 | 2.0000 |
| D22 | 6.8770 | 19.4624 | 35.5360 | 6.8770 | 19.4624 | 35.5360 |
| D28 | 19.8202 | 9.2492 | 2.0000 | 19.8202 | 9.2492 | 2.0000 |
| D34 | 7.8087 | 3.7496 | 2.0721 | 7.8087 | 3.7496 | 2.0721 |
| BF | 55.0000 | 69.6302 | 78.5569 | 55.0000 | 69.6302 | 78.5569 |

[Focal Length Data of Each Group]

| Group number | First surface of group | Focal length of group |
|---|---|---|
| G1 | 1 | 101.2181 |
| G2 | 9 | −28.6831 |
| G3 | 16 | 43.4898 |
| G4 | 23 | −51.0748 |
| G5 | 29 | 42.2851 |
| G6 | 35 | −51.8318 |

[Conditional Expressions]

| Conditional Expression (1) | |f4|/fT = 0.130 |
| Conditional Expression (2) | f3/|f4| = 0.851 |

As the parameter table in Table 3 shows, the zooming optical system according to this example satisfies both conditional Expressions (1) and (2).

Figure 10A:
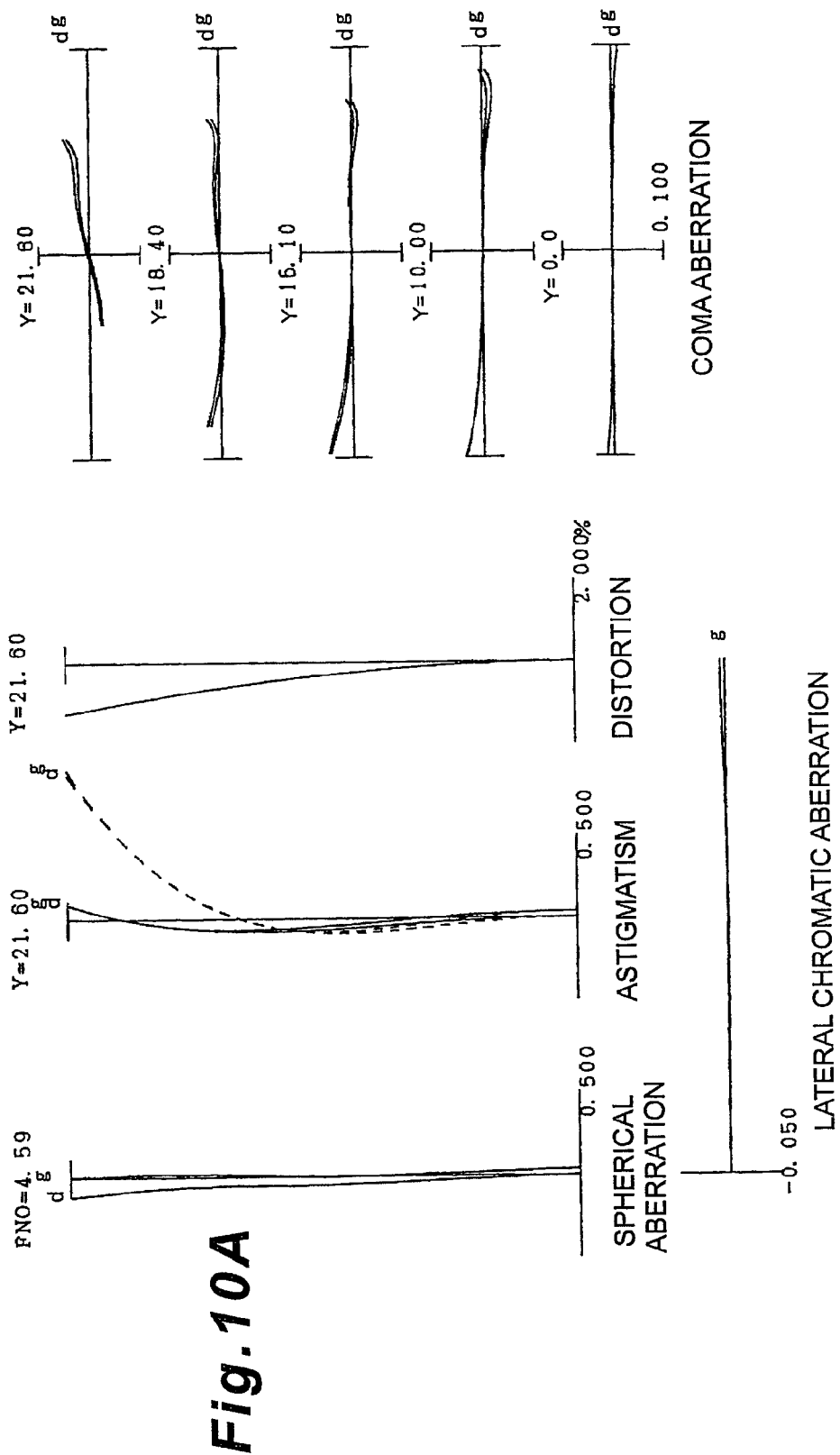
FIG. 10A shows the wide angle end state.
Figure 10B:
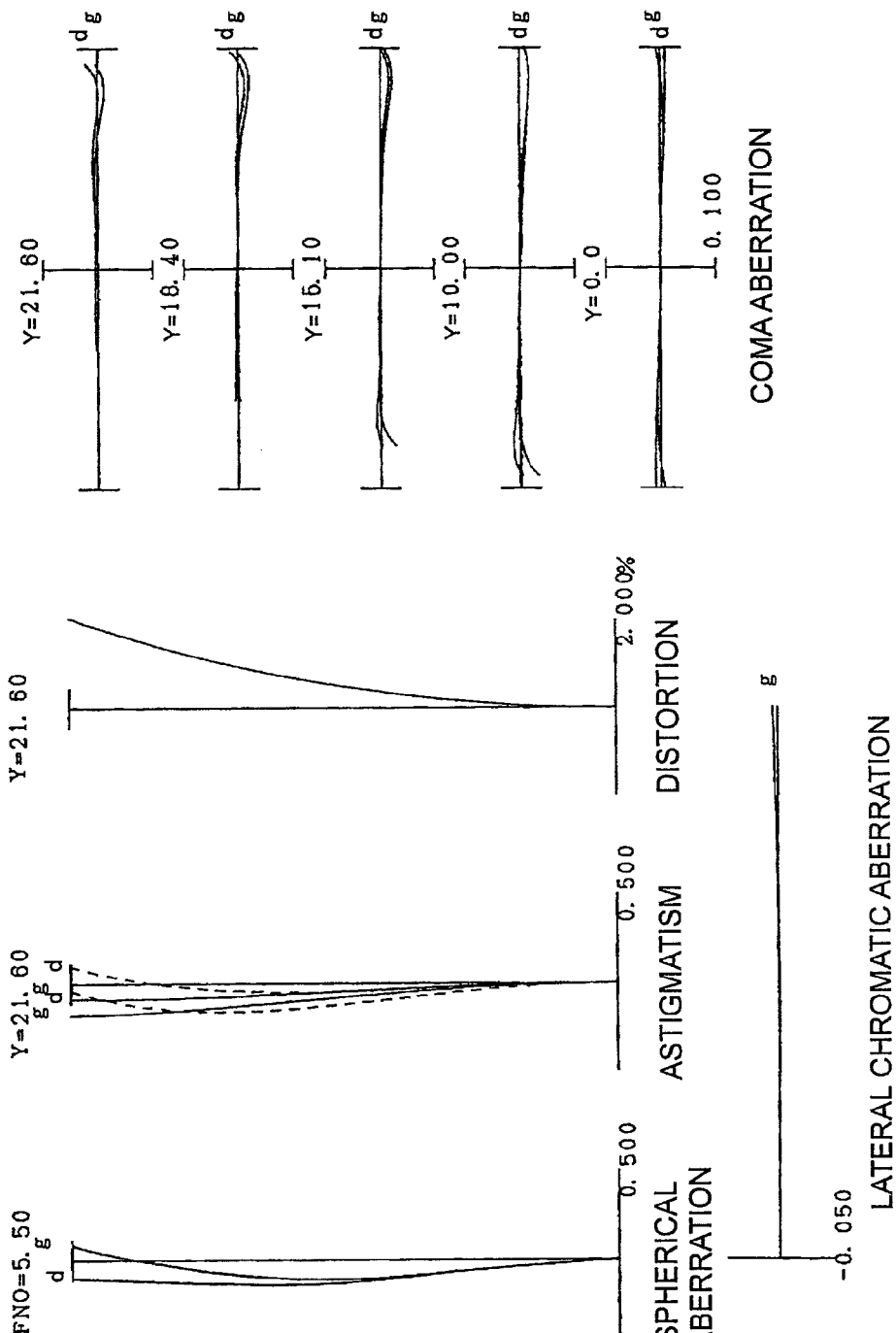
FIG. 10B shows the intermediate focal length state.
Figure 10C:
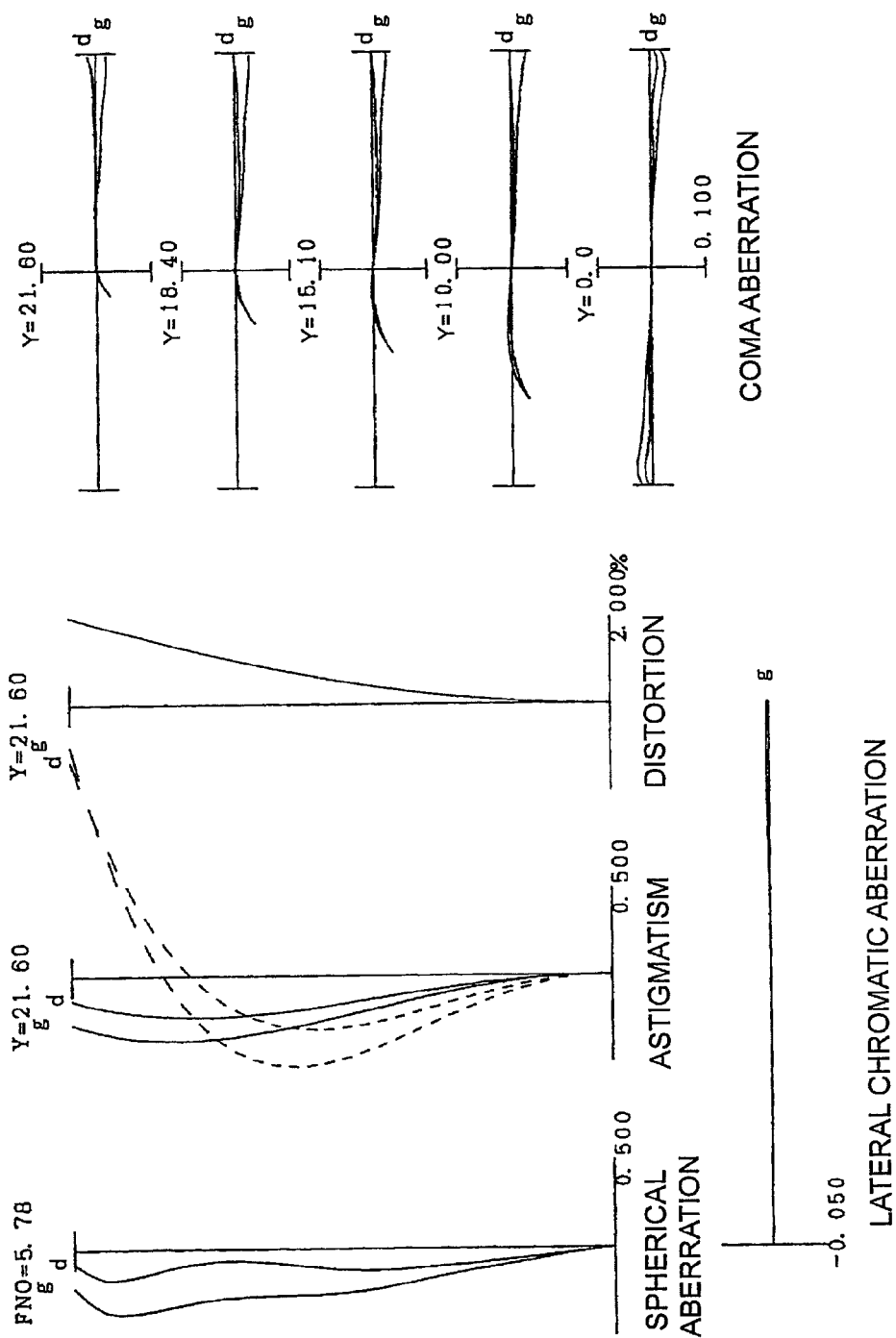
FIG. 10C shows the telephoto end state.
Figure 11A:
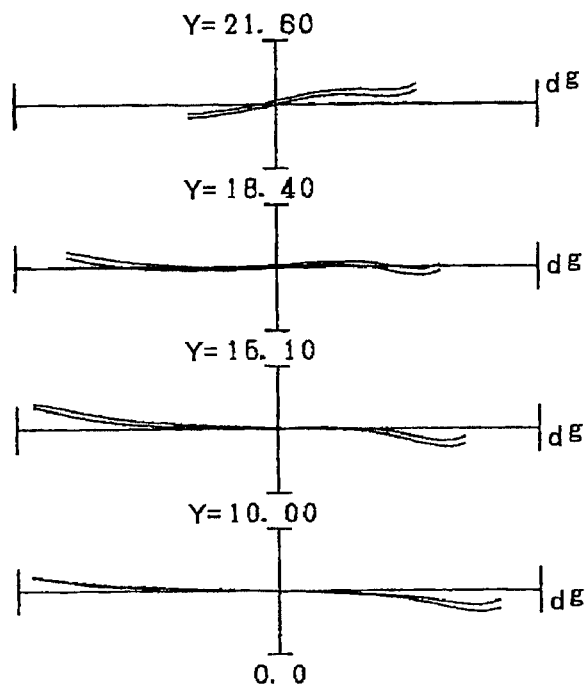
FIG. 11A shows the wide angle end state.
Figure 11B:
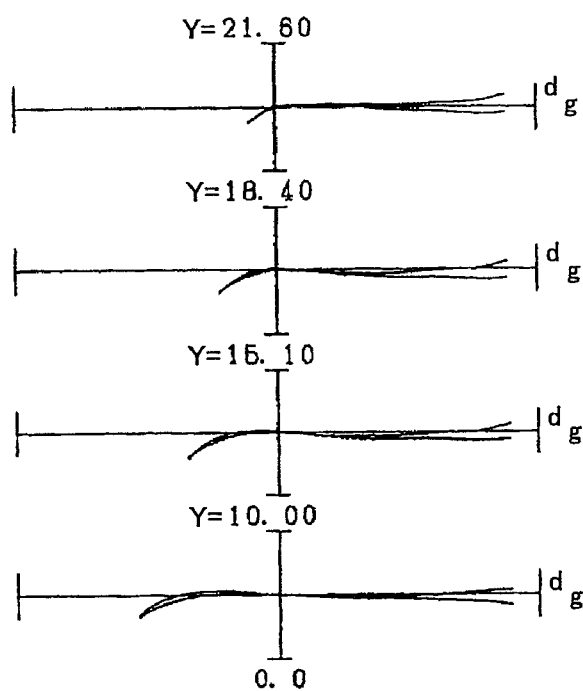
FIG. 11B shows the telephoto end state.
Figure 12A:
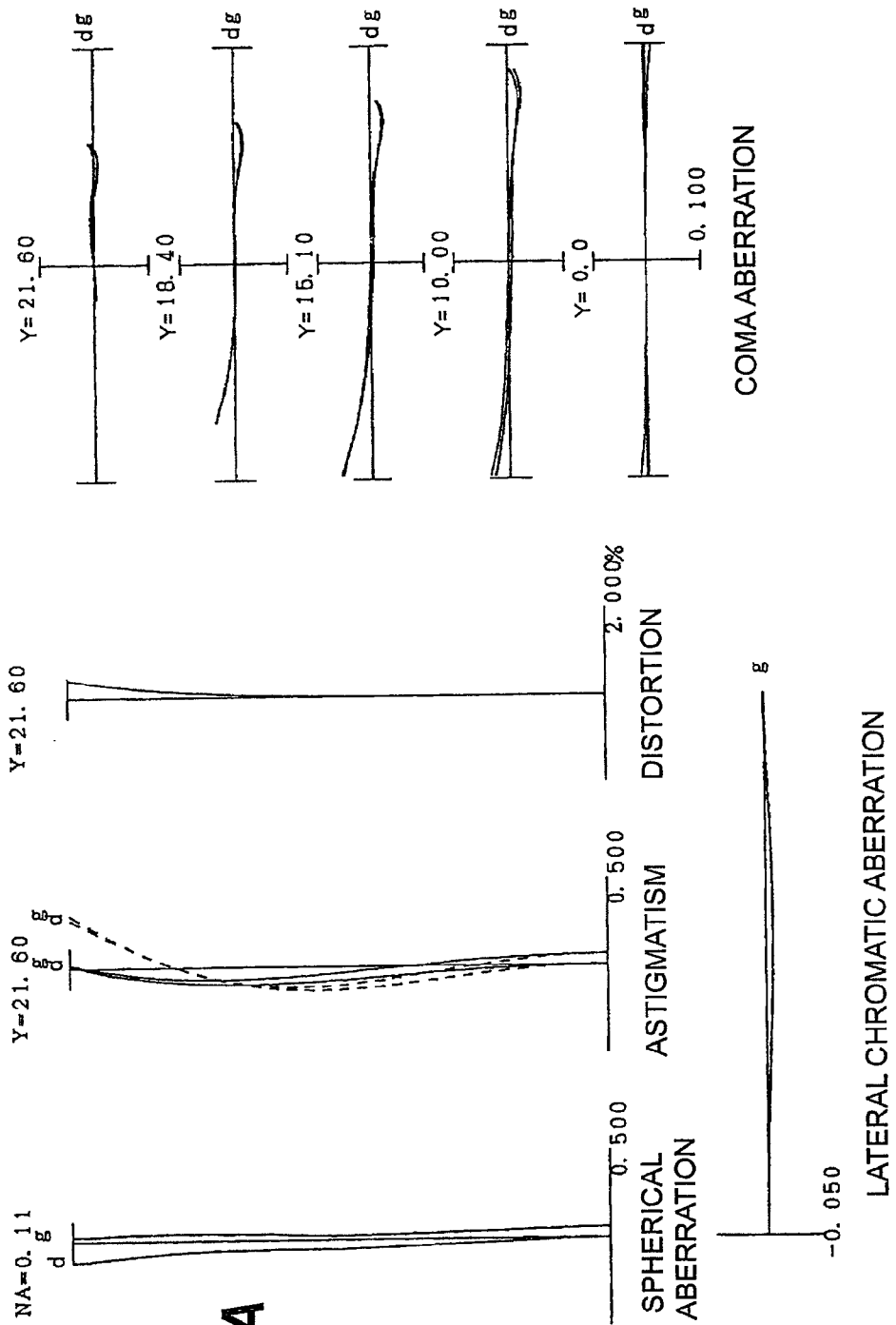
FIG. 12A shows the wide angle end state.
Figure 12B:
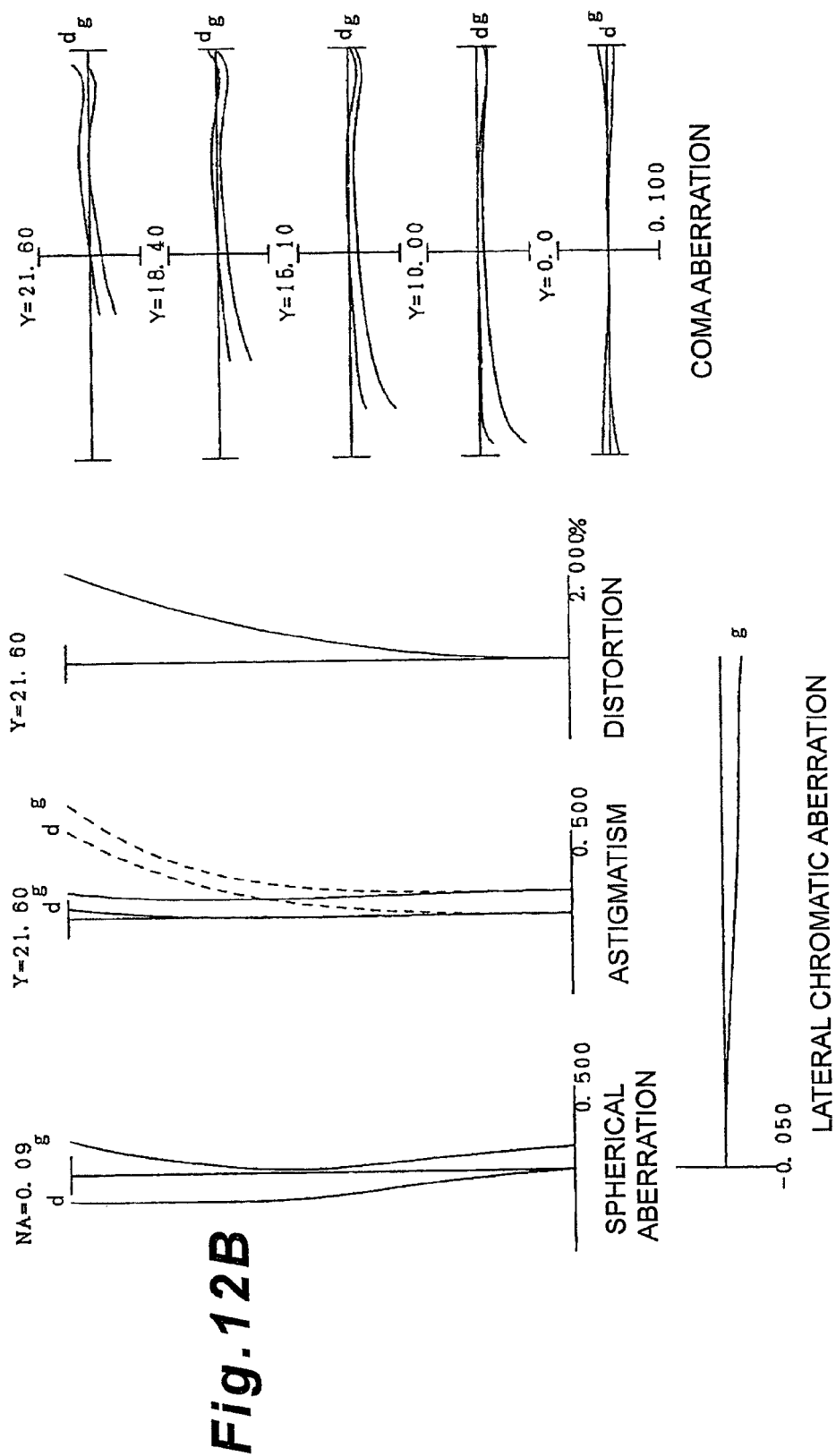
FIG. 12B shows the intermediate focal length state.
Figure 12C:
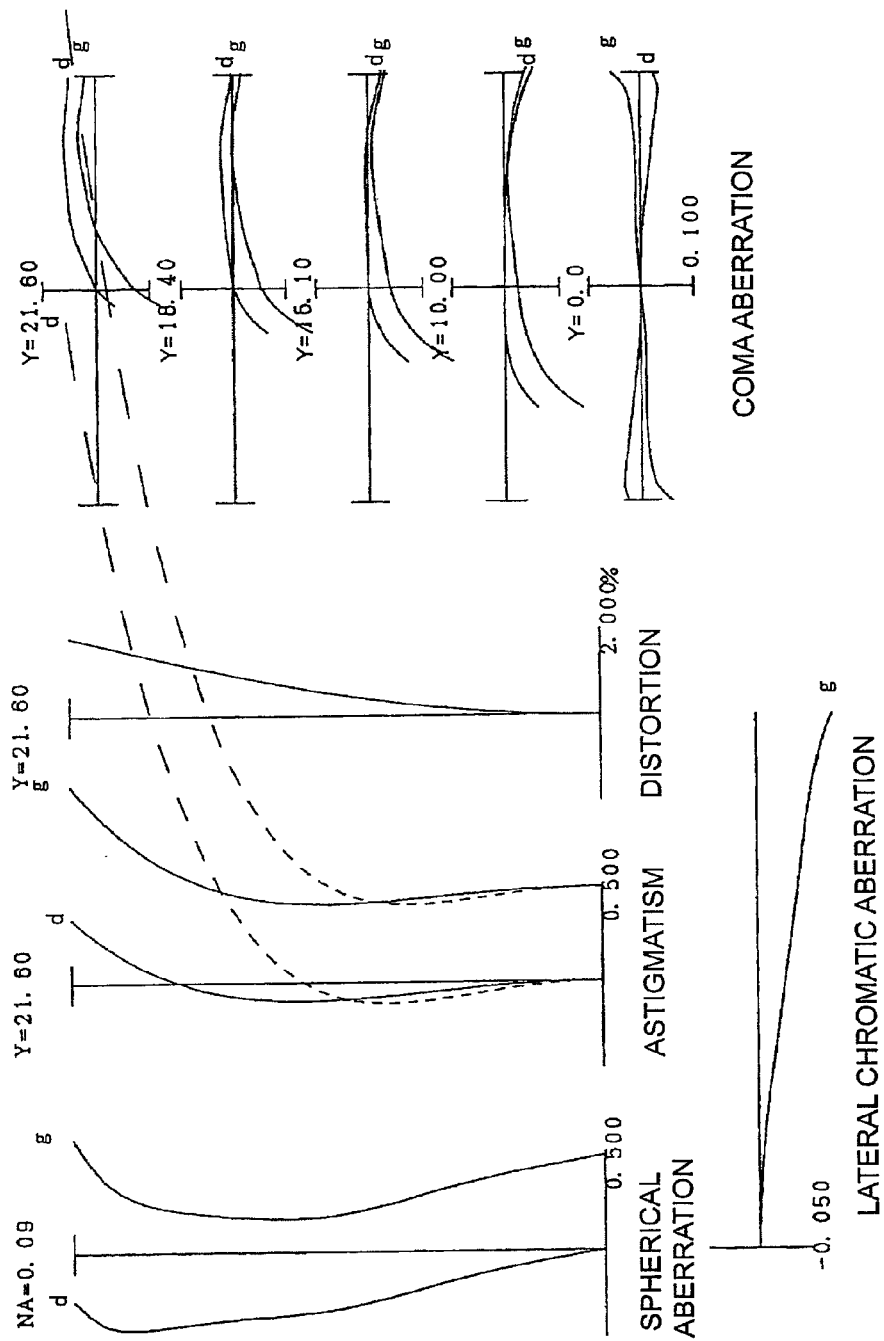
FIG. 12C shows the telephoto end state.

FIG. 10 are graphs showing various aberrations of the zooming optical system according to the third example upon focusing on infinity, wherein FIG. 10A shows the wide angle end state, FIG. 10B shows the intermediate focal length state, and FIG. 10C shows the telephoto end state. FIG. 11 are graphs showing meridional lateral aberrations when blur correction is performed on the zooming optical system according to the third example upon focusing on infinity, wherein FIG. 11A shows the wide angle end state, and FIG. 11B shows the telephoto end state. FIG. 12 are graphs showing various aberrations of the zooming optical system according to the third example upon focusing on close distance (photographing distance of entire system: R=1.8 m), wherein FIG. 12A shows the wide angle end state, FIG. 12B shows the intermediate focal length state, and FIG. 12C shows the telephoto end state.

According to the third example, as each graph on aberrations shows, various aberrations are corrected well in each focal length state from the wide angle end state to the telephoto end state, and excellent image forming performance is implemented.

Fourth Example

A fourth example will be described with reference to FIG. 13 to FIG. 16 and Table 4. FIG. 13 shows a lens configuration and zoom locus of the fourth example. As FIG. 13 shows, a zooming optical system according to the fourth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a biconvex positive lens L12, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, a cemented lens of a biconvex positive lens L32 and a biconcave negative lens L33, and a biconvex positive lens L34, which are disposed in order from the object.

The fourth lens group G4 has a cemented lens of a biconcave negative lens L41 and a positive meniscus lens L42 having a convex surface facing the object.

The fifth lens group G5 has a biconvex positive lens L51, a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.918, and the focal length is 81.6 (mm), so the moving distance of the lens L41 and the cemented lens of the lens L42 for correction 0.350° of the rotational blur is −0.280 (mm). In the telephoto end state of this example, the blur correction coefficient K is −2.100, and the focal length is 392 (mm), so the moving distance of the lens L41 and the cemented lens of the lens L42 and the lens L43 for correcting 0.160° of rotational blur is −0.520 (mm).

Table 4 below shows the values of each parameter of the zooming optical system according to the fourth example. The surface numbers 1 to 34 in Table 4 correspond to the surfaces 1 to 34 in FIG. 13.

TABLE 4

[All Parameters]

| | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.6 | ~ | 5.8 |
| TL | 258.0 | ~ | 258.0 | ~ | 258.0 |
| 2ω | 29.9 | ~ | 12.1 | ~ | 6.2 |

[Lens Data]

| Surface number | r | d | nd | νd |
|---|---|---|---|---|
| 1 | 126.2852 | 3.3 | 1.79952 | 42.3 |
| 2 | 79.6260 | 10.6 | 1.49782 | 82.5 |
| 3 | −541.0387 | 0.1 | | |
| 4 | 94.0460 | 3.7 | 1.49782 | 82.5 |
| 5 | 141.4849 | D5 | | |
| 6 | 84.8758 | 3.0 | 1.84666 | 23.8 |
| 7 | 57.9320 | 10.0 | 1.58913 | 61.2 |
| 8 | 885.9292 | D8 | | |
| 9 | 862.8124 | 2.0 | 1.79500 | 45.3 |
| 10 | 48.1688 | 4.0 | | |
| 11 | −176.6867 | 2.0 | 1.74100 | 52.7 |
| 12 | 34.0469 | 6.7 | 1.84666 | 23.8 |
| 13 | −305.8080 | 4.2 | | |
| 14 | −74.2246 | 2.0 | 1.81600 | 46.6 |
| 15 | 181.5933 | D15 | | |
| 16 | 111.3175 | 3.9 | 1.62299 | 58.2 |
| 17 | −203.7316 | 0.1 | | |
| 18 | 52.5848 | 7.0 | 1.48749 | 70.5 |
| 19 | −64.1320 | 2.0 | 1.75520 | 27.5 |
| 20 | 289.7602 | 0.5 | | |
| 21 | 54.1239 | 4.8 | 1.48749 | 70.5 |
| 22 | −195.6914 | D22 | | |
| 23 | −89.0244 | 1.8 | 1.60311 | 60.7 |
| 24 | 24.8548 | 3.0 | 1.70154 | 41.2 |
| 25 | 45.6872 | 7.6 | | |
| 26 | 0.0000 | D26 | (Aperture stop S) | |
| 27 | 64.6827 | 3.5 | 1.48749 | 70.5 |
| 28 | −104.5194 | 0.1 | | |

TABLE 4-continued

| | | | | |
|---|---|---|---|---|
| 29 | 51.5479 | 1.5 | 1.83400 | 37.2 |
| 30 | 32.0407 | 4.7 | 1.48749 | 70.5 |
| 31 | −120.2933 | D31 | | |
| 32 | −35.1150 | 1.5 | 1.80400 | 46.6 |
| 33 | 45.0203 | 4.0 | 1.72825 | 28.5 |
| 34 | −135.5442 | BF | | |

[Variable Distance Data]

| | Infinity | | | Close distance | | |
|---|---|---|---|---|---|---|
| | Wide angle End | Inter-mediate | Telephoto end | Wide angle End | Inter-mediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1542.00 | 1542.00 | 1542.00 |
| D5 | 11.6537 | 11.6537 | 11.6537 | 2.0000 | 2.0000 | 2.0000 |
| D8 | 2.0226 | 20.7147 | 28.1109 | 11.6763 | 30.3684 | 37.7646 |
| D15 | 51.8351 | 24.3452 | 2.0011 | 51.8351 | 24.3452 | 2.0011 |
| D22 | 2.4769 | 11.2746 | 26.2226 | 2.4769 | 11.2746 | 26.2226 |
| D26 | 16.2448 | 8.2055 | 2.0003 | 16.2448 | 8.2055 | 2.0003 |
| D31 | 21.1668 | 15.7916 | 3.0201 | 21.1668 | 15.7916 | 3.0201 |
| BF | 55.0000 | 68.4145 | 87.3912 | 55.0000 | 68.4145 | 87.3912 |

[Focal Length Data of Each Group]

| Group number | First surface of group | Focal length of group |
|---|---|---|
| G1 | 1 | 102.5630 |
| G2 | 9 | −31.0371 |
| G3 | 16 | 46.2095 |
| G4 | 23 | −54.5500 |
| G5 | 27 | 46.9800 |
| G6 | 32 | −53.1076 |

[Conditional Expressions]

| | |
|---|---|
| Conditional Expression (1) | $|f4|/fT = 0.139$ |
| Conditional Expression (2) | $f3/|f4| = 0.847$ |

As the parameter table in Table 4 shows, the zooming optical system according to this example satisfies both conditional Expressions (1) and (2).

Figure 14C:
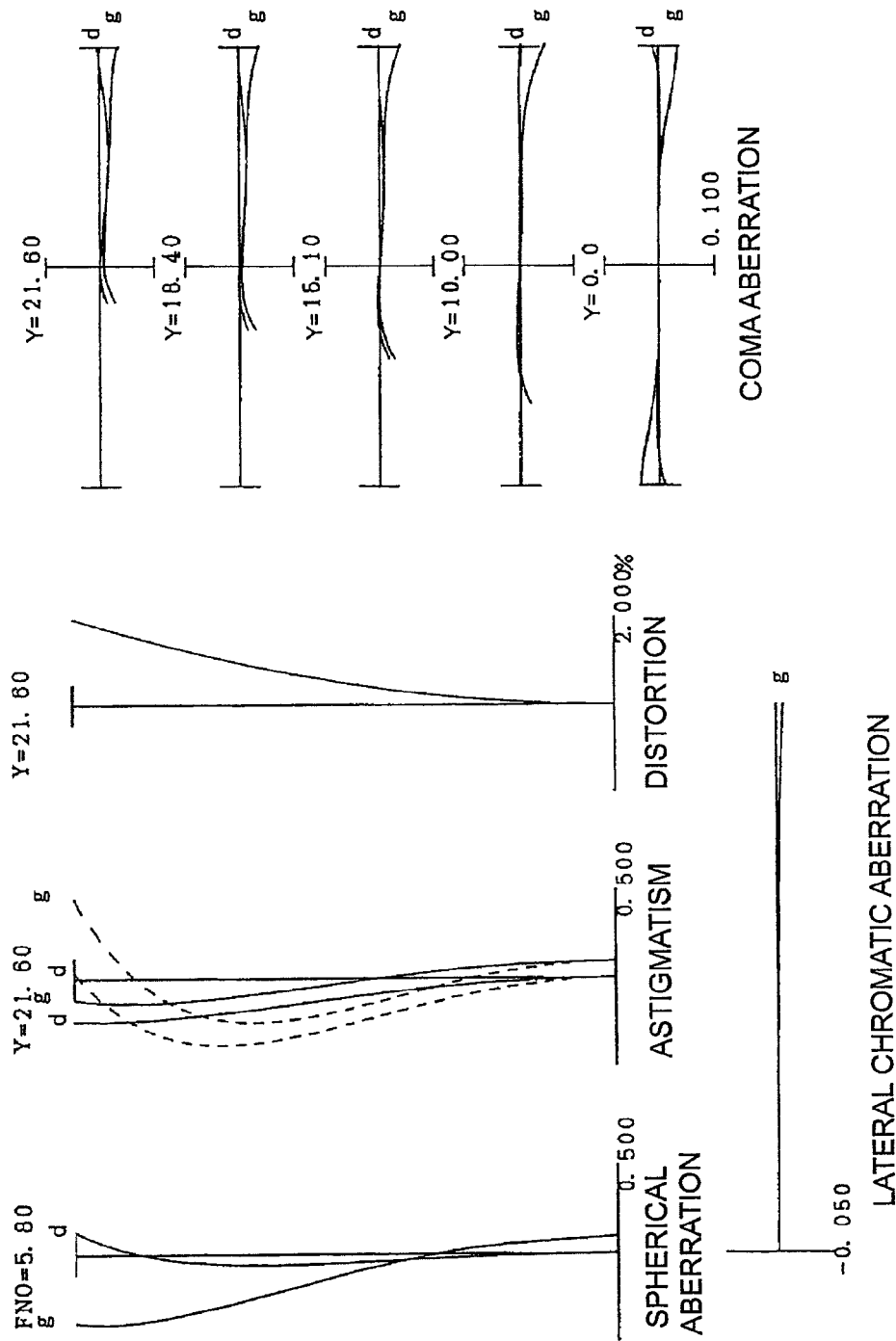
FIG. 14C shows the telephoto end state.
Figure 15A:
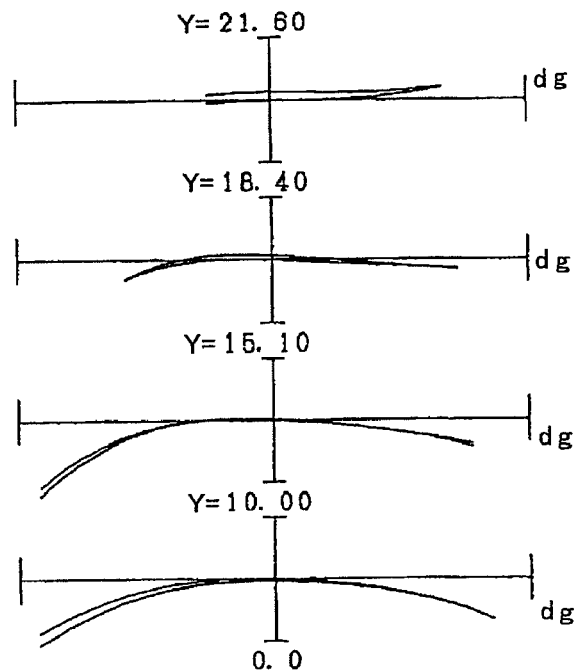
FIG. 15A shows the wide angle end state.
Figure 15B:
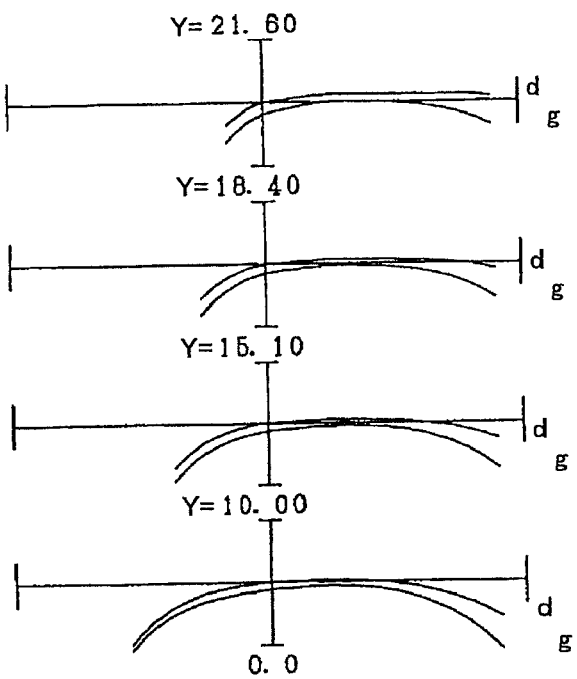
FIG. 15B shows the telephoto end state.
Figure 16A:
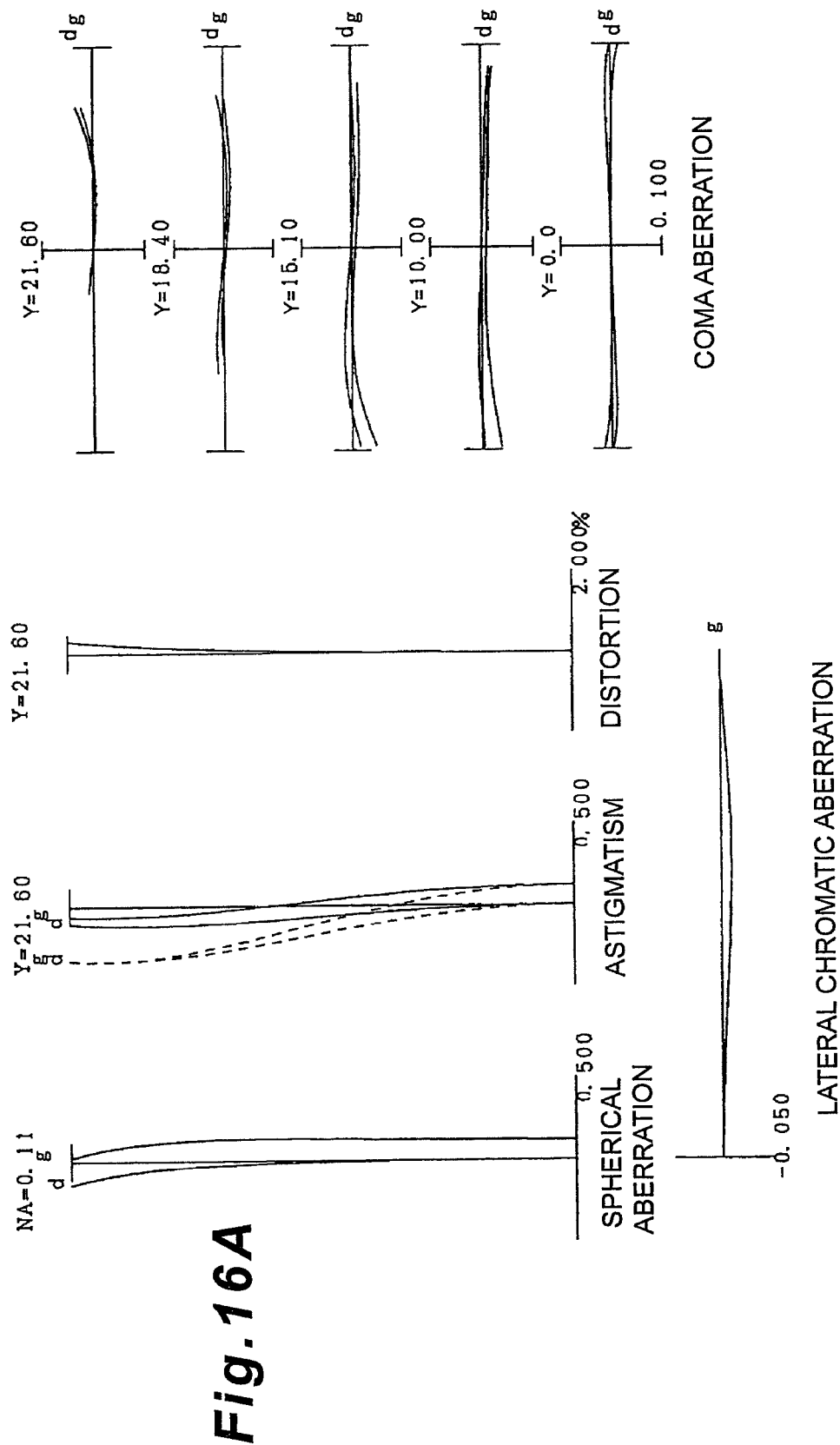
FIG. 16A shows the wide angle end state.
Figure 16B:
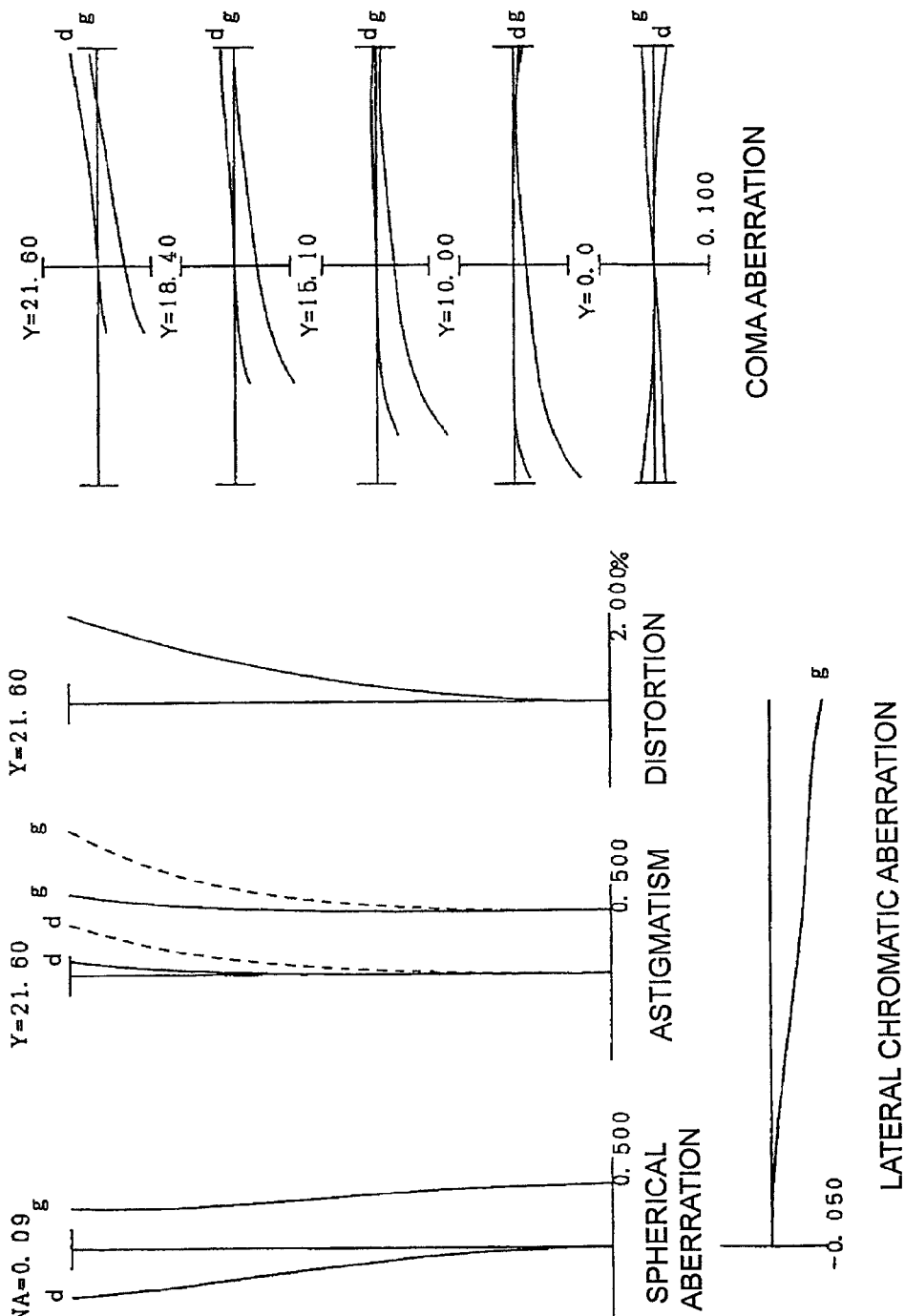
FIG. 16B shows the intermediate focal length state.
Figure 16C:
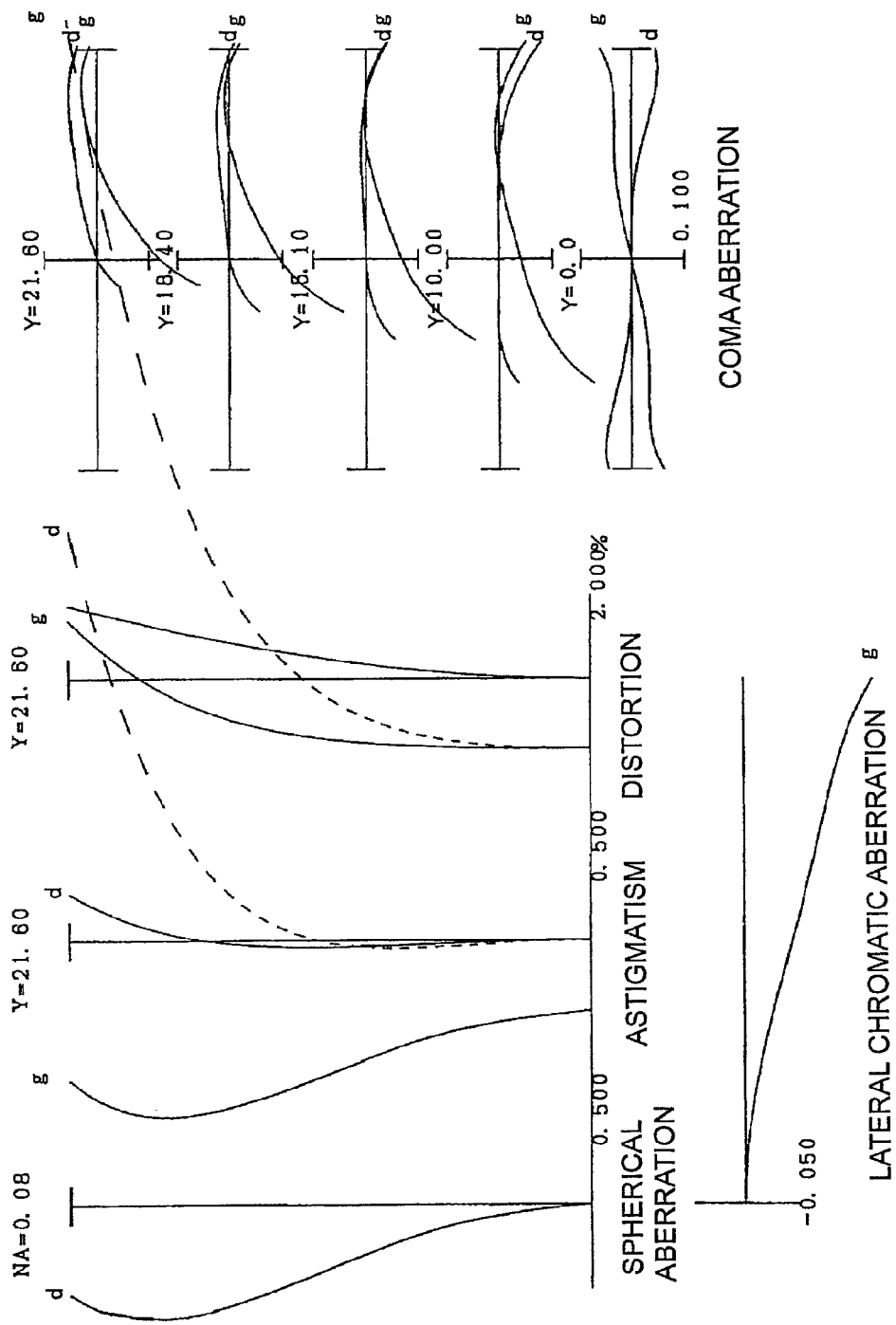
FIG. 16C shows the telephoto end state.

FIG. 14 are graphs showing various aberrations of the zooming optical system according to the fourth example upon focusing on infinity, wherein FIG. 14A shows the wide angle end state, FIG. 14B shows the intermediate focal length state, and FIG. 14C shows the telephoto end state. FIG. 15 are graphs showing meridional lateral aberrations when blur correction is performed on the zooming optical system according to the fourth example upon focusing on infinity, wherein FIG. 15A shows the wide angle end state, and FIG. 15B shows the telephoto end state. FIG. 16 are graphs showing various aberrations of the zooming optical system according to the fourth example upon focusing on close distance (photographing distance of entire system: R=1.8 m), wherein FIG. 16A shows the wide angle end state, FIG. 16B shows the intermediate focal length state, and FIG. 16C shows the telephoto end state.

According to the fourth example, as each graph on aberrations shows, various aberrations are corrected well in each focal length state from the wide angle end state to the telephoto end state, and excellent image forming performance is implemented.

Fifth Example

A fifth example will be described with reference to FIG. 17 to FIG. 20 and Table 5. FIG. 17 shows a lens configuration and zoom locus of the fifth example. As FIG. 17 shows, a zooming optical system according to the fifth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a biconvex positive lens L12, and a positive meniscus lens L13 having a convex surface facing the object, which are disposed in order from the object. The rear group G1R has a cemented lens of a negative meniscus lens L14 having a convex surface facing the object and a biconvex positive lens L15, which are disposed in order from the object.

The second lens group G2 has a cemented lens of a biconvex positive lens L21 and a biconcave negative lens L22, a cemented lens of a biconcave negative lens L23 and a positive meniscus lens L24 having a convex surface facing the object, and a biconcave negative lens L25, which are disposed in order from the object.

The third lens group G3 has a biconvex positive lens L31, a cemented lens of a biconvex positive lens L32 and a biconcave negative lens L33, and a biconvex positive lens L34, which are disposed in order from the object.

The fourth lens group G4 has a cemented lens of a positive meniscus lens L41 having a concave surface facing the object and a biconcave negative lens L42, which are disposed in order from the object.

The fifth lens group G5 has a biconvex positive lens L51 and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −2.100, and the focal length is 81.6 (mm), so the moving distance of the lens L41 and the cemented lens of the lens L42 for correction 0.350° of the rotational blur is −0.237 (inn). In the telephoto end state of this example, the blur correction coefficient K is −2.131, and the focal length is 392 (mm), so the moving distance of the lens L41 and the cemented lens of the lens L42 for correcting 0.160° of rotational blur is −0.512 (mm).

Table 5 below shows the values of each parameter of the zooming optical system according to the fifth example. The surface numbers 1 to 35 in Table 5 correspond to the surfaces 1 to 35 in FIG. 17.

TABLE 5

[All Parameters]

|  | Wide angle end state |  | Intermediate focal length state |  | Telephoto end state |
|---|---|---|---|---|---|
| f | 81.6 | ~ | 200.0 | ~ | 392.0 |
| FNO | 4.6 | ~ | 5.7 | ~ | 5.8 |
| TL | 256.6 | ~ | 256.6 | ~ | 256.6 |
| 2ω | 29.7 | ~ | 12.0 | ~ | 6.1 |

[Lens Data]

| Surface number | r | d | nd | νd |
|---|---|---|---|---|
| 1 | 179.4338 | 2.5 | 1.80610 | 40.9 |
| 2 | 89.5051 | 10.0 | 1.49782 | 82.5 |
| 3 | −446.6400 | 0.1 | | |
| 4 | 110.9379 | 5.5 | 1.49782 | 82.5 |
| 5 | 234.3333 | D5 | | |
| 6 | 92.3090 | 3.3 | 1.78472 | 25.7 |
| 7 | 70.7791 | 8.4 | 1.48749 | 70.5 |
| 8 | −25475.8490 | D8 | | |
| 9 | 1009.0937 | 4.8 | 1.80518 | 25.4 |
| 10 | −89.8865 | 1.8 | 1.77250 | 49.6 |
| 11 | 65.0749 | 4.0 | | |
| 12 | −181.3777 | 1.7 | 1.77250 | 49.6 |
| 13 | 36.8152 | 6.0 | 1.78472 | 25.7 |
| 14 | 226.5434 | 4.2 | | |
| 15 | −66.7353 | 2.0 | 1.62299 | 58.2 |
| 16 | 368.8553 | D16 | | |
| 17 | 66.6763 | 5.0 | 1.56384 | 60.7 |
| 18 | −110.2881 | 0.1 | | |
| 19 | 44.7900 | 6.2 | 1.48749 | 70.5 |
| 20 | −80.0154 | 2.0 | 1.75520 | 27.5 |
| 21 | 132.4317 | 0.1 | | |
| 22 | 115.9136 | 5.0 | 1.48749 | 70.5 |
| 23 | −100.6044 | D23 | | |
| 24 | −47.5857 | 4.0 | 1.80809 | 22.8 |
| 25 | −36.6835 | 1.8 | 1.72916 | 54.7 |
| 26 | 173.4251 | 2.3 | | |
| 27 | 0.0000 | D27 | (Aperture stop S) | |
| 28 | 470.5912 | 4.0 | 1.48749 | 70.5 |
| 29 | −41.7072 | 0.1 | | |
| 30 | 51.3411 | 1.2 | 1.80100 | 35.0 |
| 31 | 34.1887 | 5.0 | 1.48749 | 70.5 |
| 32 | −432.2669 | D32 | | |
| 33 | −31.9511 | 1.1 | 1.78800 | 47.4 |
| 34 | 32.8230 | 4.5 | 1.67270 | 32.1 |
| 35 | −81.3002 | BF | | |

[Variable Distance Data]

|  | Infinity | | | Close distance | | |
|---|---|---|---|---|---|---|
|  | Wide angle End | Inter- mediate | Telephoto end | Wide angle End | Inter- mediate | Telephoto end |
| f | 81.6 | 200.0 | 392.0 | — | — | — |
| β | 0 | 0 | 0 | −0.06 | −0.14 | −0.26 |
| D0 | 0 | 0 | 0 | 1543.41 | 1543.41 | 1543.41 |
| D5 | 14.5310 | 14.5310 | 14.5310 | 2.0000 | 2.0000 | 2.0000 |
| D8 | 2.0014 | 30.5817 | 38.9987 | 14.5323 | 43.1127 | 51.5297 |
| D16 | 54.2333 | 25.8372 | 2.0033 | 54.2333 | 25.8372 | 2.0033 |
| D23 | 2.8656 | 2.6813 | 18.0983 | 2.8656 | 2.6813 | 18.0983 |
| D27 | 10.0853 | 3.9231 | 2.0001 | 10.0853 | 3.9231 | 2.0001 |
| D32 | 20.4765 | 22.0533 | 6.6083 | 20.4765 | 22.0533 | 6.6083 |

TABLE 5-continued

| BF | 55.7244 | 60.3097 | 77.6778 | 55.7244 | 60.3097 | 77.6778 |
|---|---|---|---|---|---|---|

[Focal Length Data of Each Group]

| Group number | First surface of group | Focal length of group |
|---|---|---|
| G1 | 1 | 101.2181 |
| G2 | 9 | −31.5893 |
| G3 | 17 | 42.3904 |
| G4 | 24 | −52.1478 |
| G5 | 28 | 49.2644 |
| G6 | 33 | −52.0818 |

[Conditional Expressions]

| Conditional Expression (1) | \|f4\|/fT = 0.133 |
|---|---|
| Conditional Expression (2) | f3/\|f4\| = 0.813 |

As the parameter table in Table 5 shows, the zooming optical system according to this example satisfies both conditional Expressions (1) and (2).

Figure 18A:
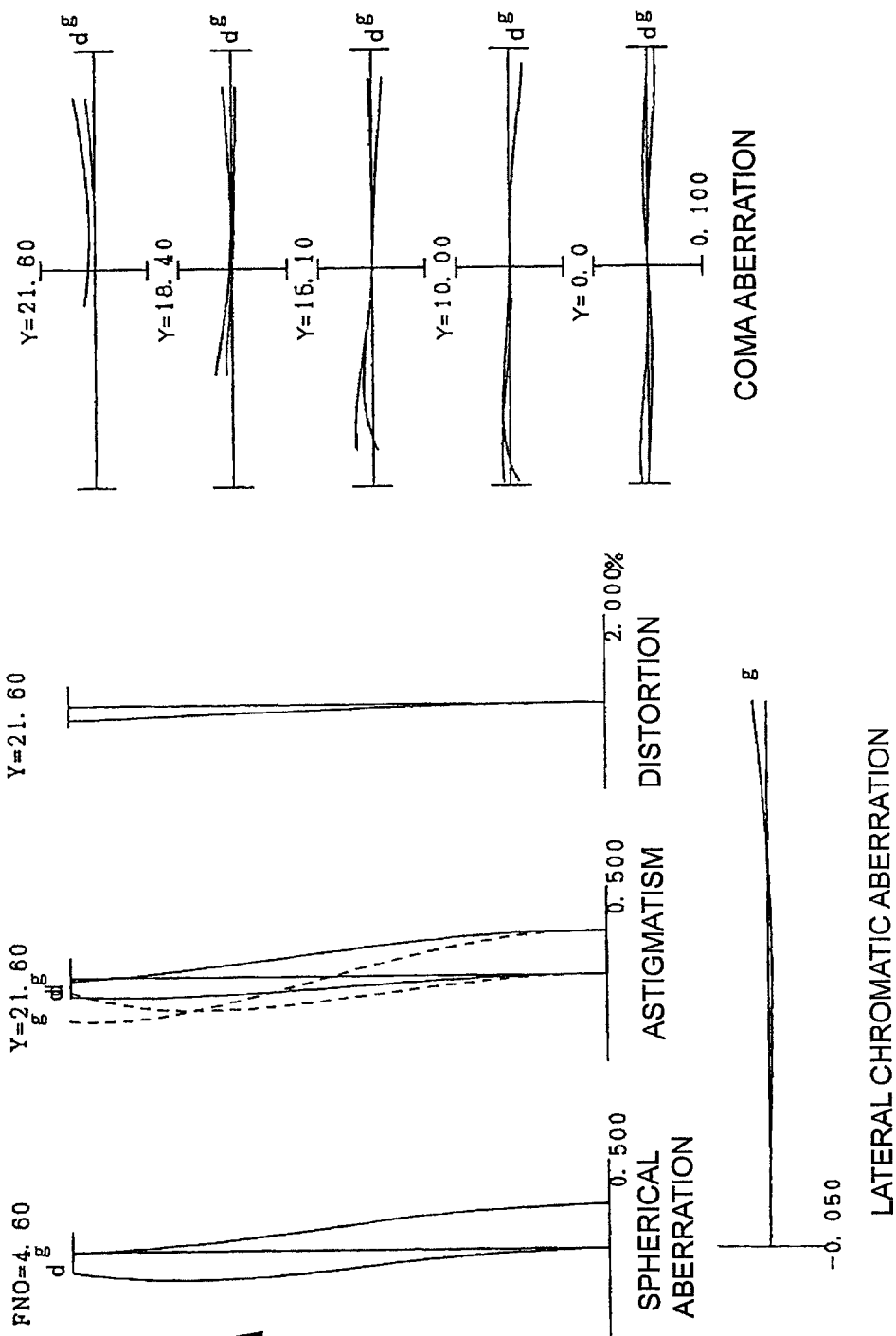
FIG. 18A shows the wide angle end state.
Figure 18B:
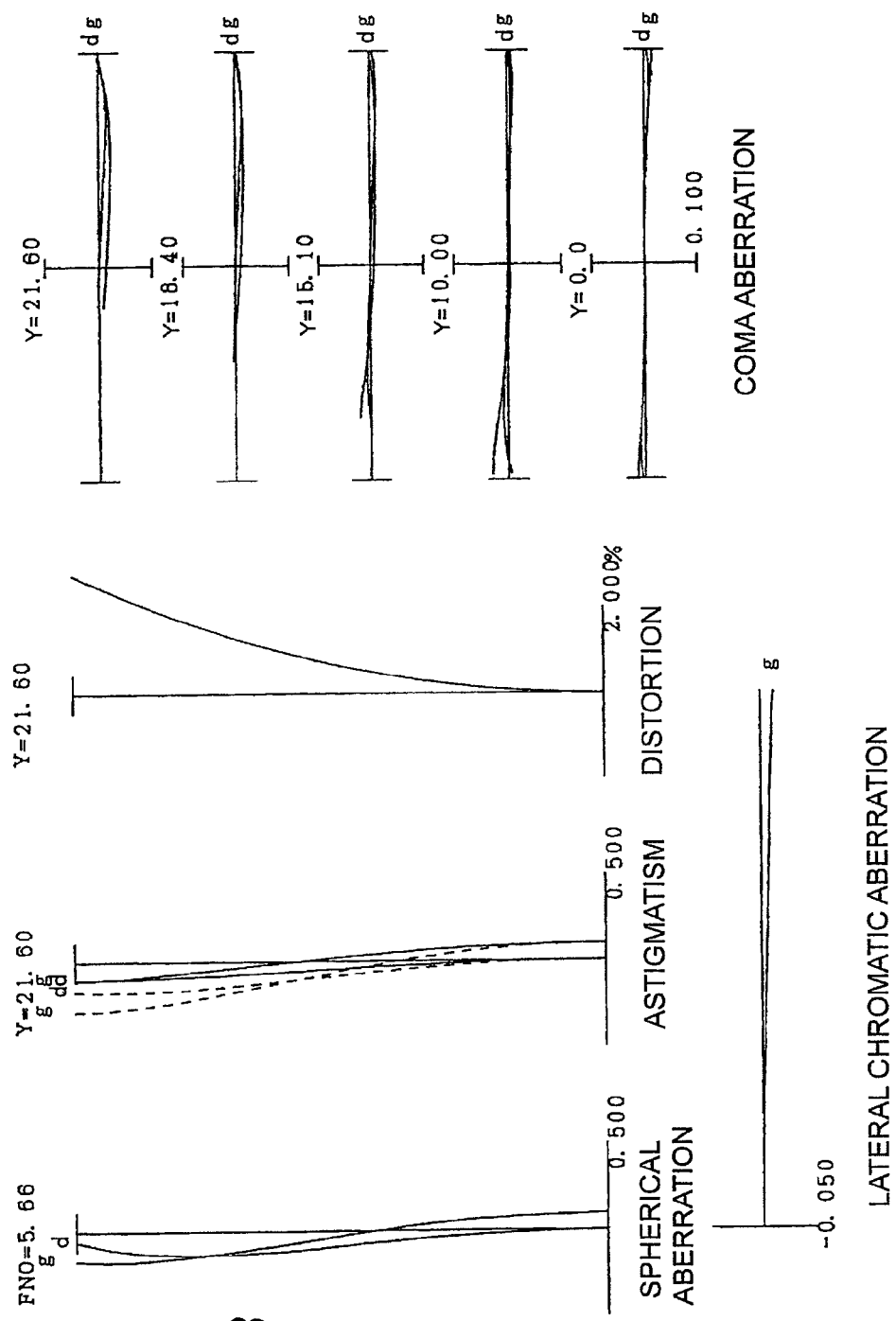
FIG. 18B shows the intermediate focal length state.
Figure 18C:
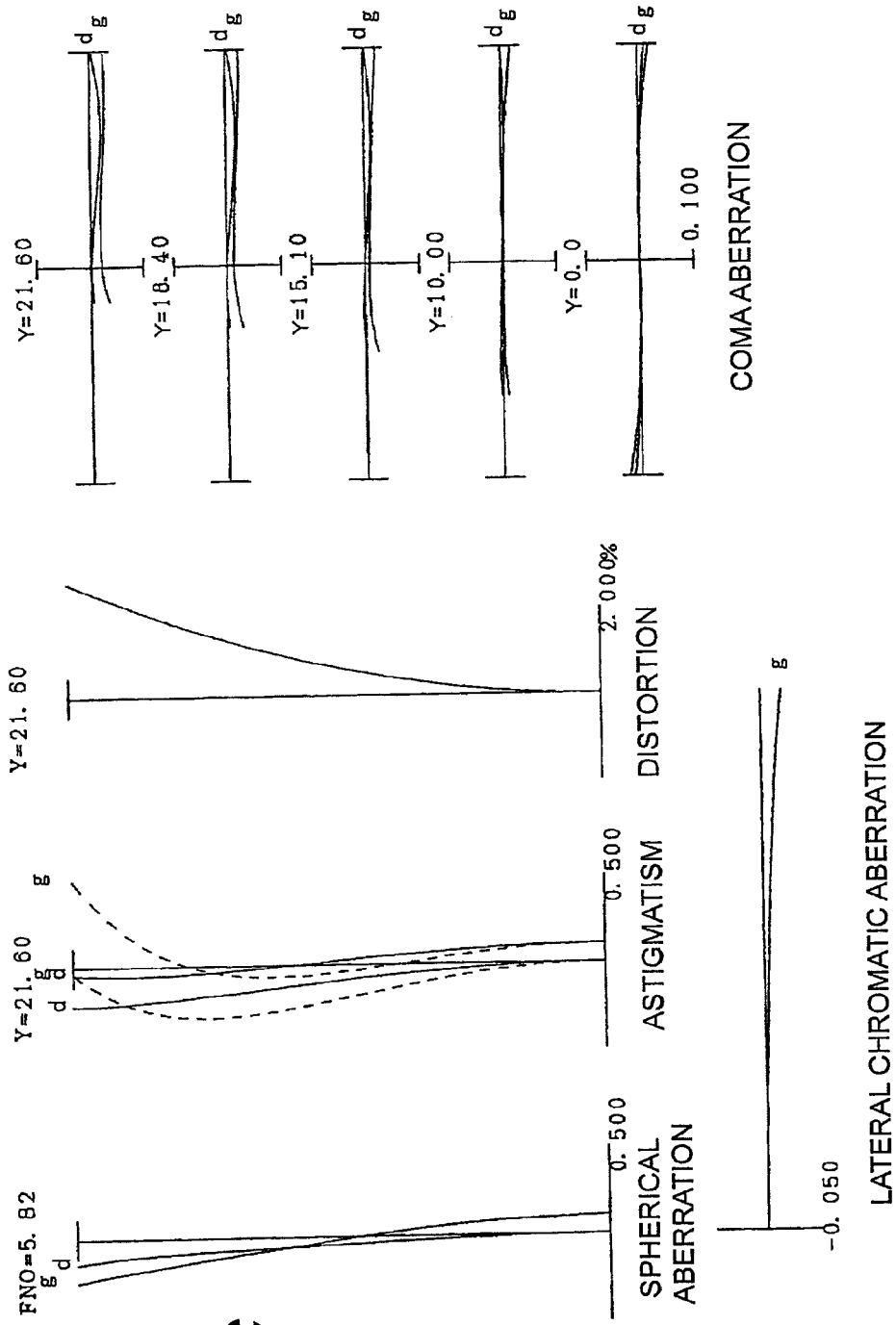
FIG. 18C shows the telephoto end state.
Figure 19A:
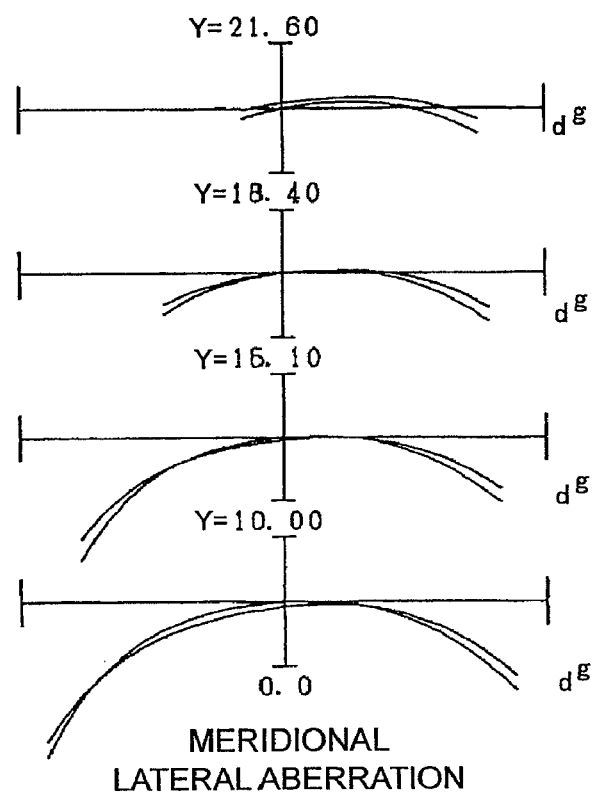
FIG. 19A shows the wide angle end state.
Figure 19B:
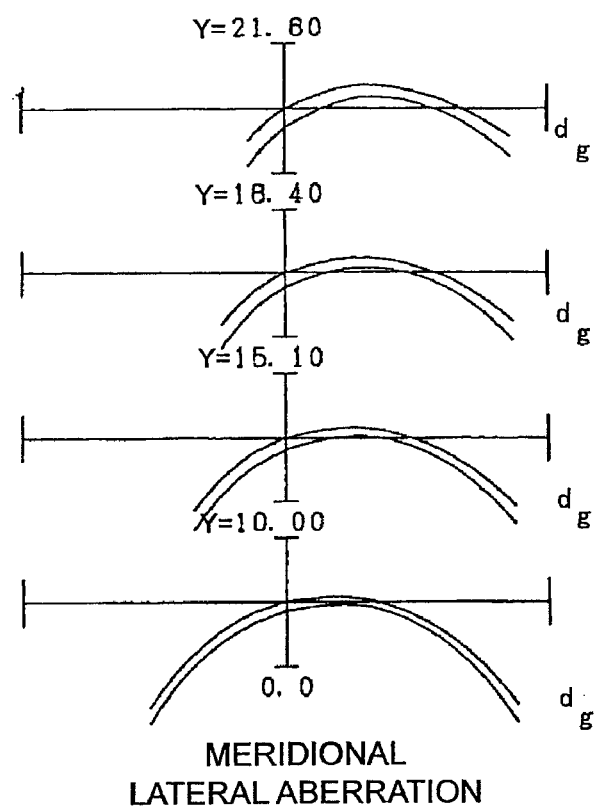
FIG. 19B shows the telephoto end state.
Figure 20A:
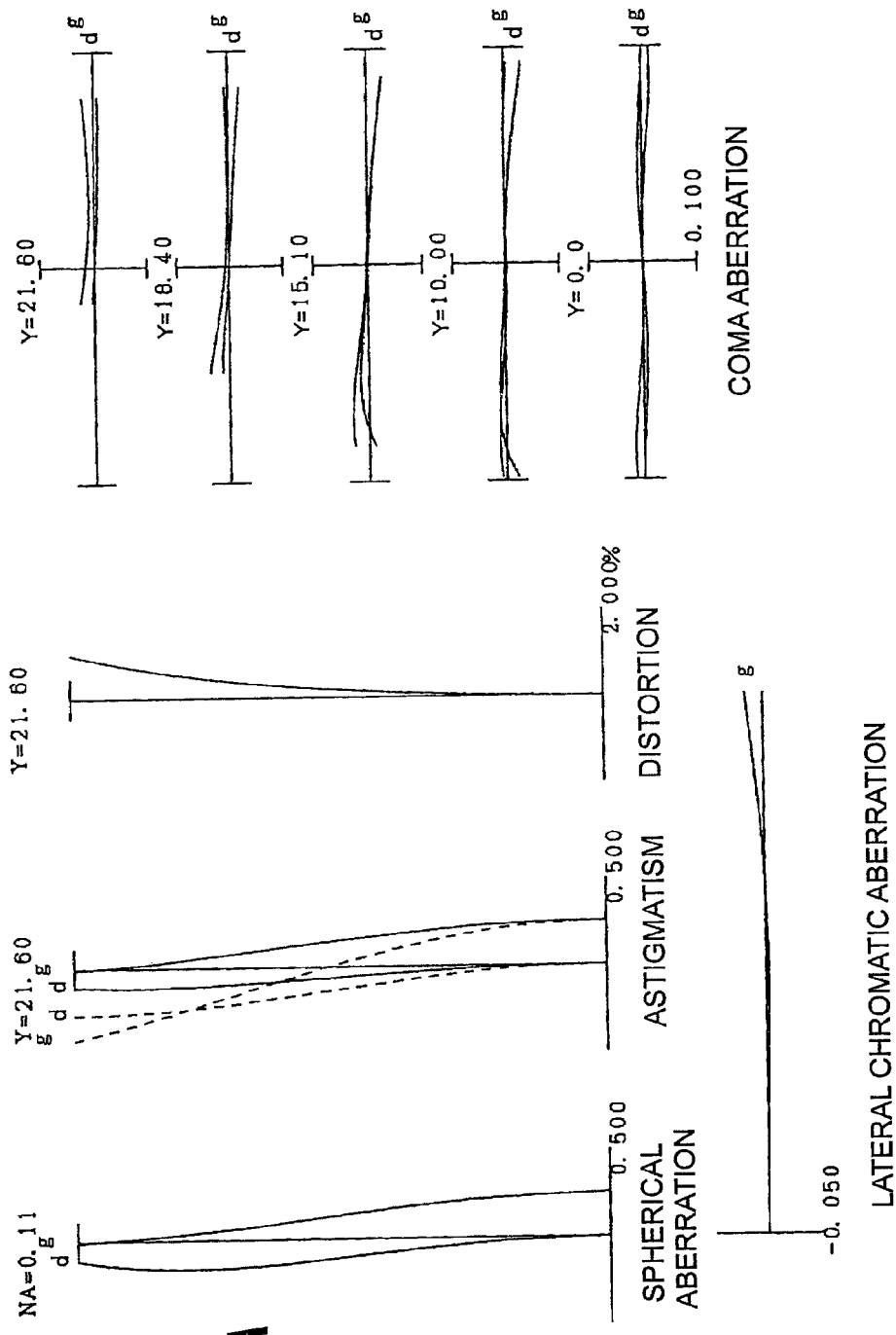
FIG. 20A shows the wide angle end state.
Figure 20B:
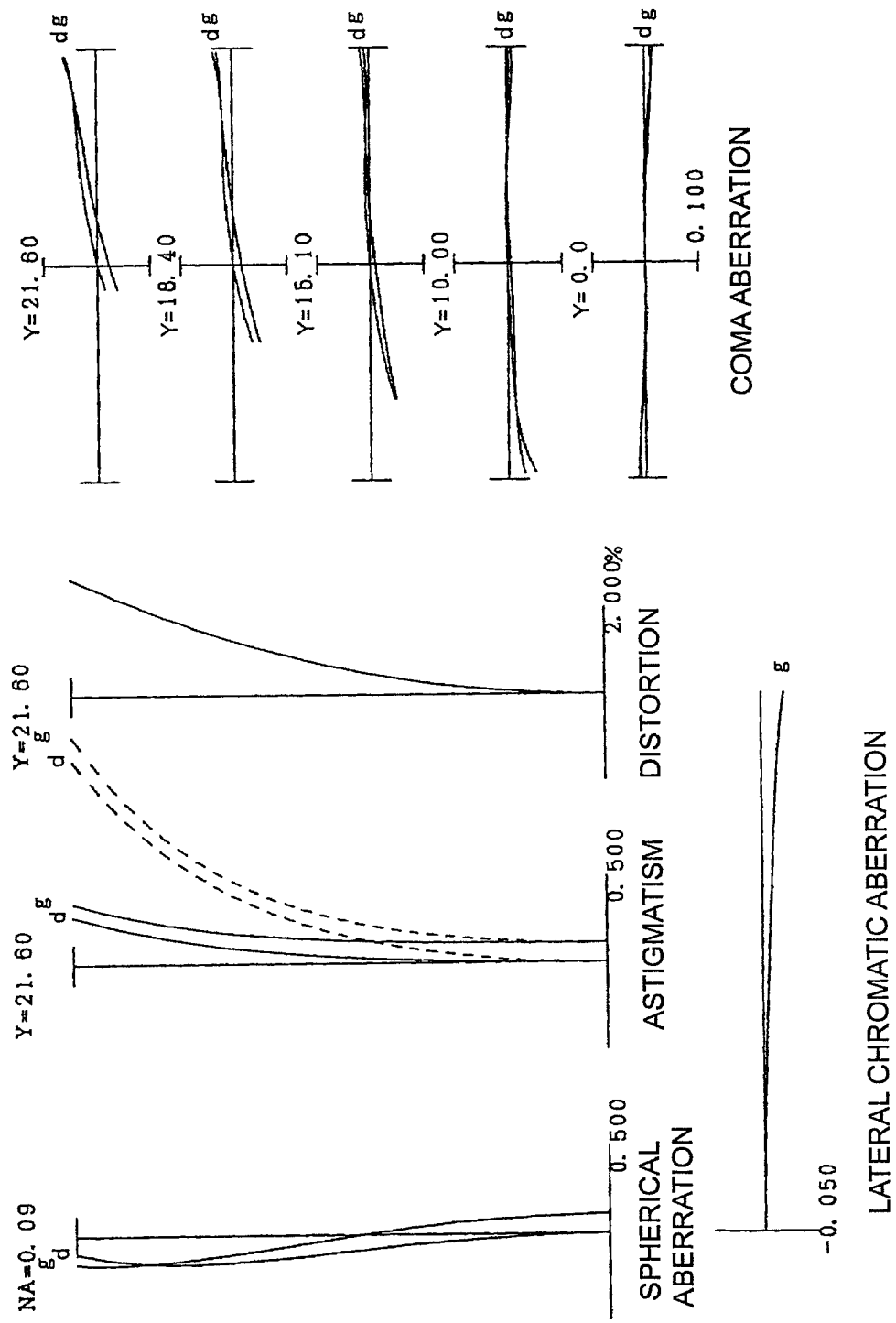
FIG. 20B shows the intermediate focal length state.
Figure 20C:
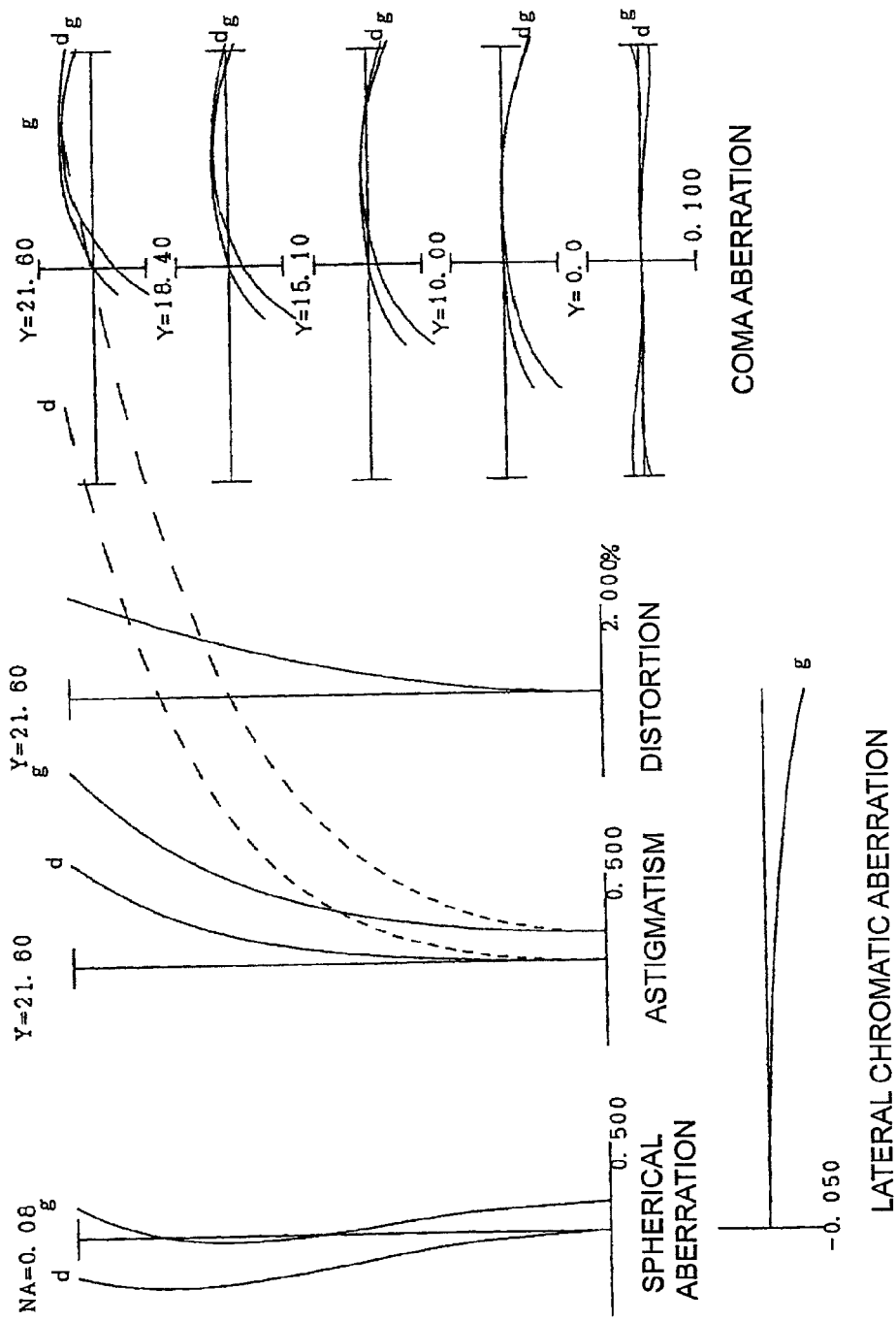
FIG. 20C shows the telephoto end state.

FIG. 18 are graphs showing various aberrations of the zooming optical system according to the fifth example upon focusing on infinity, wherein FIG. 18A shows the wide angle end state, FIG. 18B shows the intermediate focal length state, and FIG. 18C shows the telephoto end state. FIG. 19 are graphs showing meridional lateral aberrations when blur correction is performed on the zooming optical system according to the fifth example upon focusing on infinity, wherein FIG. 19A shows the wide angle end state, and FIG. 19B shows the telephoto end state. FIG. 20 are graphs showing various aberrations of the zooming optical system according to the fifth example upon focusing on close distance (photographing distance of entire system: R=1.8 m), wherein FIG. 20A shows the wide angle end state, FIG. 20B shows the intermediate focal length state, and FIG. 20C shows the telephoto end state.

According to the fifth example, as each graph on aberrations shows, various aberrations are corrected well in each focal length state from the wide angle end state to the telephoto end state, and excellent image forming performance is implemented.

Sixth Example

Figure 21:
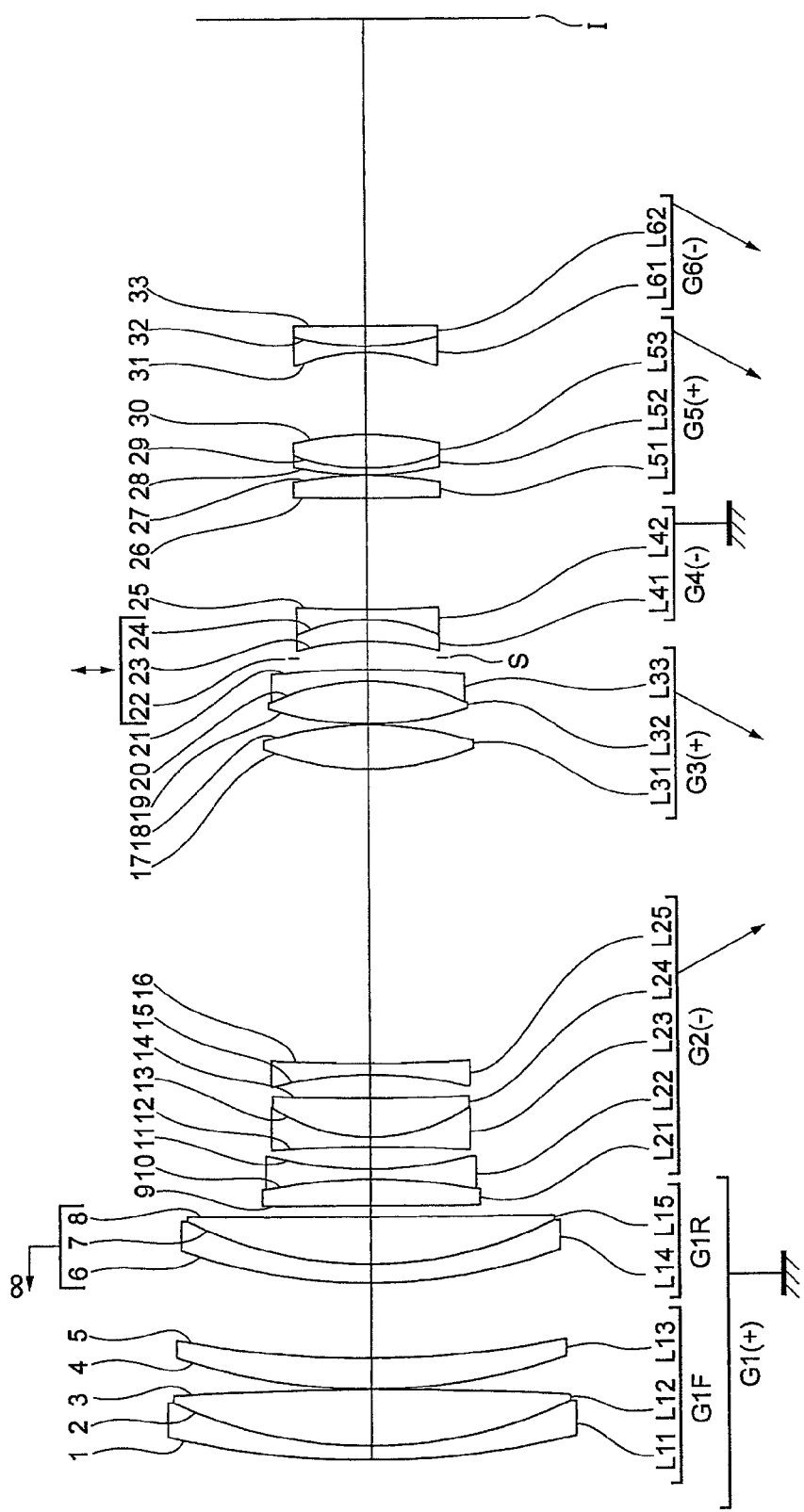
FIG. 21 is a diagram depicting a configuration and zoom locus of the zooming optical system according to the sixth example.

A sixth example will be described with reference to FIG. 21 to FIG. 24 and Table 6. FIG. 21 shows a lens configuration and zoom locus of the sixth example. As FIG. 21 shows, a zooming optical system according to the sixth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a biconvex positive lens L12, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a cemented lens of a negative meniscus lens L21 having a convex surface facing the object and a biconcave negative lens L22, and a cemented lens of a biconcave negative lens L23 and a positive meniscus lens L24 having a convex surface facing the object, and a biconcave negative lens L25, which are disposed in order from the object.

The third lens group G3 has a biconvex positive lens L31, and a cemented lens of a biconvex positive lens L32 and a negative meniscus lens L33 having a convex surface facing the object, which are disposed in order from the object.

The fourth lens group G4 has a cemented lens of a positive meniscus lens L41 having a concave surface facing the object and a biconcave negative lens L42, which are disposed in order from the object.

The fifth lens group G5 has a biconvex positive lens L51 and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the third lens group G3 and the fourth lens group G4, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.882, and the focal length is 81.6 (mm), so the moving distance of the lens L41 and the cemented lens of the lens L42 for correction 0.350° of the rotational blur is −0.265 (mm). In the telephoto end state of this example, the blur correction coefficient K is −1.978, and the focal length is 392 (mm), so the moving distance of the lens L41 and the cemented lens of the lens L42 for correcting 0.160° of rotational blur is −0.552 (mm).

Table 6 below shows the values of each parameter of the zooming optical system according to the sixth example. The surface numbers 1 to 33 in Table 6 correspond to the surfaces 1 to 33 in FIG. 21.

TABLE 6

[All Parameters]

|  | Wide angle end state |  | Intermediate focal length state |  | Telephoto end state |
|---|---|---|---|---|---|
| f | 81.6 | ~ | 200.0 | ~ | 392.0 |
| FNO | 4.6 | ~ | 5.6 | ~ | 5.8 |
| TL | 257.8 | ~ | 257.8 | ~ | 257.8 |
| 2ω | 30.1 | ~ | 12.2 | ~ | 6.2 |

[Lens Data]

| Surface number | r | d | nd | νd |
|---|---|---|---|---|
| 1 | 151.4355 | 2.5 | 1.80400 | 46.6 |
| 2 | 80.9045 | 10.0 | 1.49782 | 82.5 |
| 3 | −660.7905 | 0.1 |  |  |
| 4 | 103.7009 | 5.5 | 1.49782 | 82.5 |
| 5 | 177.6269 | D5 |  |  |
| 6 | 97.7191 | 3.3 | 1.84666 | 23.8 |
| 7 | 70.3201 | 8.4 | 1.58913 | 61.2 |
| 8 | 2650.6755 | D8 |  |  |
| 9 | 2332.5539 | 4.8 | 1.80809 | 22.8 |
| 10 | −95.5599 | 1.8 | 1.80440 | 39.6 |
| 11 | 66.9490 | 4.0 |  |  |
| 12 | −266.6149 | 1.7 | 1.77250 | 49.6 |
| 13 | 29.9961 | 7.0 | 1.78472 | 25.7 |
| 14 | 356.0090 | 4.2 |  |  |
| 15 | −70.4727 | 2.0 | 1.74400 | 44.8 |
| 16 | 286.5097 | D16 |  |  |
| 17 | 47.3805 | 7.9 | 1.51680 | 64.1 |
| 18 | −59.1743 | 0.2 |  |  |
| 19 | 56.3209 | 7.7 | 1.48749 | 70.5 |
| 20 | −40.0873 | 2.0 | 1.80518 | 25.4 |
| 21 | −168.1697 | D21 |  |  |
| 22 | 0.0000 | 3.0 | (Aperture stop S) |  |
| 23 | −46.9340 | 4.0 | 1.84666 | 23.8 |
| 24 | −29.2304 | 1.8 | 1.74100 | 52.7 |
| 25 | 200.3114 | D25 |  |  |
| 26 | 490.9425 | 4.0 | 1.48749 | 70.5 |
| 27 | −67.9550 | 0.1 |  |  |
| 28 | 60.1092 | 1.2 | 1.84666 | 23.8 |
| 29 | 36.2041 | 6.0 | 1.48749 | 70.5 |
| 30 | −53.9995 | D30 |  |  |
| 31 | −31.7589 | 1.1 | 1.75500 | 52.3 |
| 32 | 46.0734 | 3.7 | 1.84666 | 23.8 |
| 33 | −8940.2754 | BF |  |  |

[Variable Distance Data]

|  | Infinity | | | Close distance | | |
|---|---|---|---|---|---|---|
|  | Wide angle End | Intermediate | Telephoto end | Wide angle End | Intermediate | Telephoto end |
| f | 81.6 | 200.0 | 392.0 | — | — | — |
| β | 0 | 0 | 0 | −0.06 | −0.14 | −0.27 |
| D0 | 0 | 0 | 0 | 1542.24 | 1542.24 | 1542.24 |
| D5 | 13.4120 | 13.4120 | 13.4120 | 2.0000 | 2.0000 | 2.0000 |
| D8 | 2.0000 | 28.5031 | 35.0926 | 13.4120 | 39.9151 | 46.5046 |
| D16 | 52.6489 | 25.0338 | 2.0038 | 52.6489 | 25.0338 | 2.0038 |
| D21 | 2.0000 | 3.1120 | 19.5525 | 2.0000 | 3.1120 | 19.5525 |
| D25 | 20.1010 | 9.8885 | 9.1172 | 20.1010 | 9.8885 | 9.1172 |
| D30 | 14.5969 | 14.6003 | 2.8343 | 14.5969 | 14.6003 | 2.8343 |
| BF | 55.0000 | 65.2091 | 77.7465 | 55.0000 | 65.2092 | 77.7464 |

[Focal Length Data of Each Group]

| Group number | First surface of group | Focal length of group |
|---|---|---|
| G1 | 1 | 114.7469 |
| G2 | 9 | −30.9191 |
| G3 | 17 | 40.5507 |
| G4 | 22 | −55.0000 |

TABLE 6-continued

| G5 | 26 | 47.9530 |
| G6 | 31 | −46.1818 |

| [Conditional Expressions] | |
| --- | --- |
| Conditional Expression (1) | \|f4\|/fT = 0.140 |
| Conditional Expression (2) | f3/\|f4\| = 0.737 |

As the parameter table in Table 6 shows, the zooming optical system according to this example satisfies both conditional Expressions (1) and (2).

Figure 22A:
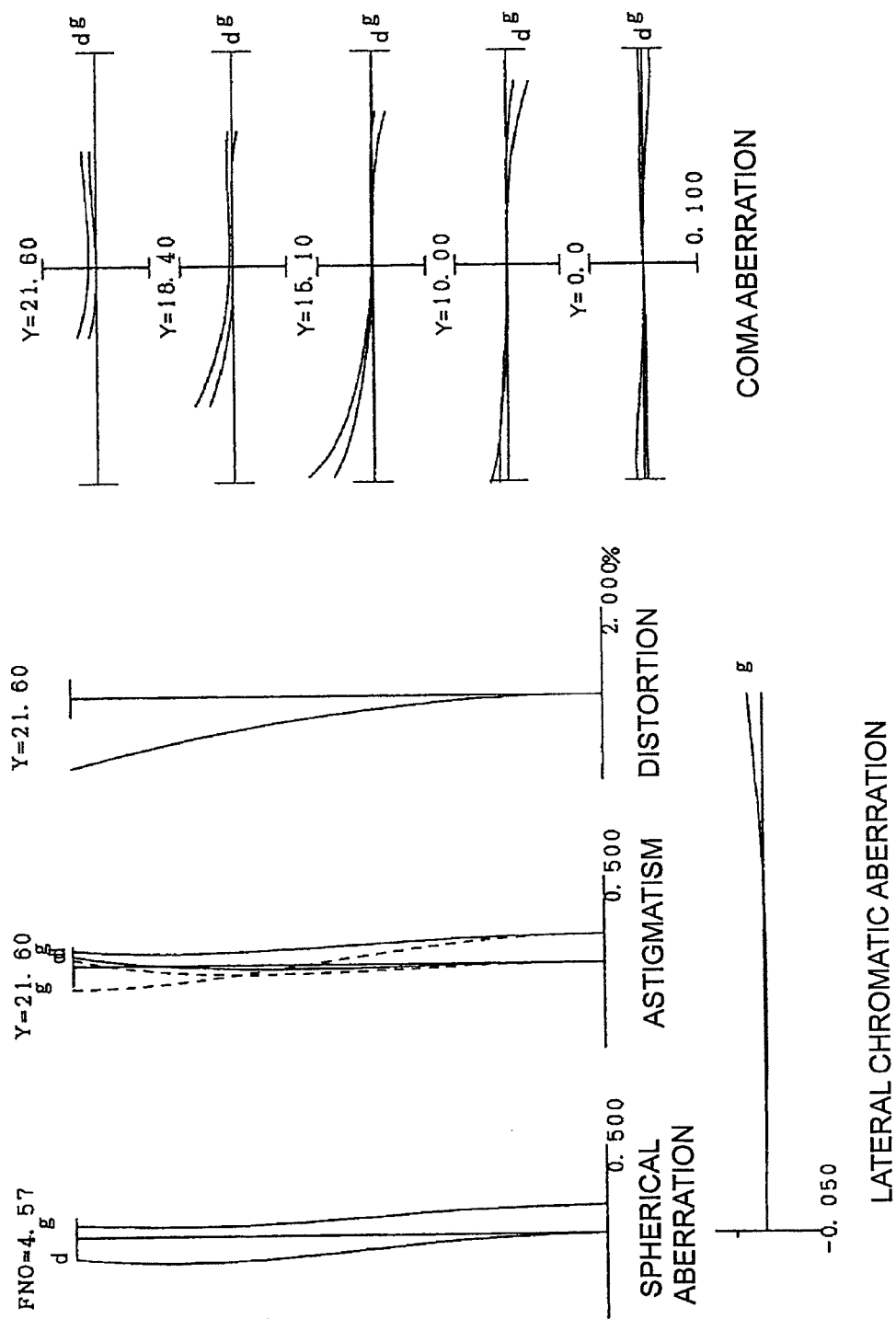
FIG. 22A shows the wide angle end state.
Figure 22B:
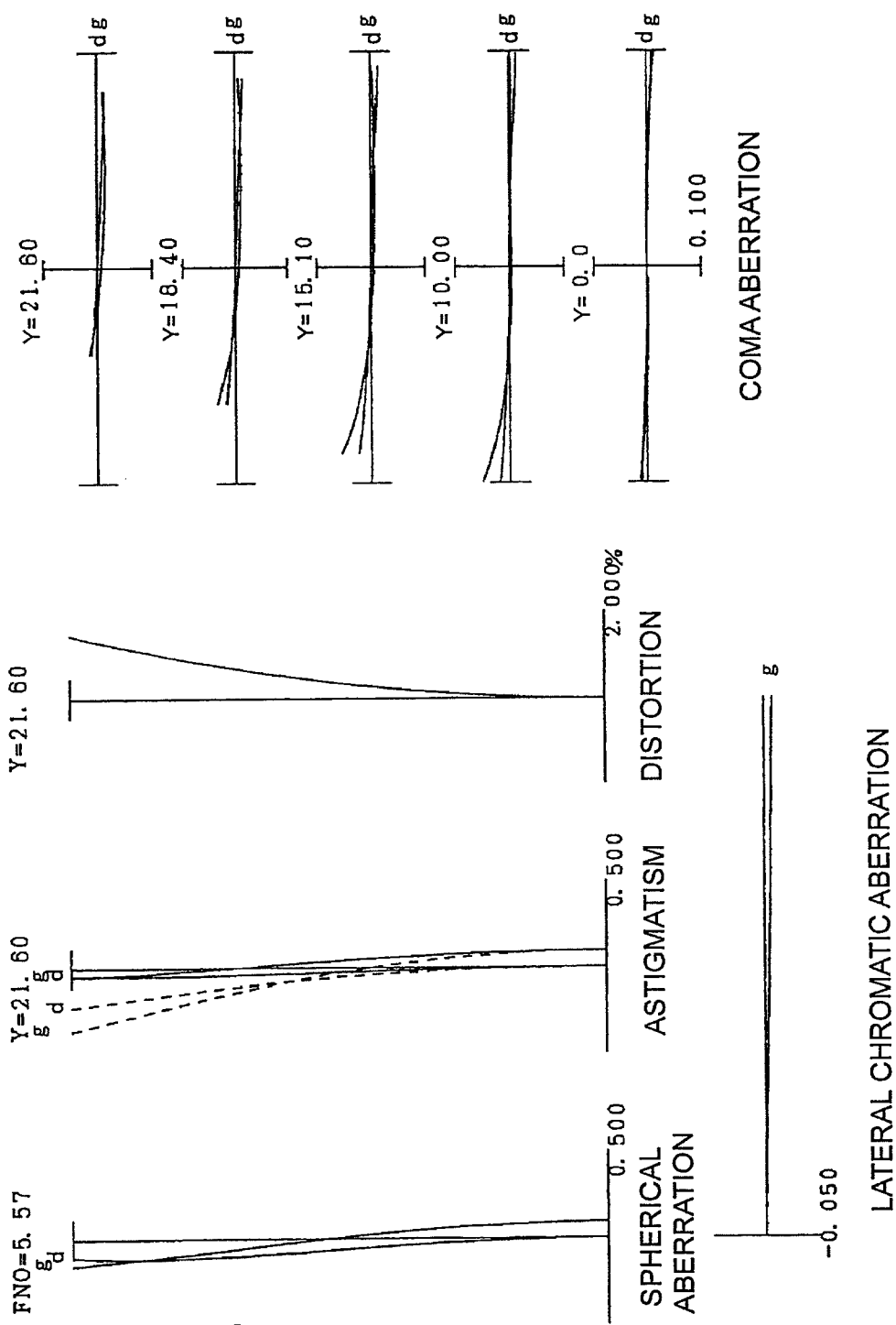
FIG. 22B shows the intermediate focal length state.
Figure 22C:
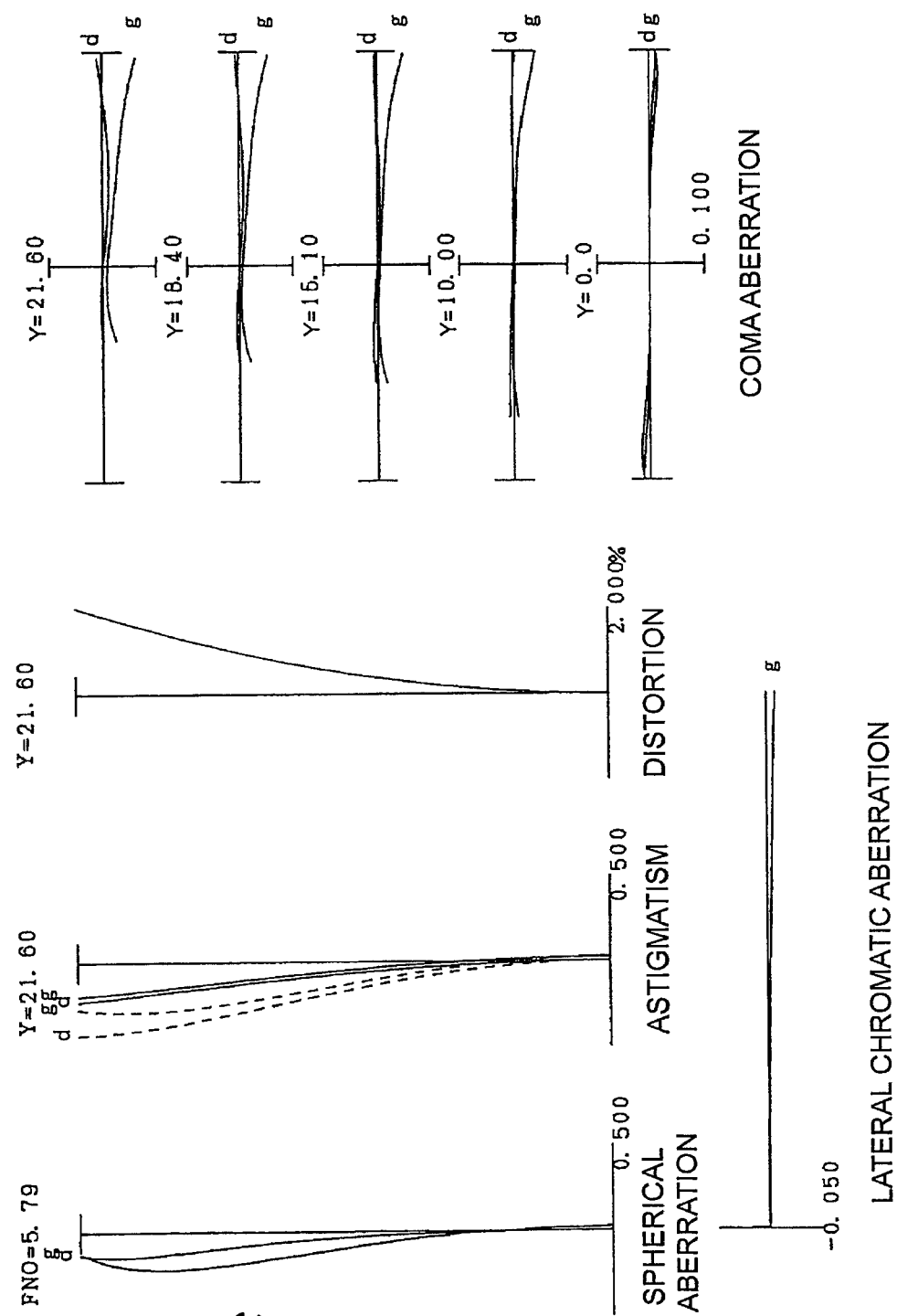
FIG. 22C shows the telephoto end state.
Figure 23A:
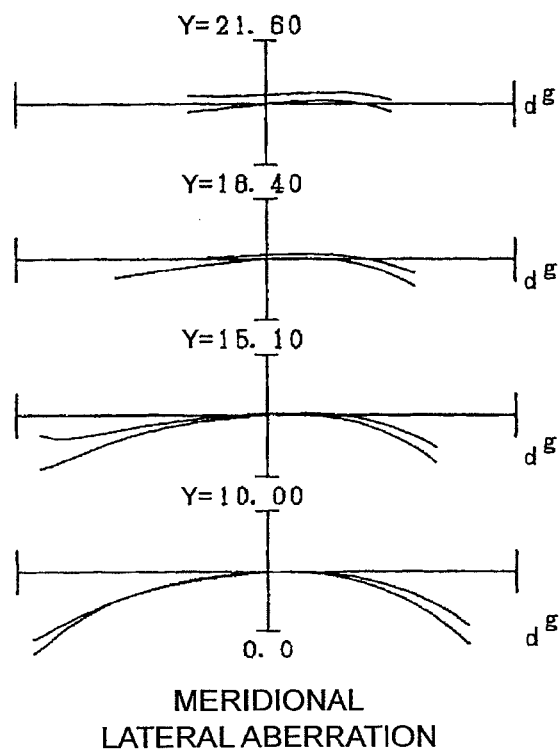
FIG. 23A shows the wide angle end state.
Figure 23B:
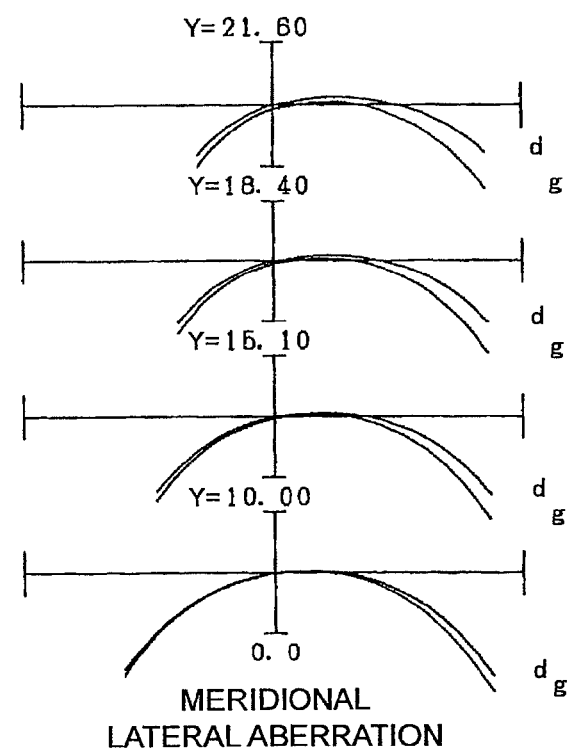
FIG. 23B shows the telephoto end state.
Figure 24A:
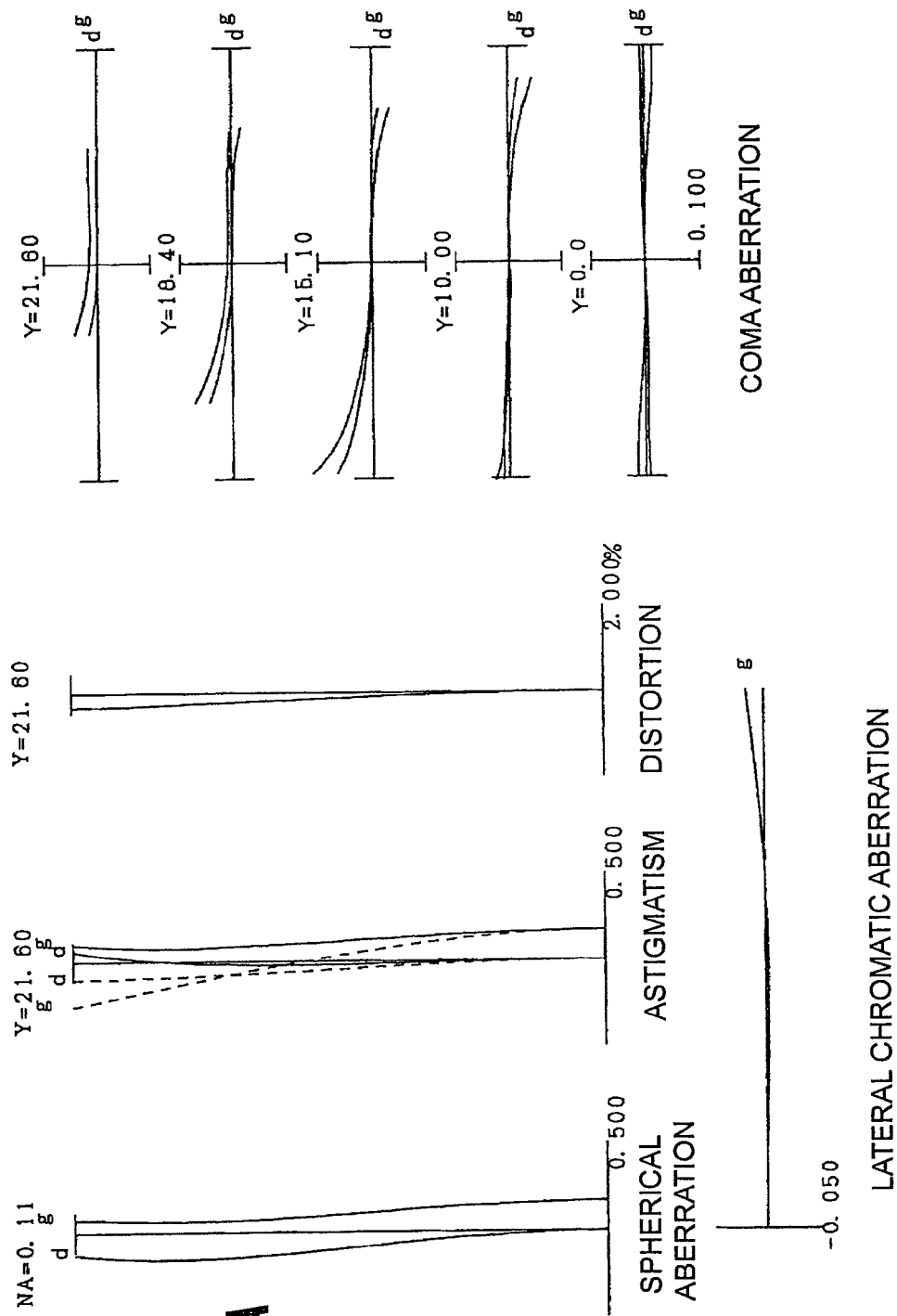
FIG. 24A shows the wide angle end state.
Figure 24B:
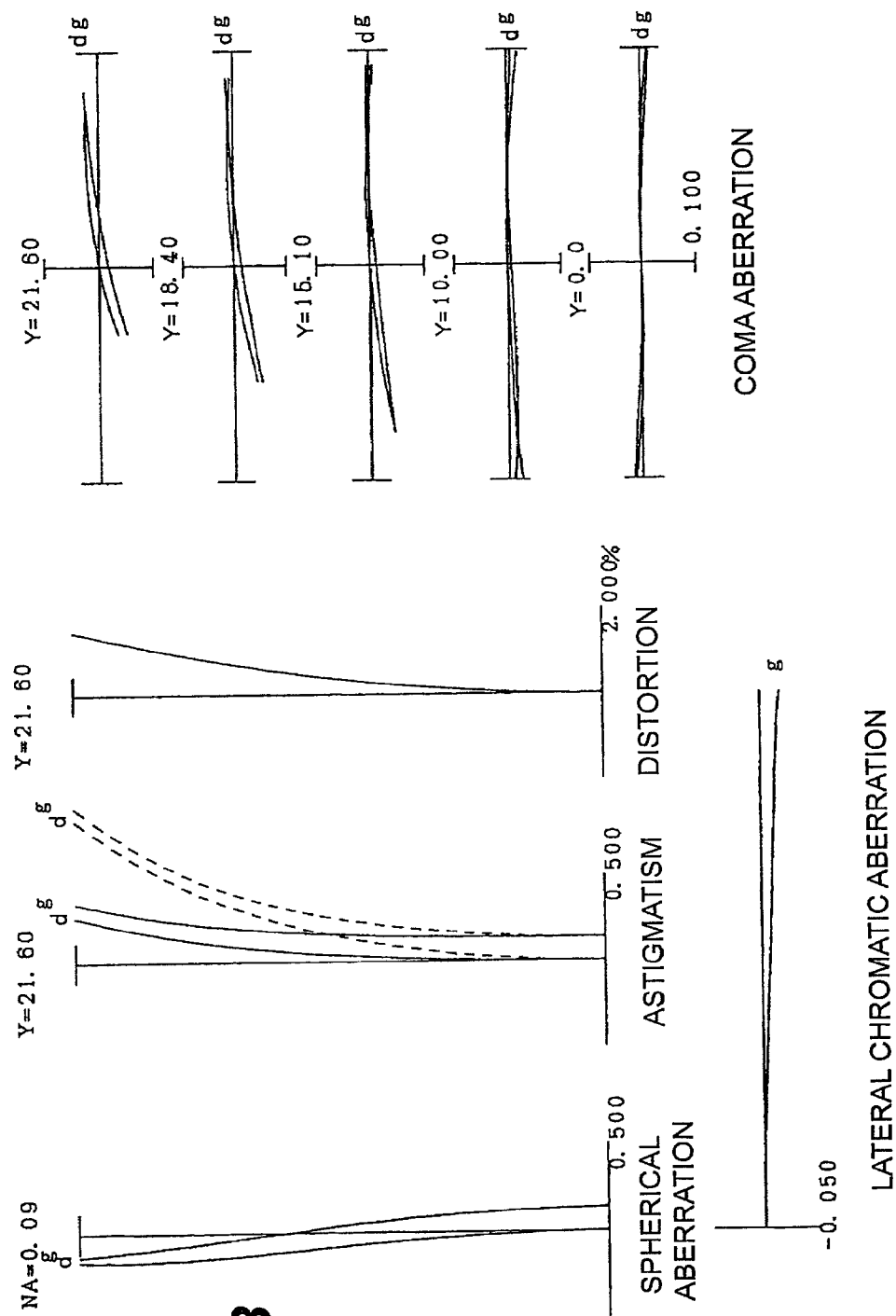
FIG. 24B shows the intermediate focal length state.
Figure 24C:
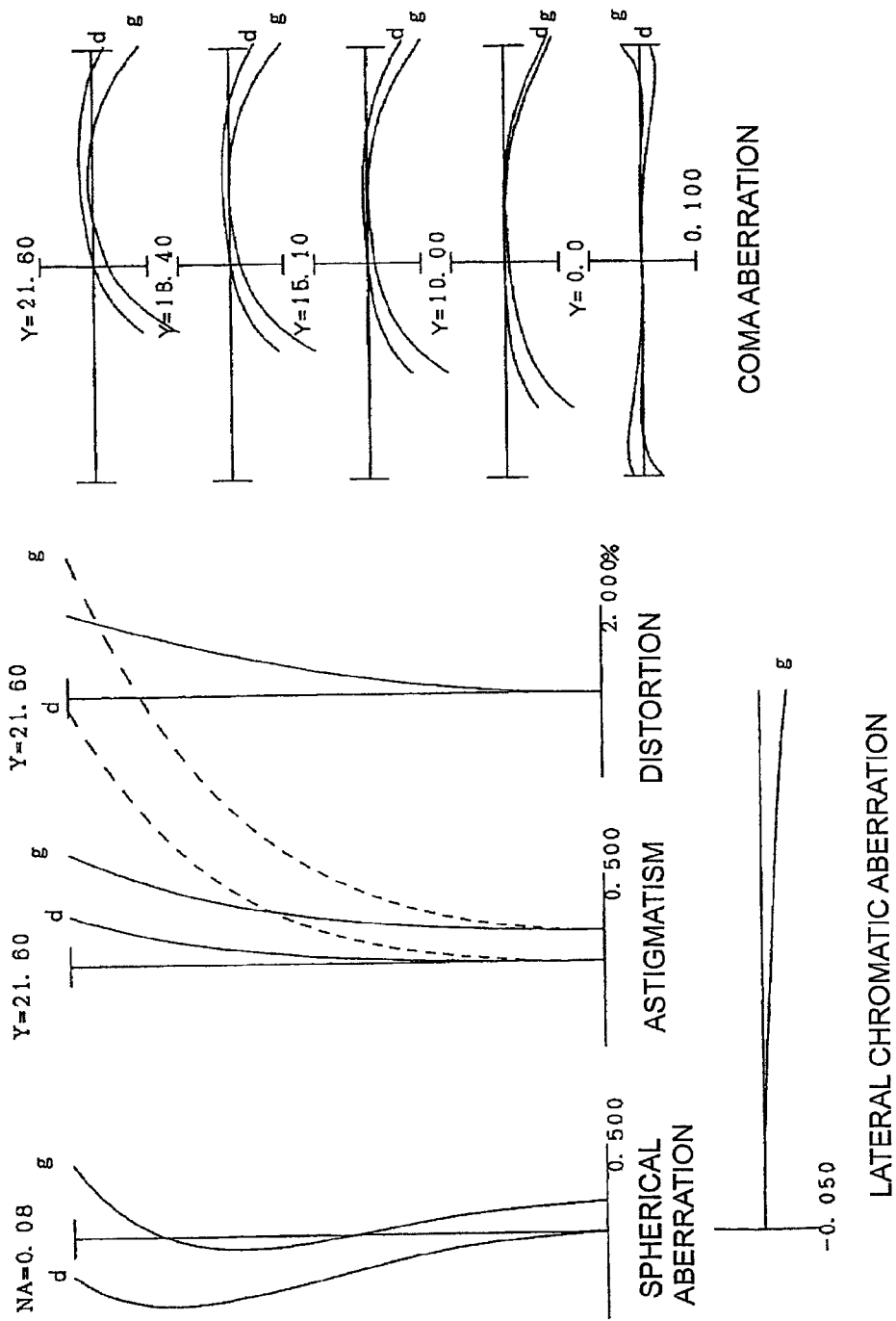
FIG. 24C shows the telephoto end state.

FIG. 22 are graphs showing various aberrations of the zooming optical system according to the sixth example upon focusing on infinity, wherein FIG. 22A shows the wide angle end state, FIG. 22B shows the intermediate focal length state, and FIG. 22C shows the telephoto end state. FIG. 23 are graphs showing meridional lateral aberrations when blur correction is performed on the zooming optical system according to the sixth example upon focusing on infinity, wherein FIG. 23A shows the wide angle end state, and FIG. 23B shows the telephoto end state. FIG. 24 are graphs showing various aberrations of the zooming optical system according to the sixth example upon focusing on close distance (photographing distance of entire system: R=1.8 m), wherein FIG. 24A shows the wide angle end state, FIG. 24B shows the intermediate focal length state, and FIG. 24C shows the telephoto end state.

According to the sixth example, as each graph on aberrations shows, various aberrations are corrected well in each focal length state from the wide angle end state to the telephoto end state, and excellent image forming performance is implemented.

Seventh Example

A seventh example will be described with reference to FIG. 25 to FIG. 28 and Table 7. FIG. 25 shows a lens configuration and zoom locus of the seventh example. As FIG. 25 shows, a zooming optical system according to the seventh example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive lens L12 having a convex surface facing the object, and a biconvex positive lens positive lens L13, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, and a cemented lens of a biconvex positive lens L32 and a biconcave negative lens L33, which are disposed in order from the object.

The fourth lens group G4 has a negative meniscus lens L41 having a convex surface facing the object, and a cemented lens of a positive lens L42 having a concave surface facing the object and a biconcave negative lens L43, which are disposed in order from the object.

The fifth lens group G5 has a positive meniscus lens L51 having a convex surface facing the object, a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.432, and the focal length is 81.6 (mm), so the moving distance of the lens L41 and the cemented lens of the lens L42 and lens L43 for correction 0.350° of the rotational blur is −0.348 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 7 below shows the values of each parameter of the zooming optical system according to the seventh example. The surface numbers 1 to 34 in Table 7 correspond to the surfaces 1 to 34 in FIG. 25.

TABLE 7

| [All Parameters] | | | | | |
|---|---|---|---|---|---|
| | Wide angle end state | | Intermediate focal length state | | Telephoto end state |
| f | 81.6 | ~ | 200.0 | ~ | 392.0 |
| FNO | 4.6 | ~ | 5.3 | ~ | 5.8 |
| TL | 260.0 | ~ | 260.0 | ~ | 260.0 |
| 2ω | 29.5 | ~ | 12.0 | ~ | 6.2 |

| [Lens Data] | | | | |
|---|---|---|---|---|
| Surface number | r | d | nd | νd |
| 1 | 189.2251 | 3.6 | 1.83481 | 42.7 |
| 2 | 85.1335 | 8.2 | 1.49782 | 82.6 |
| 3 | 1015.6177 | 0.1 | | |
| 4 | 108.8270 | 8.1 | 1.49782 | 82.6 |
| 5 | −537.5395 | D5 | | |
| 6 | 88.9642 | 3.2 | 1.84666 | 23.8 |
| 7 | 66.2716 | 8.1 | 1.58913 | 61.2 |
| 8 | 588.7120 | D8 | | |
| *9 | 1000.0000 | 2.0 | 1.79050 | 45.0 |
| 10 | 92.9093 | 4.1 | | |
| 11 | −84.2744 | 2.0 | 1.75500 | 52.3 |
| 12 | 41.0861 | 5.8 | 1.80809 | 22.8 |
| 13 | −176.5623 | 1.4 | | |
| 14 | −68.0933 | 1.7 | 1.80400 | 46.6 |
| 15 | 87.0261 | D15 | | |
| 16 | 91.3387 | 4.8 | 1.79500 | 45.3 |
| 17 | −88.6741 | 0.1 | | |
| 18 | 56.2501 | 7.1 | 1.51680 | 64.1 |
| 19 | −56.2501 | 1.8 | 1.84666 | 23.8 |
| 20 | 33.1404 | D20 | | |
| 21 | 105.8589 | 1.3 | 1.84666 | 23.8 |
| 22 | 69.0399 | 1.8 | | |
| 23 | −73.2131 | 2.8 | 1.80518 | 25.4 |
| 24 | −26.8863 | 1.3 | 1.72000 | 43.7 |
| 25 | 211.2287 | 4.1 | | |
| 26 | 0.0000 | D26 | (Aperture stop S) | |
| 27 | 27.6410 | 3.5 | 1.51680 | 64.1 |
| 28 | 125.3545 | 7.5 | | |
| 29 | 40.6460 | 1.3 | 1.84666 | 23.8 |
| 30 | 19.0178 | 12.9 | 1.51742 | 52.3 |
| 31 | −58.3678 | D31 | | |
| 32 | −25.9539 | 1.3 | 1.80400 | 46.6 |
| 33 | 25.9539 | 5.8 | 1.78472 | 25.7 |
| 34 | −113.2339 | BF | | |

[Aspherical Data]
Ninth surface

κ = 1.0000, A4 = 1.4266E−06, A6 = 4.5344E−10, A8 = 3.7386E−13, A10 = 4.6201E−16

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1540.00 | 1540.00 | 1540.00 |
| D5 | 11.8592 | 11.8592 | 11.8592 | 2.0153 | 2.0153 | 2.0154 |
| D8 | 2.2708 | 21.6597 | 28.5685 | 12.1146 | 31.5035 | 38.4123 |
| D15 | 49.0856 | 22.5061 | 2.0000 | 49.0856 | 22.5061 | 2.0000 |
| D20 | 12.3526 | 19.5431 | 33.1404 | 12.3526 | 19.5431 | 33.1404 |
| D26 | 27.1659 | 13.9317 | 2.0000 | 27.1659 | 13.9317 | 2.0000 |
| D31 | 5.6235 | 5.1024 | 3.1982 | 5.6235 | 5.1024 | 3.1982 |
| BF | 45.9240 | 59.6793 | 73.5152 | 45.9240 | 59.6793 | 73.5153 |

[Focal Length Data of Each Group]

| Group number | First surface of group | Focal length of group |
|---|---|---|
| G1 | 1 | 102.4814 |
| G2 | 9 | −29.2207 |

TABLE 7-continued

| G3 | 16 | 46.7169 |
| G4 | 21 | −64.5468 |
| G5 | 27 | 41.5607 |
| G6 | 32 | −41.7749 |

[Conditional Expressions]

| Conditional Expression (1) | |f4|/fT = 0.165 |
| Conditional Expression (2) | f3/|f4| = 0.724 |

As the parameter table in Table 7 shows, the zooming optical system according to this example satisfies both conditional Expressions (1) and (2).

Figure 26A:
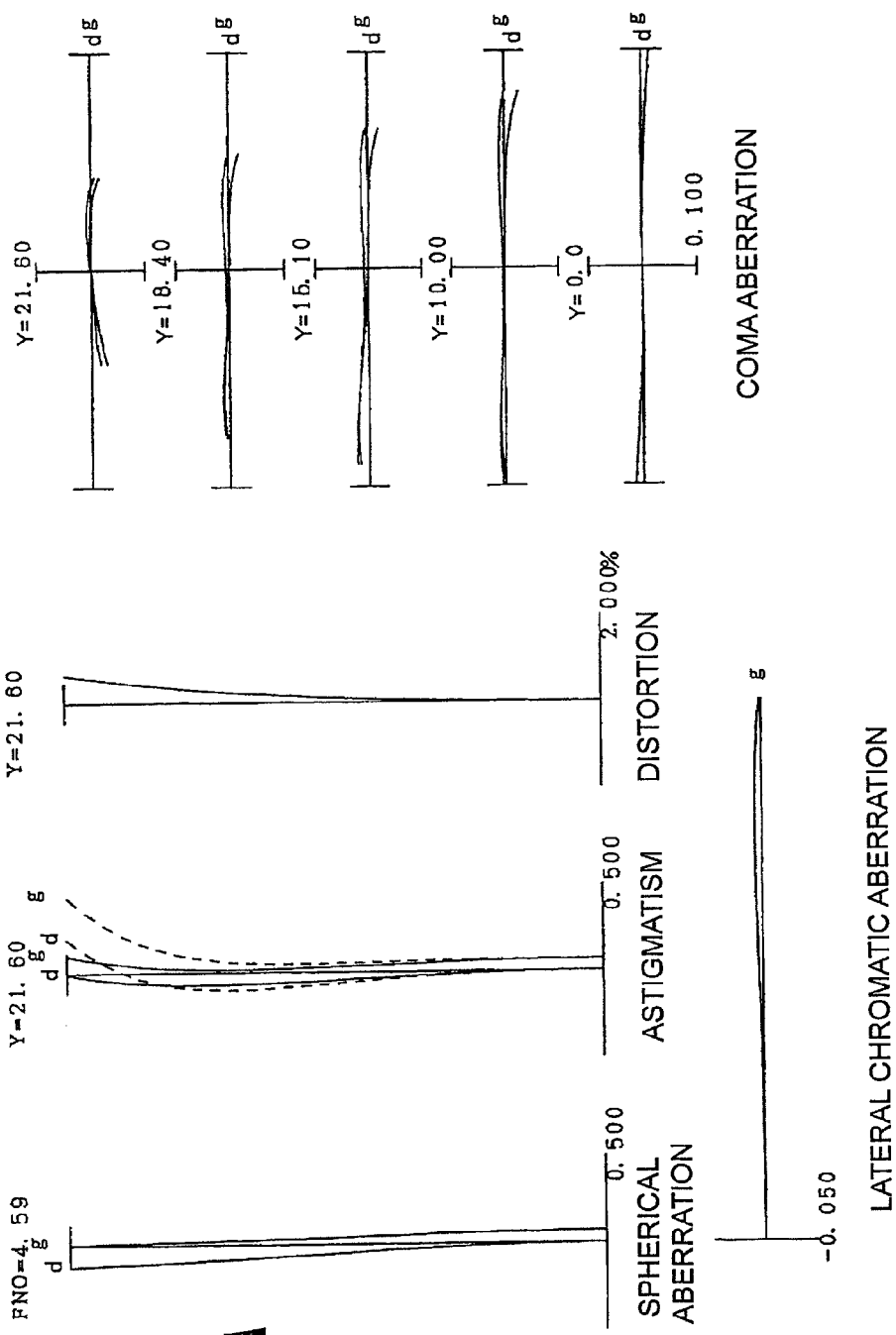
FIG. 26A shows the wide angle end state.
Figure 26B:
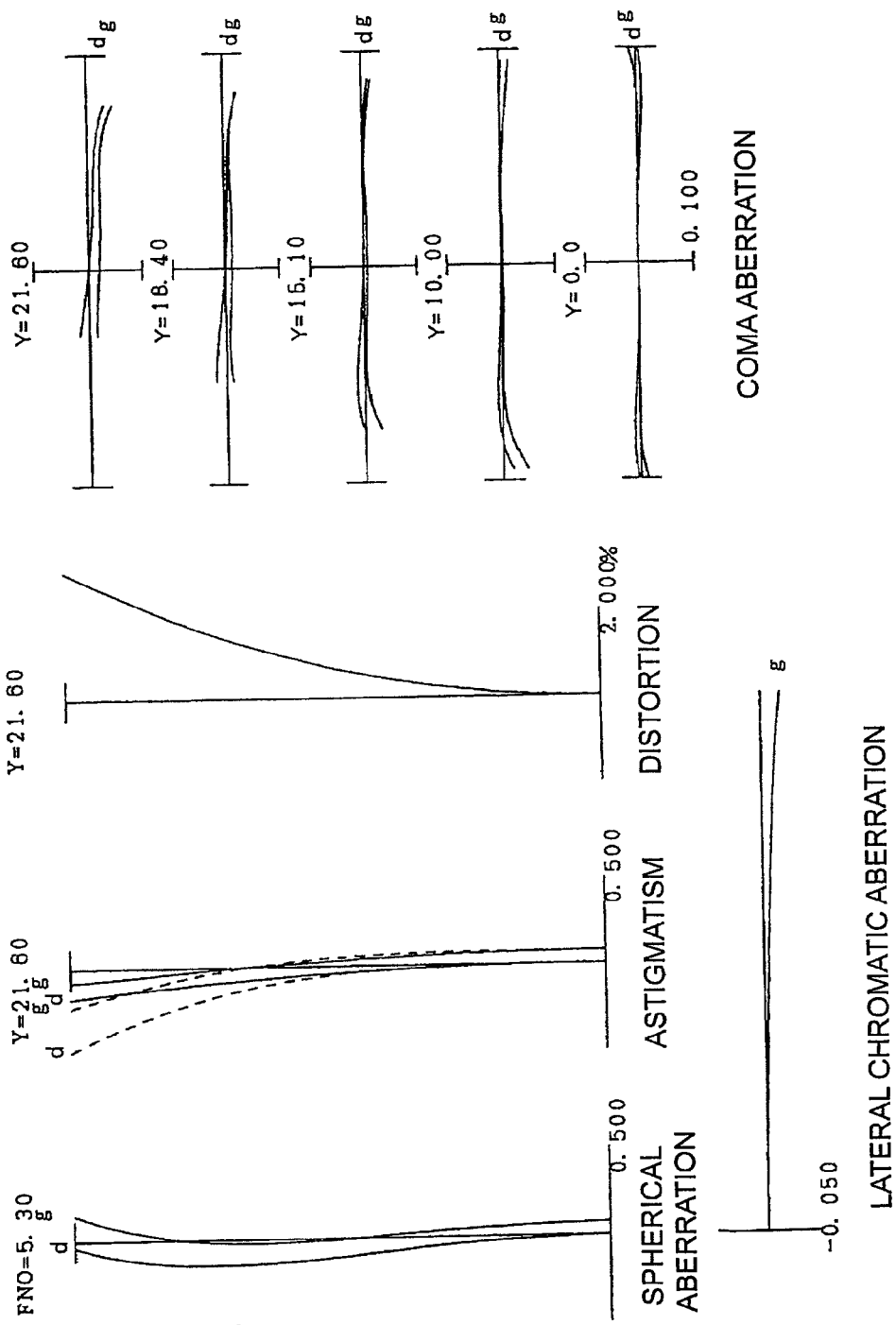
FIG. 26B shows the intermediate focal length state.
Figure 27A:
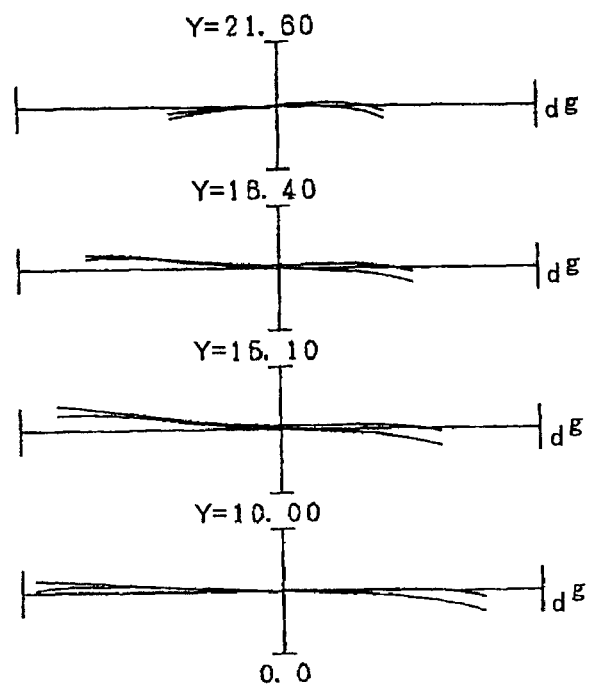
FIG. 27A shows the wide angle end state.
Figure 27B:
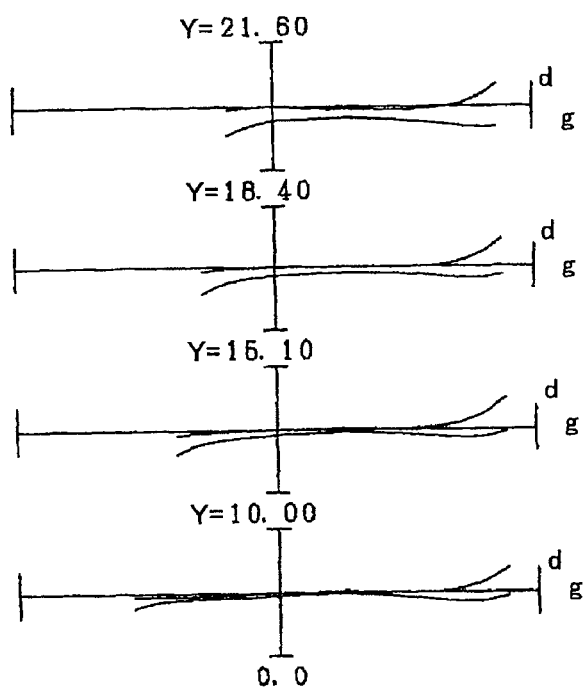
FIG. 27B shows the telephoto end state.
Figure 28B:
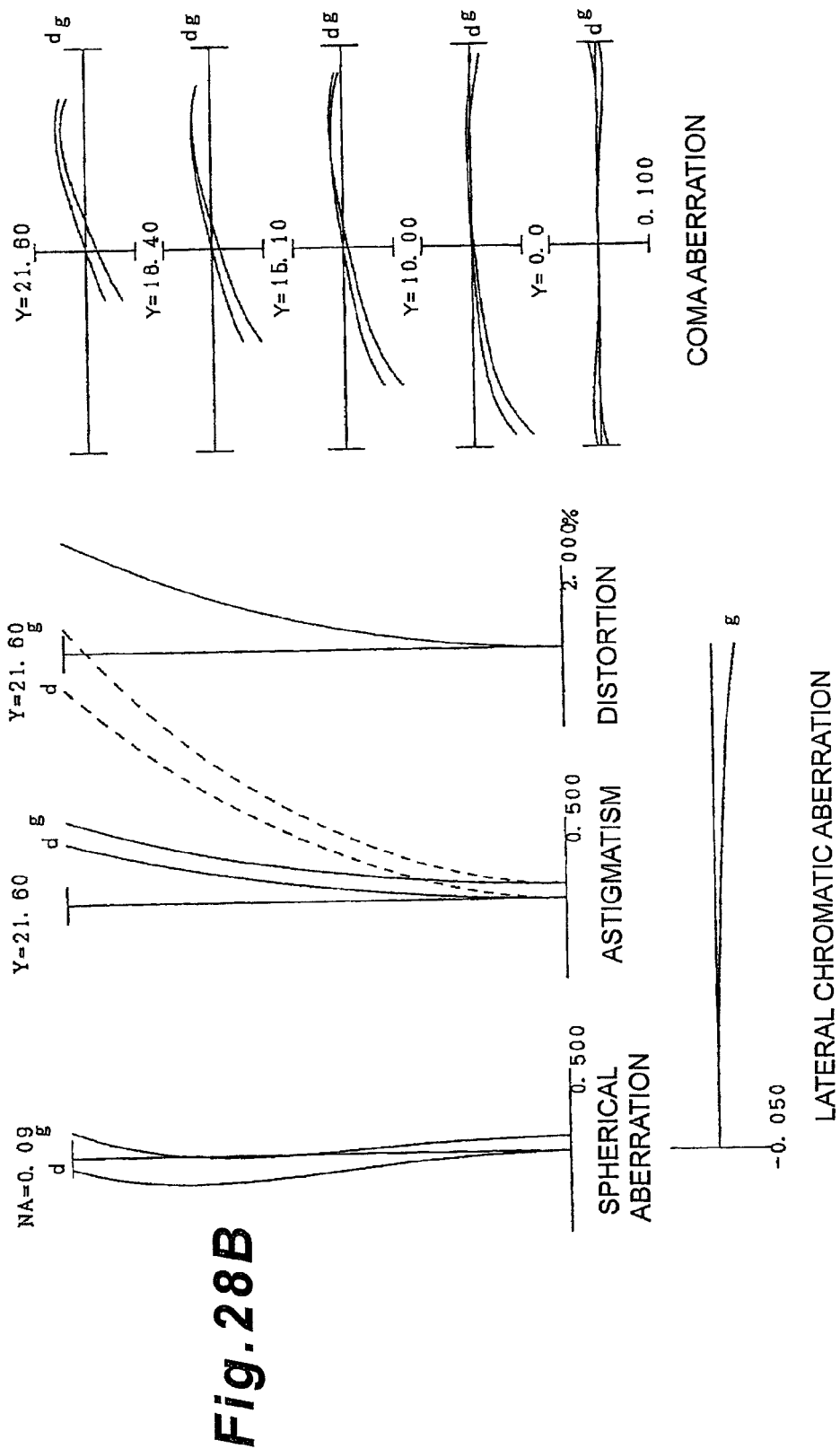
FIG. 28B shows the intermediate focal length state.
Figure 28C:
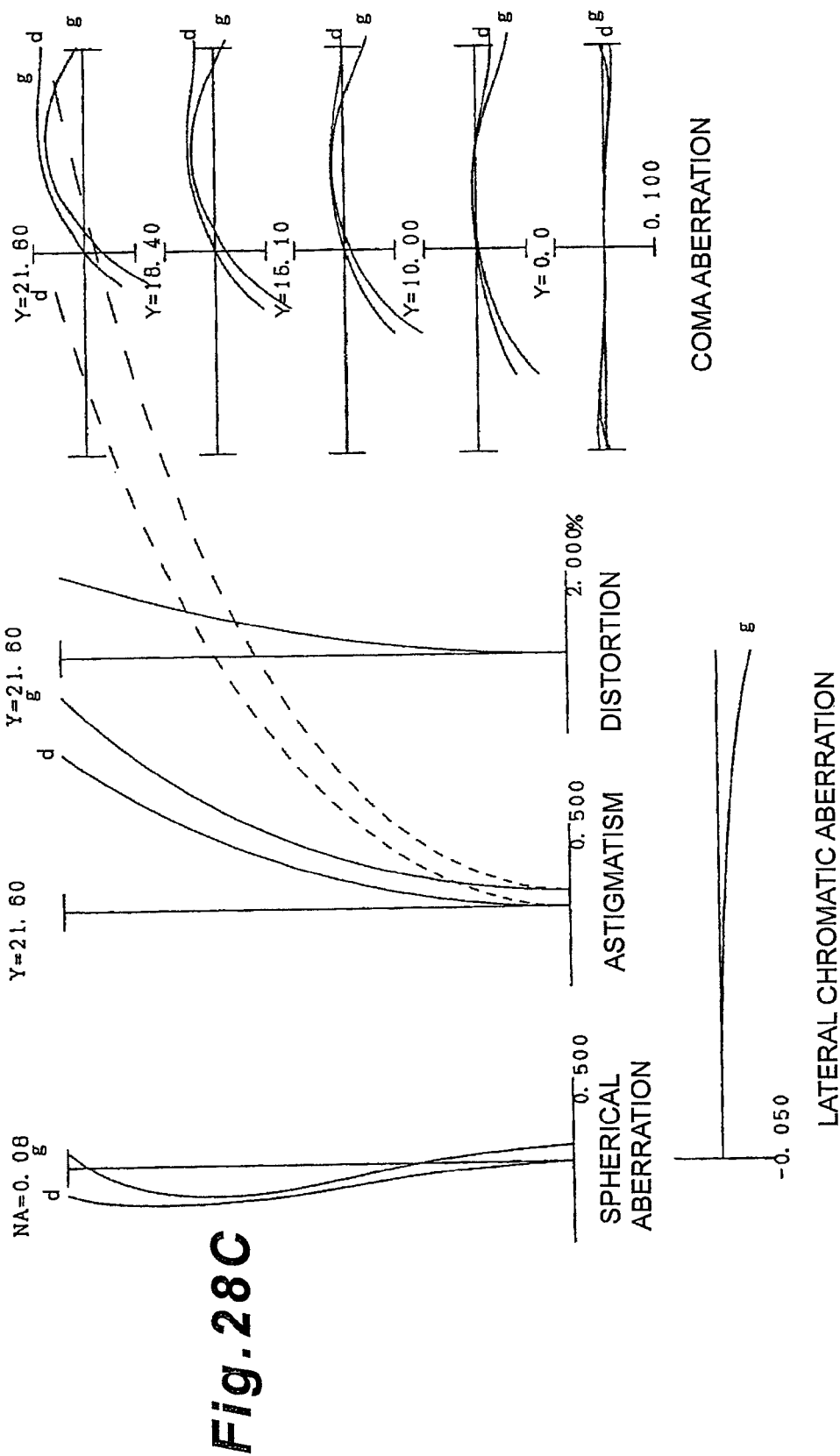
FIG. 28C shows the telephoto end state.

FIG. 26 are graphs showing various aberrations of the zooming optical system according to the seventh example upon focusing on infinity, wherein FIG. 26A shows the wide angle end state, FIG. 26B shows the intermediate focal length state, and FIG. 26C shows the telephoto end state. FIG. 27 are graphs showing meridional lateral aberrations when blur correction is performed on the zooming optical system according to the seventh example upon focusing on infinity, wherein FIG. 27A shows the wide angle end state, and FIG. 27B shows the telephoto end state. FIG. 28 are graphs showing various aberrations of the zooming optical system according to the seventh example upon focusing on close distance (photographing distance of entire system: R=1.8 n), wherein FIG. 28A shows the wide angle end state, FIG. 28B shows the intermediate focal length state, and FIG. 28C shows the telephoto end state.

According to the seventh example, as each graph on aberrations shows, various aberrations are corrected well in each focal length state from the wide angle end state to the telephoto end state, and excellent image forming performance is implemented.

Eighth Example

An eighth example will be described with reference to FIG. 29 to FIG. 32 and Table 8. FIG. 29 shows a lens configuration and zoom locus of the eighth example. As FIG. 29 shows, a zooming optical system according to the eighth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, a cemented lens of a biconvex positive lens L32 and a biconcave negative lens L33, and a positive meniscus lens L34 having a convex surface facing the object, which are disposed in order from the object.

The fourth lens group G4 has a negative meniscus lens L41 having a convex surface facing the object, and a cemented lens of a positive meniscus lens L42 having a concave surface facing the object and a biconcave negative lens L43, which are disposed in order from the object.

The fifth lens group G5 has a biconvex positive lens L51, and a cemented lens of a biconvex positive lens L52 and a negative meniscus lens L53 having a concave surface facing the object, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.538, and the focal length is 81.6 (mm), so the moving distance of the lens L41 and the cemented lens of the lens L42 and lens L43 for correction 0.350° of the rotational blur is −0.324 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 8 below shows the values of each parameter of the zooming optical system according to the eighth example. The surface numbers 1 to 36 in Table 8 correspond to the surfaces 1 to 36 in FIG. 29.

TABLE 8

[All Parameters]

|  | Wide angle end state |  | Intermediate focal length state |  | Telephoto end state |
|---|---|---|---|---|---|
| f | 81.6 | ~ | 200.0 | ~ | 392.3 |
| FNO | 4.6 | ~ | 5.2 | ~ | 5.8 |
| TL | 260.0 | ~ | 260.0 | ~ | 260.0 |
| 2ω | 29.2 | ~ | 12.0 | ~ | 6.2 |

[Lens Data]

| Surface number | r | d | nd | νd |
|---|---|---|---|---|
| 1 | 141.4367 | 3.6 | 1.83481 | 42.7 |
| 2 | 77.5835 | 9.1 | 1.49782 | 82.6 |
| 3 | 1217.2505 | 0.1 | | |
| 4 | 98.6776 | 7.2 | 1.49782 | 82.6 |
| 5 | 1816.6879 | D5 | | |
| 6 | 86.8450 | 3.2 | 1.84666 | 23.8 |
| 7 | 61.4144 | 8.6 | 1.58913 | 61.2 |
| 8 | 586.4327 | D8 | | |
| *9 | 1000.0000 | 2.0 | 1.79050 | 45.0 |
| 10 | 78.7985 | 3.8 | | |
| 11 | −115.6092 | 2.0 | 1.75500 | 52.3 |
| 12 | 34.4861 | 6.2 | 1.80809 | 22.8 |
| 13 | −217.3620 | 1.5 | | |
| 14 | −71.6505 | 1.7 | 1.81600 | 46.6 |
| 15 | 63.5472 | D15 | | |
| 16 | 135.7647 | 4.1 | 1.74400 | 44.8 |
| 17 | −89.5215 | 0.2 | | |
| 18 | 60.1055 | 6.6 | 1.61800 | 63.4 |
| 19 | −61.6315 | 1.8 | 1.84666 | 23.8 |
| 20 | 587.4989 | 0.1 | | |
| 21 | 54.0842 | 2.9 | 1.48749 | 70.5 |
| 22 | 108.0347 | D22 | | |
| 23 | 78.4319 | 1.3 | 1.84666 | 23.8 |
| 24 | 51.4225 | 2.8 | | |
| 25 | −89.2197 | 3.2 | 1.80518 | 25.4 |
| 26 | −26.3728 | 1.3 | 1.74400 | 44.8 |
| 27 | 162.3606 | 4.1 | | |
| 28 | 0.0000 | D28 | (Aperture stop S) | |
| 29 | 57.0723 | 4.1 | 1.48749 | 70.5 |
| 30 | −47.3394 | 0.8 | | |
| 31 | 135.0079 | 7.6 | 1.51742 | 52.3 |
| 32 | −31.0619 | 1.7 | 1.80518 | 25.4 |
| 33 | −114.3448 | D33 | | |
| 34 | −46.0933 | 1.3 | 1.81600 | 46.6 |
| 35 | 31.0312 | 4.4 | 1.75520 | 27.5 |
| 36 | −181.0133 | BF | | |

[Aspherical Data]
Ninth surface

κ = 1.0000, A4 = 1.7255E−06, A6 = 2.4724E−10, A8 = 7.1737E−13, A10 = −1.7822E−16

[Variable Distance Data]

|  | Infinity | | | Close distance | | |
|---|---|---|---|---|---|---|
|  | Wide angle End | Intermediate | Telephoto end | Wide angle End | Intermediate | Telephoto end |
| f | 81.6 | 200.0 | 392.3 | — | — | — |
| β | 0 | 0 | 0 | −0.05 | −0.13 | −0.26 |
| D0 | 0 | 0 | 0 | 1540.00 | 1540.00 | 1540.00 |
| D5 | 11.6403 | 11.6403 | 11.6403 | 2.0038 | 2.0038 | 2.0038 |
| D8 | 2.0000 | 19.7154 | 26.6341 | 11.6366 | 29.3520 | 36.2707 |
| D15 | 49.5877 | 22.9984 | 3.0852 | 49.5877 | 22.9984 | 3.0852 |

TABLE 8-continued

| D22 | 11.5139 | 20.3877 | 33.3823 | 11.5139 | 20.3877 | 33.3823 |
| D28 | 27.3128 | 14.4763 | 2.2541 | 27.3128 | 14.4763 | 2.2541 |
| D33 | 6.7527 | 6.0569 | 3.4268 | 6.7527 | 6.0569 | 3.4268 |
| BF | 53.8135 | 67.3459 | 82.1982 | 53.8135 | 67.3459 | 82.1982 |

[Focal Length Data of Each Group]

| Group number | First surface of group | Focal length of group |
| --- | --- | --- |
| G1 | 1 | 99.1871 |
| G2 | 9 | −26.5930 |
| G3 | 16 | 42.7402 |
| G4 | 23 | −58.7482 |
| G5 | 29 | 49.2727 |
| G6 | 34 | −65.5437 |

[Conditional Expressions]

| Conditional Expression (1) | $|f4|/fT = 0.150$ |
| Conditional Expression (2) | $f3/|f4| = 0.728$ |

As the parameter table in Table 8 shows, the zooming optical system according to this example satisfies both conditional Expressions (1) and (2).

Figure 30A:
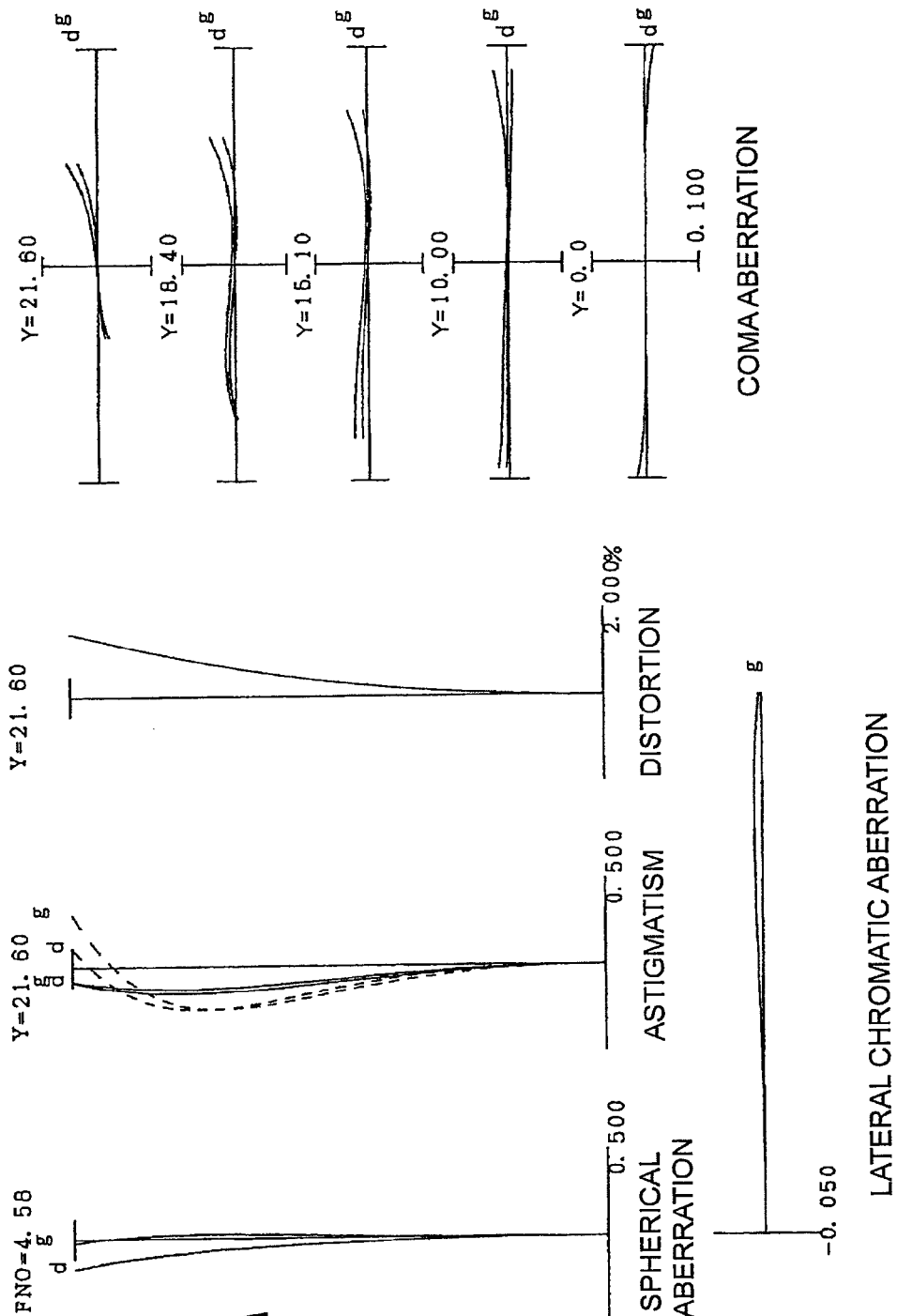
FIG. 30A shows the wide angle end state.
Figure 30B:
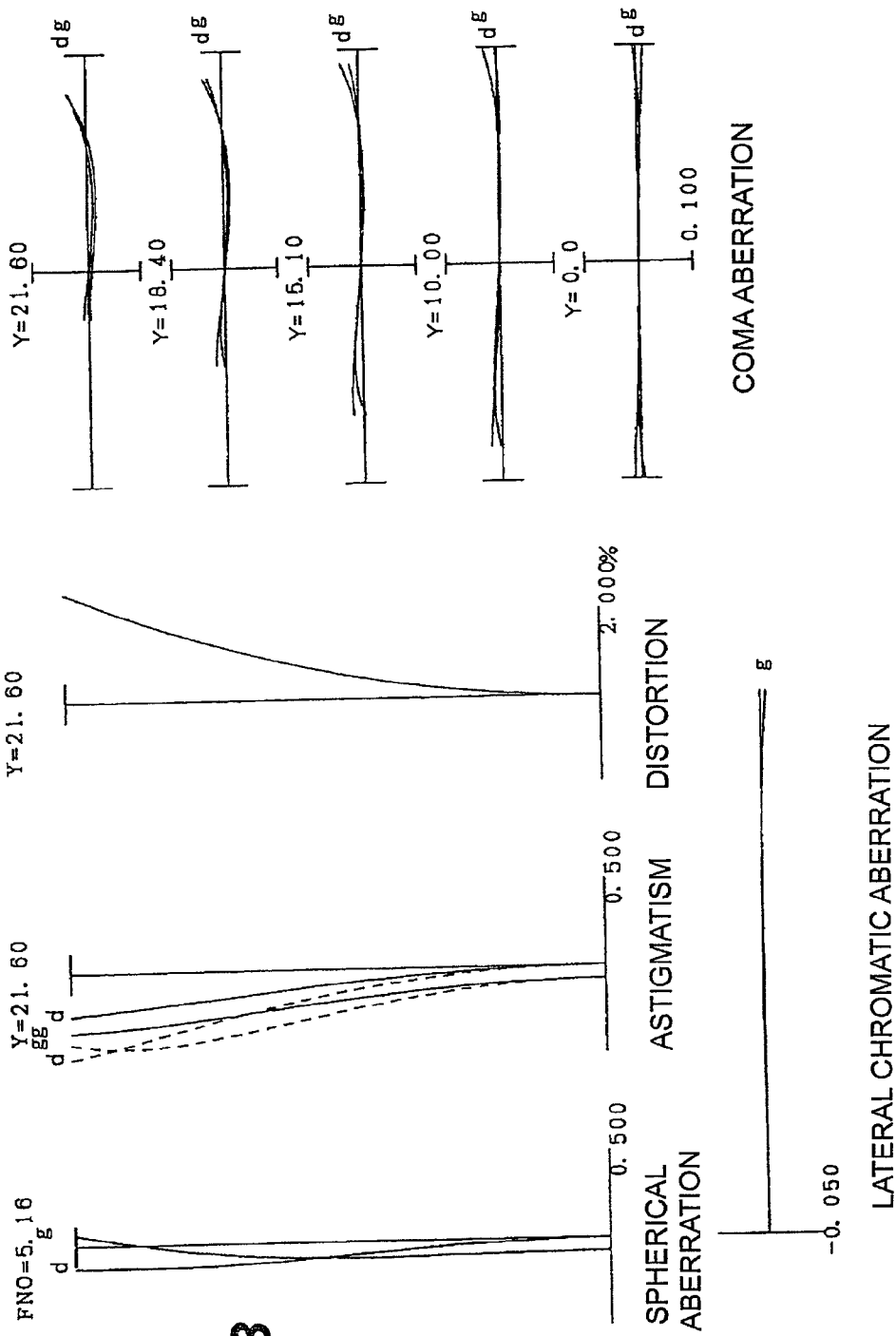
FIG. 30B shows the intermediate focal length state.
Figure 31A:
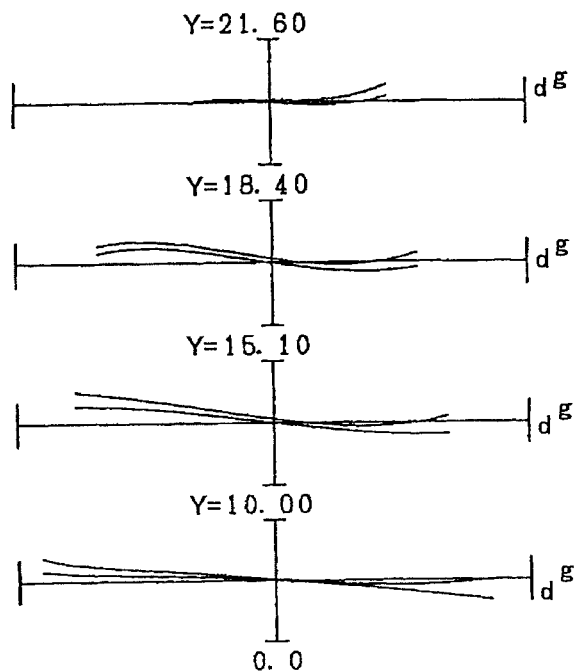
FIG. 31A shows the wide angle end state.
Figure 31B:
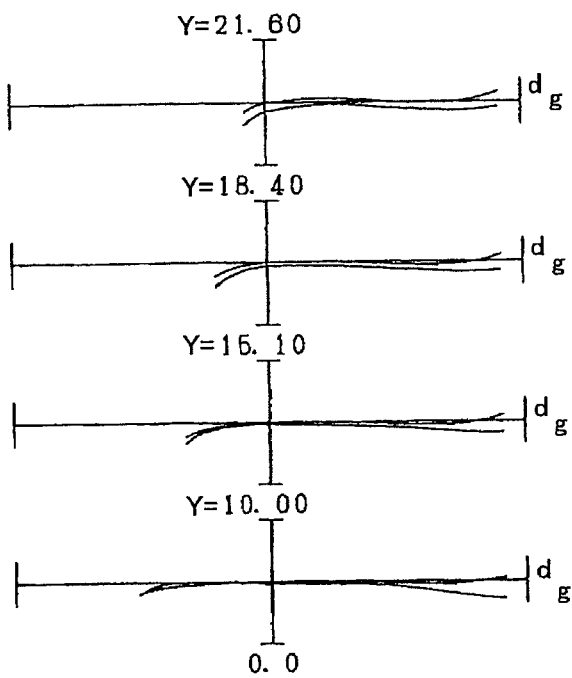
FIG. 31B shows the telephoto end state.
Figure 32A:
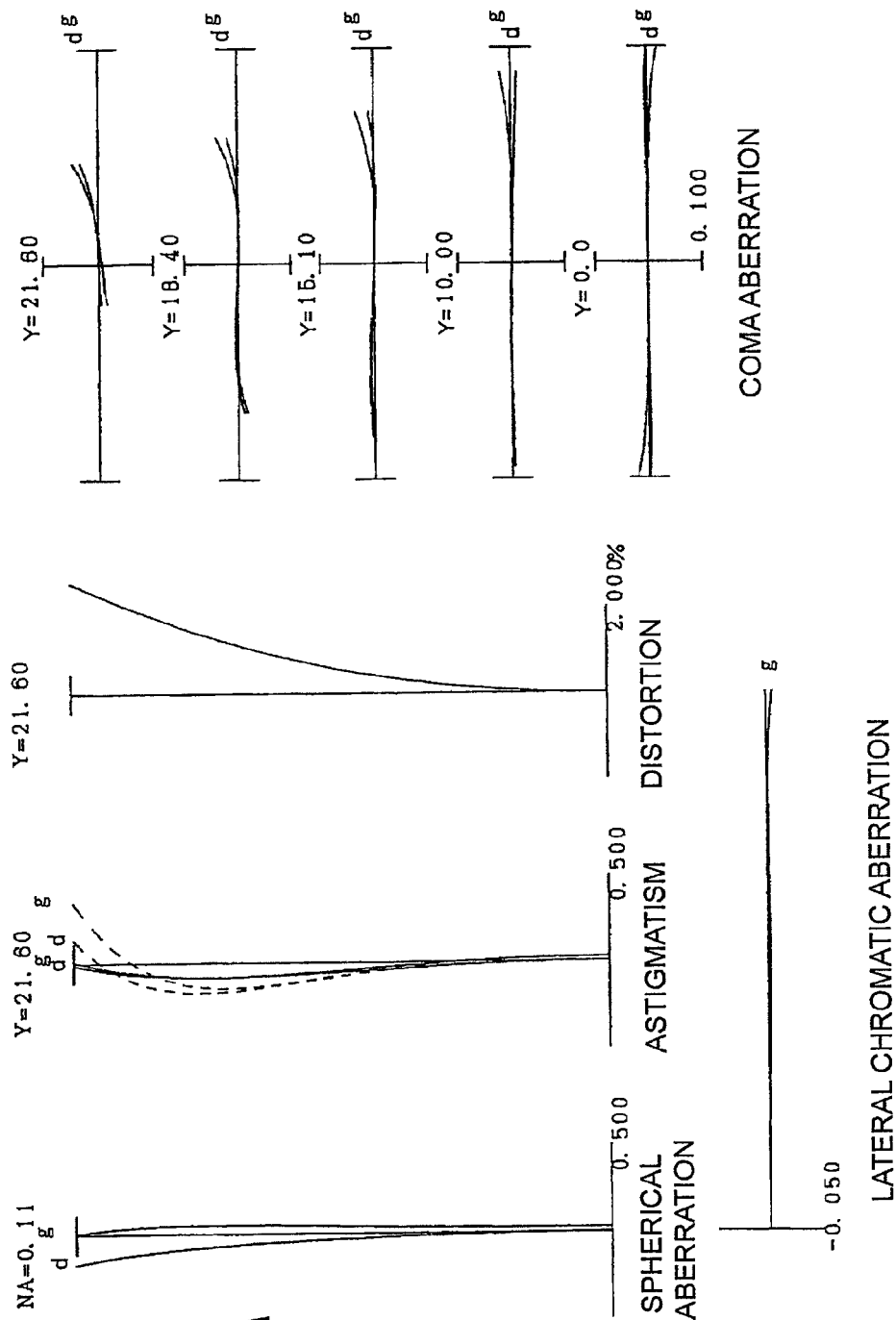
FIG. 32A shows the wide angle end state.
Figure 32B:
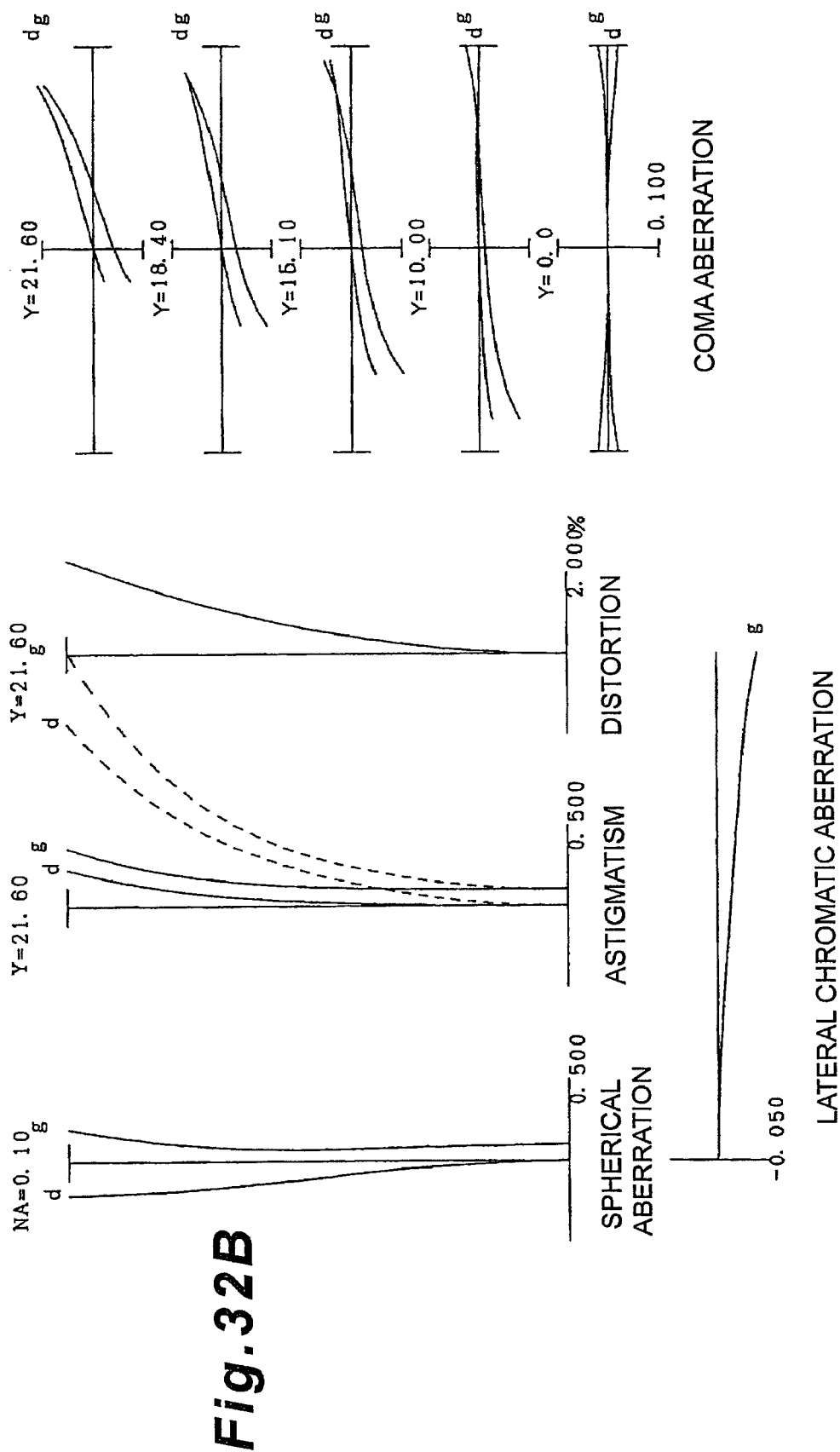
FIG. 32B shows the intermediate focal length state.
Figure 32C:
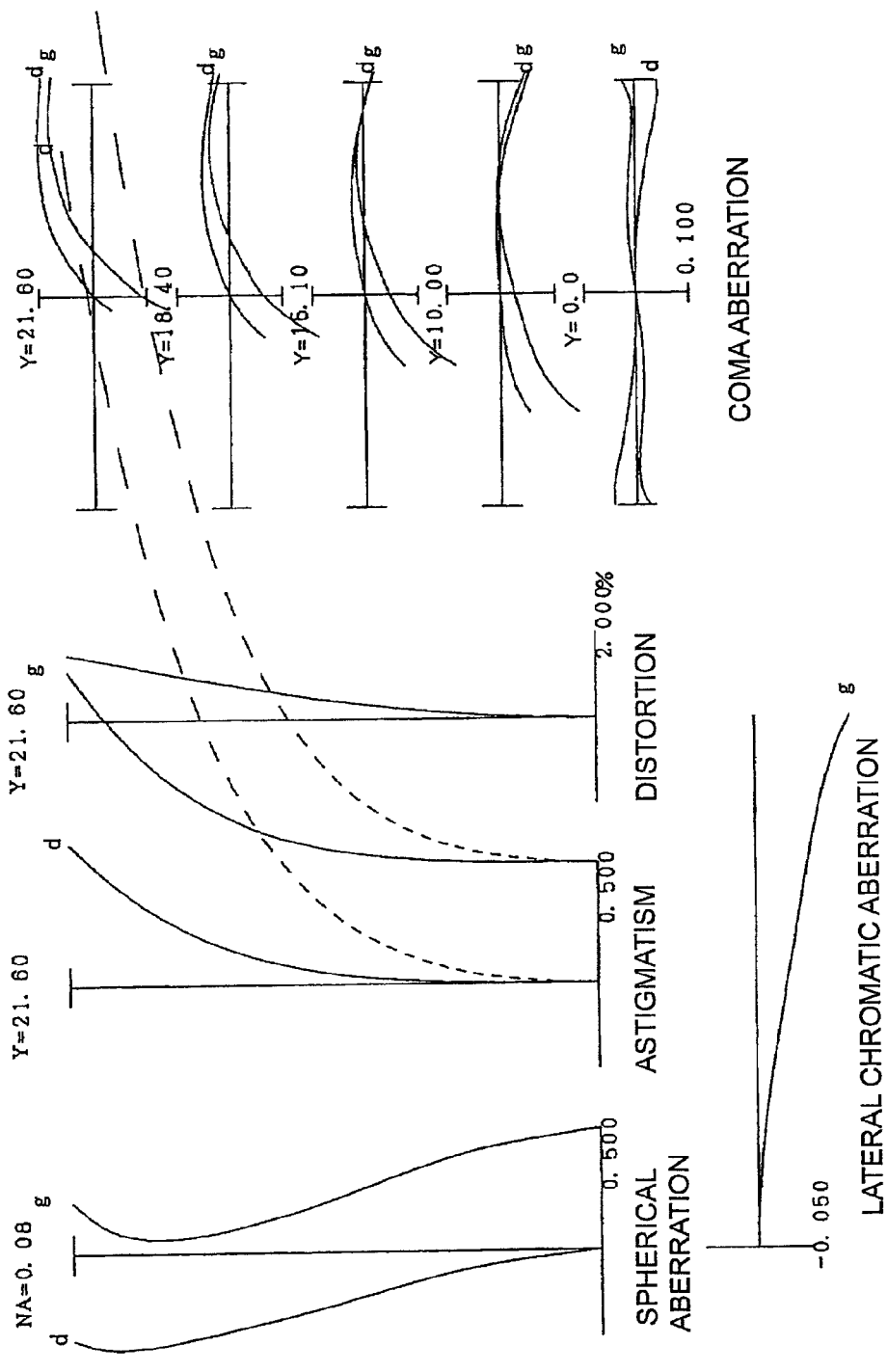
FIG. 32C shows the telephoto end state.

FIG. 30 are graphs showing various aberrations of the zooming optical system according to the eighth example upon focusing on infinity, wherein FIG. 30A shows the wide angle end state, FIG. 30B shows the intermediate focal length state, and FIG. 30C shows the telephoto end state. FIG. 31 are graphs showing meridional lateral Aberrations when blur correction is performed on the zooming optical system according to the eighth example upon focusing on infinity, wherein FIG. 31A shows the wide angle end state, and FIG. 31B shows the telephoto end state. FIG. 32 are graphs showing various Aberrations of the zooming optical system according to the eighth example upon focusing on close distance (photographing distance of entire system: R=1.8 m), wherein FIG. 32A shows the wide angle end state, FIG. 32B shows the intermediate focal length state, and FIG. 32C shows the telephoto end state.

According to the eighth example, as each graph on Aberrations shows, various aberrations are corrected well in each focal length state from the wide angle end state to the telephoto end state, and excellent image forming performance is implemented.

Ninth Example

A ninth example will be described with reference to FIG. 33 to FIG. 36 and Table 9. FIG. 36 shows a lens configuration and zoom locus of the ninth example. As FIG. 36 shows, a zooming optical system according to the ninth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a biconvex positive lens L13, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, a biconvex positive lens L32, and a cemented lens of a biconvex positive lens L33 and a biconcave negative lens L34, which are disposed in order from the object.

The fourth lens group G4 has a cemented lens of a biconvex positive lens L41 and a biconcave negative lens L42, and a biconcave negative lens L43, which are disposed in order from the object.

The fifth lens group G5 has a positive meniscus lens L51 having a convex surface facing the object, and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.513, and the focal length is 81.6 (mm), so the moving distance of the lens L41 and the cemented lens of the lens L42 and lens L43 for correction 0.350° of the rotational blur is −0.329 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 9 below shows the values of each parameter of the zooming optical system according to the ninth example. The surface numbers 1 to 36 in Table 9 correspond to the surfaces 1 to 36 in FIG. 33.

TABLE 9

[All Parameters]

|  | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.3 | ~ | 5.9 |
| TL | 259.9 | ~ | 259.9 | ~ | 259.9 |
| 2ω | 29.5 | ~ | 11.9 | ~ | 6.1 |

[Lens Data]

| Surface number | r | d | nd | vd |
|---|---|---|---|---|
| 1 | 136.5927 | 3.6 | 1.83481 | 42.7 |
| 2 | 77.4288 | 8.4 | 1.49782 | 82.6 |
| 3 | 480.1154 | 0.1 | | |
| 4 | 112.0728 | 7.7 | 1.49782 | 82.6 |
| 5 | −763.0919 | D5 | | |
| 6 | 89.3642 | 3.2 | 1.84666 | 23.8 |
| 7 | 65.2719 | 8.6 | 1.58913 | 61.2 |
| 8 | 622.4204 | D8 | | |
| *9 | 856.4923 | 2.0 | 1.79050 | 45.0 |
| 10 | 75.8742 | 4.1 | | |
| 11 | −106.9796 | 2.0 | 1.75500 | 52.3 |
| 12 | 36.4011 | 6.0 | 1.80809 | 22.8 |
| 13 | −328.5252 | 1.7 | | |
| 14 | −66.6918 | 1.7 | 1.80400 | 46.6 |
| 15 | 89.8287 | D15 | | |
| 16 | 131.5292 | 4.0 | 1.72916 | 54.7 |
| 17 | −122.0116 | 0.1 | | |
| 18 | 88.6769 | 3.4 | 1.48749 | 70.5 |
| 19 | −385.5563 | 0.1 | | |
| 20 | 61.9020 | 6.5 | 1.61800 | 63.4 |
| 21 | −86.1967 | 1.8 | 1.84666 | 23.8 |
| 22 | 242.3945 | D22 | | |
| 23 | 4432.8239 | 2.8 | 1.80518 | 25.4 |
| 24 | −48.7019 | 1.3 | 1.74400 | 44.8 |
| 25 | 68.5468 | 1.8 | | |
| 26 | −154.2813 | 1.3 | 1.77250 | 49.6 |
| 27 | 278.4806 | 4.1 | | |
| 28 | 0.0000 | D28 | (Aperture stop S) | |
| 29 | 28.3699 | 3.9 | 1.48749 | 70.5 |
| 30 | 269.2184 | 6.5 | | |
| 31 | 56.8377 | 1.3 | 1.75520 | 27.5 |
| 32 | 18.8512 | 7.3 | 1.51823 | 58.9 |
| 33 | −60.6257 | D33 | | |
| 34 | −27.6815 | 1.3 | 1.80400 | 46.6 |
| 35 | 29.3829 | 5.8 | 1.78472 | 25.7 |
| 36 | −80.4905 | BF | | |

[Aspherical Data]
Ninth surface

κ = 1.0000, A4 = 1.1177E−06, A6 = 2.2238E−10, A8 = 5.3529E−13, A10 = −8.5532E−17

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |

TABLE 9-continued

| D0  | 0       | 0       | 0       | 1540.12 | 1540.12 | 1540.12 |
|-----|---------|---------|---------|---------|---------|---------|
| D5  | 11.7134 | 11.7134 | 11.7134 | 2.0000  | 2.0000  | 2.0000  |
| D8  | 2.0000  | 21.4337 | 27.3996 | 11.7134 | 31.1472 | 37.1130 |
| D15 | 49.3041 | 23.0636 | 2.4250  | 49.3041 | 23.0636 | 2.4250  |
| D22 | 26.5526 | 15.3736 | 4.1319  | 26.5526 | 15.3736 | 4.1319  |
| D28 | 6.9815  | 6.4986  | 4.1109  | 6.9815  | 6.4986  | 4.1109  |
| BF  | 46.9037 | 58.5656 | 72.1951 | 46.9037 | 58.5656 | 72.1951 |

[Focal Length Data of Each Group]

| Group number | First surface of group | Focal length of group |
|---|---|---|
| G1 | 1  | 100.1359  |
| G2 | 9  | −27.4127  |
| G3 | 16 | 44.5281   |
| G4 | 23 | −57.6921  |
| G5 | 29 | 43.8984   |
| G6 | 34 | −53.1354  |

[Conditional Expressions]

| Conditional Expression (1) | |f4|/fT = 0.147 |
| Conditional Expression (2) | f3/|f4| = 0.772 |

As the parameter table in Table 9 shows, the zooming optical system according to this example satisfies both conditional Expressions (1) and (2).

Figure 34A:
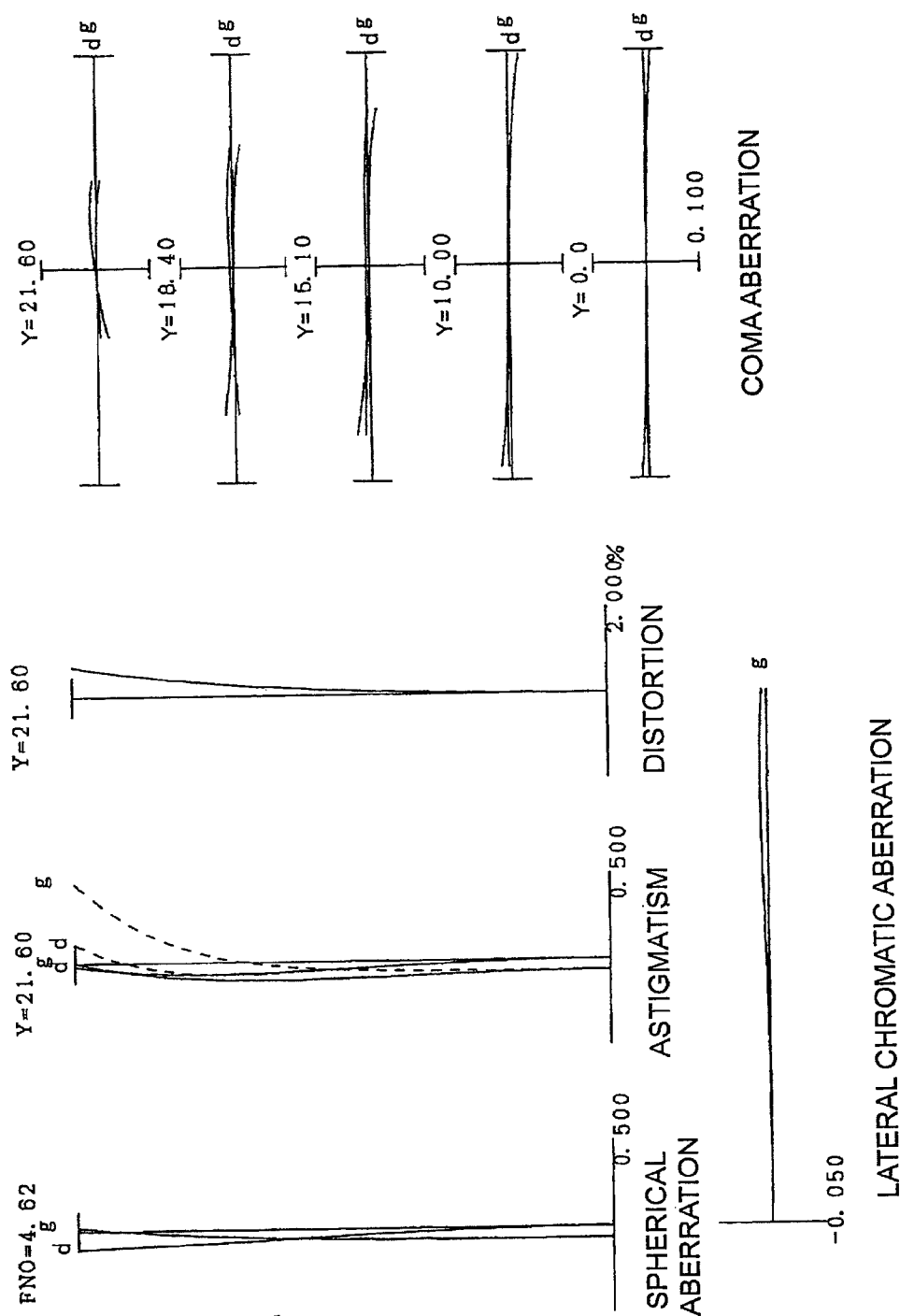
FIG. 34A shows the wide angle end state.
Figure 34B:
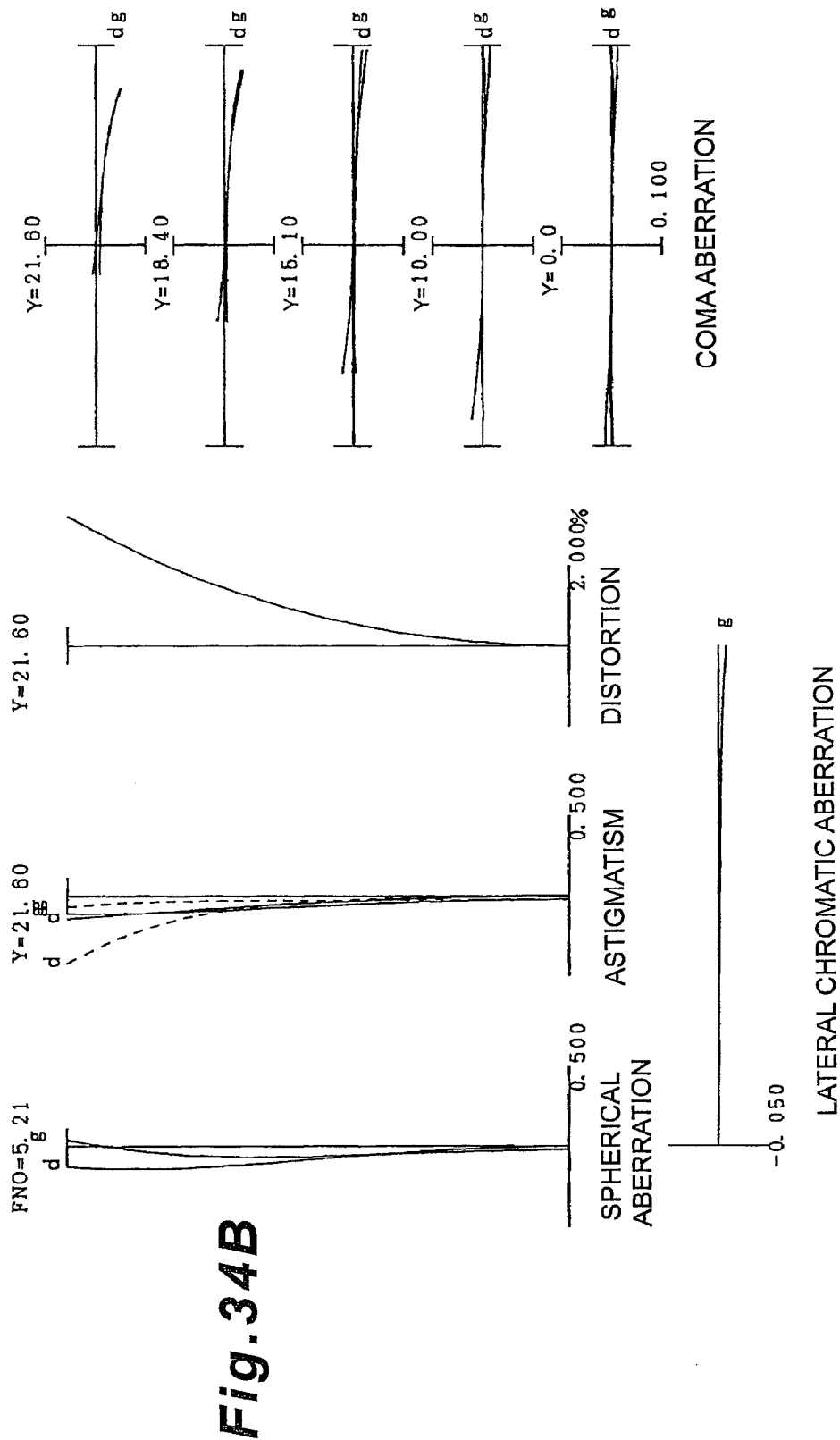
FIG. 34B shows the intermediate focal length state.
Figure 34C:
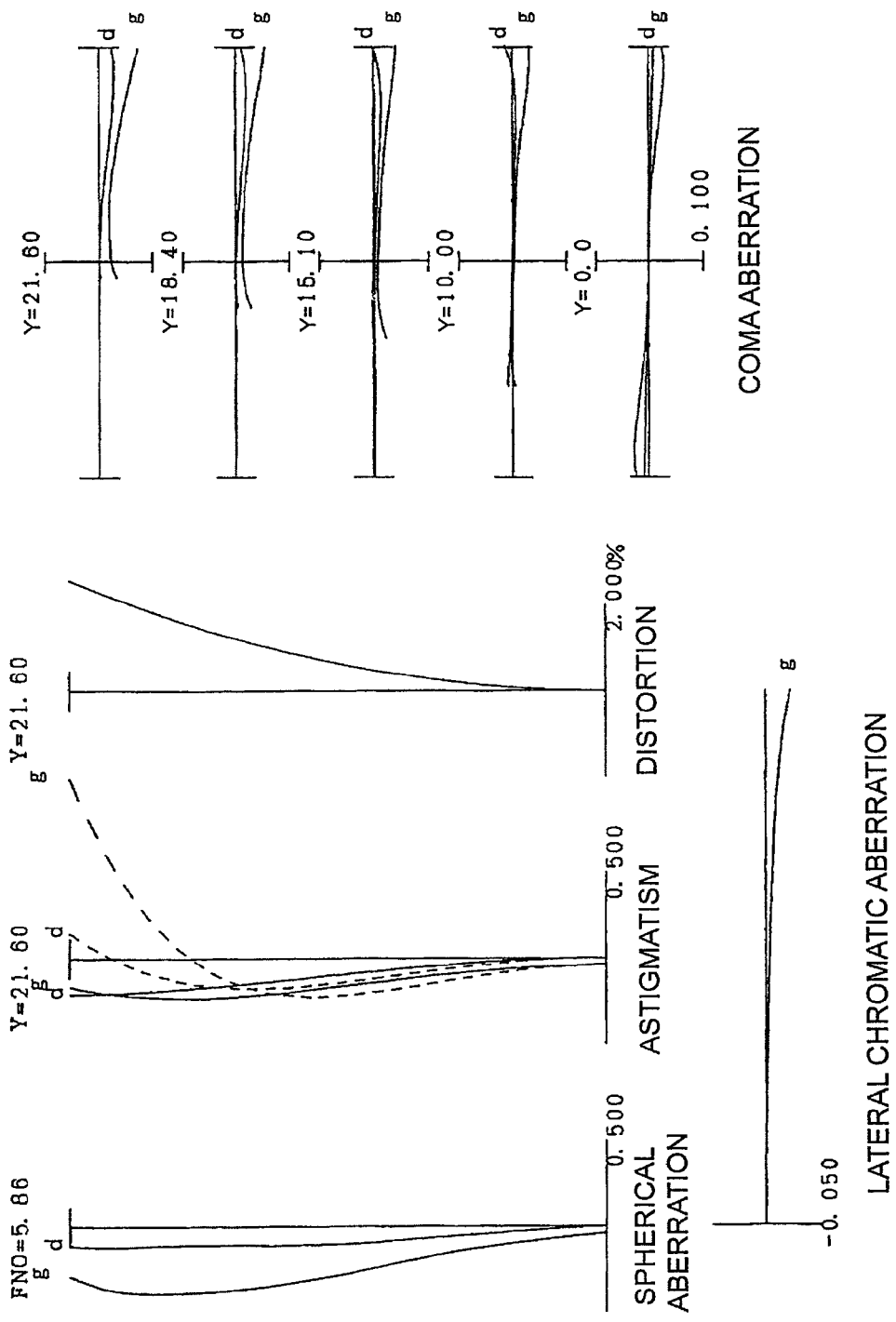
FIG. 34C shows the telephoto end state.
Figure 35A:
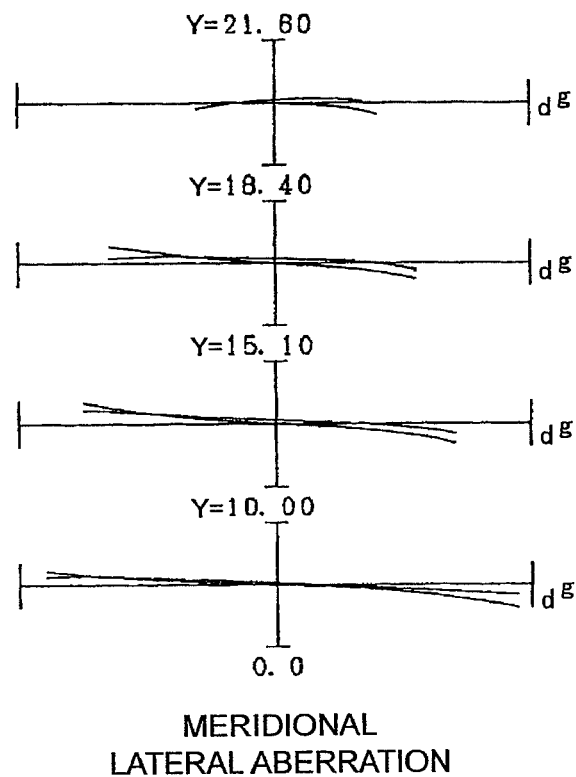
FIG. 35A shows the wide angle end state.
Figure 35B:
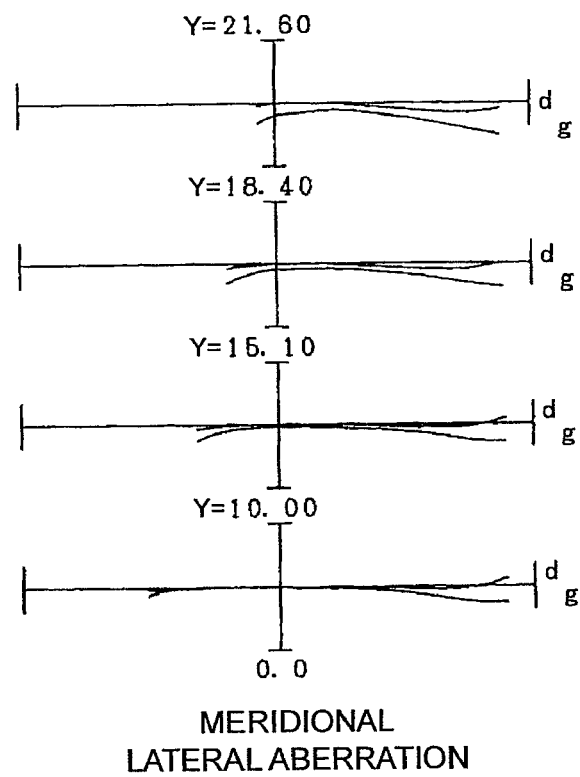
FIG. 35B shows the telephoto end state.
Figure 36A:
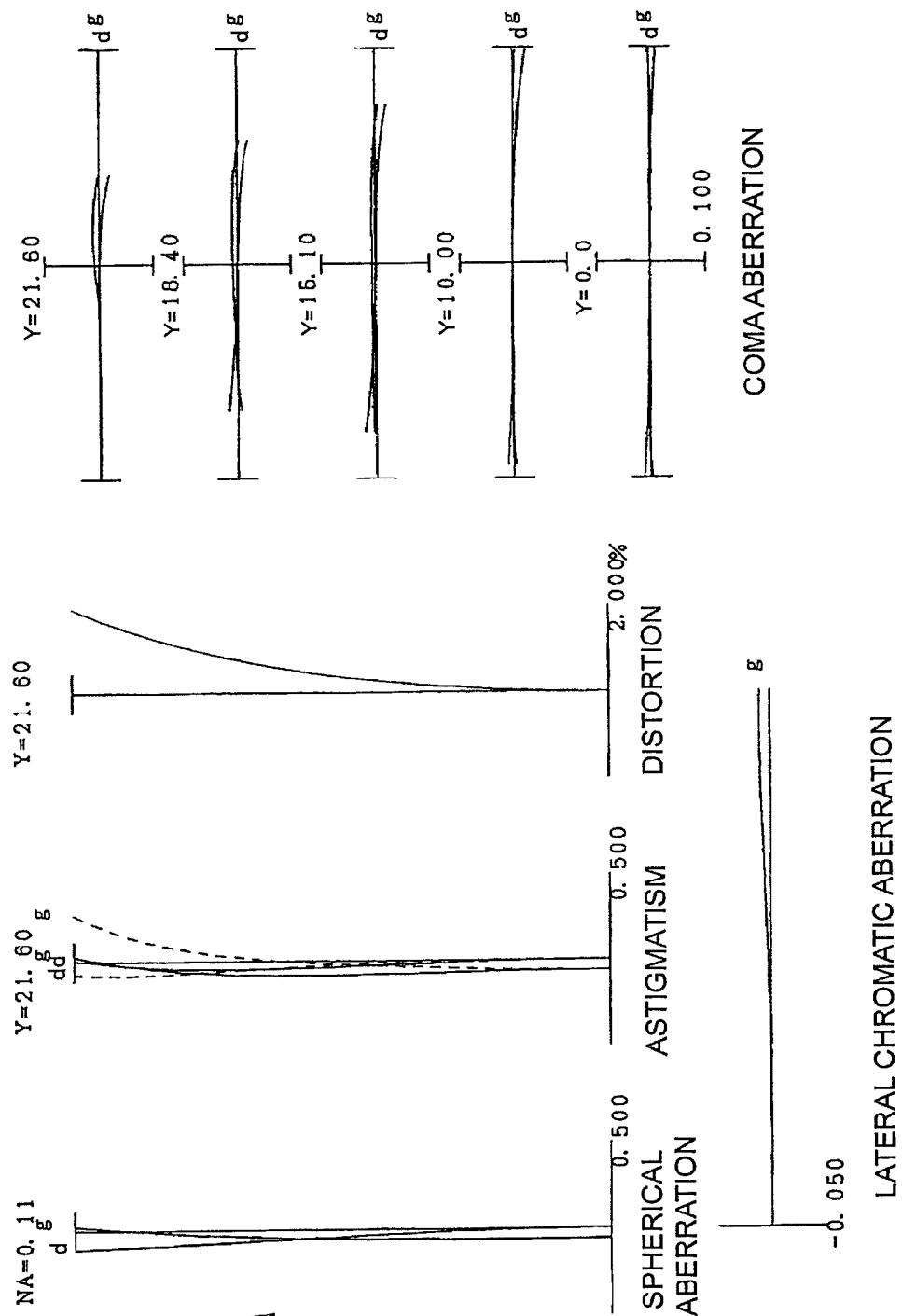
FIG. 36A shows the wide angle end state.
Figure 36B:
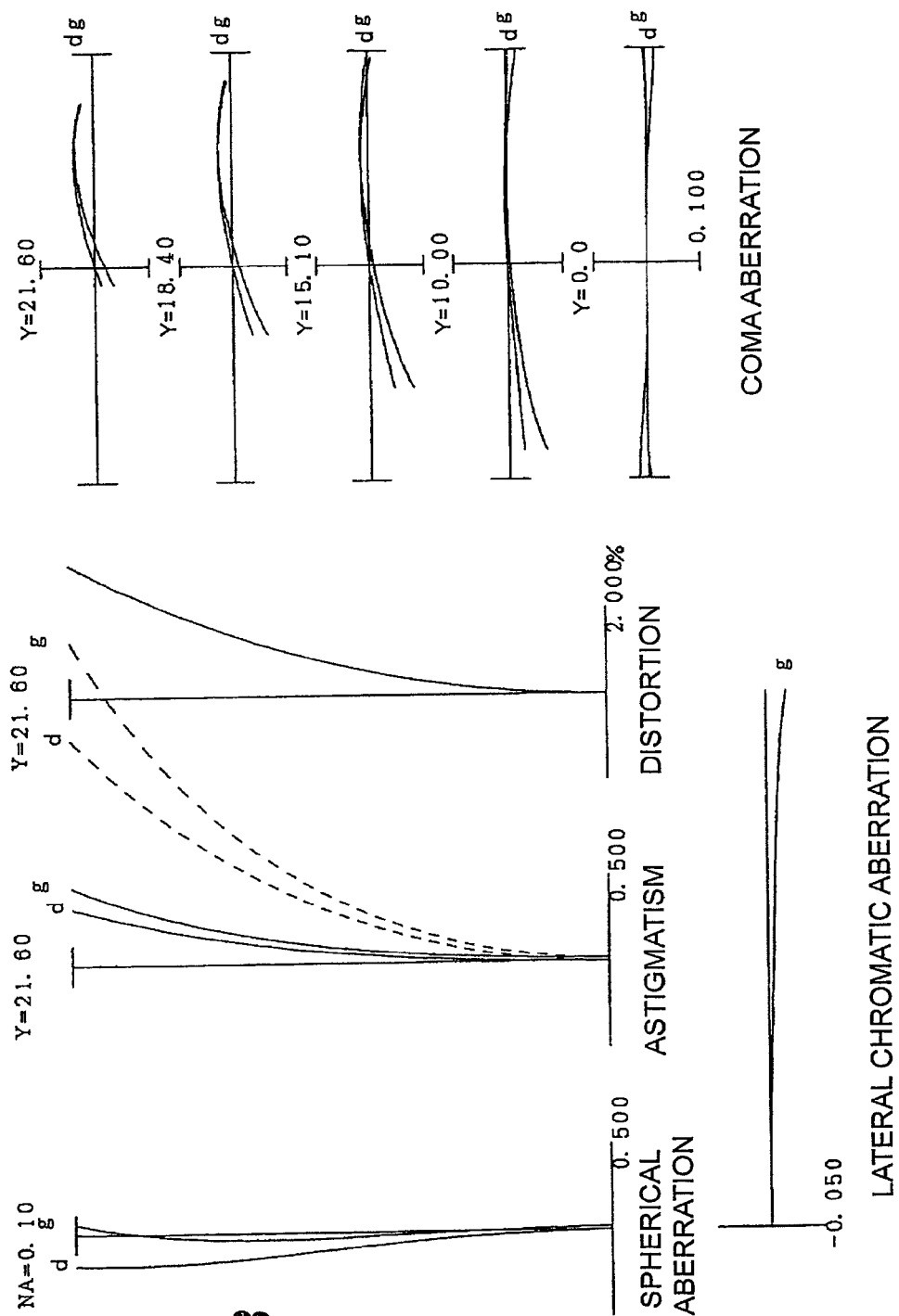
FIG. 36B shows the intermediate focal length state.
Figure 36C:
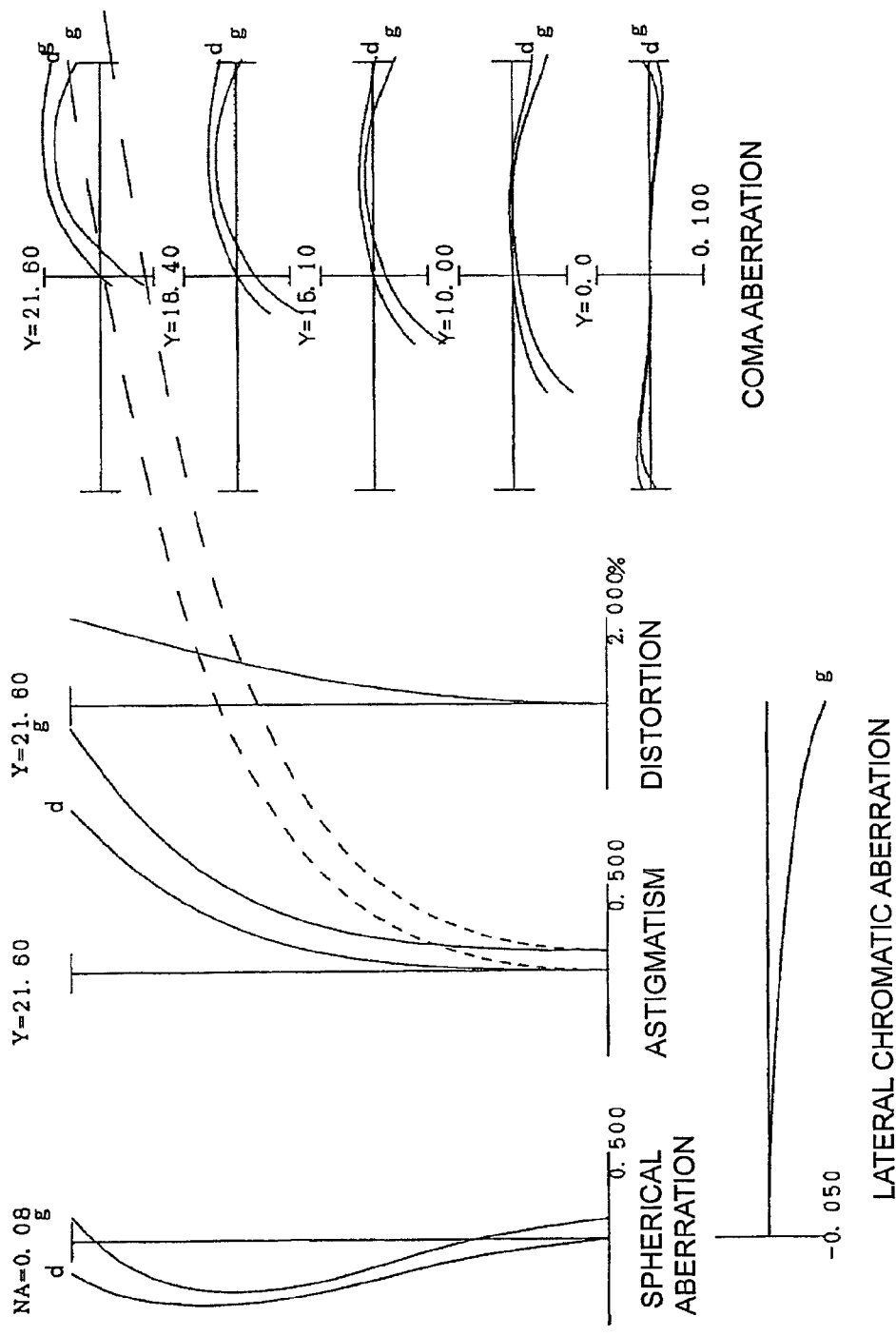
FIG. 36C shows the telephoto end state.

FIG. 34 are graphs showing various aberrations of the zooming optical system according to the ninth example upon focusing on infinity, wherein FIG. 34A shows the wide angle end state, FIG. 34B shows the intermediate focal length state, and FIG. 34C shows the telephoto end state. FIG. 35 are graphs showing meridional lateral aberrations when blur correction is performed on the zooming optical system according to the ninth example upon focusing on infinity, wherein FIG. 35A shows the wide angle end state, and FIG. 35B shows the telephoto end state. FIG. 36 are graphs showing various aberrations of the zooming optical system according to the ninth example upon focusing on close distance (photographing distance of entire system: R=1.8 m), wherein FIG. 36A shows the wide angle end state, FIG. 36B shows the intermediate focal length state, and FIG. 36C shows the telephoto end state.

According to the ninth example, as each graph on aberrations shows, various aberrations are corrected well in each focal length state from the wide angle end state to the telephoto end state, and excellent image forming performance is implemented.

Tenth Example

A tenth example will be described with reference to FIG. 37 to FIG. 40 and Table 10. FIG. 37 shows a lens configuration and zoom locus of the tenth example. As FIG. 37 shows, a zooming optical system according to the tenth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a positive meniscus lens L23 having a convex surface facing the object, and a biconcave negative lens L24, which are disposed in order from the object.

The third lens group G3 has a biconvex positive lens L31, a cemented lens of a biconvex positive lens L32 and a biconcave negative lens L33, and a positive meniscus lens L34 having a convex surface facing the object, which are disposed in order from the object.

The fourth lens group G4 has a negative meniscus lens L41 having a convex surface facing the object, and a cemented lens of a positive meniscus lens L42 having a concave surface facing the object and a biconcave negative lens L43, which are disposed in order from the object.

The fifth lens group G5 has a positive meniscus lens L51 having a convex surface facing the object, a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.351, and the focal length is 81.6 (mm), so the moving distance of the lens L41 and the cemented lens of the lens L42 and lens L43 for correction 0.350° of the rotational blur is −0.369 (mm). In the telephoto end state of this example, the blur correction coefficient K is −1.700, and the focal length is 392 (mm), so the moving distance of the lens L41 and the cemented lens of the lens L42 and the lens L43 for correcting 0.160° of rotational blur is −0.642 (mm).

Table 10 below shows the values of each parameter of the zooming optical system according to the tenth example. The surface numbers 1 to 36 in Table 10 correspond to the surfaces 1 to 36 in FIG. 37.

TABLE 10

| [All Parameters] | | | | |
|---|---|---|---|---|
| | Wide angle end state | | Intermediate focal length state | | Telephoto end state |
| f | 81.6 | ~ | 200.0 | ~ | 392.0 |
| FNO | 4.6 | ~ | 5.3 | ~ | 5.8 |
| TL | 259.8 | ~ | 259.8 | ~ | 259.8 |
| 2ω | 29.4 | ~ | 12.0 | ~ | 6.1 |

| [Lens Data] | | | | |
|---|---|---|---|---|
| Surface number | r | d | nd | vd |
| 1 | 129.9076 | 3.6 | 1.83481 | 42.7 |
| 2 | 75.6303 | 8.5 | 1.49782 | 82.6 |
| 3 | 442.7333 | 0.1 | | |
| 4 | 110.9240 | 7.5 | 1.49782 | 82.6 |
| 5 | −816.2615 | D5 | | |
| 6 | 85.9708 | 3.2 | 1.84666 | 23.8 |
| 7 | 62.0564 | 9.0 | 1.58913 | 61.2 |
| 8 | 598.8161 | D8 | | |
| *9 | 884.9284 | 2.0 | 1.79050 | 45.0 |
| 10 | 71.3911 | 4.2 | | |
| 11 | −106.6390 | 2.0 | 1.75500 | 52.3 |
| 12 | 36.8443 | 6.0 | 1.80809 | 22.8 |
| 13 | −267.9233 | 1.8 | | |
| 14 | −62.3635 | 1.7 | 1.80400 | 46.6 |
| 15 | 94.6941 | D15 | | |
| 16 | 144.0036 | 4.0 | 1.74400 | 44.8 |
| 17 | −91.4279 | 0.1 | | |
| 18 | 64.8767 | 8.4 | 1.60300 | 65.5 |
| 19 | −64.8767 | 1.8 | 1.84666 | 23.8 |
| 20 | 1898.9739 | 0.1 | | |
| 21 | 68.6533 | 2.3 | 1.48749 | 70.5 |
| 22 | 136.9385 | D22 | | |
| 23 | 129.0250 | 1.3 | 1.62004 | 36.3 |
| 24 | 57.4273 | 1.8 | | |
| 25 | −92.5865 | 3.1 | 1.79504 | 28.7 |
| 26 | −27.0013 | 1.3 | 1.74400 | 44.8 |
| 27 | 332.0147 | 4.1 | | |
| 28 | 0.0000 | D28 | (Aperture stop S) | |
| 29 | 27.5541 | 4.2 | 1.48749 | 70.5 |
| 30 | 167.5525 | 7.1 | | |
| 31 | 55.7759 | 1.3 | 1.75520 | 27.5 |
| 32 | 18.2265 | 8.6 | 1.51823 | 58.9 |
| 33 | −60.8589 | D33 | | |

TABLE 10-continued

| | | | | |
|---|---|---|---|---|
| 34 | −27.7779 | 1.3 | 1.80400 | 46.6 |
| 35 | 27.7779 | 5.6 | 1.78472 | 25.7 |
| 36 | −84.5200 | BF | | |

[Aspherical Data]
Ninth surface

κ = 1.0000, A4 = 1.1546E−06, A6 = 2.2711E−10, A8 = 6.5905E−13,
A10 = −2.0618E−16

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1540.20 | 1540.20 | 1540.20 |
| D5 | 11.0323 | 11.0323 | 11.0323 | 1.8400 | 1.8400 | 1.8400 |
| D8 | 2.0000 | 19.3680 | 26.5375 | 11.1923 | 28.5603 | 35.7297 |
| D15 | 48.6029 | 22.6018 | 2.0000 | 48.6029 | 22.6018 | 2.0000 |
| D22 | 13.9941 | 22.6272 | 36.0595 | 13.9941 | 22.6272 | 36.0595 |
| D28 | 26.2541 | 12.0119 | 1.8900 | 26.2541 | 12.0119 | 1.8900 |
| D33 | 6.1601 | 5.3477 | 3.0592 | 6.1601 | 5.3477 | 3.0592 |
| BF | 45.7684 | 60.8230 | 73.2333 | 45.7684 | 60.8230 | 73.2333 |

[Focal Length Data of Each Group]

| Group number | First surface of group | Focal length of group |
|---|---|---|
| G1 | 1 | 97.5902 |
| G2 | 9 | −26.8801 |
| G3 | 16 | 45.7125 |
| G4 | 23 | −66.7628 |
| G5 | 29 | 45.6409 |
| G6 | 34 | −51.7889 |

[Conditional Expressions]

| | |
|---|---|
| Conditional Expression (1) | |f4|/fT = 0.170 |
| Conditional Expression (2) | f3/|f4| = 0.685 |

As the parameter table in Table 10 shows, the zooming optical system according to this example satisfies both conditional Expressions (1) and (2).

Figure 38A:
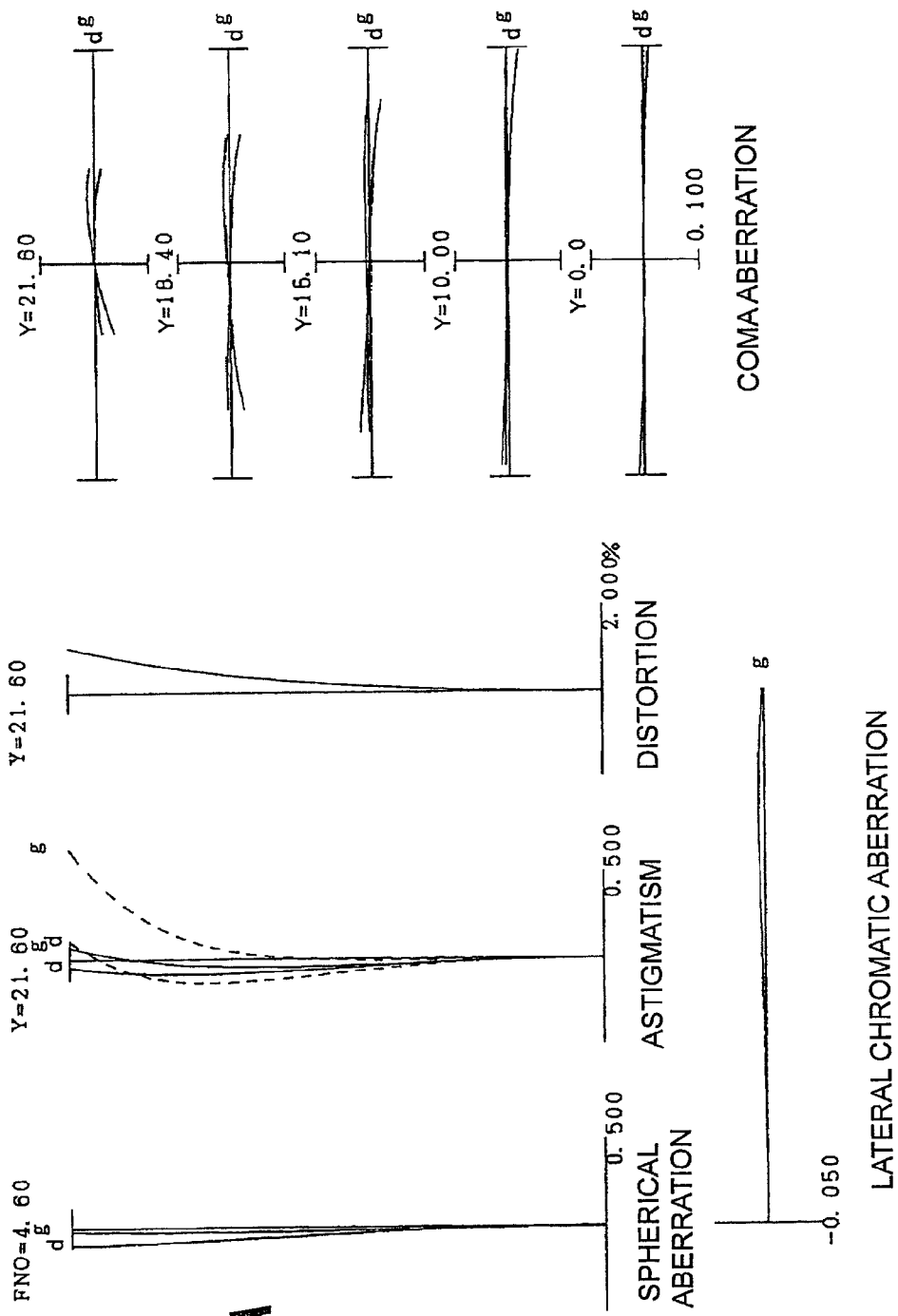
FIG. 38A shows the wide angle end state.
Figure 38B:
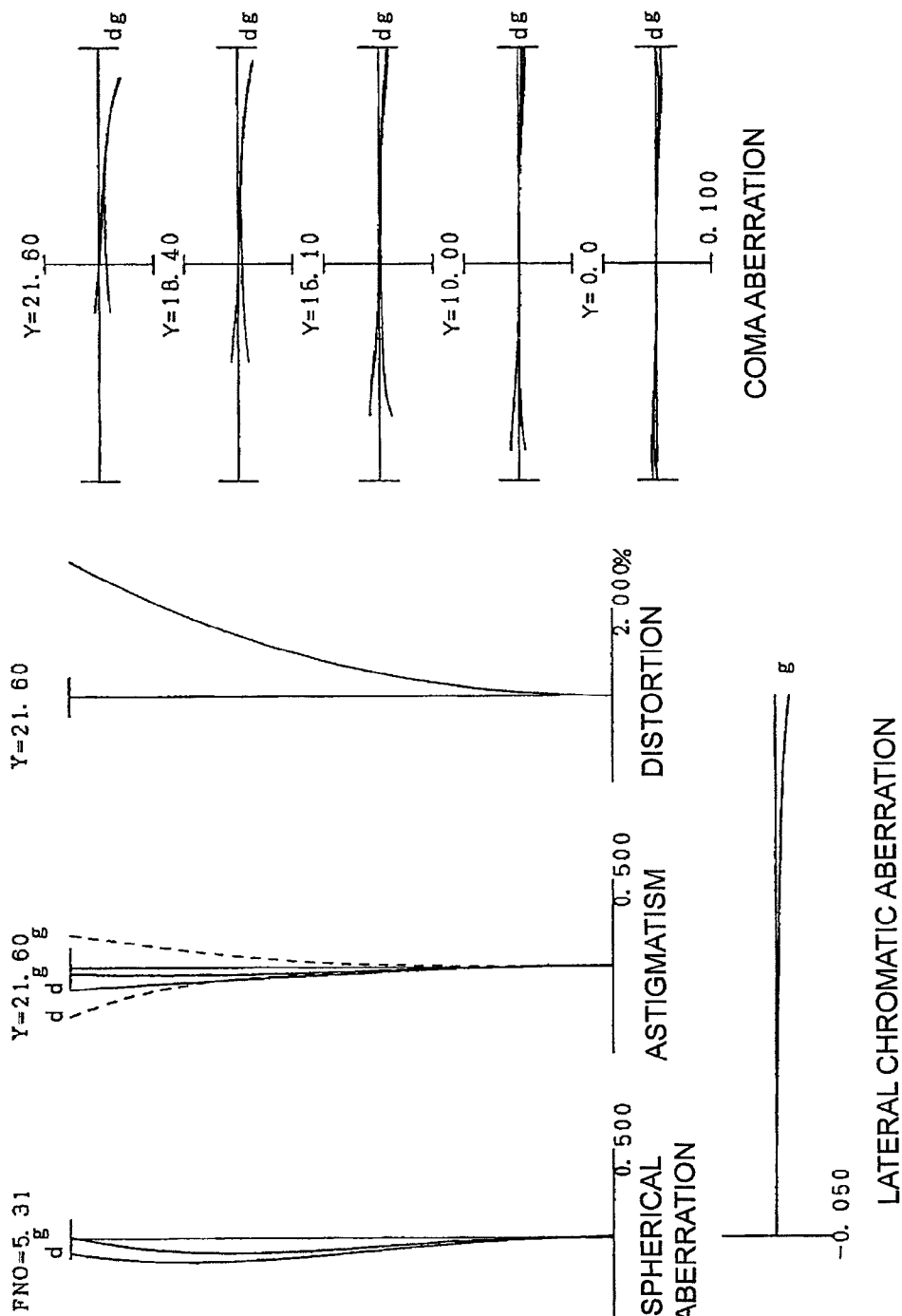
FIG. 38B shows the intermediate focal length state.
Figure 38C:
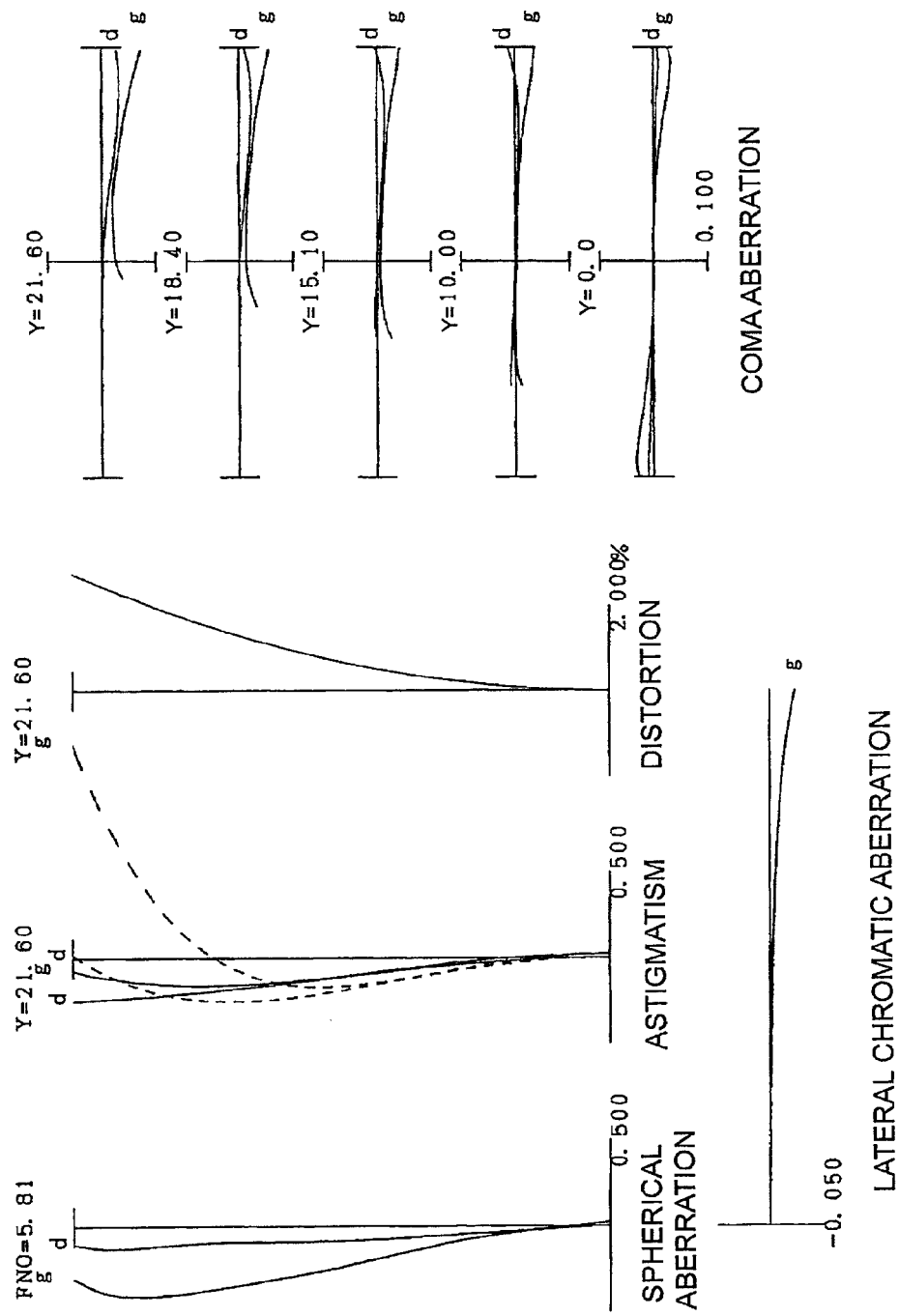
FIG. 38C shows the telephoto end state.
Figure 39A:
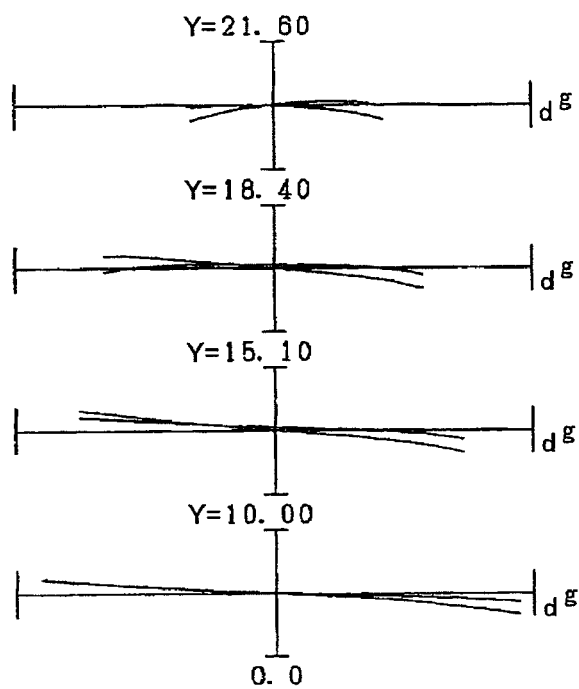
FIG. 39A shows the wide angle end state.
Figure 39B:
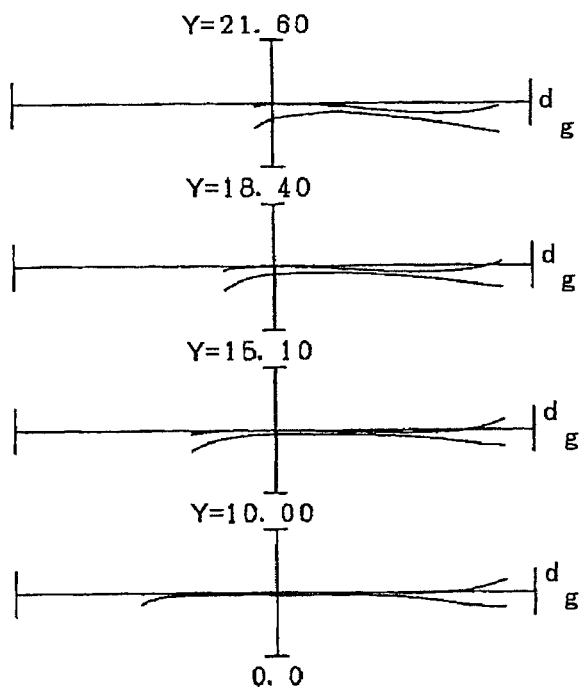
FIG. 39B shows the telephoto end state.
Figure 40A:
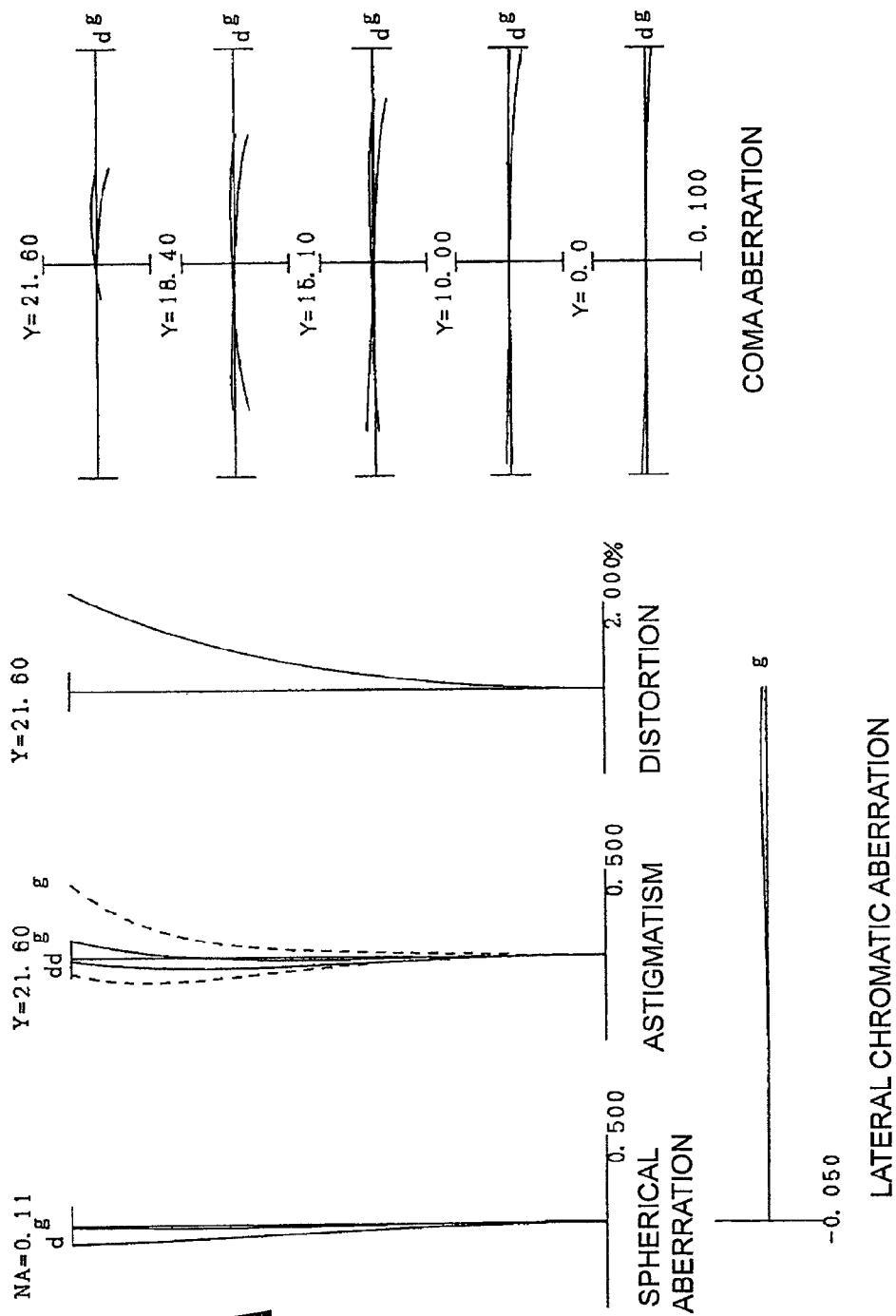
FIG. 40A shows the wide angle end state.
Figure 40C:
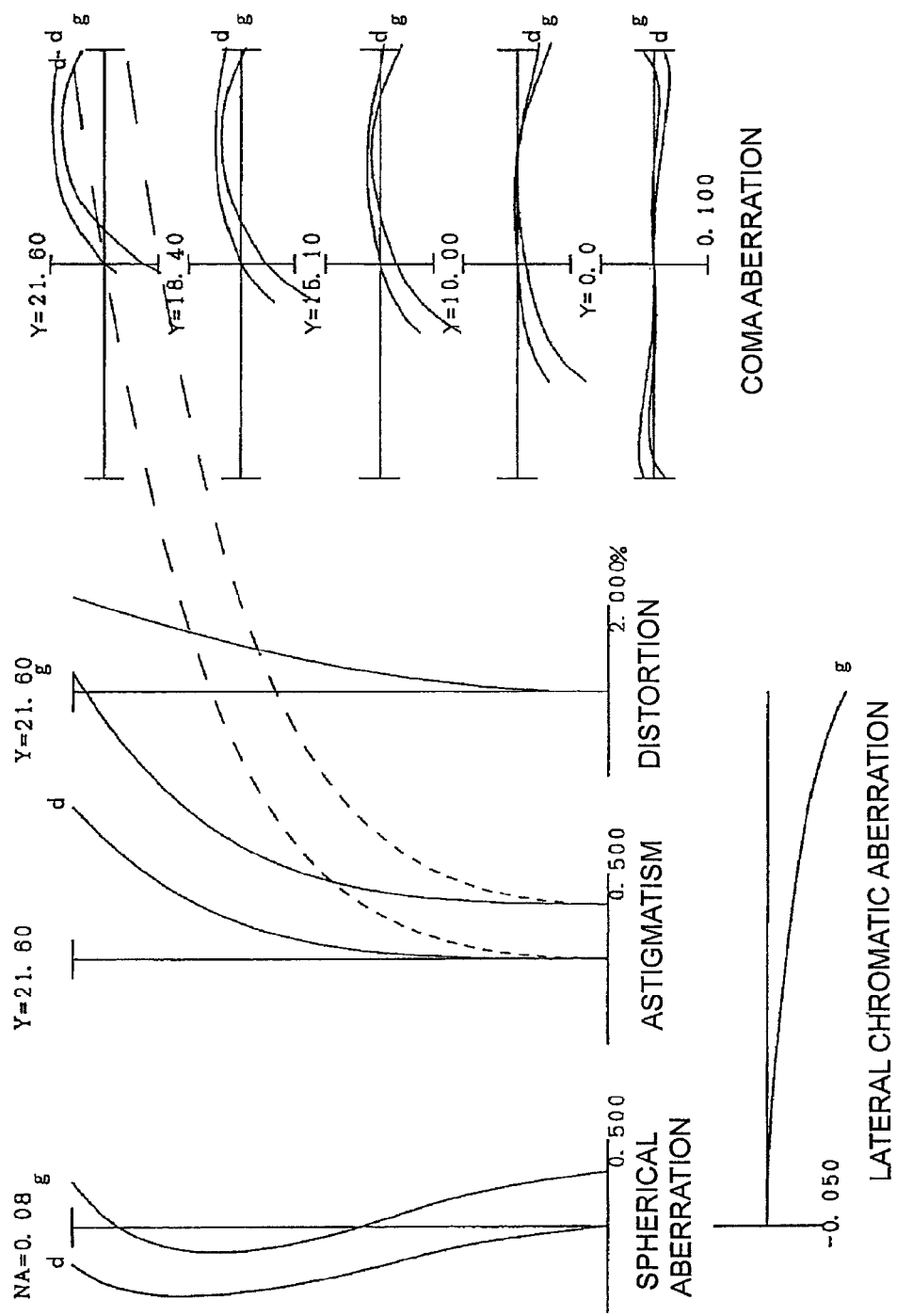
FIG. 40C shows the telephoto end state.

FIG. 38 are graphs showing various aberrations of the zooming optical system according to the tenth example upon focusing on infinity, wherein FIG. 38A shows the wide angle end state, FIG. 38B shows the intermediate focal length state, and FIG. 38C shows the telephoto end state. FIG. 39 are graphs showing meridional lateral Aberrations when blur correction is performed on the zooming optical system according to the tenth example upon focusing on infinity, wherein FIG. 39A shows the wide angle end state, and FIG. 39B shows the telephoto end state. FIG. 40 are graphs showing various aberrations of the zooming optical system according to the tenth example upon focusing on close distance (photographing distance of entire system: R=1.8 m), wherein FIG. 40A shows the wide angle end state, FIG. 40B shows the intermediate focal length state, and FIG. 40C shows the telephoto end state.

According to the tenth example, as each graph on aberrations shows, various aberrations are corrected well in each focal length state from the wide angle end state to the telephoto end state, and excellent image forming performance is implemented.

Eleventh Example

Figure 41:
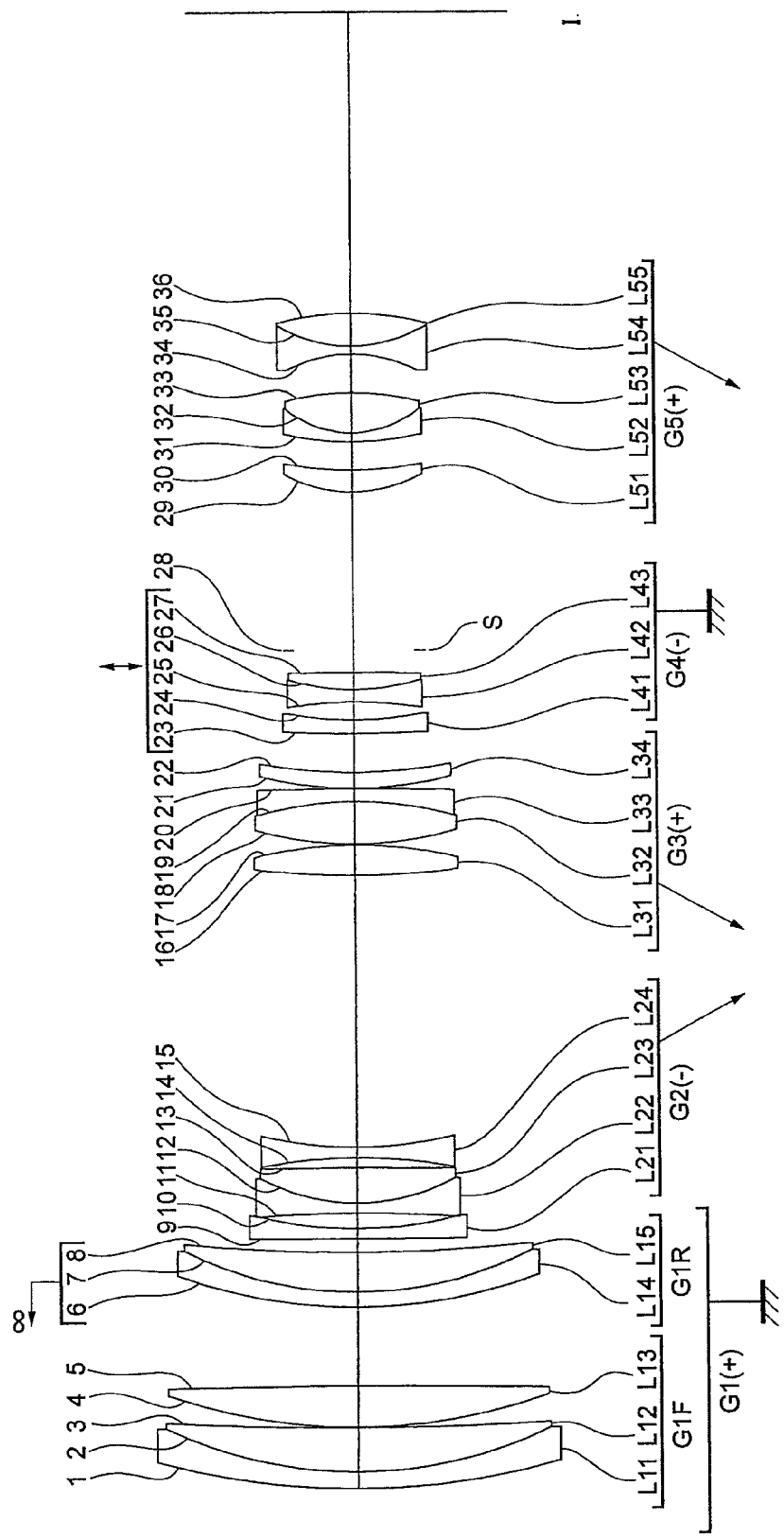
FIG. 41 is a diagram depicting a configuration and zoom locus of the zooming optical system according to the eleventh example.

An eleventh example will be described with reference to FIG. 41 to FIG. 44 and Table 11. FIG. 41 shows a lens configuration and zoom locus of the eleventh example. As FIG. 41 shows, a zooming optical system according to the eleventh example has a first lens group G1 having positive refractive power, a second lens group G2 having negative refractive power, a third lens group G3 having positive refractive power, a fourth lens group G4 having negative refractive power, and a fifth lens group G5 having positive refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a biconvex positive lens L13, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a biconvex positive lens L23, and a biconcave negative lens L24, which are disposed in order from the object.

The third lens group G3 has a biconvex positive lens L31, a cemented lens of a biconvex positive lens L32 and a negative meniscus lens L33 having a concave surface facing the object, and a positive meniscus lens L34 having a convex surface facing the object, which are disposed in order from the object.

The fourth lens group G4 has a negative meniscus lens L41 having a convex surface facing the object, and a cemented lens of a biconcave negative lens L42 and a biconvex positive lens L43, which are disposed in order from the object.

The fifth lens group G5 has a positive meniscus lens L51 having a convex surface facing the object, a cemented lens of a negative meniscus lens L52 having a convex surface facing the object and a biconvex positive lens L53, and a cemented lens of a biconcave negative lens L54 and a biconvex positive lens L55, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.351, and the focal length is 81.6 (mm), so the moving distance of the lens L41 and the cemented lens of the lens L42 and lens L43 for correction 0.350° of the rotational blur is −0.326 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 11 below shows the values of each parameter of the zooming optical system according to the eleventh example. The surface numbers 1 to 36 in Table 11 correspond to the surfaces 1 to 36 in FIG. 41.

TABLE 11

[All Parameters]

|  | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.3 | ~ | 5.8 |
| TL | 270.0 | ~ | 270.0 | ~ | 270.0 |
| 2ω | 29.1 | ~ | 12.0 | ~ | 6.1 |

[Lens Data]

| Surface number | r | d | nd | vd |
|---|---|---|---|---|
| 1 | 131.3733 | 3.1 | 1.79952 | 42.3 |
| 2 | 77.9420 | 8.0 | 1.49782 | 82.6 |
| 3 | 590.7966 | 0.1 | | |
| 4 | 100.3294 | 7.4 | 1.49782 | 82.6 |
| 5 | −2177.7042 | D5 | | |
| 6 | 91.1424 | 2.8 | 1.84666 | 23.8 |
| 7 | 67.4990 | 7.2 | 1.58913 | 61.2 |
| 8 | 298.4027 | D8 | | |
| 9 | 1907.8176 | 1.9 | 1.81600 | 46.6 |
| 10 | 67.8056 | 2.9 | | |
| 11 | −232.6022 | 1.9 | 1.75500 | 52.3 |
| 12 | 34.7446 | 6.4 | 1.80809 | 22.8 |
| 13 | −1904.1548 | 1.9 | | |
| 14 | −87.0849 | 1.9 | 1.81600 | 46.6 |
| 15 | 64.3866 | D15 | | |
| 16 | 141.9402 | 5.5 | 1.69680 | 55.5 |
| 17 | −75.2679 | 0.2 | | |
| 18 | 62.4433 | 7.7 | 1.60300 | 65.5 |
| 19 | −64.2310 | 2.3 | 1.84666 | 23.8 |
| 20 | −1049.2013 | 0.1 | | |
| 21 | 64.3458 | 2.9 | 1.58913 | 61.2 |
| 22 | 87.5547 | D22 | | |
| 23 | 264.1470 | 2.5 | 1.75520 | 27.5 |
| 24 | 61.2860 | 3.3 | | |
| 25 | −74.2176 | 2.3 | 1.74400 | 44.8 |
| 26 | 36.8899 | 3.2 | 1.84666 | 23.8 |
| 27 | −657.2884 | 4.1 | | |
| 28 | 0.0000 | D28 | (Aperture stop S) | |
| 29 | 24.0787 | 4.0 | 1.48749 | 70.5 |
| 30 | 62.2885 | 5.2 | | |
| 31 | 53.5194 | 1.6 | 1.75520 | 27.5 |
| 32 | 18.0160 | 7.3 | 1.48749 | 70.5 |

TABLE 11-continued

| | | | | |
|---|---|---|---|---|
| 33 | −47.5290 | 7.1 | | |
| 34 | −24.4743 | 1.4 | 1.79500 | 45.3 |
| 35 | 24.4905 | 6.1 | 1.75520 | 27.5 |
| 36 | −49.8657 | BF | | |

[Variable Distance Data]

| | Infinity | | | Close distance | | |
|---|---|---|---|---|---|---|
| | Wide angle End | Intermediate | Telephoto end | Wide angle End | Intermediate | Telephoto Telephoto end |
| f | 81.6 | 200.0 | 392.0 | — | — | — |
| β | 0 | 0 | 0 | −0.06 | −0.14 | −0.27 |
| D0 | 0 | 0 | 0 | 1530.00 | 1530.00 | 1530.00 |
| D5 | 14.3225 | 14.3225 | 14.3225 | 2.0000 | 2.0000 | 2.0000 |
| D8 | 2.4826 | 20.2199 | 28.1069 | 14.8051 | 32.5424 | 40.4294 |
| D15 | 49.8066 | 23.1985 | 2.9665 | 49.8066 | 23.1985 | 2.9665 |
| D22 | 7.0930 | 15.9639 | 28.3089 | 7.0930 | 15.9639 | 28.3089 |
| D28 | 29.0316 | 12.6360 | 2.0000 | 29.0316 | 12.6360 | 2.0000 |
| BF | 55.0000 | 71.3957 | 82.0317 | 55.0000 | 71.3957 | 82.0317 |

[Focal Length Data of Each Group]

| Group number | First surface of group | Focal length of group |
|---|---|---|
| G1 | 1 | 102.9955 |
| G2 | 9 | −26.3866 |
| G3 | 16 | 42.9736 |
| G4 | 23 | −65.0018 |
| G5 | 29 | 117.9763 |

[Conditional Expressions]

| | |
|---|---|
| Conditional Expression (1) | $|f4|/fT = 0.166$ |
| Conditional Expression (2) | $f3/|f4| = 0.661$ |

As the parameter table in Table 11 shows, the zooming optical system according to this example satisfies both conditional Expressions (1) and (2).

Figure 42A:
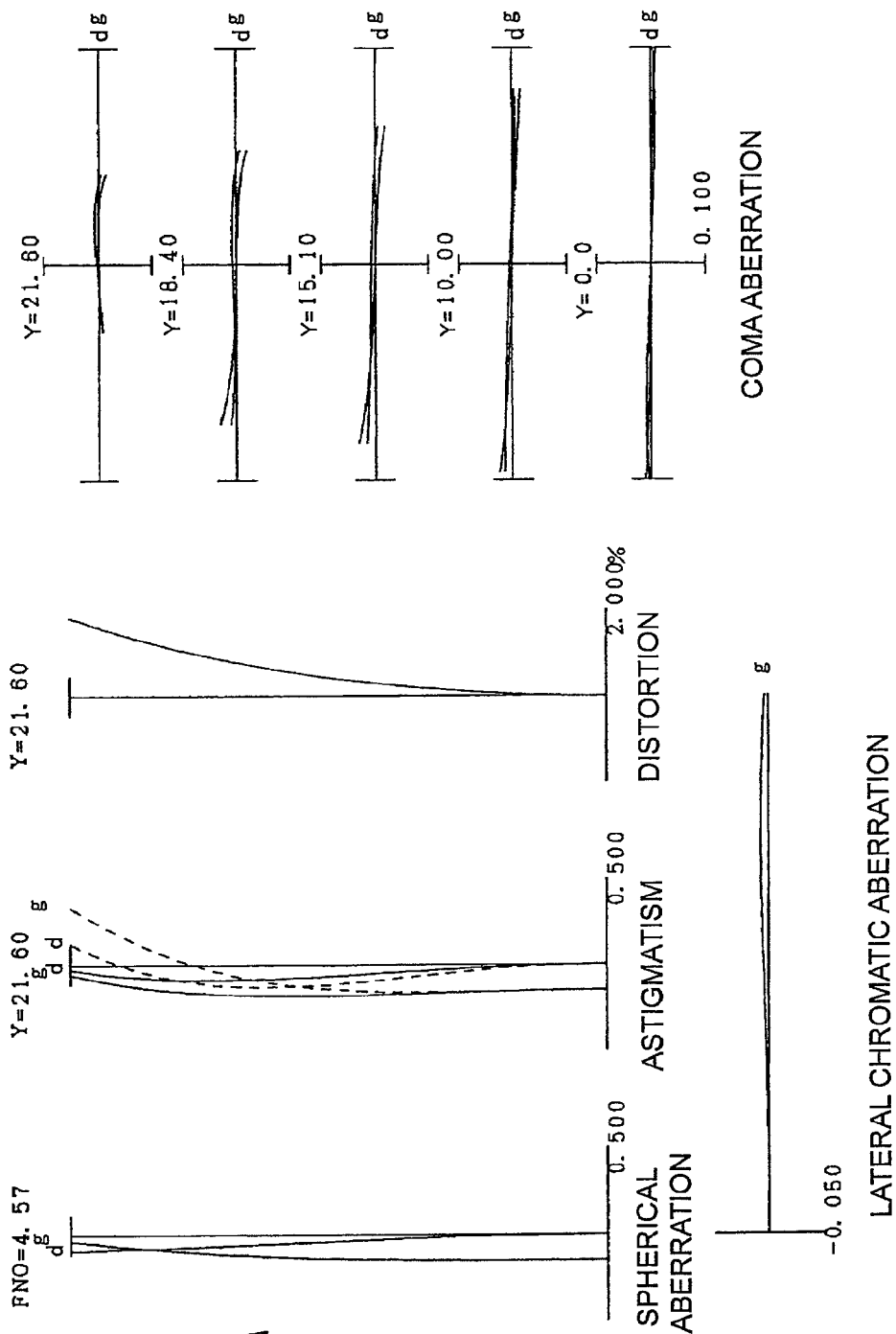
FIG. 42A shows the wide angle end state.
Figure 42B:
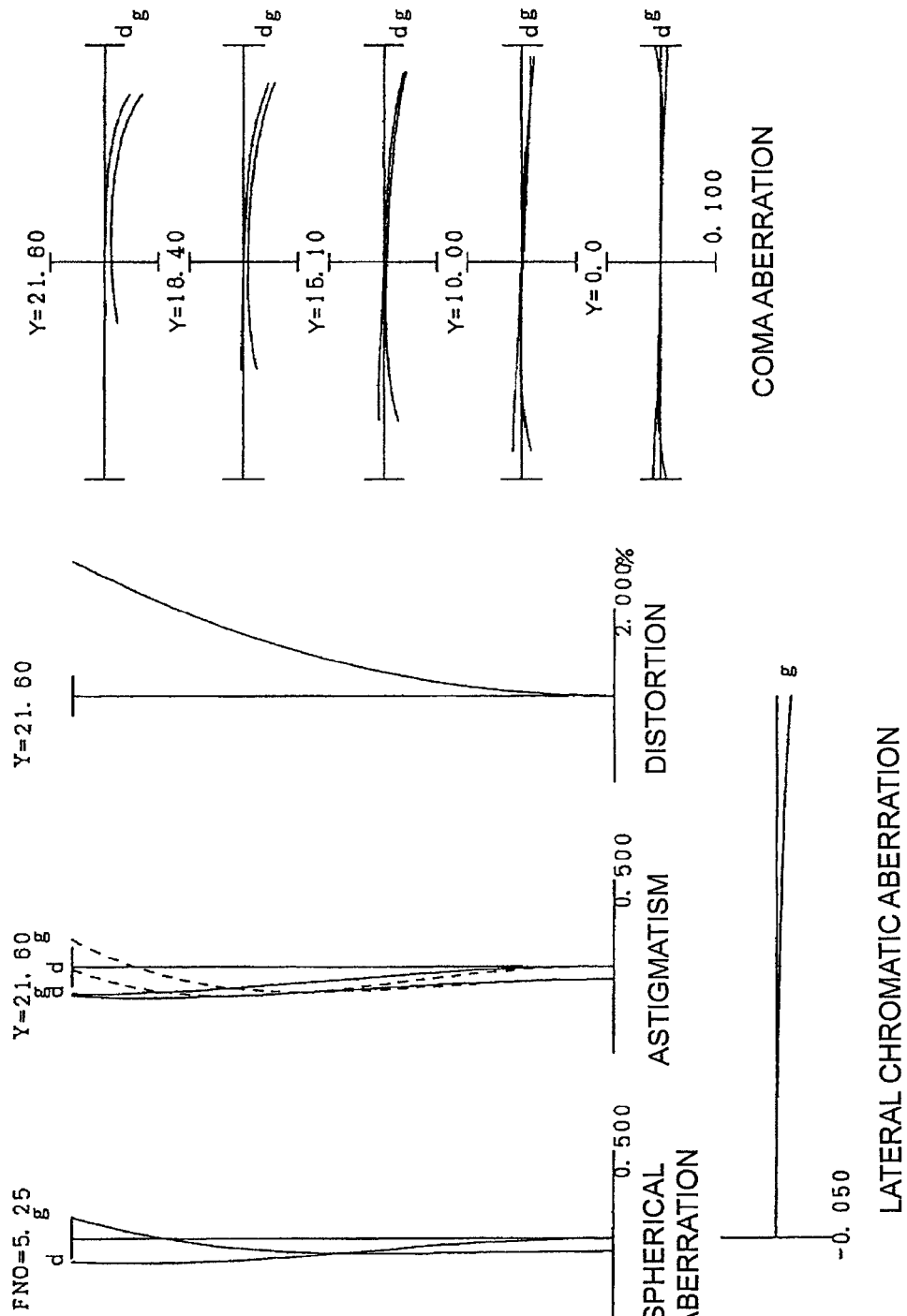
FIG. 42B shows the intermediate focal length state.
Figure 42C:
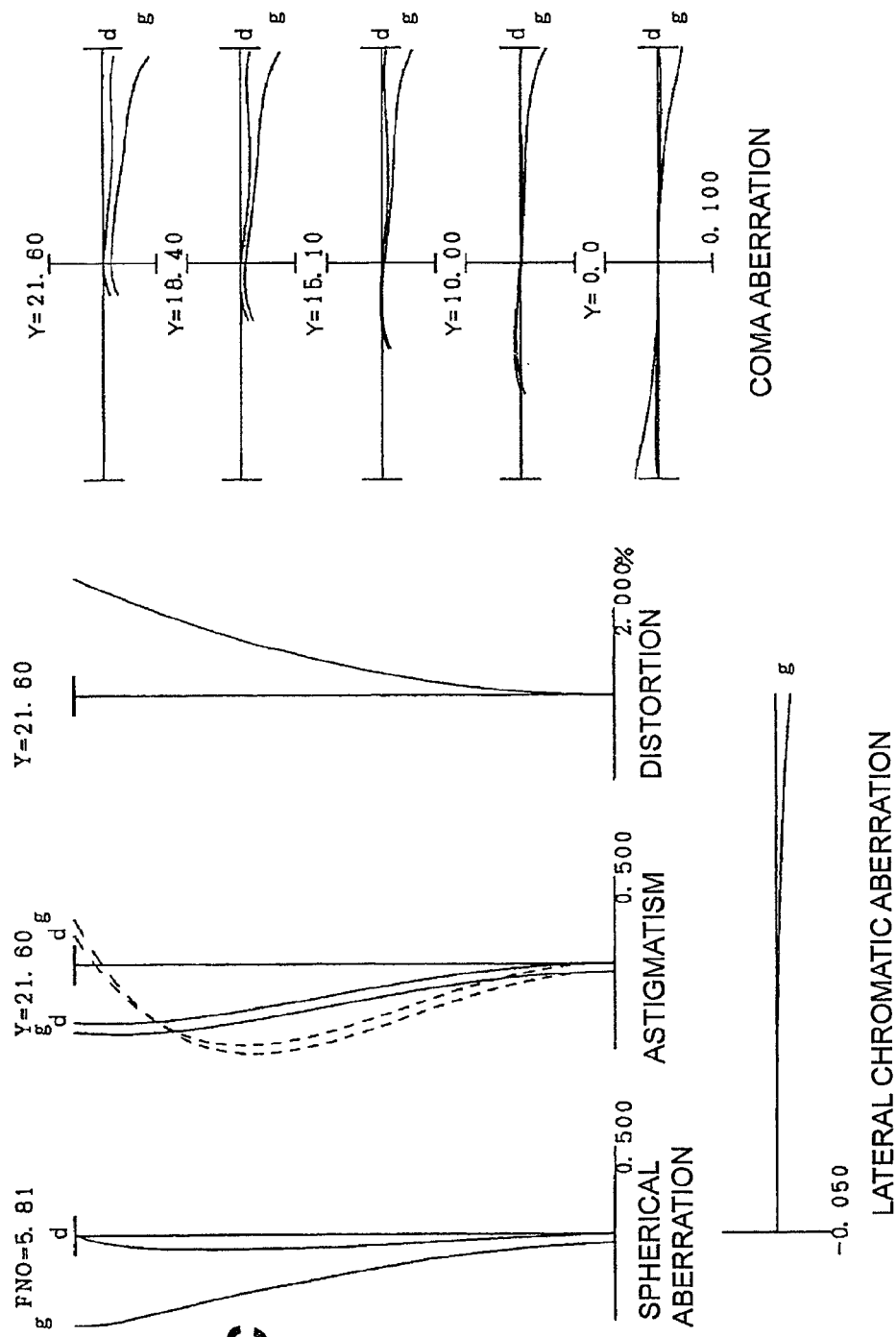
FIG. 42C shows the telephoto end state.
Figure 43A:
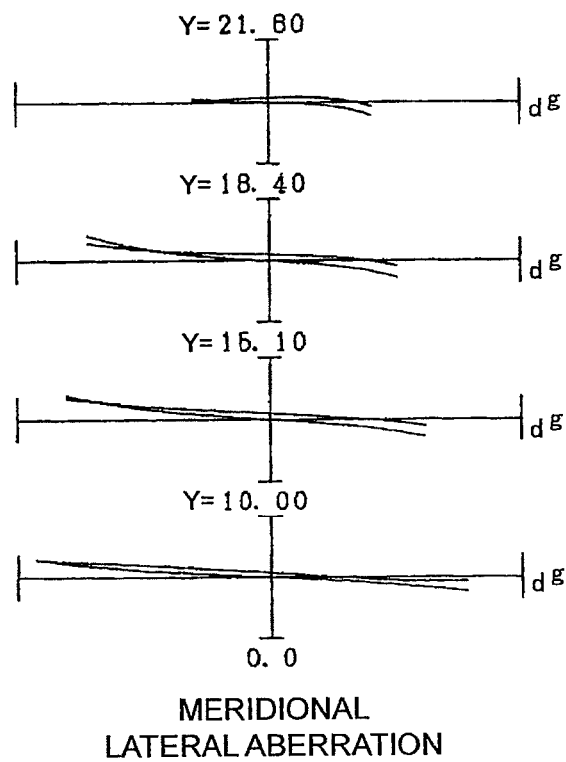
FIG. 43A shows the wide angle end state.
Figure 43B:
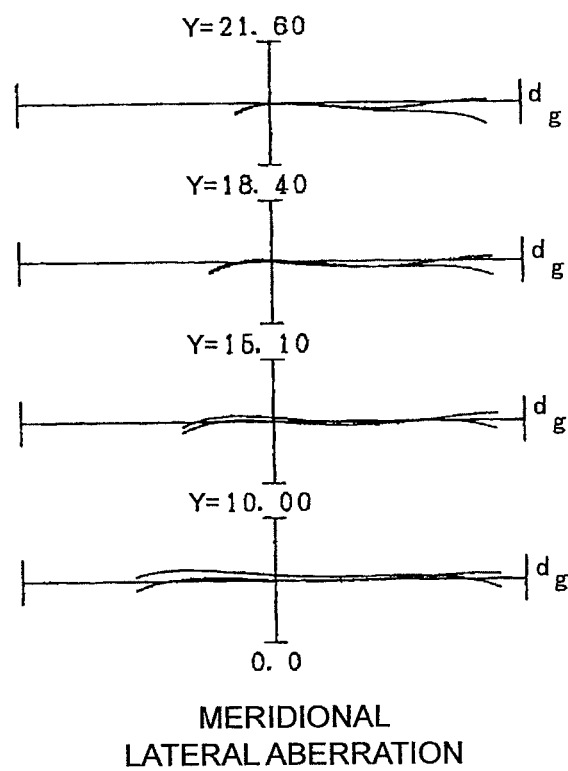
FIG. 43B shows the telephoto end state.
Figure 44A:
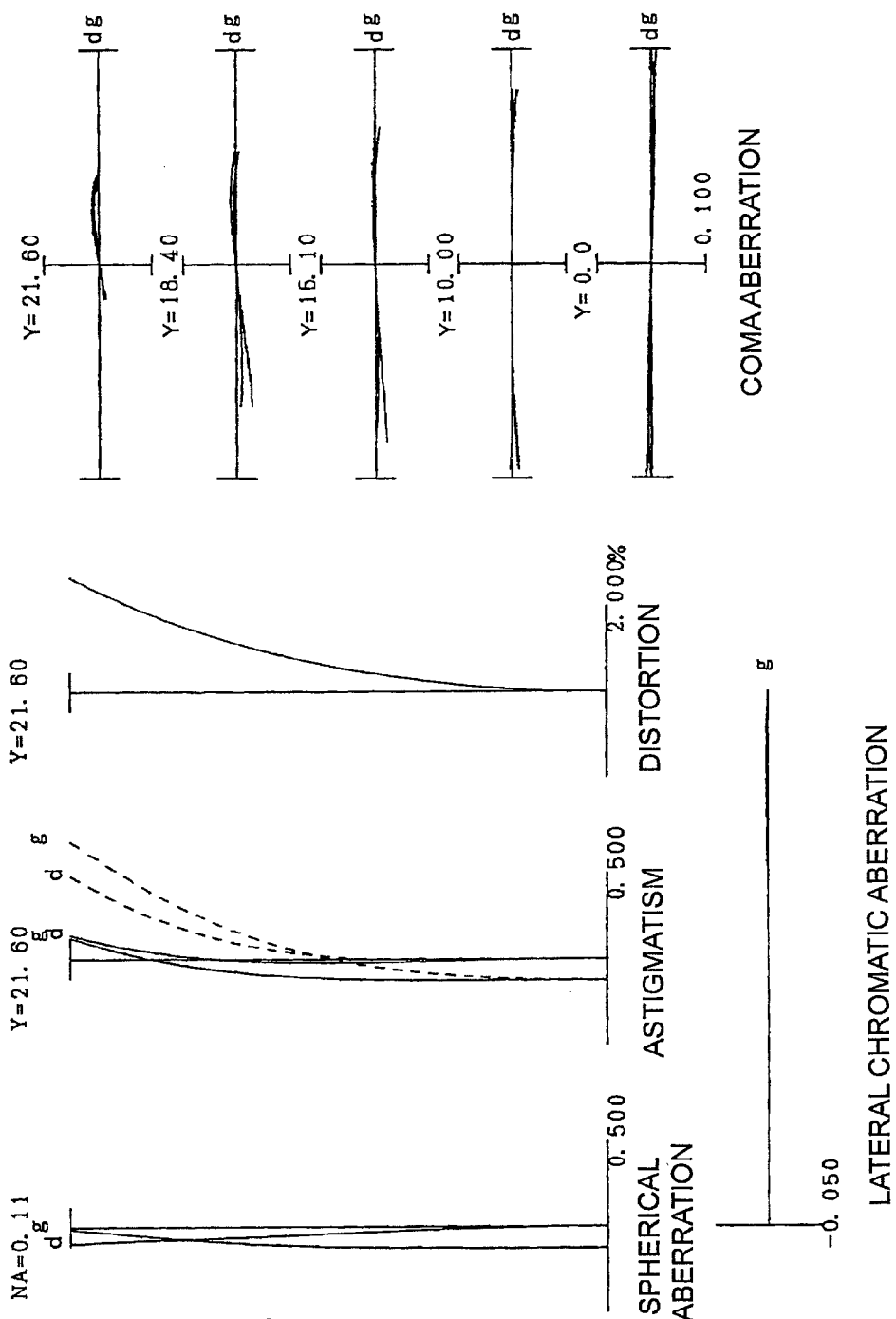
FIG. 44A shows the wide angle end state.
Figure 44B:
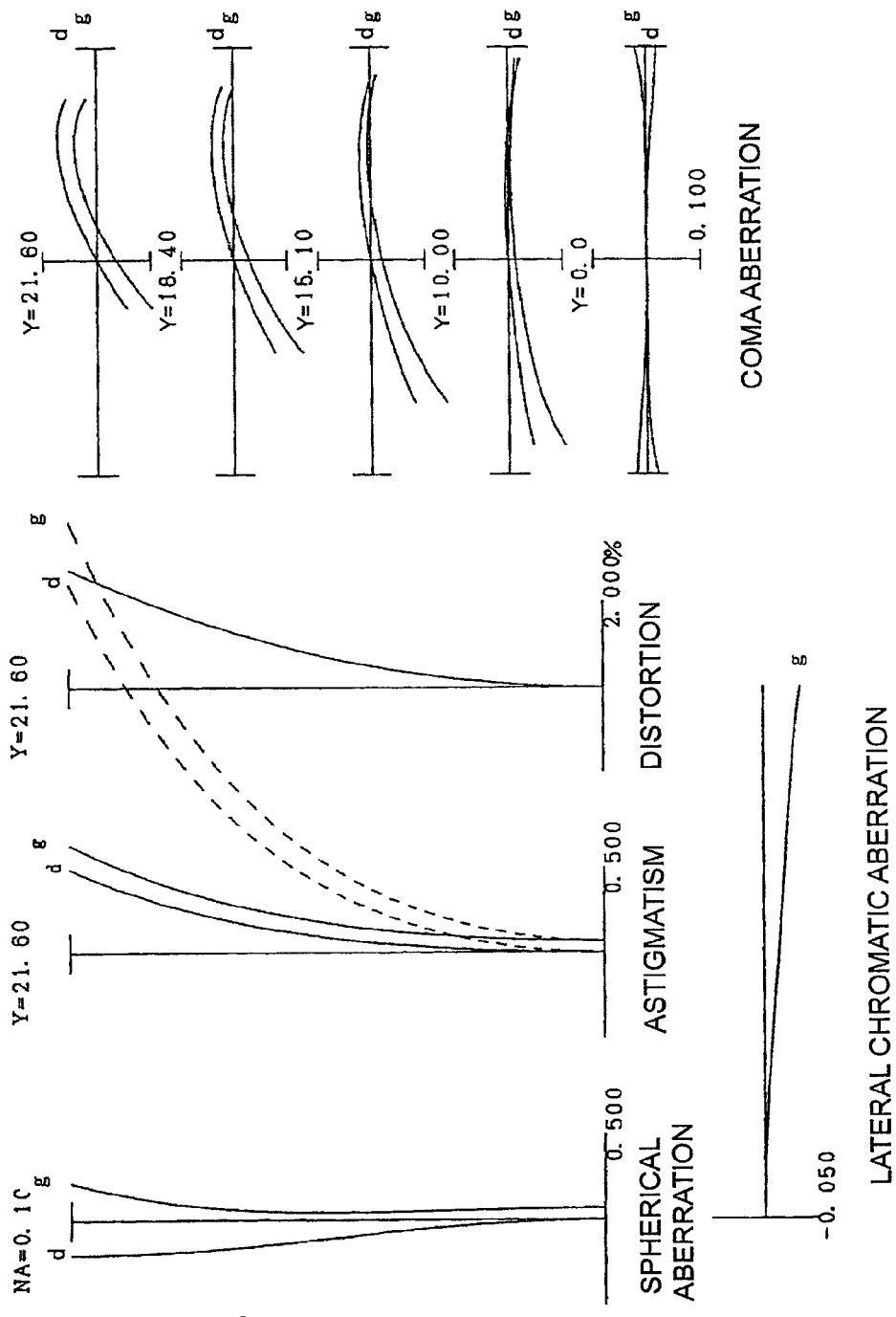
FIG. 44B shows the intermediate focal length state.
Figure 44C:
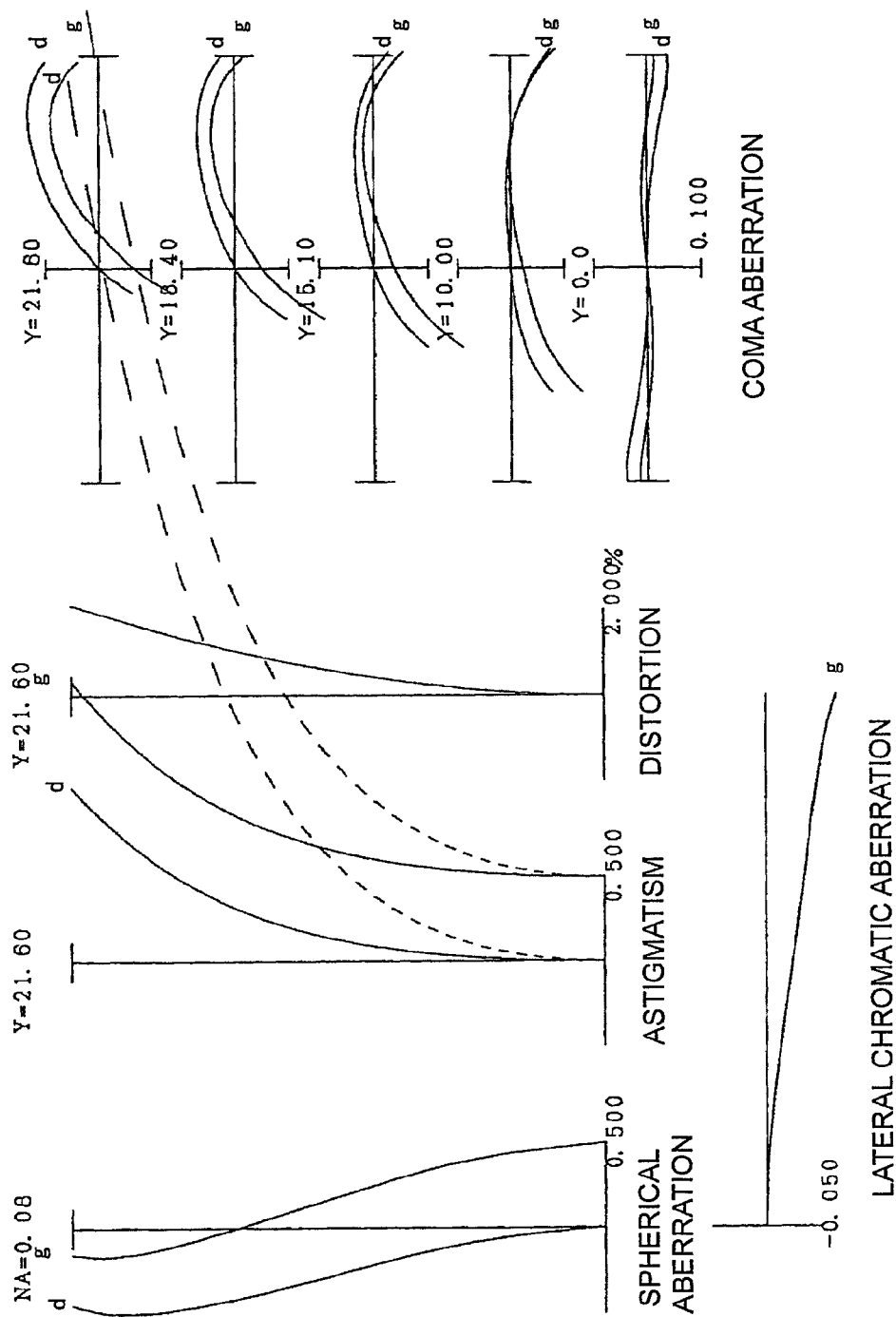
FIG. 44C shows the telephoto end state.

FIG. 42 are graphs showing various aberrations of the zooming optical system according to the eleventh example upon focusing on infinity, wherein FIG. 42A shows the wide angle end state, FIG. 42B shows the intermediate focal length state, and FIG. 42C shows the telephoto end state. FIG. 43 are graphs showing meridional lateral aberrations when blur correction is performed on the zooming optical system according to the eleventh example upon focusing on infinity, wherein FIG. 43A shows the wide angle end state, and FIG. 43B shows the telephoto end state. FIG. 44 are graphs showing various aberrations of the zooming optical system according to the eleventh example upon focusing on close distance (photographing distance of entire system: R=1.8 m), wherein FIG. 44A shows the wide angle end state, FIG. 44B shows the intermediate focal length state, and FIG. 44C shows the telephoto end state.

According to the eleventh example, as each graph on aberrations shows, various aberrations are corrected well in each focal length state from the wide angle end state to the telephoto end state, and excellent image forming performance is implemented.

Twelfth Example

Figure 45:
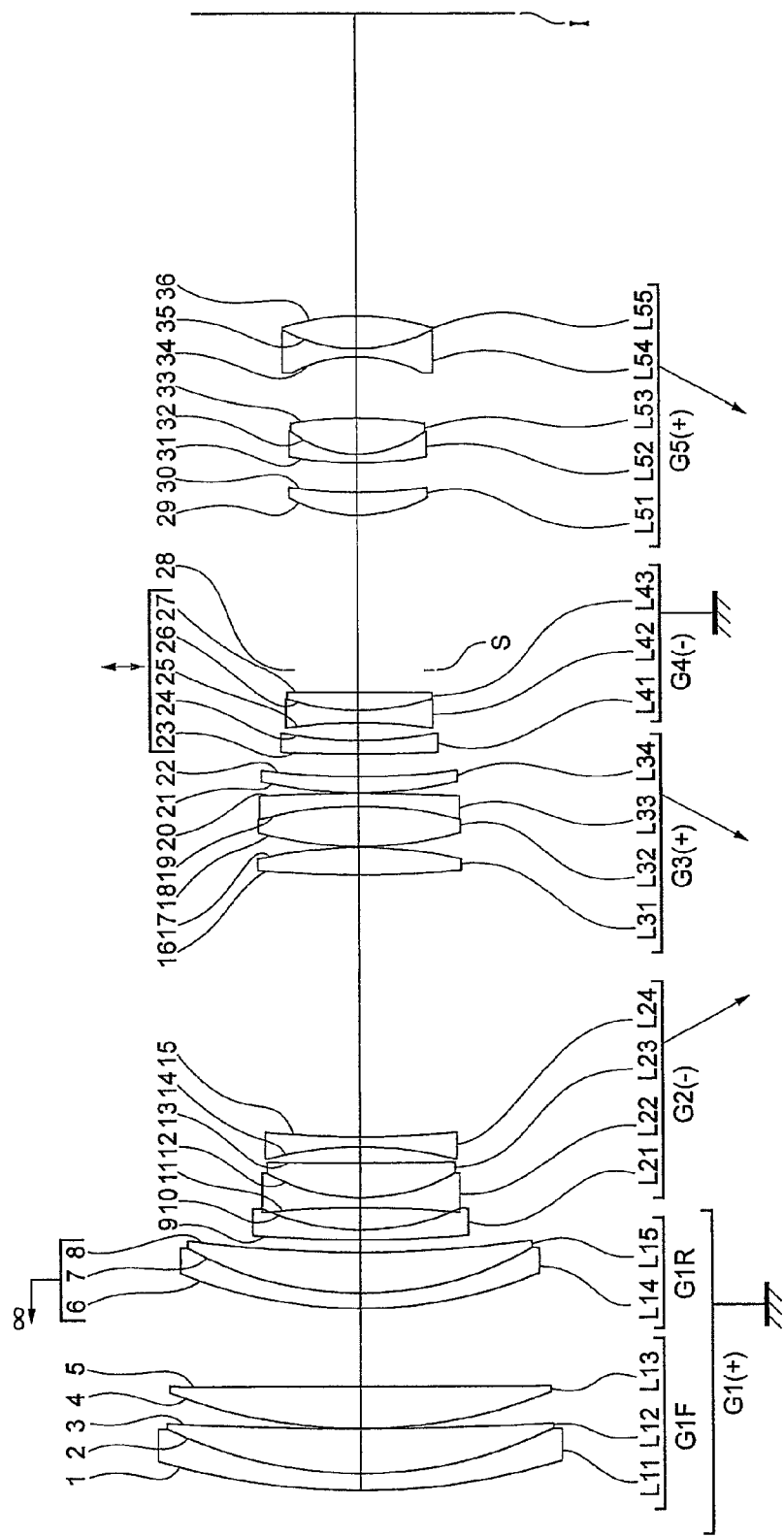
FIG. 45 is a diagram depicting a configuration and zoom locus of the zooming optical system according to the twelfth example.

A twelfth example will be described with reference to FIG. 45 to FIG. 48 and Table 12. FIG. 45 shows a lens configuration and zoom locus of the twelfth example. As FIG. 45 shows, a zooming optical system according to the twelfth example has a first lens group G1 having positive refractive power, a second lens group G2 having negative refractive power, a third lens group G3 having positive refractive power, a fourth lens group G4 having negative refractive power, and a fifth lens group G5 having positive refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object and a positive meniscus lens L13 having a convex surface facing the object, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and a positive meniscus lens L23 having a convex surface facing the object, and a biconcave negative lens L24, which are disposed in order from the object.

The third lens group G3 has a biconvex positive lens L31, a cemented lens of a biconvex positive lens L32 and a negative meniscus lens L33 having a concave surface facing the object, and a positive meniscus lens L34 having a convex surface facing the object, which are disposed in order from the object.

The fourth lens group G4 has a negative meniscus lens L41 having a convex surface facing the object, and a cemented lens of a biconcave negative lens L42 and a biconvex positive lens L43, which are disposed in order from the object.

The fifth lens group G5 has a positive meniscus lens L51 having a convex surface facing the object, a cemented lens of a negative meniscus lens L52 having a convex surface facing the object and a biconvex positive lens L53, and a cemented lens of a biconcave negative lens L54 and a biconvex positive lens L55, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.540, and the focal length is 81.6 (mm), so the moving distance of the lens L41 and the cemented lens of the lens L42 and lens L43 for correction 0.350° of the rotational blur is −0.324 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 12 below shows the values of each parameter of the zooming optical system according to the twelfth example. The surface numbers 1 to 36 in Table 12 correspond to the surfaces 1 to 36 in FIG. 45.

TABLE 12

[All Parameters]

| | Wide angle end state | | Intermediate focal length state | | Telephoto end state |
|---|---|---|---|---|---|
| f | 81.6 | ~ | 200.0 | ~ | 392.0 |
| FNO | 4.6 | ~ | 5.3 | ~ | 5.8 |
| TL | 270.0 | ~ | 270.0 | ~ | 270.0 |
| 2ω | 29.0 | ~ | 12.0 | ~ | 6.1 |

[Lens Data]

| Surface number | r | d | nd | vd |
|---|---|---|---|---|
| 1 | 125.5034 | 3.1 | 1.79952 | 42.3 |
| 2 | 76.9564 | 8.2 | 1.49782 | 82.6 |
| 3 | 597.3071 | 0.1 | | |
| 4 | 92.8195 | 7.5 | 1.49782 | 82.6 |
| 5 | 5664.2677 | D5 | | |
| 6 | 83.4732 | 2.8 | 1.84666 | 23.8 |
| 7 | 61.8777 | 7.5 | 1.58913 | 61.2 |
| 8 | 222.6063 | D8 | | |
| 9 | 218.6940 | 1.9 | 1.81600 | 46.6 |
| 10 | 42.0813 | 4.0 | | |
| 11 | −188.5623 | 1.9 | 1.75500 | 52.3 |
| 12 | 33.7734 | 6.4 | 1.80809 | 22.8 |
| 13 | 1721.3104 | 2.9 | | |
| 14 | −63.5455 | 1.9 | 1.81600 | 46.6 |
| 15 | 188.3593 | D15 | | |
| 16 | 193.5184 | 5.0 | 1.69680 | 55.5 |
| 17 | −79.5259 | 0.2 | | |
| 18 | 67.1328 | 7.3 | 1.60300 | 65.5 |
| 19 | −66.5546 | 2.3 | 1.84666 | 23.8 |
| 20 | −315.3675 | 0.1 | | |
| 21 | 74.7539 | 2.9 | 1.58913 | 61.2 |
| 22 | 129.8989 | D22 | | |
| 23 | 312.5475 | 2.5 | 1.75520 | 27.5 |
| 24 | 69.6022 | 3.3 | | |
| 25 | −86.8084 | 2.3 | 1.74400 | 44.8 |
| 26 | 39.3145 | 3.3 | 1.84666 | 23.8 |
| 27 | −38124.2510 | 4.1 | | |
| 28 | 0.0000 | D28 | (Aperture stop S) | |
| 29 | 25.1712 | 4.2 | 1.48749 | 70.5 |
| 30 | 87.3944 | 5.4 | | |
| 31 | 66.9683 | 1.6 | 1.75520 | 27.5 |
| 32 | 18.6535 | 6.7 | 1.48749 | 70.5 |
| 33 | −69.4145 | 11.3 | | |
| 34 | −23.7461 | 1.4 | 1.79500 | 45.3 |
| 35 | 27.0073 | 6.1 | 1.75520 | 27.5 |
| 36 | −40.9113 | BF | | |

TABLE 12-continued

[Variable Distance Data]

| | Infinity | | | Close distance | | |
|---|---|---|---|---|---|---|
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.06 | −0.14 | −0.26 |
| D0 | 0 | 0 | 0 | 1530.00 | 1530.00 | 1530.00 |
| D5 | 14.2414 | 14.2414 | 14.2414 | 2.0000 | 2.0000 | 2.0000 |
| D8 | 2.2446 | 19.2453 | 26.6534 | 14.4860 | 31.4868 | 38.8948 |
| D15 | 47.8881 | 21.8873 | 2.0000 | 47.8881 | 21.8873 | 2.0000 |
| D22 | 4.1814 | 13.1814 | 25.6607 | 4.1814 | 13.1814 | 25.6607 |
| D28 | 28.3974 | 12.9412 | 2.0000 | 28.3974 | 12.9412 | 2.0000 |
| BF | 55.1067 | 70.5629 | 81.5042 | 55.1067 | 70.5629 | 81.5043 |

[Focal Length Data of Each Group]

| Group number | First surface of group | Focal length of group |
|---|---|---|
| G1 | 1 | 100.5534 |
| G2 | 9 | −25.3867 |
| G3 | 16 | 42.8750 |
| G4 | 23 | −69.3653 |
| G5 | 29 | 129.9877 |

[Conditional Expressions]

| | |
|---|---|
| Conditional Expression (1) | $|f4|/fT = 0.177$ |
| Conditional Expression (2) | $f3/|f4| = 0.618$ |

As the parameter table in Table 12 shows, the zooming optical system according to this example satisfies both conditional Expressions (1) and (2).

Figure 46A:
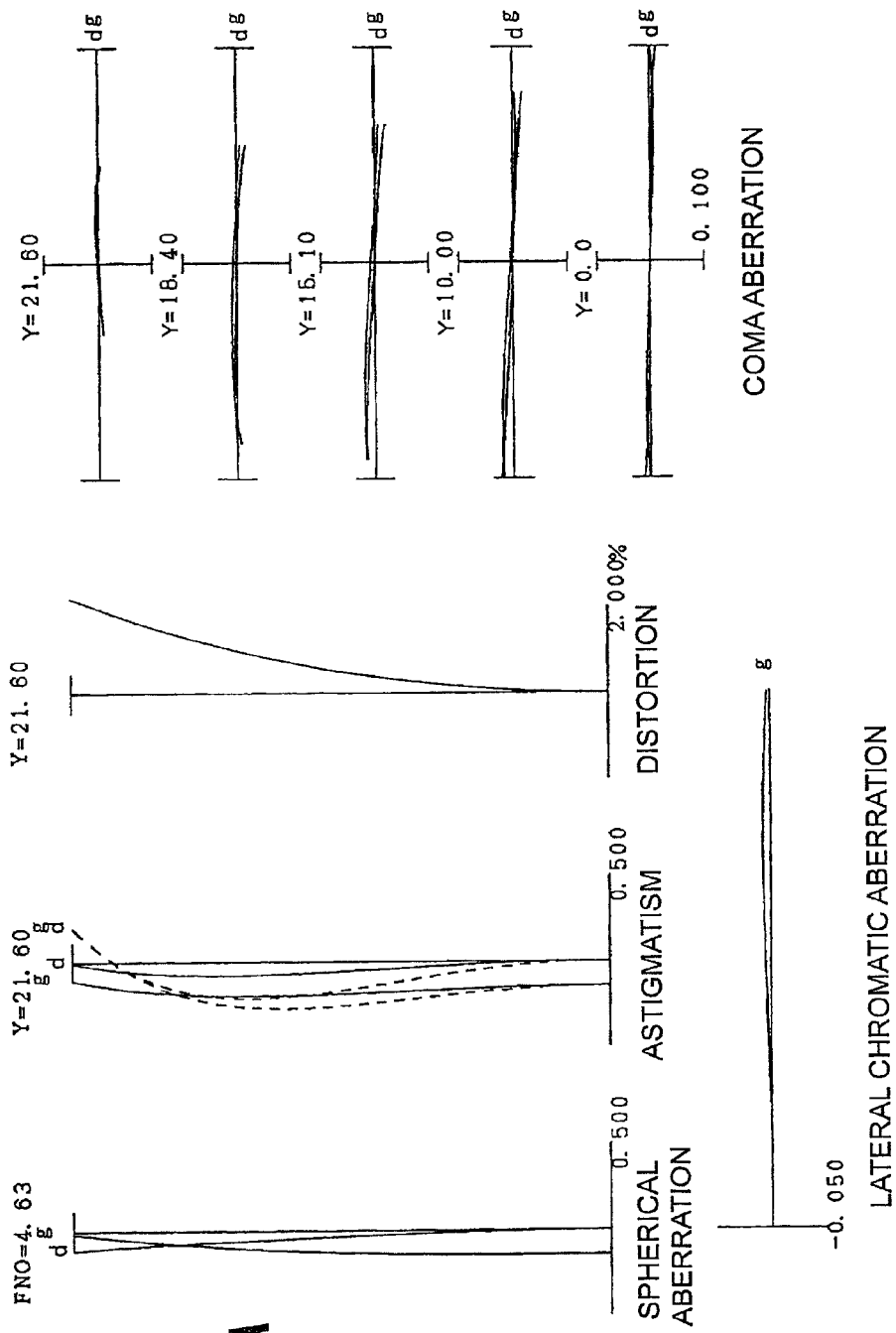
FIG. 46A shows the wide angle end state.
Figure 46B:
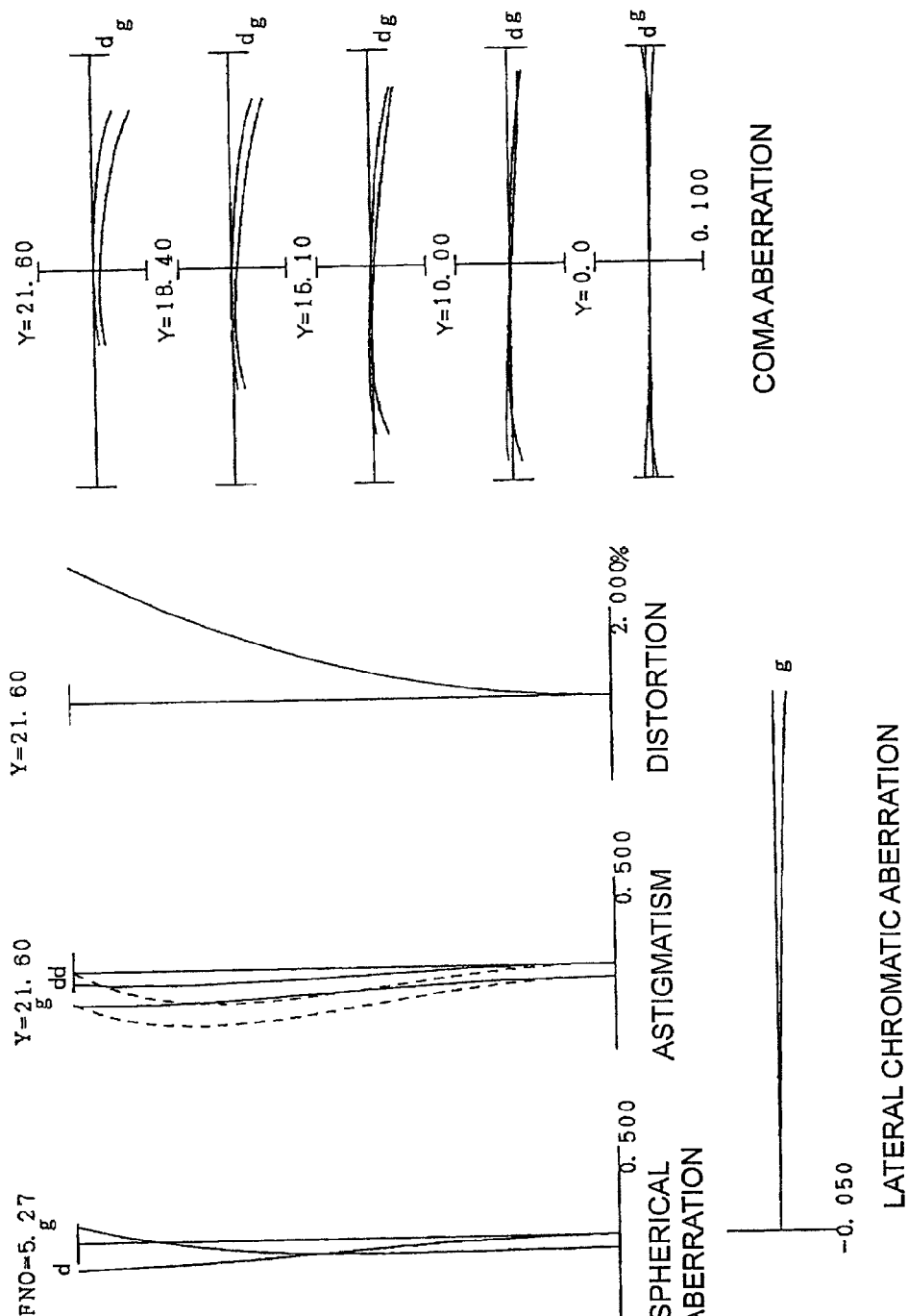
FIG. 46B shows the intermediate focal length state.
Figure 46C:
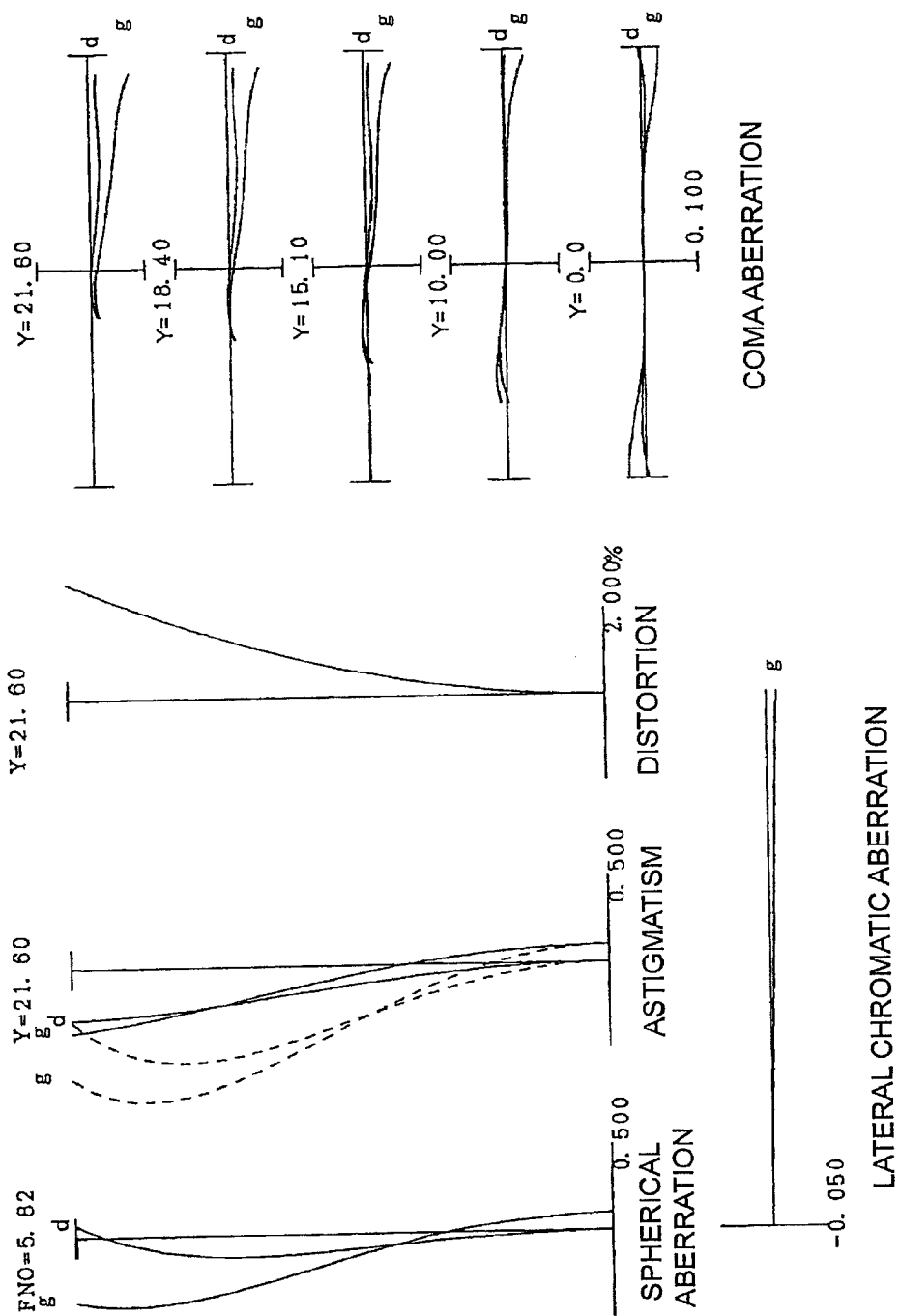
FIG. 46C shows the telephoto end state.
Figure 47A:
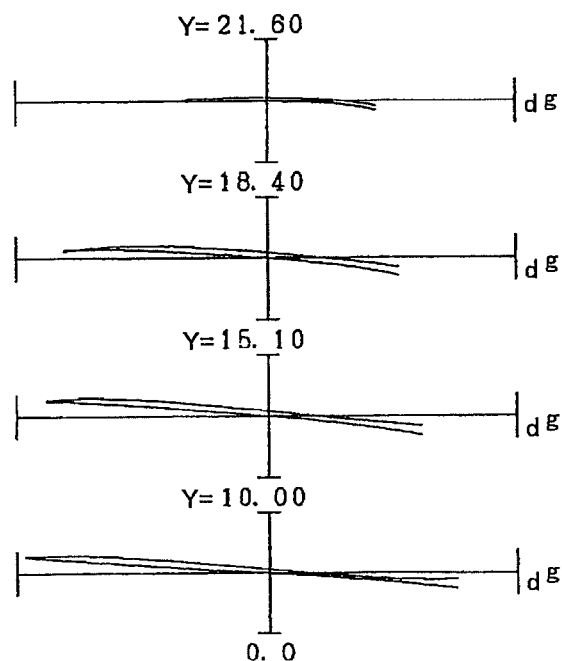
FIG. 47A shows the wide angle end state.
Figure 47B:
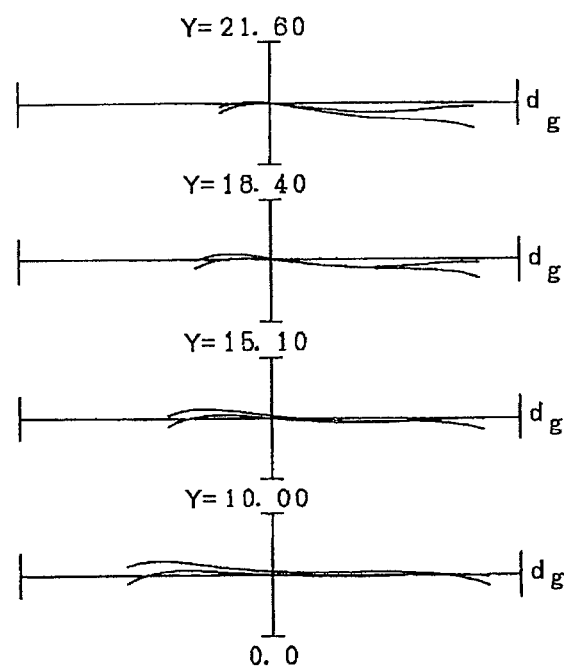
FIG. 47B shows the telephoto end state.
Figure 48A:
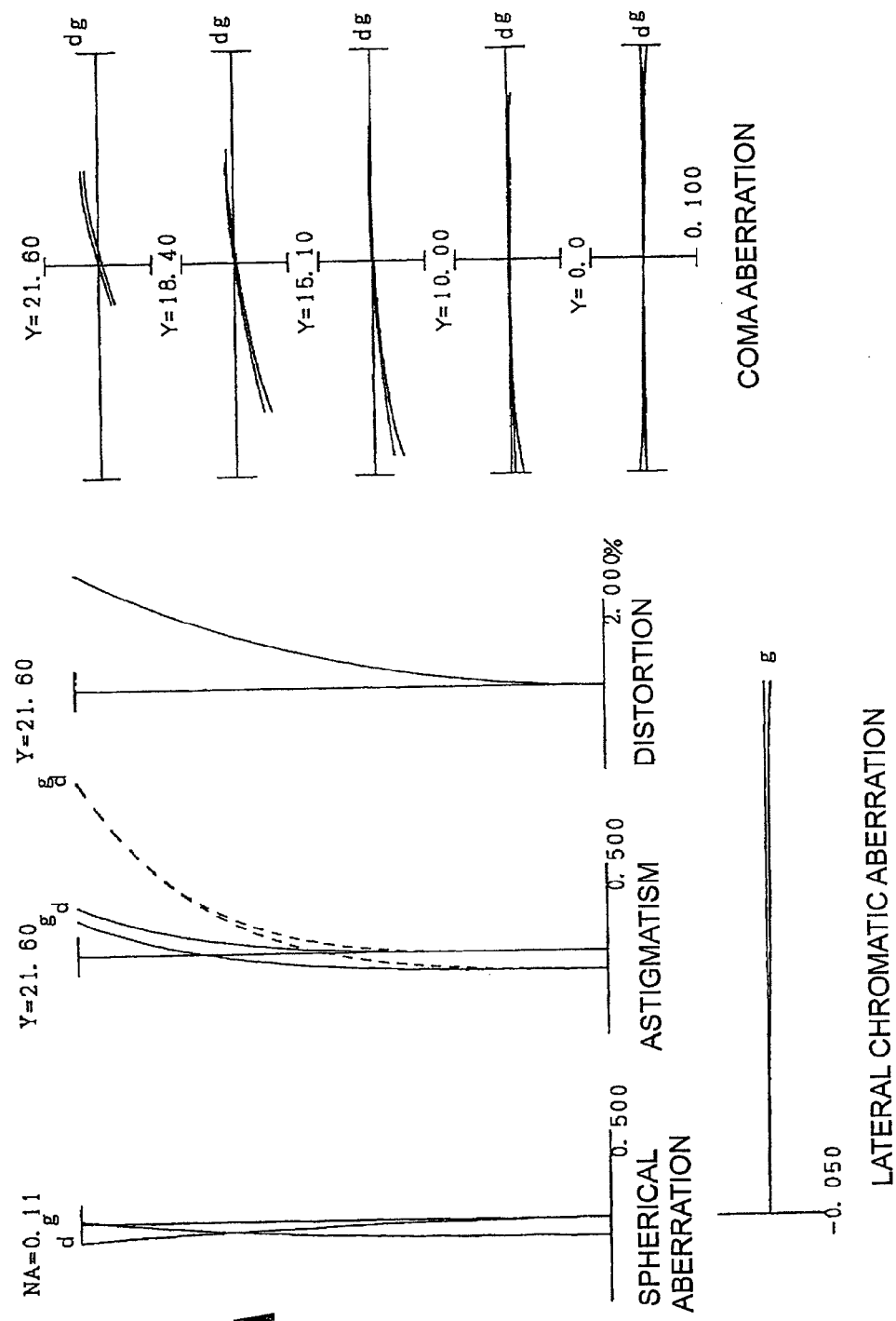
FIG. 48A shows the wide angle end state.
Figure 48B:
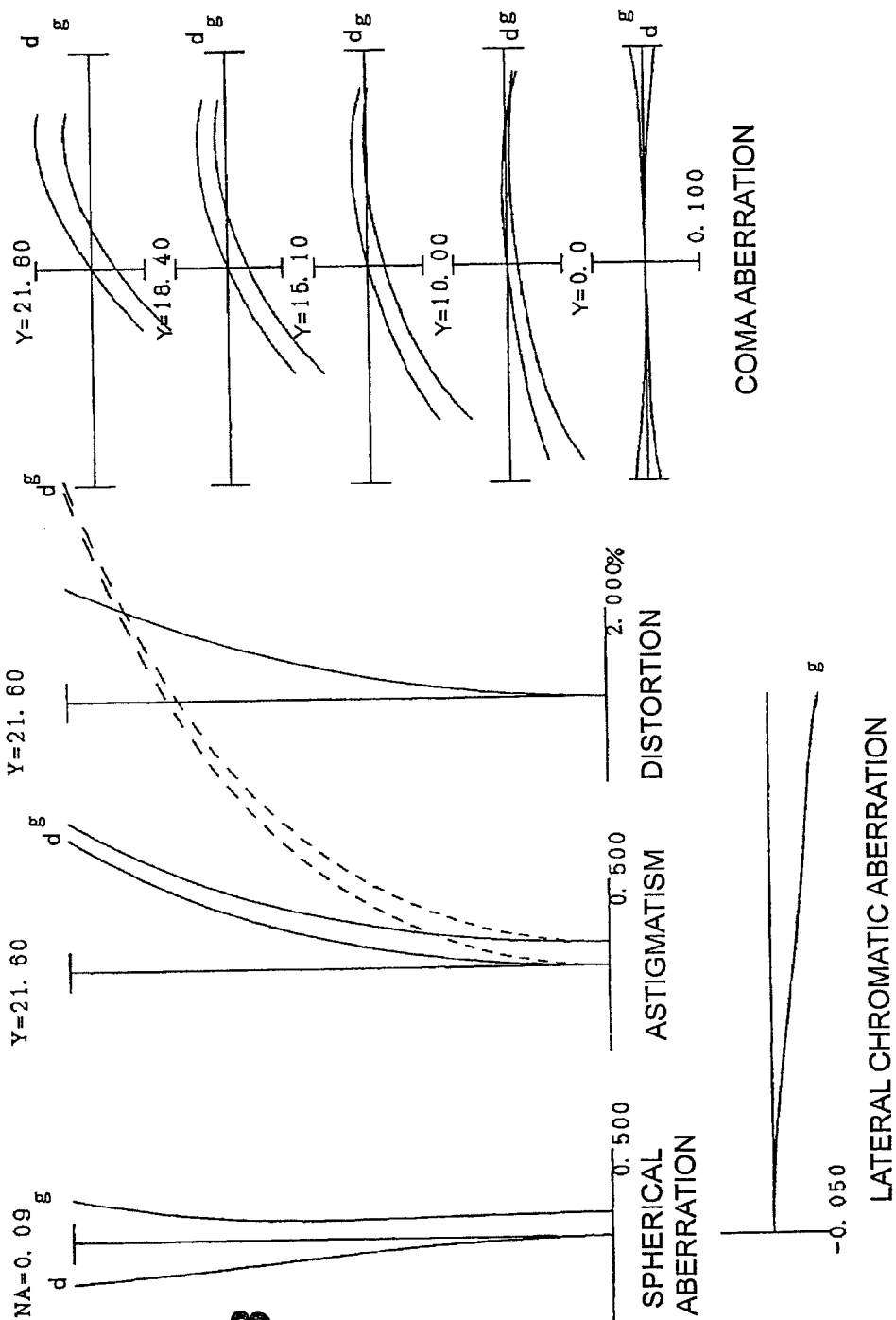
FIG. 48B shows the intermediate focal length state.
Figure 48C:
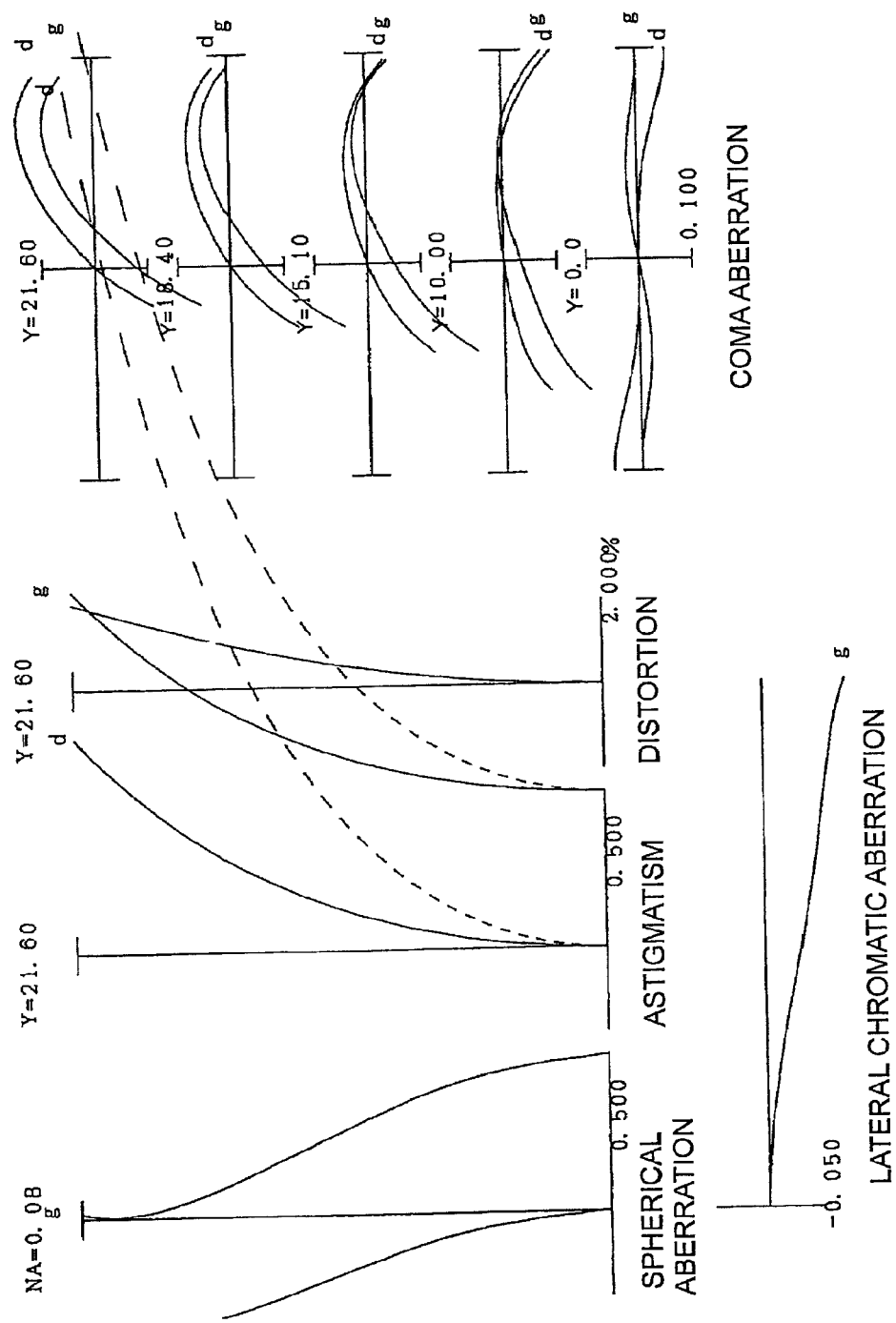
FIG. 48C shows the telephoto end state.

FIG. 46 are graphs showing various aberrations of the zooming optical system according to the twelfth example upon focusing on infinity, wherein FIG. 46A shows the wide angle end state, FIG. 46B shows the intermediate focal length state, and FIG. 46C shows the telephoto end state. FIG. 47 are graphs showing meridional lateral aberrations when blur correction is performed on the zooming optical system according to the twelfth example upon focusing on infinity, wherein FIG. 47A shows the wide angle end state, and FIG. 47B shows the telephoto end state. FIG. 48 are graphs showing various aberrations of the zooming optical system according to the twelfth example upon focusing on close distance (photographing distance of entire system: R=1.8 m), wherein FIG. 48A shows the wide angle end state, FIG. 48B shows the intermediate focal length state, and FIG. 48C shows the telephoto end state.

According to the twelfth example, as each graph on aberrations shows, various aberrations are corrected well in each focal length state from the wide angle end state to the telephoto end state, and excellent image forming performance is implemented.

Thirteenth Example

A thirteenth example will be described with reference to FIG. 49 to FIG. 52 and Table 13. FIG. 49 shows a lens configuration and zoom locus of the thirteenth example. As FIG. 49 shows, a zooming optical system according to the thirteenth example has a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power, which are disposed in order from the object.

The first lens group G1 has a front group G1F and a rear group G1R (focusing lens group) which are disposed in order from the object. The front group G1F has a cemented lens of a negative meniscus lens L11 having a convex surface facing the object and a positive meniscus lens L12 having a convex surface facing the object, and a biconvex positive lens L13, which are disposed in order from the object. The rear group G1R has a cemented lens of a negative meniscus lens L14 having a convex surface facing the object and a positive meniscus lens L15 having a convex surface facing the object, which are disposed in order from the object.

The second lens group G2 has a negative meniscus lens L21 having a convex surface facing the object, a cemented lens of a biconcave negative lens L22 and biconvex positive lens L23, and a biconcave negative lens L24, which are disposed in order from the object.

The third lens group G3 has a biconvex positive lens L31, a cemented lens of a biconvex positive lens L32 and a biconcave negative lens L33, and a positive meniscus lens L34 having a convex surface facing the object, which are disposed in order from the object.

The fourth lens group G4 has a negative meniscus lens L41 having a convex surface facing the object, and a cemented lens of a positive meniscus lens L42 having a concave surface facing the object and a biconcave negative lens L43, which are disposed in order from the object.

The fifth lens group G5 has a positive meniscus lens L51 having a convex surface facing the object, and a cemented lens of a negative meniscus lens L52 having a convex surface facing the object and a biconvex positive lens L53, which are disposed in order from the object.

The sixth lens group G6 has a cemented lens of a biconcave negative lens L61 and a biconvex positive lens L62, which are disposed in order from the object.

In the zooming optical system according to this example having this configuration, each lens group moves upon zooming from the wide angle end state to the telephoto end state, so that the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases. The first lens group G1 and the fourth lens group G4 are fixed with respect to the image surface I upon zooming from the wide angle end state to the telephoto end state.

The aperture stop S is disposed between the fourth lens group G4 and the fifth lens group G5, and is fixed with respect to the image surface I upon zooming from the wide angle end state to the telephoto end state.

In the zooming optical system according to this example, an image surface when a blur is generated is corrected by shifting the lens L41 and the cemented lens of the lens L42 and lens L43 in the fourth lens group G4 in a direction perpendicular to the optical axis. In order to correct a rotational blur of angle θ, the lens group for blur correction is moved in a direction perpendicular to the optical axis by the amount of (f·tan θ)/K, where f denotes the focal length of the entire system, and K denotes the blur correction coefficient of the lens (ratio of the moving distance of the image on the image surface I to the moving distance of the lens group for blur correction in the optical axis direction). In the wide angle end state of this example, the blur correction coefficient K is −1.488, and the focal length is 81.6 (mm), so the moving distance of the lens L41 and the cemented lens of the lens L42 and lens L43 for correction 0.350° of the rotational blur is −0.335 (mm). In the telephoto end state of this example, the blur correction coefficient K is −1.900, and the focal length is 392 (mm), so the moving distance of the lens L41 and the cemented lens of the lens L42 and the lens L43 for correcting 0.160° of rotational blur is −0.575 (mm).

Table 13 below shows the values of each parameter of the zooming optical system according to the thirteenth example. The surface numbers 1 to 36 in Table 13 correspond to the surfaces 1 to 36 in FIG. 49.

TABLE 13

[All Parameters]

|  | Wide angle end state | | Intermediate focal length state | | Telephoto end state |
|---|---|---|---|---|---|
| f | 81.6 | ~ | 200.0 | ~ | 392.0 |
| FNO | 4.5 | ~ | 5.3 | ~ | 5.8 |
| TL | 259.9 | ~ | 259.9 | ~ | 259.9 |
| 2ω | 29.4 | ~ | 12.0 | ~ | 6.1 |

[Lens Data]

| Surface number | r | d | nd | νd |
|---|---|---|---|---|
| 1 | 131.5273 | 3.6 | 1.83481 | 42.7 |
| 2 | 75.2890 | 8.6 | 1.49782 | 82.6 |
| 3 | 468.3641 | 0.1 | | |
| 4 | 106.0385 | 7.7 | 1.49782 | 82.6 |
| 5 | −928.7919 | D5 | | |
| 6 | 87.6000 | 3.2 | 1.84666 | 23.8 |
| 7 | 63.0110 | 8.8 | 1.58913 | 61.2 |
| 8 | 553.3485 | D8 | | |
| *9 | 949.9140 | 2.0 | 1.79050 | 45.0 |
| 10 | 72.9166 | 4.2 | | |
| 11 | −105.9661 | 2.0 | 1.75500 | 52.3 |
| 12 | 36.6390 | 6.1 | 1.80809 | 22.8 |
| 13 | −262.3986 | 1.8 | | |
| 14 | −62.0851 | 1.7 | 1.80400 | 46.6 |
| 15 | 89.8014 | D15 | | |
| 16 | 156.9157 | 4.1 | 1.74400 | 44.8 |
| 17 | −87.6277 | 0.1 | | |
| 18 | 64.6661 | 6.2 | 1.60300 | 65.5 |
| 19 | −64.6450 | 1.8 | 1.84666 | 23.8 |
| 20 | −1644.6864 | 0.1 | | |
| 21 | 62.7701 | 2.4 | 1.48749 | 70.5 |
| 22 | 114.6467 | D22 | | |
| 23 | 114.8569 | 1.3 | 1.62004 | 36.2 |
| 24 | 54.8911 | 1.8 | | |
| 25 | −92.2541 | 3.1 | 1.79504 | 28.7 |
| 26 | −27.0180 | 1.3 | 1.74400 | 44.8 |
| 27 | 193.5011 | 4.1 | | |
| 28 | 0.0000 | D28 | (Aperture stop S) | |
| 29 | 27.2612 | 4.4 | 1.48749 | 70.5 |
| 30 | 298.2465 | 6.2 | | |
| 31 | 61.8805 | 1.3 | 1.75520 | 27.5 |
| 32 | 17.9910 | 7.7 | 1.51823 | 58.9 |
| 33 | −53.6762 | D33 | | |

TABLE 13-continued

| 34 | −27.3003 | 1.3 | 1.80400 | 46.6 |
| 35 | 27.3060 | 5.7 | 1.78472 | 25.7 |
| 36 | −81.4626 | BF | | |

[Aspherical Data]
Ninth surface

κ = 1.0000, A4 = 1.2623E−06, A6 = 2.9682E−10, A8 = 5.7870E−13, A10 = −1.2302E−16

[Variable Distance Data]

| | Infinity | | | Close distance | | |
| --- | --- | --- | --- | --- | --- | --- |
| | Wide angle End | Intermediate | Telephoto end | Wide angle End | Intermediate | Telephoto end |
| f | 81.6 | 200.0 | 392.0 | — | — | — |
| β | 0 | 0 | 0 | −0.05 | −0.13 | −0.26 |
| D0 | 0 | 0 | 0 | 1540.12 | 1540.12 | 1540.12 |
| D5 | 11.5037 | 11.5037 | 11.5037 | 1.8932 | 1.8932 | 1.8932 |
| D8 | 2.0055 | 19.3952 | 26.6587 | 11.6160 | 29.0058 | 36.2693 |
| D15 | 47.4566 | 22.0189 | 2.1846 | 47.4566 | 22.0189 | 2.1846 |
| D22 | 14.0706 | 22.1186 | 34.6893 | 14.0706 | 22.1186 | 34.6893 |
| D28 | 27.0683 | 12.3291 | 2.0706 | 27.0683 | 12.3291 | 2.0706 |
| D33 | 5.8957 | 5.2880 | 3.2943 | 5.8957 | 5.2880 | 3.2943 |
| BF | 49.1754 | 64.5223 | 76.7746 | 49.1754 | 64.5223 | 76.7746 |

[Focal Length Data of Each Group]

| Group number | First surface of group | Focal length of group |
| --- | --- | --- |
| G1 | 1 | 98.5763 |
| G2 | 9 | −26.6117 |
| G3 | 16 | 44.0942 |
| G4 | 23 | −60.3396 |
| G5 | 29 | 43.5178 |
| G6 | 34 | −51.5312 |

[Conditional Expressions]

| Conditional Expression (1) | $|f4|/fT = 0.154$ |
| Conditional Expression (2) | $f3/|f4| = 0.731$ |

As the parameter table in Table 13 shows, the zooming optical system according to this example satisfies both conditional Expressions (1) and (2).

Figure 50B:
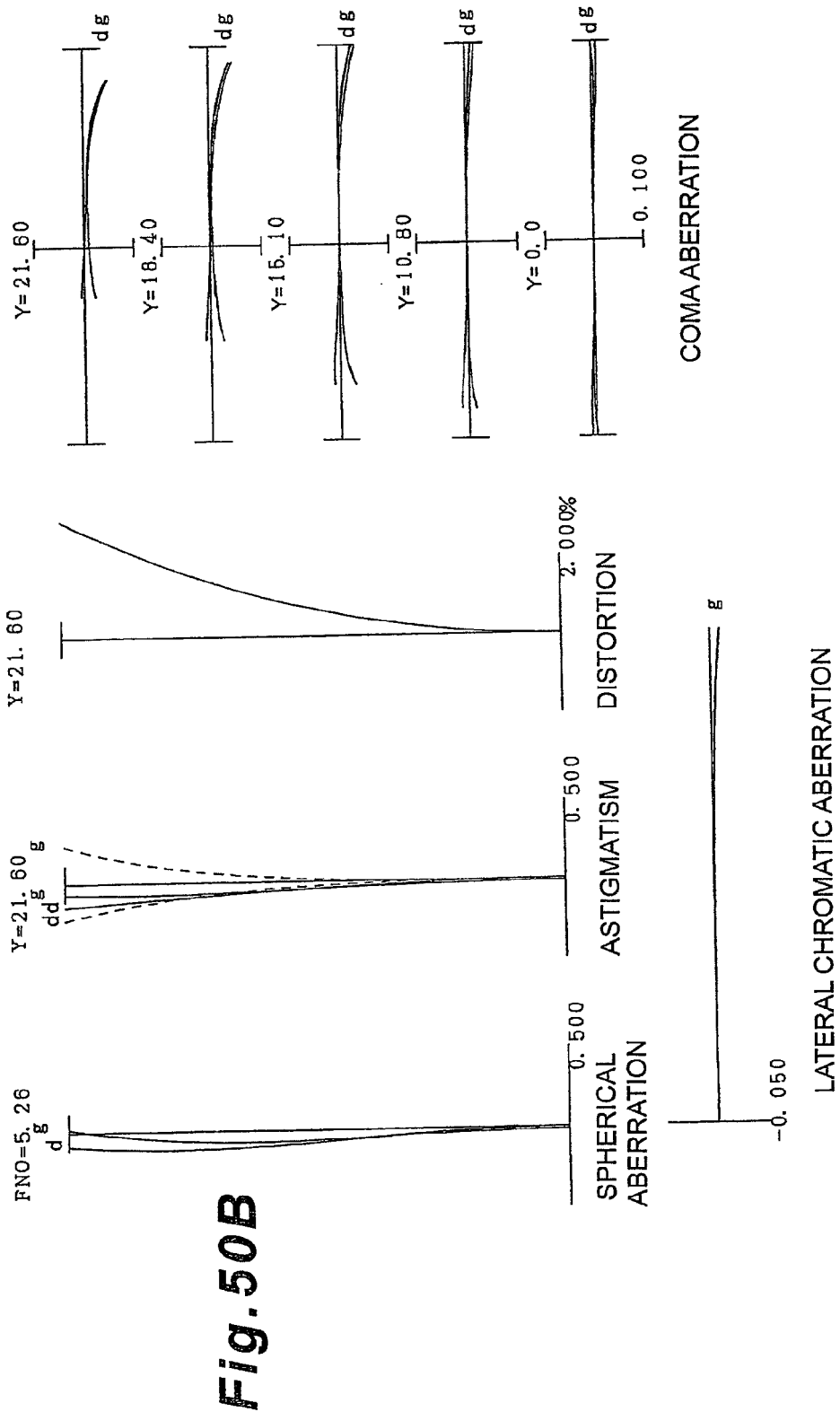
FIG. 50B shows the intermediate focal length state.
Figure 50C:
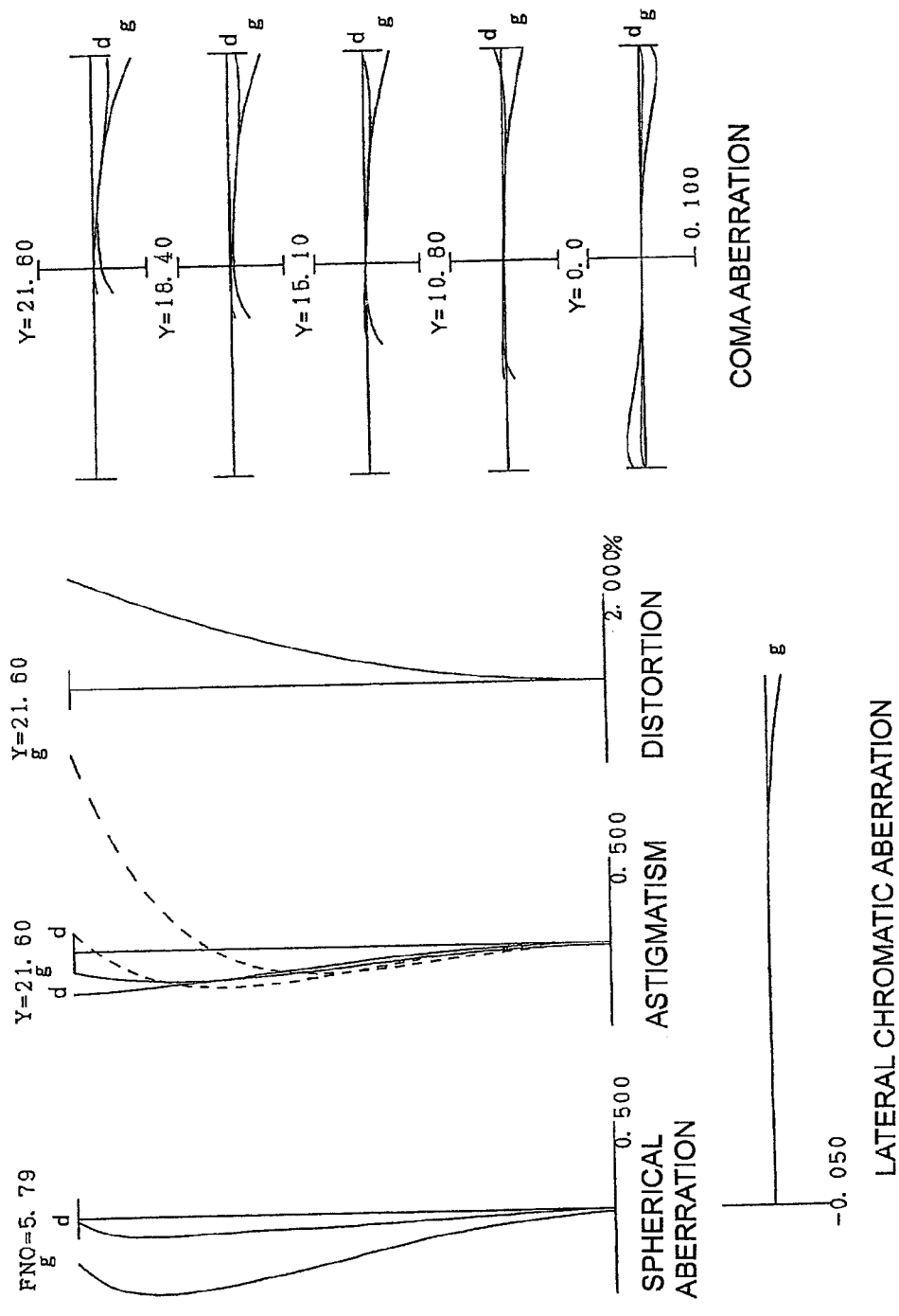
FIG. 50C shows the telephoto end state.
Figure 51A:
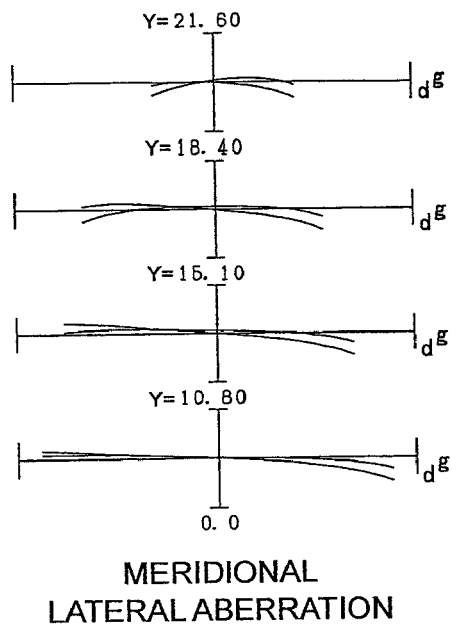
FIG. 51A shows the wide angle end state.
Figure 51B:
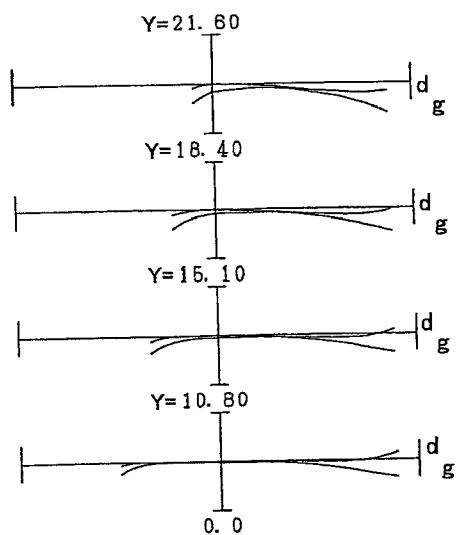
FIG. 51B shows the telephoto end state.
Figure 52A:
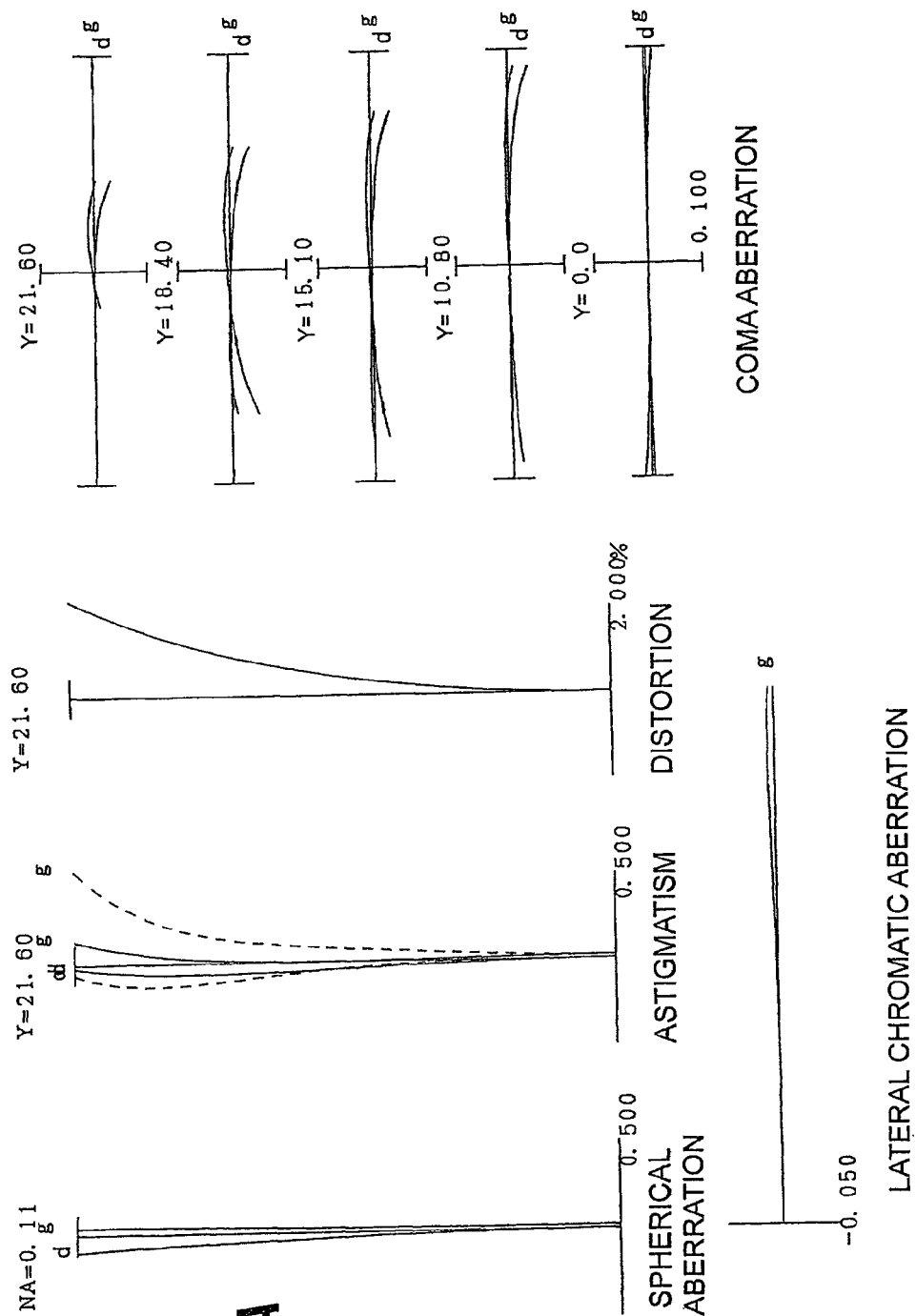
FIG. 52A shows the wide angle end state.
Figure 52B:
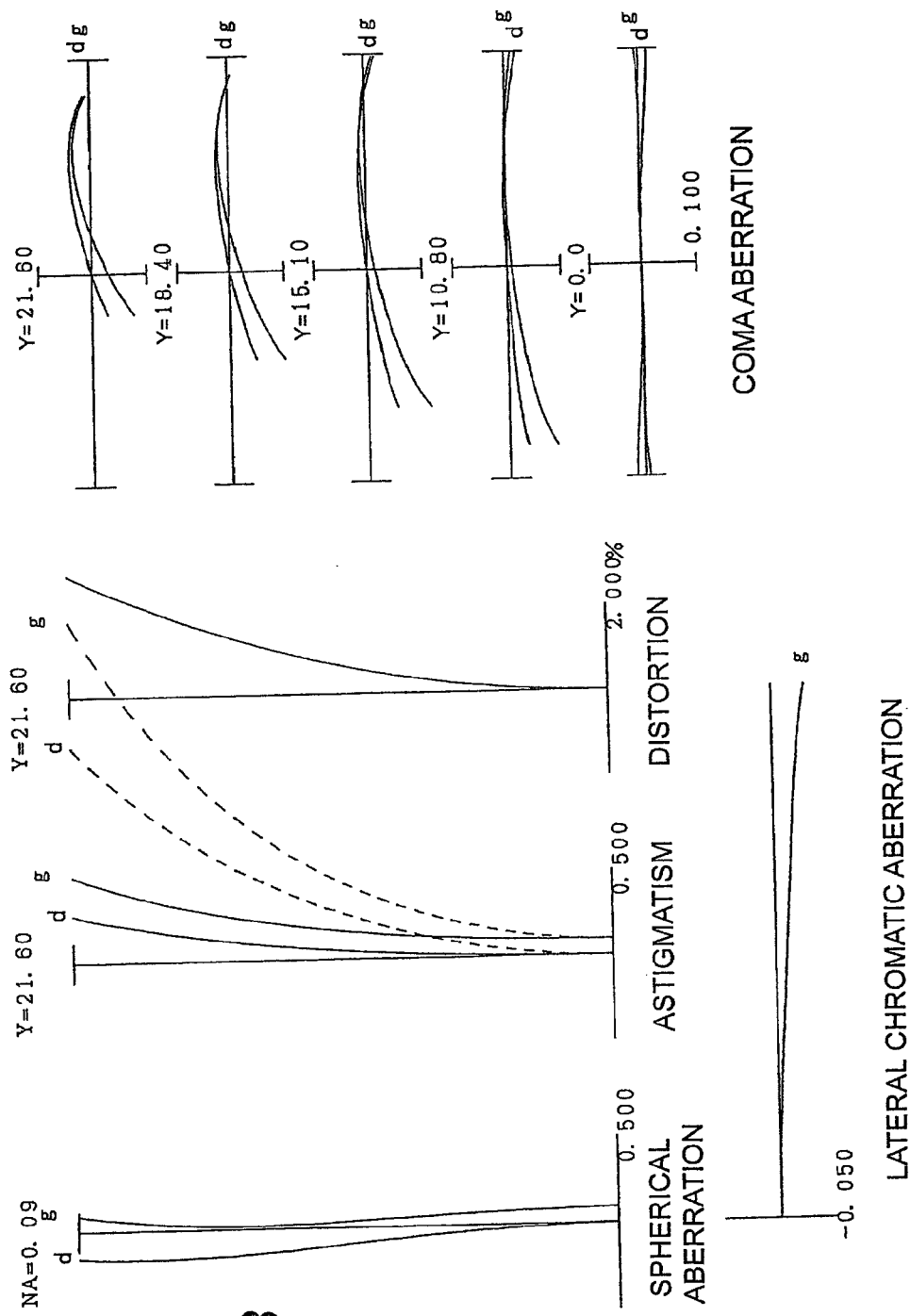
FIG. 52B shows the intermediate focal length state.

FIG. 50 are graphs showing various aberrations of the zooming optical system according to the thirteenth example upon focusing on infinity, wherein FIG. 50A shows the wide angle end state, FIG. 50B shows the intermediate focal length state, and FIG. 50C shows the telephoto end state. FIG. 51 are graphs showing meridional lateral aberrations when blur correction is performed on the zooming optical system according to the thirteenth example upon focusing on infinity, wherein FIG. 51A shows the wide angle end state, and FIG. 51B shows the telephoto end state. FIG. 52 are graphs showing various aberrations of the zooming optical system according to the thirteenth example upon focusing on close distance (photographing distance of entire system: R=1.8 m), wherein FIG. 52A shows the wide angle end state, FIG. 52B shows the intermediate focal length state, and FIG. 52C shows the telephoto end state.

According to the thirteenth example, as each graph on aberrations shows, various aberrations are corrected well in each focal length state from the wide angle end state to the telephoto end state, and excellent image forming performance is implemented.

In the above mentioned embodiments and examples, the following content can be used within a scope that does not diminish optical performance.

In the above examples, a zooming optical system having a five-group or six-group configuration was shown, but the present invention can also be applied to a seven-group, eight-group or other group configurations. In concrete terms, a configuration in which a positive lens group is added in a position closest to the object, or a configuration in which a positive or a negative lens group is added in a position closest to the image, can be used.

A single or multiple lens group(s) or a partial lens group may be moved in the optical axis direction, and be used as a focusing lens group which focuses from an infinite object to a close object. The focusing lens group can also be applied to auto focus, and is also appropriate for driving a motor for auto focus (e.g. ultrasonic motor). In particular, it is preferable that a cemented lens of the lens L14 and lens L15, constituting the first lens group G1, is a focusing lens group.

A lens group or a partial lens group may be vibrated in a direction perpendicular to the optical axis, so as to function as a vibration proof lens group that corrects image blur, which is generated by hand motion. It is particularly preferable that at least a part of the fourth lens group G4 is a vibration proof lens group.

Each lens surface may be a spherical surface, plane or aspherical surface. It is particularly preferable that at least a part of the second lens group G2, third lens group G3, fourth lens group G4 and fifth lens group G5 has an aspherical surface. If the lens surface is spherical or a plane, processing, assembly and adjustment of the lens is easy, and deterioration of optical performance, due to processing, assembly and adjustment error, can be prevented, which is desirable. Deterioration of drawing performance is less even if the image surface deviates, which is also desirable. In the case of the lens surface being aspherical, this aspherical surface may be either an aspherical surface created by grinding, a glass mold aspherical surface created by molding glass in an aspherical form using a die, or a composite aspherical surface created by forming a resin in an aspherical form on the surface of the glass. Each lens surface may be a diffraction surface, and the lens may be a refractive index distributed lens (GRIN lens) or plastic lens.

It is preferable that the aperture stop S is disposed near the fourth lens group G4 (preferably the image side), or the third lens group G3, but instead of disposing the aperture stop as an independent element, the role of the aperture stop may be played by the lens frame.

In order to decrease flares and ghosts and to implement a high optical performance with high contrast, anti-reflection, that has high transmittance in a wide wavelength area, may be formed on each lens surface.

The zoom ratio of the zooming optical system of the present embodiment is about 4.5 to 6.

In the zooming optical systems of the present embodiments and examples, it is preferable that the front group G1P of the first lens group G1 has two or three positive lenses and one negative lens. It is preferable that the front lens group G1P has a negative lens, positive lens and positive lens, or a negative lens, positive lens, positive lens, and a positive lens, which are disposed in order from the object. Each lens may be a single lens, or may be cemented to be a cemented lens.

In the zooming optical systems of the present embodiments and examples, it is preferable that the rear group G1R of the first lens group G1 has one positive lens and one negative lens. In the rear group G1R, it is preferable that the negative lens and the positive lens are disposed in order from the object. It is preferable that the rear group G1R is constituted by one cemented lens.

In the zooming optical systems of the present embodiments and examples, it is preferable that the second lens group G2 has one or two positive lens(es) and three negative lenses. In the second lens group G2, it is preferable that a negative lens, negative lens, positive lens and negative lens, or a positive lens, negative lens, negative lens, positive lens and negative lens are disposed in order from the object. Each lens may be a single lens, or may be cemented to be a cemented lens.

In the zooming optical systems of the present embodiments or examples, it is preferable that the third lens group G3 has two or three positive lenses and one negative lens. In the third lens group G3, it is preferable that a positive lens, positive lens and negative lens, or a positive lens, positive lens, negative lens and positive lens are disposed in order from the object. Each lens may be a single lens, or may be cemented to be a cemented lens.

In the zooming optical systems of the present embodiments or examples, it is preferable that the fourth lens group G4 has one positive lens and one or two negative lens(es). In the fourth lens group G4, it is preferable that a positive lens and negative lens, or a negative lens, positive lens and negative lens are disposed in order from the object. In the fourth lens group G4, it is also preferable that a positive lens, negative lens and negative lens, or a negative lens, negative lens and positive lens are disposed in order from the object. Each lens may be a single lens, or may be cemented to be a cemented lens.

In the zooming optical systems of the present embodiments or examples, it is preferable that the fifth lens group G5 has two or three positive lenses and one or two negative lens(es). In the fifth lens group G5, it is preferable that a positive lens, positive lens and negative lens, or a positive lens, negative lens and positive lens are disposed in order from the object. In the fifth lens group G5, it is also preferable that a positive lens, positive lens, negative lens and positive lens, or a positive lens, negative lens, positive lens and negative lens are disposed in order from the object. In the fifth lens group G5, it is also preferable that a positive lens, negative lens, positive lens, negative lens and positive lens are disposed in order from the object. Each lens may be a single lens, or may be cemented to be a cemented lens.

In the zooming optical systems of the present embodiments and examples, it is preferable that the sixth lens group G6 has one positive lens and one or two negative lens(es). In the sixth lens group G6, it is preferable that a negative lens and a positive lens are disposed in order from the object. Each lens may be a single lens, or may be cemented to be a cemented lens.

To assist in understanding the present invention, the embodiments and examples were described using configuration requirements, bu needless to say, the present invention is not limited to this.

As described above, the present invention can provide a zooming optical system that has good optical performance, is suitable for a photo-camera, electronic still camera and video camera, and can focus at high speed, and an optical apparatus having this optical system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zooming optical system comprising at least a first lens group to a fifth lens group which are disposed in order from an object,
   the first lens group having positive refractive power and having at least two subgroups,
   one of the subgroups being used as a focusing lens group, and
   the subgroup other than the focusing lens group in the subgroups, being fixed, upon focusing from an infinite object point to a close object point, and
   wherein the first lens group is fixed in an optical axis direction with respect to an image surface, upon zooming from a wide angle end state to a telephoto end state.

2. The zooming optical system according to claim 1, wherein the focusing lens group is positioned to be closest to an image in the subgroups.

3. The zooming optical system according to claim 1, wherein the focusing lens group moves to the object side upon focusing from the infinite far object point to the close object point.

4. the zooming optical system according to claim 1, wherein at least one of the subgroup closest to the object and the subgroup closest to the image in the subgroups, has positive refractive power.

5. The zooming optical system according to claim 1, wherein the fourth lens group has negative refractive power.

6. The zooming optical system according to claim 1, wherein the second lens group has negative refractive power.

7. The zooming optical system according to claim 1, wherein the third lens group has positive refractive power.

8. The zooming optical system according to claim 1, wherein the fifth lens groups has positive refractive power.

9. The zooming optical system according to claim 1, wherein the fourth lens group is fixed in the optical axis direction with respect to the image surface, upon zooming from the wide angle end state to the telephoto end state.

10. The zooming optical system according to claim 1, wherein all or a part of the fourth lens group is moved so as to have a moving component in a direction orthogonal to the optical axis.

11. The zooming optical system according to claim 1, wherein a diaphragm is disposed closer to the image than the fourth lens group.

12. The zooming optical system according to claim 11, wherein the diaphragm is fixed in the optical axis direction with respect to the image surface, upon zooming from the wide angle end state to the telephoto end state.

13. The zooming optical system according to claim 1, wherein a condition of the expression $$|f4|/fT<0.210$$

is satisfied, where f4 denotes a focal length of the fourth lens group, and fT denotes a focal length of the zooming optical system in the telephoto end state.

14. The zooming optical system according to claim 1, wherein a condition of the expression $$0.570<f3/|f4|<0.880$$

is satisfied, where f3 denotes a focal length of the third lens group, and f4 denotes a focal length of the fourth lens group.

15. The zooming optical system according to claim 1, wherein the first lens group has at least two cemented lenses.

16. The zooming optical system according to claim 1, wherein the second lens group has at least two cemented lenses.

17. The zooming optical system according to claim 1, wherein the first to the fifth lens groups have at least seven cemented lenses.

18. The zooming optical system according to claim 1, wherein the sixth lens group is disposed in a position closer to the image of the fifth lens group.

19. An optical apparatus having a zooming optical system, the zooming optical system comprising at least a first lens group to a fifth lens group which are disposed in order from an object,
the first lens group having positive refractive power and having at least two subgroups,
one of the subgroups being used as a focusing lens group, and
the subgroup other than the focusing lens group in the subgroups, being fixed, upon focusing from an infinite object point to a close object point, and
wherein the first lens group is fixed in an optical axis direction with respect to an image surface, upon zooming from a wide angle end state to a telephoto end state.

20. A zooming optical system comprising at least a first lens group to a fifth lens group which are disposed in order from an object,
the first lens group having at least two subgroups, and
a subgroup closest to the image in the subgroups, being a focusing lens group, and
wherein the first lens group is fixed in an optical axis direction with respect to an image surface, upon zooming from a wide angle end state to a telephoto end state.

21. The zooming optical system according to claim 20, wherein a diaphragm is disposed closer to the image than the fourth lens group.

22. The zooming optical system according to claim 20, wherein the subgroup closest to the object in the subgroups, has positive refractive power.

23. An optical apparatus having a zooming optical system, the zooming optical system comprising at least a first lens group to a fifth lens group which are disposed in order from an object,
the first lens group having at least two subgroups, and
a subgroup closest to the image in the subgroups, being a focusing lens group, and
wherein the first lens group is fixed in an optical axis direction with respect to an image surface, upon zooming from a wide angle end state to a telephoto end state.

24. A zooming optical system comprising at least a first lens group to a sixth lens group which are disposed in order from an object,
any lens group having positive refractive power in the lens groups, has at least two subgroups,
at least one of the subgroups being used as a focusing lens group, and
the focusing lens group being moved to the object side, upon focusing from an infinite far object point to a close object point, and
wherein the first lens group is fixed in an optical axis direction with respect to an image surface, upon zooming from a wide angle end state to a telephoto end state.

25. The zooming optical system according to claim 24, wherein the first lens group includes the focusing lens group.

26. The zooming optical system according to claim 24, wherein the sixth lens group has negative refractive power.

27. An optical apparatus having a zooming optical system, the zooming optical system comprising at least a first lens group to a sixth lens group which are disposed in order from an object,
any lens group having positive refractive power in the lens groups, has at least two subgroups,
at least one of the subgroups being a focusing lens group, and
the focusing lens group being moved to the object side, upon focusing from an infinite object point to a close object point, and
wherein the first lens group is fixed in an optical axis direction with respect to an image surface, upon zooming from a wide angle end state to a telephoto end state.

28. A zooming optical system comprising at least a first lens group to a fifth lens group which are disposed in order from an object,
the fourth lens group having negative refractive power and being fixed in an optical axis direction with respect to an image surface, upon zooming from a wide angle end state to a telephoto end state, and
a diaphragm being disposed closer to an image than the fourth lens group, and
wherein the first lens group is fixed in the optical axis direction with respect to the image surface, upon zooming from the wide angle end state to the telephoto end state.

29. The zooming optical system according to claim 28, wherein all or a part of the fourth lens group is moved so as to have a moving component orthogonal to the optical axis.

30. An optical apparatus having a zooming optical system, the zooming optical system comprising at least a first lens group to a fifth lens group which are disposed in order from an object,
the fourth lens group having negative refractive power and being fixed in an optical axis direction with respect to an image surface, upon zooming from a wide angle end state to a telephoto end state, and
a diaphragm being disposed closer to an image than the fourth lens group, and wherein the first lens group is fixed in the optical axis direction with respect to the image surface, upon zooming from the wide angle end state to the telephoto end state.

31. A manufacturing method for a zooming optical system having at least a first lens group to a fifth lens group which are disposed in order from an object, the method comprising: assembling each lens in a lens barrel, and confirming operation, so that the first lens group has positive refractive power and has at least two subgroups, one of the subgroups is used as a focusing lens group, and the subgroup other than the focusing lens group in the subgroups, is fixed, upon focusing from an infinite object point to a close object point, and the first lens group is fixed in an optical axis direction with respect to an image surface, upon zooming from a wide angle end state to a telephoto end state.

32. The manufacturing method for a zooming optical system according to claim 31, wherein the focusing lens group is a subgroup closest to an image in the subgroups.

33. The manufacturing method for a zooming optical system according to claim 31, wherein at least one of the subgroup closest to the object and the subgroup closest to the image in the subgroups, has positive refractive power.

34. The manufacturing method for a zooming optical system according to claim 31, wherein a condition of the expression $$|f4|/fT<0.210$$

is satisfied, where f4 denotes a focal length of the fourth lens group, and fT denotes a focal length of the zooming optical system in the telephoto end state.

35. The manufacturing method for a zooming optical system according to claim 31, wherein a condition of the expression $$0.570<f3/|f4|<0.880$$

is satisfied, where f3 denotes a focal length of the third lens group, and f4 denotes a focal length of the fourth lens group.

36. A manufacturing method for a zooming optical system having at least a first lens group to a fifth lens group which are disposed in order from an object, the method comprising: assembling each lens in a lens barrel, and confirming operation, so that the first lens group has at least two subgroups, and the subgroup closest to the image in the subgroups, is used as a focusing lens group, and the first lens group is fixed in an optical axis direction with respect to an image surface, upon zooming from a wide angle end state to a telephoto end state.

37. A manufacturing method for a zooming optical system having at least a first lens group to a sixth lens group which are disposed in order from an object, the method comprising: assembling each lens in a lens barrel, and confirming operation, so that any lens group having positive refractive power in the lens groups, has at least two subgroups, at least one of the subgroups is used as a focusing lens group, and the focusing lens group is moved to the object side, upon focusing from an infinite object point to a close object point, and the first lens group is fixed in an optical axis direction with respect to an image surface, upon zooming from a wide angle end state to a telephoto end state.

38. A manufacturing method for a zooming optical system having at least a first lens group to a fifth lens group which are disposed in order from an object, the method comprising: assembling each lens in a lens barrel, and confirming operation, so that the fourth lens group has negative refractive power and is fixed in an optical axis direction with respect to an image surface, upon zooming from a wide angle end state to a telephoto end state, and a diaphragm is disposed closer to an image than the fourth lens group, and the first lens group is fixed in the optical axis direction with respect to the image surface, upon zooming from the wide angle end state to the telephoto end state.

* * * * *